US010469215B2

(12) United States Patent
Rakib et al.

(10) Patent No.: US 10,469,215 B2
(45) Date of Patent: Nov. 5, 2019

(54) ORTHOGONAL TIME FREQUENCY SPACE MODULATION SYSTEM FOR THE INTERNET OF THINGS

(71) Applicant: Cohere Technologies, Inc., Santa Clara, CA (US)

(72) Inventors: Selim Shlomo Rakib, Cupertino, CA (US); Ronny Hadani, Austin, TX (US)

(73) Assignee: COHERE TECHNOLOGIES, INC.

( * ) Notice: Subject to any disclaimer, the term of this patent is extended or adjusted under 35 U.S.C. 154(b) by 360 days.

(21) Appl. No.: 15/143,323

(22) Filed: Apr. 29, 2016

(65) Prior Publication Data

US 2017/0033899 A1    Feb. 2, 2017

Related U.S. Application Data

(63) Continuation-in-part of application No. 14/709,377, filed on May 11, 2015, now Pat. No. 9,729,281, (Continued)

(51) Int. Cl.
*H04L 5/00* (2006.01)
*H04L 29/08* (2006.01)
(Continued)

(52) U.S. Cl.
CPC .......... *H04L 5/0007* (2013.01); *H04L 5/0005* (2013.01); *H04L 5/0016* (2013.01);
(Continued)

(58) Field of Classification Search
CPC .................................................. H04L 5/0007
See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1376338 A | 10/2002 |
| CN | 1579077 A | 2/2005 |

(Continued)

OTHER PUBLICATIONS

Office Action for U.S. Appl. No. 13/117,119, dated Aug. 5, 2013.
(Continued)

*Primary Examiner* — Brandon M Renner
*Assistant Examiner* — Abdeltif Ajid
(74) *Attorney, Agent, or Firm* — Cooley LLP

(57) ABSTRACT

A system and method of operating an Internet of Things (IOT) device and an IOT manager device. The method includes determining, during operation of the IOT device in a low power mode, an orthogonal time frequency space (OTFS) transmission waveform using two-dimensional (2D) channel state information relevant to a delay-Doppler channel domain. The method further includes transmitting, during operation of the IOT device in a high power mode, the OTFS transmission waveform. The process of determining the OTFS transmission waveform may include, for example, receiving, from the IOT manager device, the 2D channel state information and storing it within a memory of the IOT device. Alternatively, at least one OTFS pilot transmission may be received from the IOT manager device and the 2D channel state information determined using the OTFS pilot transmission.

10 Claims, 73 Drawing Sheets

Related U.S. Application Data which is a continuation of application No. 13/927,086, filed on Jun. 25, 2013, now Pat. No. 9,031,141.

(60) Provisional application No. 62/154,937, filed on Apr. 30, 2015, provisional application No. 62/215,663, filed on Sep. 8, 2015, provisional application No. 61/664,020, filed on Jun. 25, 2012, provisional application No. 61/801,398, filed on Mar. 15, 2013, provisional application No. 61/801,366, filed on Mar. 15, 2013, provisional application No. 61/801,435, filed on Mar. 15, 2013, provisional application No. 61/801,495, filed on Mar. 15, 2013, provisional application No. 61/801,994, filed on Mar. 15, 2013, provisional application No. 61/801,968, filed on Mar. 15, 2013.

(51) Int. Cl.

| | | |
|---|---|---|
| *H04L 27/26* | (2006.01) | |
| *H04B 1/707* | (2011.01) | |
| *H04L 23/02* | (2006.01) | |
| *H04L 25/03* | (2006.01) | |
| *H04W 72/00* | (2009.01) | |
| *H04J 11/00* | (2006.01) | |

(52) U.S. Cl.
CPC ........ *H04L 5/0048* (2013.01); *H04L 27/2636* (2013.01); *H04L 27/2639* (2013.01); *H04L 27/2646* (2013.01); *H04L 27/2655* (2013.01); *H04L 27/2697* (2013.01); *H04L 67/10* (2013.01); *H04B 1/707* (2013.01); *H04J 2011/0009* (2013.01); *H04J 2011/0013* (2013.01); *H04J 2011/0016* (2013.01); *H04L 23/02* (2013.01); *H04L 25/03834* (2013.01); *H04W 72/00* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/21* (2018.01); *Y02D 70/22* (2018.01); *Y02D 70/40* (2018.01)

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,654,429 B1 | 11/2003 | Li |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,836 B1 | 1/2011 | Zhidkov |
| 7,864,877 B2 | 1/2011 | Hottinen |
| 8,155,658 B1 | 4/2012 | Gunasekara et al. |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 8,983,511 B2 | 3/2015 | Koo et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,537,575 B2 | 1/2017 | Ashrafi et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 9,866,363 B2 | 1/2018 | Rakib et al. |
| 9,893,922 B2 | 2/2018 | Rakib et al. |
| 9,900,048 B2 | 2/2018 | Hadani et al. |
| 9,912,507 B2 | 3/2018 | Rakib |
| 9,929,783 B2 | 3/2018 | Rakib et al. |
| 9,967,758 B2 | 5/2018 | Hadani et al. |
| 10,003,487 B2 | 6/2018 | Rakib et al. |
| 10,020,854 B2 | 7/2018 | Hadani et al. |
| 10,090,972 B2 | 10/2018 | Hadani et al. |
| 10,090,973 B2 | 10/2018 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0086027 A1 | 5/2004 | Shattil |
| 2004/0131011 A1 | 7/2004 | Sandell et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0136943 A1 | 6/2005 | Banerjee et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211814 A1 | 9/2007 | Walton et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0273624 A1* | 11/2008 | Kent .................. H04B 7/0632 375/296 |
| 2008/0310383 A1 | 12/2008 | Kowalski |
| 2008/0310485 A1 | 12/2008 | Soliman et al. |
| 2009/0080403 A1 | 3/2009 | Hamdi |

(56) References Cited

U.S. PATENT DOCUMENTS

| | | |
|---|---|---|
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0040154 A1 | 2/2010 | Carbonelli et al. |
| 2010/0073232 A1 | 3/2010 | Sajuyigbe et al. |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0203841 A1 | 8/2010 | Hwang et al. |
| 2010/0208676 A1 | 8/2010 | Li et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286498 A1 | 11/2011 | Abrishamkar et al. |
| 2011/0286502 A1 | 11/2011 | Adachi et al. |
| 2011/0287778 A1 | 11/2011 | Levin et al. |
| 2011/0289391 A1 | 11/2011 | Breiling et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0045995 A1* | 2/2012 | Nakano ............... H04J 11/0036 455/63.1 |
| 2012/0051457 A1 | 3/2012 | Ma et al. |
| 2012/0120970 A1 | 5/2012 | Wang et al. |
| 2012/0140716 A1 | 6/2012 | Baldemair et al. |
| 2012/0170531 A1 | 7/2012 | Prasad et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1* | 9/2012 | Liao ................... G06K 19/0723 340/10.1 |
| 2012/0269201 A1 | 10/2012 | Atungsiri et al. |
| 2012/0272117 A1 | 10/2012 | Stadelmeier et al. |
| 2012/0306685 A1* | 12/2012 | Asanuma ............. G01S 13/931 342/149 |
| 2012/0320994 A1 | 12/2012 | Loghin et al. |
| 2013/0003789 A1 | 1/2013 | Eom et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0128932 A1 | 5/2013 | Huang et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0010171 A1 | 1/2014 | Morrill et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0043525 A1 | 2/2015 | Jiang et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0164587 A1 | 6/2016 | Pu et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0117994 A1 | 4/2017 | Ashrafi et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2017/0288710 A1 | 10/2017 | Delfeld et al. |
| 2017/0324601 A1 | 11/2017 | Hadani et al. |
| 2017/0346665 A1 | 11/2017 | Hadani et al. |

FOREIGN PATENT DOCUMENTS

| | | |
|---|---|---|
| CN | 1972272 A | 10/2010 |
| EP | 1432168 A1 | 6/2004 |
| EP | 2375604 A1 | 11/2011 |
| EP | 3314836 A1 | 5/2018 |
| EP | 3378187 A1 | 9/2018 |
| EP | 2865153 | 12/2018 |
| JP | 2011-127910 | 6/2011 |
| WO | WO 2007/004297 | 1/2007 |
| WO | WO-2011/105704 | 1/2011 |
| WO | WO 2011/137699 A1 | 11/2011 |
| WO | WO 2011/150315 A3 | 12/2011 |
| WO | WO 2013/148546 A1 | 10/2013 |
| WO | WO 2014/004585 | 1/2014 |
| WO | WO 2016/014596 | 1/2016 |
| WO | WO 2016/014598 | 1/2016 |
| WO | WO 2016/176642 | 11/2016 |
| WO | WO 2016/183230 | 11/2016 |
| WO | WO 2016/183240 | 11/2016 |
| WO | WO 2016/209848 | 12/2016 |
| WO | WO 2017/003952 | 1/2017 |
| WO | WO 2017/011478 | 1/2017 |

OTHER PUBLICATIONS

Notice of Allowance for U.S. Appl. No. 13/117,119, dated Feb. 28, 2014.

International Search Report and Written Opinion for International Application No. PCT/US2011/038302, dated Nov. 15, 2011.

International Preliminary Report on Patentability for International Application No. PCT/US2011/038302, dated Jun. 4, 2012.

Office Action for U.S. Appl. No. 13/117,124, dated Feb. 22, 2013.

Notice of Allowance for U.S. Appl. No. 13/117,124 dated Aug. 8, 2013.

Examination Report for Australian Application No. 2013280487, dated May 2, 2016.

Supplementary European Search Report for European Application No. 13809004.8, dated Apr. 14, 2016, 8 pages.

Office Action for Japanese Application No. 2015-518647, dated Jul. 7, 2015, 10 pages.

(56) References Cited

OTHER PUBLICATIONS

Notice of Allowance for U.S. Appl. No. 13/927,087, dated Feb. 25, 2015.
Office Action for U.S. Appl. No. 13/927,087, dated Nov. 12, 2014.
International Search Report and Written Opinion for International Application No. PCT/US2013/047723 dated Oct. 29, 2013.
International Preliminary Report on Patentability for International Application No. PCT/US2013/047723 dated Dec. 31, 2014.
Notice of Allowance for U.S. Appl. No. 13/927,088, dated Feb. 18, 2015.
Office Action for U.S. Appl. No. 13/927,088, dated Nov. 28, 2014.
Notice of Allowance for U.S. Appl. No. 13/927,086, dated Dec. 26, 2014.
Notice of Allowance for U.S. Appl. No. 13/927,086, dated Mar. 19, 2015.
Office Action for U.S. Appl. No. 13/927,086, dated Oct. 14, 2014.
Office Action for U.S. Appl. No. 13/927,089, dated Dec. 24, 2014.
Office Action for U.S. App. No. 13/927,089, dated Aug. 14, 2015, 7 pages.
Supplemental Notice of Allowability for U.S. Appl. No. 13/927,091 dated Jun. 11, 2015.
Notice of Allowance for U.S. Appl. No. 13/927,091 dated Apr. 24, 2015.
Office Action for U.S. Appl. No. 13/927,091 dated Jan. 27, 2015.
Office Action for U.S. Appl. No. 13/927,092 dated Oct. 8, 2014.
Notice of Allowance for U.S. Appl. No. 13/927,092 dated Oct. 24, 2014.
Office Action fpr U.S. Appl. No. 13/927,095, dated Apr. 30, 2015, 11 pages.
Office Action fpr U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Patent Examination Report No. 1 for Australian Application No. 2013239970, dated Dec. 8, 2015, 3 pages.
Supplementary European Search Report for European Application No. 13768150.8, dated Oct. 30, 2015, 7 pages.
International Search Report and Written Opinion for International Application No. PCT/US2013/033652, dated Jun. 12, 2013.
"AT&T Investor Report," 2014. [Online]. Available: http://www.att.com/Investor/ATT_Annual/2014/att_introduces_new_concepts_for_telecom_network.html.
Banelli, P. et al., "Modulation Formats and Waveforms for 5G Networks: Who Will Be the Heir of OFDM?," IEEE Signal Processing Magazine, pp. 80-93, 2014.
Catt, "UL Ackinack transmission methods for LTE-A", 3GPP Draft; RAN WG1 R1-102453, Apr. 7, 2010 (Apr. 7, 2010), Beijing, China, XP050419703.
Gurevich et al. "Group Representation Design of Digital Signals and Sequences", S.W. Golomb et al. (Eds.): SETA2008, LNCS 5203, pp. 153-166 (2008).
Holma, H. et al., "LTE for UMTS-OFDMA and SCFDMA Based Radio Access". Jan. 1, 2009 (Jan. 1, 2009), John Wiley & Sons, United Kingdom, XP002728837. See pp. 83-135.
Mecklenbrauker, W., "A Tutorial on Non-Parametric Bilinear Time-Frequency Signal Representations," Time and Frequency Representation of Signals and Systems (Eds. G Longo and B. Picinbono), vol. 309, pp. 11-68, 1989.
Nehorai et al., "MURI: Adaptive waveform design for full spectral dominance," [online], Mar. 11, 2011 [Retrieved on May 11, 2013, Retrieved from the Internet <URL: http://oai.dtic.mil/oai/oai?verb=getRecord&metadataPrefix=html&identifier=ADA565420>.
Rachid, J. E. et al., "NGMN 5G Initiative White Paper," Feb. 17, 2015. [Online]. Available: https://www.ngmn.org/uploads/media/NGMN_5G_White_Paper_V1_0.pdf.
Rusek, F. et al., "Scaling Up MIMO, Opportunities and Challenges with Very Large Arrays," IEEE Signal Processing Magazine, pp. 40-60, 2013.
Vodafone, "Cellular Internet of Things: Architectural Aspects," in 3GPP RAN#68, Malmo, Sweden, 2015.
Office Action for U.S. Appl. No. 14/605,957, dated Jun. 22, 2017, 6 pages.
International Search Report and Written Opinion for International Application No. PCT/US2017/025797, dated Jun. 21, 2017, 6 pages.
Office Action for U.S. Appl. No. 15/152,464, dated Apr. 6, 2017, 10 pages.
Office Action for U.S. Appl. No. 15/188,946, dated May 8, 2017, 14 pages.
Office Action for U.S. Appl. No. 15/194,494, dated May 5, 2017, 16 pages.
Office Action for U.S. Appl. No. 15/436,653, dated Jun. 2, 2017, 10 pages.
Supplementary European Search Report for European Application No. 11787483.4, dated Sep. 9, 2014, 6 pages.
Communication Pursuant to Article 94(3) EPC for European Application No. 13809004.8, dated Feb. 17, 2017, 5 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
International Search Report and Written Opinion for International Application No. PCT/US2016/039662, dated Nov. 29, 2016, 14 pages.
International Search Report and Written Opinion for International Application No. PCT/US2016/041940, dated Oct. 20, 2016, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
International Search Report and Written Opinion for International Application No. PCT/US2016/030259, dated Aug. 4, 2016, 13 pages.
International Search Report and Written Opinion for International Application No. PCT/US2016/031928, dated Oct. 7, 2016, 10 pages.
Examination Report No. 1 for Australian Application No. 2017200197, dated Oct. 26, 2017, 3 pages.
Notice of Reasons for Rejection for Japanese Application No. 2015-198228, dated Mar. 20, 2018, 5 pages.
Office Action for U.S. Appl. No. 15/601,959, dated May 30, 2018, 8 pages.
Office Action for U.S. Appl. No. 15/617,962, dated Sep. 6, 2017, 10 pages.
Office Action for U.S. Appl. No. 15/617,962, dated Feb. 27, 2018, 10 pages.
Office Action for U.S. Appl. No. 15/617,962, dated Aug. 14, 2018, 12 pages.
Office Action for U.S. Appl. No. 15/374,989, dated Jan. 31, 2018, 8 pages.

(56) References Cited

OTHER PUBLICATIONS

Office Action for U.S. Appl. No. 15/258,970, dated Oct. 11, 2017, 10 pages.
Office Action for U.S. Appl. No. 15/258,970, dated Jan. 10, 2018, 7 pages.
Notice of Allowance for U.S. Appl. No. 15/258,970, dated May 9, 2018, 8 pages.
Office Action for U.S. Appl. No. 15/374,995, dated Aug. 7, 2017, 6 pages.
Office Action for U.S. Appl. No. 15/269,793, dated Mar. 9, 2018, 10 pages.
Notice of Allowance for U.S. Appl. No. 15/269,793, dated May 25, 2018, 11 pages.
Notice of Allowance for U.S. Appl. No. 15/478,174, dated Apr. 25, 2018, 9 pages.
Notice of Allowance for U.S. Appl. No. 15/407,941, dated Apr. 27, 2018, 7 pages.
Office Action for U.S. Appl. No. 15/188,946, dated Oct. 31, 2017, 16 pages.
Office Action for U.S. Appl. No. 15/187,671, dated May 25, 2018, 11 pages.
Office Action for U.S. Appl. No. 15/208,545, dated Aug. 21, 2017, 15 pages.
Berger, C. R. et al. (2008) "Compressed Sensing for OFDM/MIMO Radar", IEEE, pp. 213-217.
Office Action for U.S. Appl. No. 15/143,323, dated Dec. 4, 2018, 27 pages.
Extended European Search Report for European Application No. 16787273.8, dated Nov. 26, 2018, 10 pages.
Wunder, G. et al., "Sparse Signal Processing Concepts for Efficient 5G System Design", IEEE Access, vol. 3, pp. 195-208, Mar. 31, 2015, 14 pages.
Cohere Technologies, "5G Air Interface Waveforms", 3GPP RAN workshop on 5G; RWS-150034; Phoenix, USA, Sep. 17-18, 2015, 10 pages.
Extended European Search Report for European Application No. 16793474.4, dated Dec. 19, 2018, 7 pages.
Extended European Search Report for European Application No. 16825056.1, dated Jan. 24, 2019, 11 pages.
Cohere Technologies et al: "OTFS Modulation Waveform and Reference Signals for New RAT", 3GPP Draft; R1-163619 OTFS Waveform for New RAT, 3rd Generation Partnership Project (3GPP), Mobile Competence Centre; 650, Route des Lucioles ; F-06921 Sophia-Antipolis Cedex; France vol. RAN WG1, No. Busan, South Korea; Apr. 15, 2016, Apr. 18, 2016, XP051090363, Retrieved from the Internet: URL:http://www.3gpp.org/ftp/tsg_ran/WG1 RI-I /TSGRI 84b/Docs/ [retrieved on Apr. 18, 2016].
Notice of Allowance for U.S. Appl. No. 15/601,959, dated Feb. 13, 2019, 7 pages.
Office Action issued for Chinese Patent Application No. 201680050535.7 dated Feb. 19, 2019, 13 pages.
Extended European Search Report for European Application No. 16815159.5, dated Feb. 20, 2019, 9 pages.
Extended European Search Report for European Application No. 16818557.7, dated Feb. 20, 2019, 9 pages.
Extended European Search Report for European Application No. 16845070.8, dated Mar. 18, 2019, 10 pages.
Final Office Action for U.S. Appl. No. 15/617,962, dated Apr. 8, 2019, 12 pages.
Notice of Allowance for U.S. Appl. No. 15/208,545, dated Apr. 24, 2019, 9 pages.
Non-Final Office Action for U.S. Appl. No. 15/203,728, dated May 16, 2019, 10 pages.
Yingnan, L. et al. "Estimation of Basis Expansion Models for doubly selective channels", Journal of Electronics (China), Jan. 1, 2008. 25(1): 115-9.
Coleri, S. et al. "Channel estimation techniques based on pilot arrangement in OFDM systems", IEEE Transactions on Broadcasting, Sep. 2002. 48(3): 223-9.

\* cited by examiner

Trajectory of Time Varying
Impulse Response for Accelerating Reflector

RECEIVER (1): $[U1^H] * P^{-1}[U3^H]*[r]) * [U2^H]$

| $r_{11}$ | $r_{12}$ | | $r_{1n}$ |
|---|---|---|---|
| $r_{21}$ | $r_{22}$ | | $r_{2n}$ |
| | | | |
| $r_{n1}$ | $r_{n2}$ | | $r_{nn}$ |

1400

*

| $V^*_{11}$ | $V^*_{12}$ | | $V^*_{1n}$ |
|---|---|---|---|
| $V^*_{21}$ | $V^*_{22}$ | | $V^*_{2n}$ |
| | | | |
| $V^*_{n1}$ | $V^*_{n2}$ | | $V^*_{nn}$ |

1402

$\xrightarrow{P^{-1}}$

| $D'_{11}$ | $D'_{12}$ | | $D'_{1n}$ |
|---|---|---|---|
| $D'_{21}$ | $D'_{22}$ | | $D'_{2n}$ |
| | | | |
| $D'_{n1}$ | $D'_{n2}$ | | $D'_{nn}$ |

| $D'_{11}$ | $D'_{12}$ | | $D'_{1n}$ |
|---|---|---|---|
| $D'_{2n}$ | $D'_{21}$ | | $D'_{2n-1}$ |
| | | | |
| $D'_{n2}$ | $D'_{n3}$ | | $D'_{n1}$ |

1404

=

| $d'_{11}$ | $d'_{12}$ | | $d'_{1n}$ |
|---|---|---|---|
| $d'_{21}$ | $d'_{22}$ | | $d'_{2n}$ |
| | | | |
| $d'_{n1}$ | $d'_{n2}$ | | $d'_{nn}$ |

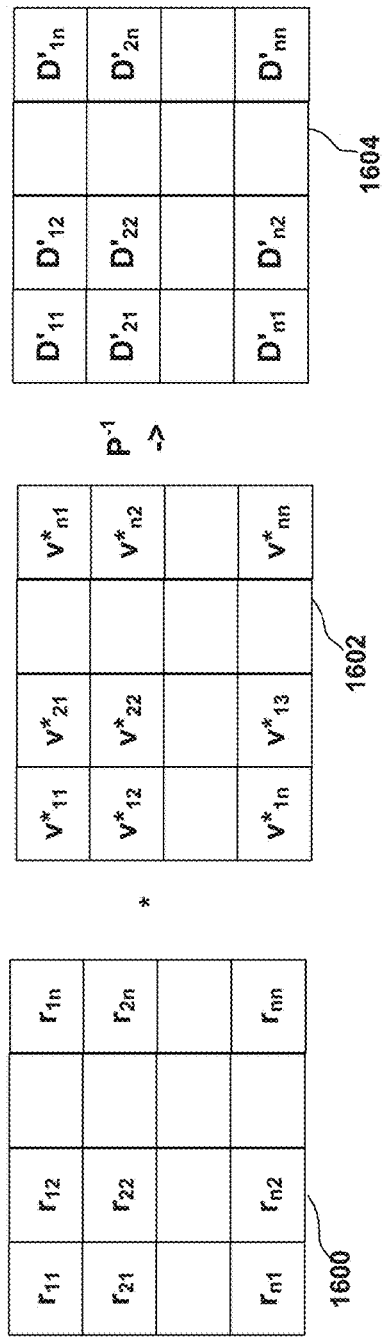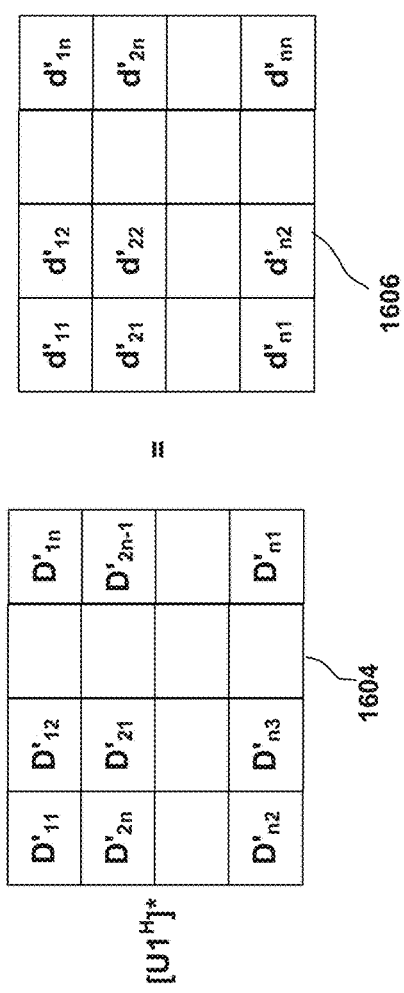
FIG. 16A
FIG. 16B

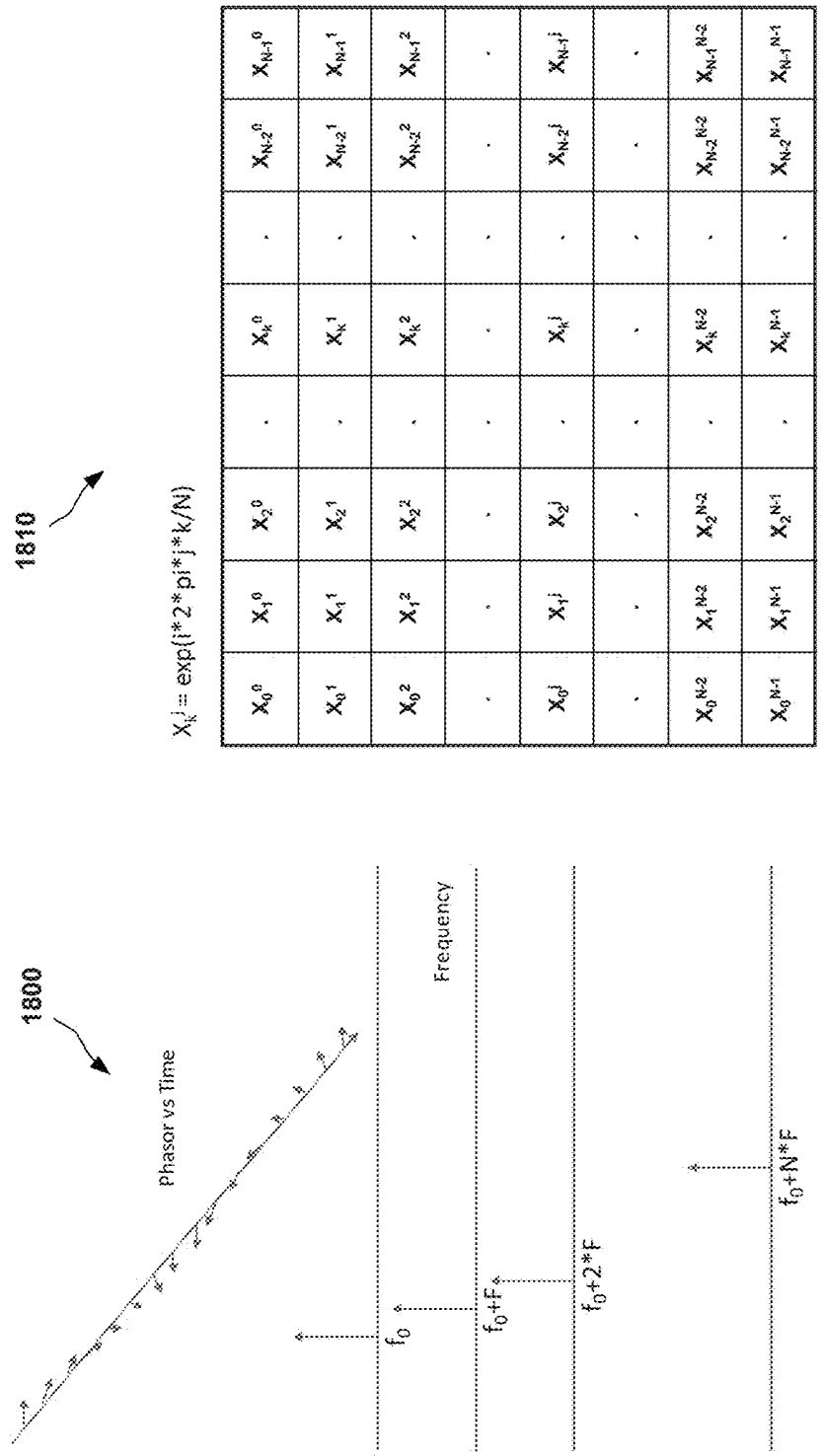

Frame = L x NxN [Symbols]

Duration ≥ N x [L x (NxT + $T_g$)]

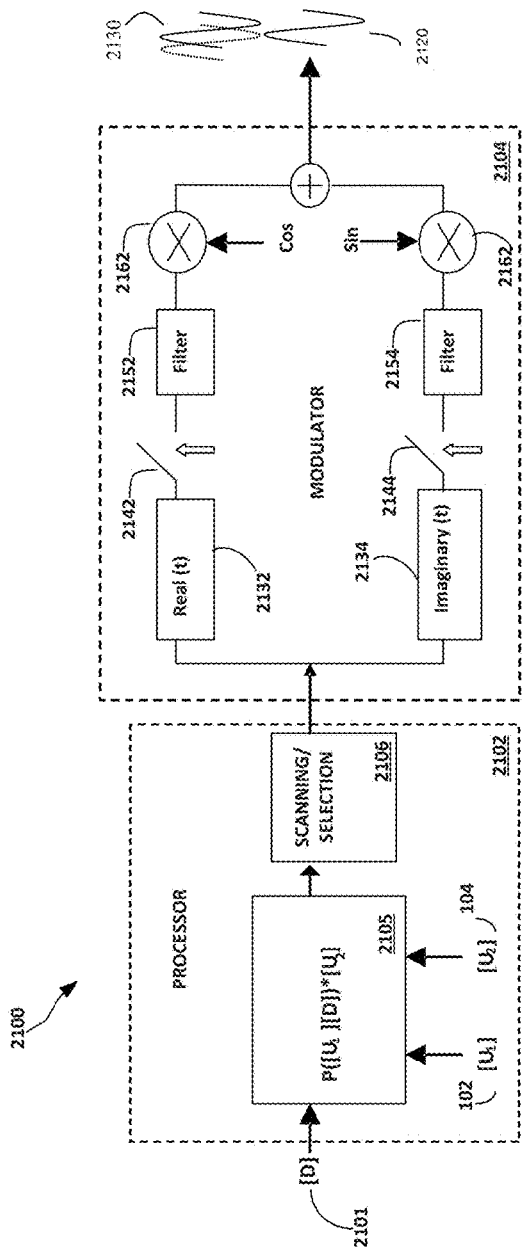
FIG. 21A
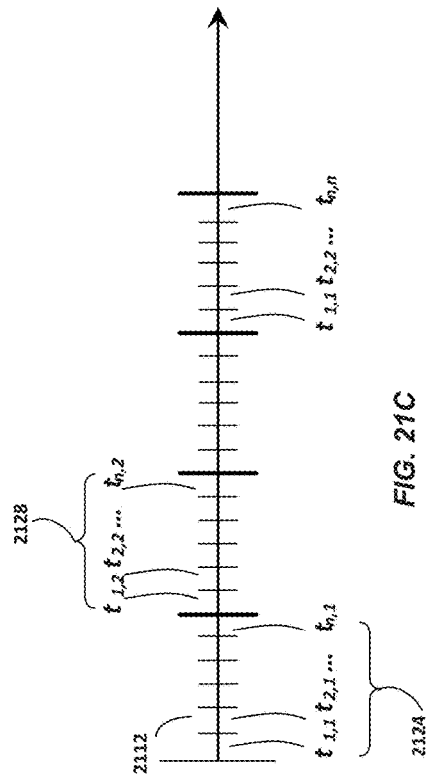
FIG. 21C
FIG. 21B

|  | $\underline{A}^0$ | $\underline{A}^1$ | $\underline{A}^2$ |  |  | $\underline{A}^{N-2}$ | $\underline{A}^{N-1}$ |
|---|---|---|---|---|---|---|---|
|  | $a_{0,0}$ | $a_{0,1}$ | $a_{0,2}$ |  |  | $a_{0,N-2}$ | $a_{0,N-1}$ |
|  | $a_{1,1}$ | $a_{1,2}$ | $a_{1,3}$ |  |  | $a_{1,N-1}$ | $a_{1,0}$ |
|  | $a_{2,2}$ | $a_{2,3}$ | $a_{2,4}$ |  |  | $a_{2,0}$ | $a_{2,1}$ |
|  |  |  |  |  |  |  |  |
|  |  |  |  |  |  |  |  |
|  | $a_{N-2,N-2}$ | $a_{N-2,N-1}$ | $a_{N-2,0}$ |  |  | $a_{N-2,N-4}$ | $a_{N-2,N-3}$ |
|  | $a_{N-1,N-1}$ | $a_{N-1,0}$ | $a_{N-1,1}$ |  |  | $a_{N-1,N-3}$ | $a_{N-1,N-2}$ |

=

|  | $\underline{B}^0$ | $\underline{B}^1$ | $\underline{B}^2$ |  |  | $\underline{B}^{N-2}$ | $\underline{B}^{N-1}$ |
|---|---|---|---|---|---|---|---|
|  | $b_{0,0}$ | $b_{0,1}$ | $b_{0,2}$ |  |  | $b_{0,N-2}$ | $b_{0,N-1}$ |
|  | $b_{1,0}$ | $b_{1,1}$ | $b_{1,2}$ |  |  | $b_{1,N-2}$ | $b_{1,N-1}$ |
|  | $b_{2,0}$ | $b_{2,1}$ | $b_{2,2}$ |  |  | $b_{2,N-2}$ | $b_{2,N-1}$ |
|  |  |  |  |  |  |  |  |
|  |  |  |  |  |  |  |  |
|  | $b_{N-2,0}$ | $b_{N-2,1}$ | $b_{N-2,2}$ |  |  | $b_{N-2,N-2}$ | $b_{N-2,N-1}$ |
|  | $b_{N-1,0}$ | $b_{N-1,1}$ | $b_{N-1,2}$ |  |  | $b_{N-1,N-2}$ | $b_{N-1,N-1}$ |

= $\underline{B}$ $b_{i,j} = a_{i,(i+j) \bmod N}$

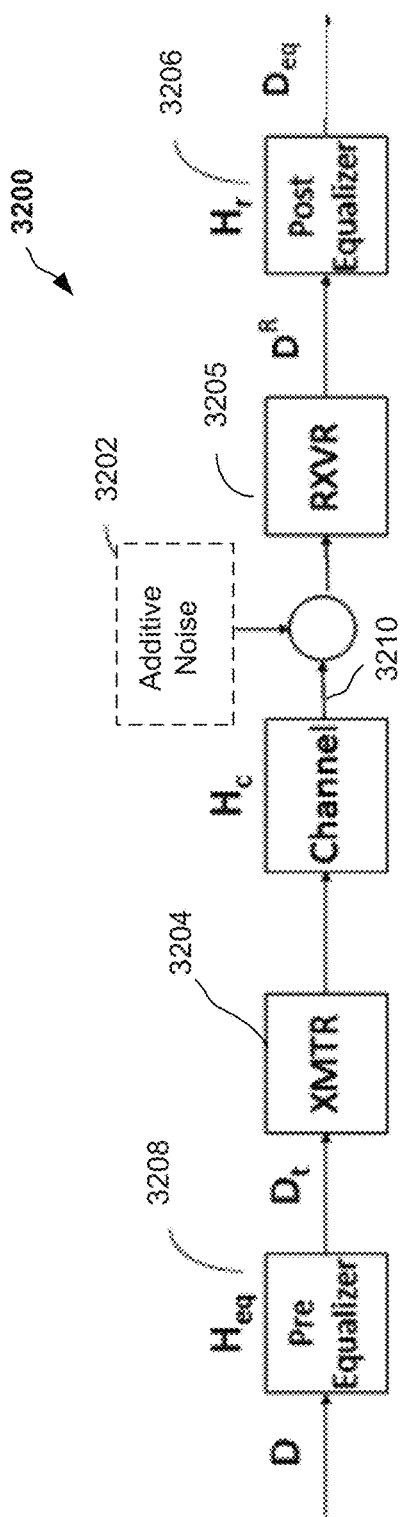
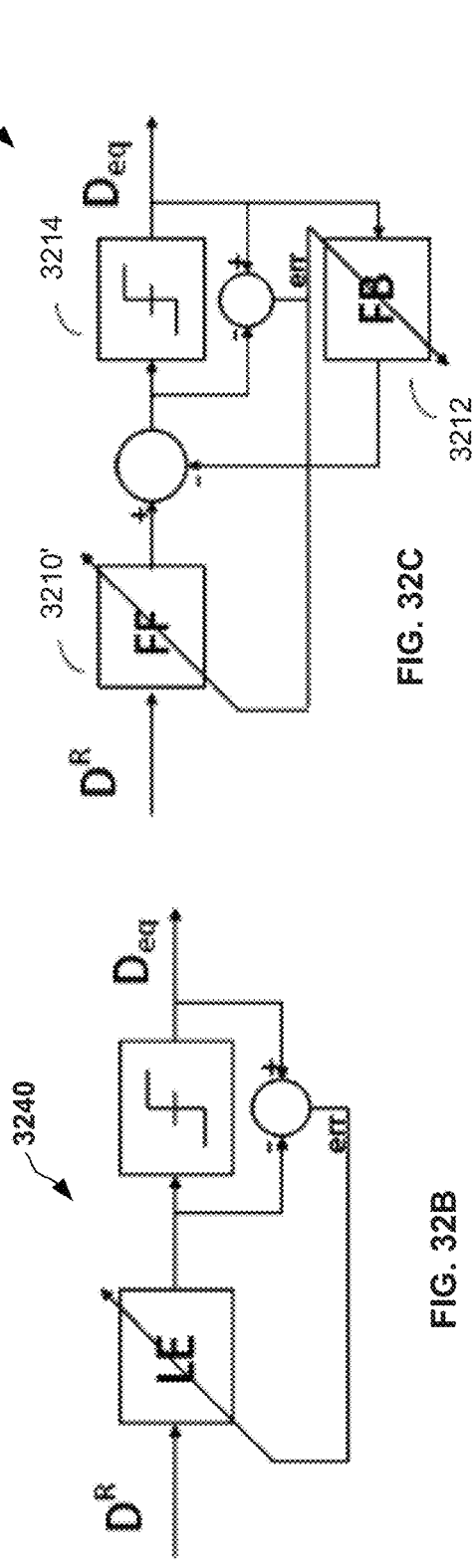
FIG. 32A
FIG. 32B
FIG. 32C

Transformation of the Time-Frequency Plane to the Doppler-Delay Plane

Notation Used to Denote Signals at Various Stages of Transmitter and Receiver

Conceptual Implementation of the Heisenberg Transform in the Transmitter and the Wigner Transform in the Receiver

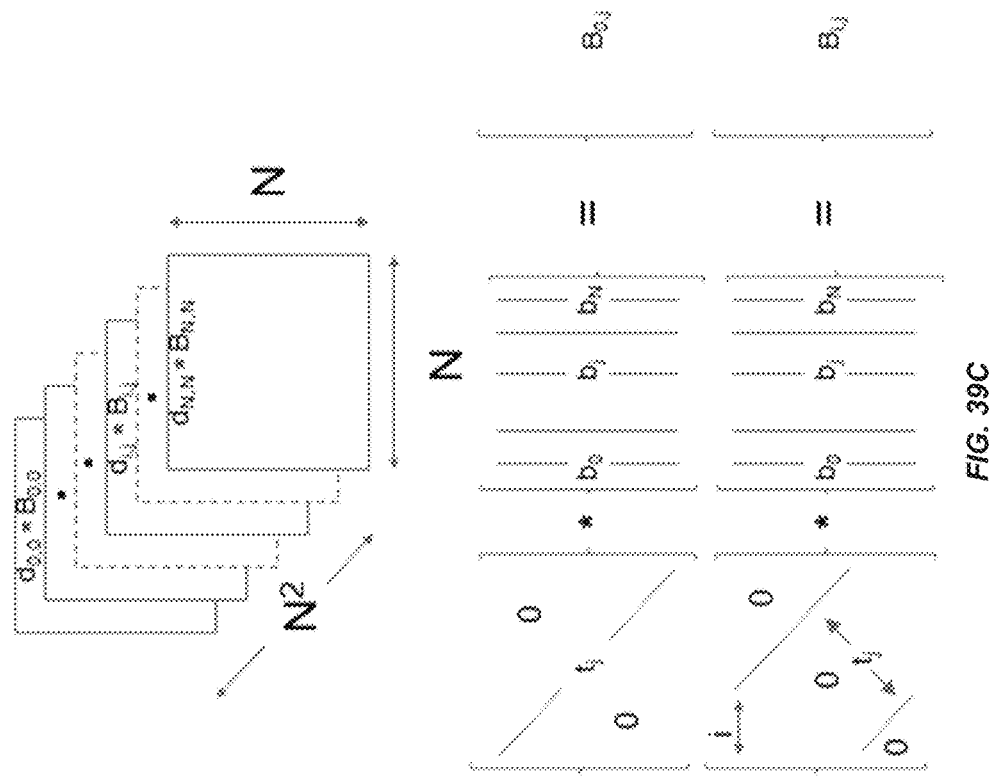
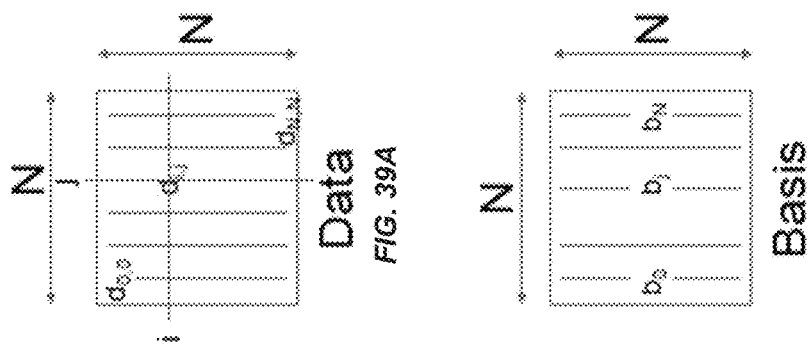
FIG. 39A FIG. 39B FIG. 39C

Multiplexing Three Users in the Time-Frequency Domain with Interleaving

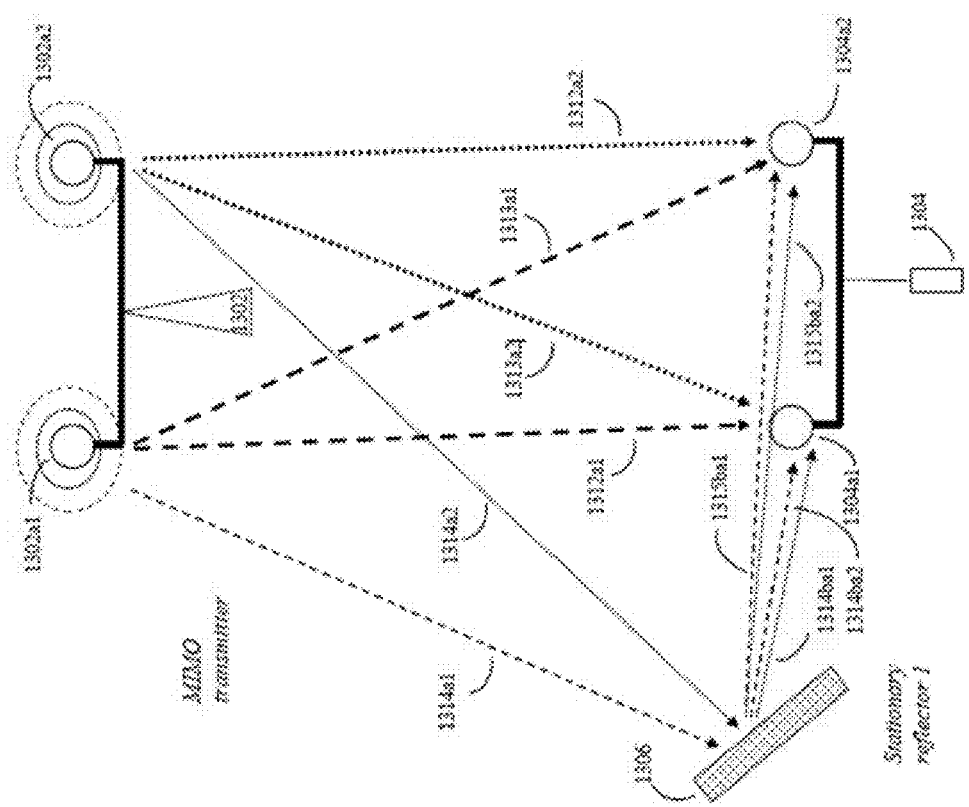

ORTHOGONAL TIME FREQUENCY SPACE MODULATION SYSTEM FOR THE INTERNET OF THINGS

CROSS-REFERENCE TO RELATED APPLICATIONS

The present application claims the benefit of priority under 35 U.S.C. § 119(e) of U.S. Provisional Application No. 62/154,937, entitled SYSTEM AND METHOD TO PRODUCE AN OTFS WIRELESS CONNECTED INTERNET OF THINGS, filed Apr. 30, 2015, and of U.S. Provisional Application No. 62/215,663, entitled ORTHOGONAL TIME FREQUENCY SPACE COMMUNICATION SYSTEM AND METHOD, filed Sep. 8, 2015, the contents of each of which are hereby incorporated by reference in their entirety for all purposes. The present application is a continuation-in-part of U.S. application Ser. No. 14/709,377, entitled MODULATION AND EQUALIZATION IN AN ORTHONORMAL TIME-FREQUENCY SHIFTING COMMUNICATIONS SYSTEM, filed May 11, 2015, which is a continuation of U.S. patent application Ser. No. 13/927,086, entitled MODULATION AND EQUALIZATION IN AN ORTHONORMAL TIME-FREQUENCY SHIFTING COMMUNICATIONS SYSTEM, filed on Jun. 25, 2013, which claims the benefit of priority under 35 U.S.C. § 119(e) of U.S. Provisional Application Ser. No. 61/664,020, entitled MODULATION AND EQUALIZATION IN AN ORTHONORMAL TIME-FREQUENCY SHIFTING COMMUNICATIONS SYSTEM, filed Jun. 25, 2012, of U.S. Provisional Application Ser. No. 61/801,398, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,366, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,435, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,495, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,994, entitled MODULATION AND EQUALIZATION IN AN ORTHONORMAL TIME-FREQUENCY SHIFTING COMMUNICATIONS SYSTEM, filed Mar. 15, 2013, and of U.S. Provisional Application Ser. No. 61/801,968, entitled MODULATION AND EQUALIZATION IN AN ORTHONORMAL TIME-FREQUENCY SHIFTING COMMUNICATIONS SYSTEM, filed Mar. 15, 2013, the contents of each of which are hereby incorporated by reference in their entirety for all purposes.

FIELD

This disclosure generally relates to wireless communication protocols and methods, and more particularly relates to methods for wireless communication involving devices useable within the Internet of Things.

BACKGROUND

In recent years, there has been a large amount of interest in providing computer network connectivity, in particular Internet connectivity, to nearly every conceivable device. This type of effort has been commonly been termed the "Internet of Things" (abbreviated as either IoT or IOT). Indeed, the IOT is commonly understood to be a concept, system, or method, by which everyday objects may be connected to computer networks such as the Internet. Each IOT device or "thing" may be uniquely identifiable through its embedded computing system and is able to interoperate within the existing Internet infrastructure. In many applications, the IOT devices used to provide IOT functionality will often have very limited access to electrical energy and often must be relatively small and inexpensive.

Although in principle any device, including large devices directly connected to high capacity energy sources and equipped with high power consumption processors, can be connected to the Internet, the term IOT is often used in conjunction with devices that may have little or no access to energy beyond built-in battery energy or other limited energy sources. Often, these limited energy sources are expected to operate the IOT device for periods of years or more.

It is also envisioned that many IOT devices, in particular IOT sensors, should be able to operate over relatively long periods of time with little or no need for Internet or other computer network connectivity. That is, a typical IOT device may often have long periods of low activity and low communications needs, followed by occasional periods where higher activity and higher communications needs may be required.

To reduce power and energy demands, processors commonly used for IOT functions, such as processors from the popular ARM family of processors, typically can be configured to operate at a variety of different clock speeds and to shut down some or all portions of its processor core when not all of processing capability is needed. These various processor states can save a considerable amount of energy because, to a first approximation, processor power use (e.g. energy use per unit time) is often proportional to the processor's clock speed, which is the frequency of operation of the processor's central processing unit (CPU). Certain processors may be configured to operate in various power consumption states, such as in (i) an ultra-low power consumption state where only basic timekeeping circuits and/or interrupt wakeup circuits may be activated, (ii) a low power state, where the processor is fully functioning but operating at perhaps ⅕ to ¹⁄₁₀ or less of its highest clock speed and power needs, and (iii) a high power consumption state where the processor is operating at or near its highest clock speed. Typically such processors will also have timing or clock circuitry that can be configured to "wake up" the processor at various intervals, and cause the processor to transition, for example, from an ultra-low to low power mode, or from low-power mode to high power mode. The processor can spend most of its time idling at a lower power consumption mode, and only transition to high power consumption mode when needed.

Although some IOT devices may connect to larger computer networks, such as the internet, with hard-wire network connections such as electrical wires or cables, optical fiber, and the like, for many potential IOT devices, wireless network connection methods is often either preferred, or indeed may be the only feasible method. Here prior art wireless connectivity schemes, such as the popular IEEE 802.11 (WiFi) methods, IEEE 802.15 (Bluetooth™) methods, IEEE. 802.15.4 (ZigBee™) methods, Z-wave™ wireless mesh methods, and the like may be used. Wireless mesh network schemes can help enable the relatively low power IOT wireless signals to be transmitted from various IOT devices to various Internet access points.

However these prior art wireless methods tend to have both a significant amount of both power consumption and computational overhead associated with them. Additionally, because such prior art wireless methods can be easily disrupted due to various types of channel imperfections, it is often necessary to expend yet more energy and overhead in encoding, verifying, and retransmitting information packets in order to cope with such disruptions.

SUMMARY

The present disclosure is based, in part, upon the insight that the usefulness and performance of IOT devices may be improved by utilizing orthogonal time frequency space (OTFS) modulation techniques, typically on an occasional basis and in accordance with various power-sparing modes of operation, in order to facilitate communication with IOT devices.

The present disclosure is also based, in part, on the insight that the wireless mesh networks often used provide network connectivity to IOT devices suffer from a number of drawbacks. For example, in order to maintain such mesh networks, which are composed of other wirelessly connected IOT devices, such other IOT devices are usually required to wake up, listen for signals, and report in at a certain rate. This requires that every IOT device in the mesh network regularly expend energy. By contrast, OTFS methods reduce the need for such mesh networks. This is because the unique channel state mitigating and compensation aspects of the OTFS methods described herein allow IOT devices to transmit wireless signals directly to a wireless base station using similar amounts of energy as are typically required for the far shorter transmission distances between mesh network nodes. By allowing longer distance transmissions on the same or lower energy budget that prior art IOT devices use for shorter range communications, OTFS methods can reduce or eliminate the need for wireless IOT devices to support the overhead of a mesh network and can minimize the need for access to energy sources.

Nonetheless, the OTFS methods described herein may be computationally intensive. Thus, in certain embodiments the energy demands associated with OTFS communication can be reduced by, for example, capturing, digitizing and storing OTFS waveforms while running in higher processor power modes. Because many IOT devices are idling in lower processor power modes for much of the time, it may often then be feasible to slowly (often while the processors running in a slower, lower-power mode, then interpret the stored waveforms and related information. Similarly, in the case of transmission waveforms, it often may be feasible to, while the processor may be running in a slower, lower power mode, to slowly generate OTFS waveforms intended for transmission and store these OTFS waveforms in the IOT device memory in a digital form. Then, when transmission is desired, the IOT device processor may transition into a higher power mode, rapidly convert (e.g. using a A/D converter) these digital waveforms into an analog form and transmit them.

Such novel OTFS IOT devices may also impose novel device management and control demands. Accordingly, the present disclosure also describes a new type of wireless IOT manager device as well as schemes for managing the IOT devices. For example, it will generally be necessary or desirable to provide an Internet address or "ID" for each IOT device, such as an IPv4 or IPv6 address, Universal Resource Identifier (URI), Universal Resource Locator (URL0), and the like. In one implementation the IOT device may itself, of course, incorporate an IPv4 or IPv6 or other URI/URL type address and only communicate and respond using this type address. However, for higher efficiency an IOT device operating under the control of an IOT manager device might communicate with the IOT manager device using a shorter address. The IOT manger device may, for example, act to translate between the IOT device's shorter address and the longer and more standard IPv4 or IPv6 or other URI/URL addresses. This requires less overhead and energy than would typically be required to perform addressing operations using conventional wireless communication protocols.

Thus, in one aspect the present disclosure pertains to a wireless OTFS system, IOT device system, or method of connecting at least one low power IOT device to at least one wireless IOT manager device over an impaired wireless data channel. The IOT device can comprise at least one processor configured to operate in a plurality of power modes, such as at least a lower power mode and a higher power mode. The IOT device can also comprise memory, at least one timer device, and at least one clock controlled by the timer device. The IOT device may be associated with an IOT device identification or ID. A wireless transceiver of the IOT device will generally be capable of operating at least when the processor of the IOT device is running in a higher power mode.

The internal clock of the IOT device may "wake up" or otherwise configure the processor(s) of the IOT device to transition from a lower power mode having less computational capability to a higher power mode having relatively higher computational capability. In this higher power mode the IOT device may, for example, wirelessly transmit various OTFS pilot bursts and/or OTFS data symbol waveform bursts to various OTFS receivers to an IOT manager device.

In another aspect the disclosure relates to a method of operating an IOT device. The method includes determining, during operation in a low power mode, an OTFS transmission waveform using two-dimensional (2D) channel state information relevant to a delay-Doppler channel domain. The method further includes transmitting, during operation in a high power mode, the OTFS transmission waveform. The process of determining the OTFS transmission waveform may include, for example, receiving, from an IOT manager device, the 2D channel state information and storing it within a memory. Alternatively, at least one OTFS pilot transmission may be received from the IOT manager device and the 2D channel state information determined using the OTFS pilot transmission.

The disclosure also pertains to a method of operating an IOT device which includes initially operating a processor of the IOT device in a low power mode. The operation of the processor is then transitioned to operation in a high power mode at a scheduled time or in response to, for example, a sensor signal. The method further includes transmitting an OTFS waveform during the operation of the processor in the high power mode. The processor then transitions to operation in the low power mode after the OTFS waveform has been transmitted. The process of determining the OTFS transmission waveform may include, for example, receiving, from an IOT manager device, the 2D channel state information and storing it within a memory. Alternatively, at least one OTFS pilot transmission may be received from the IOT manager device and the 2D channel state information determined using the OTFS pilot transmission. The 2D channel state information may be with respect to a delay-Doppler channel domain.

The IOT device may be included among a plurality of IOT devices in wireless communication with the IOT manager device. In one implementation the plurality of IOT devices are configured to transmit OTFS waveforms generated using OTFS data symbols occupying locations within an OTFS data frame uniquely corresponding to ones of the plurality of IOT devices.

The disclosure is also directed to a method of operating an IOT device which includes selecting an OTFS data symbol in response to an input signal. An OTFS waveform is generated using the OTFS data symbol and two-dimensional (2D) channel state information. The OTFS data symbol may be included within an OTFS data frame wherein the IOT device is included among a plurality of IOT devices uniquely associated with locations within the OTFS data frame. The method further includes transmitting the OTFS waveform.

In yet another aspect the disclosure pertains to a method for operating an IOT manager device in wireless communication with a plurality of IOT devices. The method includes receiving, from the plurality of IOT devices, a corresponding plurality of sets of OTFS pilot waveforms. A plurality of two-dimensional (2D) channel states are then determined based upon the plurality of sets of OTFS pilot waveforms. Information relating to the plurality of 2D channel states may then be transmitted to corresponding ones of the plurality of IOT devices. Each of the 2D channel states may be with respect to a delay-Doppler channel domain.

Aspects of the disclosure are also directed to a method for operating an IOT manager device in wireless communication with a plurality of IOT devices. The method includes transmitting OTFS pilot waveforms generated using OTFS pilot symbols occupying locations within an OTFS data frame reserved for the pilot symbols. A plurality of OTFS data transmissions are received from the plurality of IOT devices wherein the plurality of OTFS data transmissions are generated using a corresponding plurality of OTFS data symbols associated with a plurality of locations in the OTFS data frame respectively corresponding to the plurality of IOT devices. In one implementation the plurality of locations are different from the locations within the OTFS data frame reserved for the pilot symbols.

In a further aspect the disclosure pertains to an IOT device including a wireless transceiver, a processor capable of operating in a low power mode and in a high power mode, and a memory including program code executable by a processor. The program code may be configured to effectuate any of the above-described methods pertinent to operating an IOT device.

The disclosure is further directed to an IOT manager device in wireless communication with a plurality of IOT devices. The IOT manager device includes a wireless transceiver, a processor and a memory including program code executable by a processor. The program code may be configured to effectuate any of the above-described methods pertinent to operating an IOT manager device.

BRIEF DESCRIPTION OF THE DRAWINGS

For a better understanding of the nature and objects of various embodiments of the invention, reference should be made to the following detailed description taken in conjunction with the accompanying drawings, wherein:

FIGS. 14A and 14B illustrate operations performed by a receiver consistent with the first alternative OTFS scheme.

FIGS. 16A and 16B illustrate operations performed by a receiver consistent with the second alternative OTFS scheme.

FIG. 18A illustrates a unitary matrix [U1] in the form of a DFT matrix representative of a frequency division multiplexed transmission basis.

FIG. 18B is an illustration including a set of time lines representing the transmission of multiplexed signals using rotating phasers of different frequency offset or tone.

FIG. 21A shows a more detailed diagram of one embodiment of an OTFS transmitter module.

FIG. 21B depicts a TFS matrix generated within the OTFS transmitter of FIG. 21A.

FIG. 21C depicts a timeline relevant to operation of the transmitter of FIG. 21A.

FIG. 22 illustrates an exemplary permutation operation that can be used in an OTFS modulation scheme.

FIG. 23 illustrates another exemplary permutation operation that can be used in an OTFS modulation scheme.

FIG. 32A shows an example of a communications channel in which echo reflections and frequency shifts can blur or impair or distort a transmitted signal.

FIG. 32B shows an example of an adaptive linear equalizer that may be used to correct for distortions.

FIG. 32C shows an example of an adaptive decision feedback equalizer that may be used to correct for distortions.

FIGS. 39A-39C illustrate one manner in which OTFS encoding using a pair of transform matrices or frames can spread $N^2$ data symbols $d_{ij}$ into $N^2$ different basis matrices $B_{ij}$ of basis frames $F_{ij}$.

FIGS. 59A-59C exemplify the use of MIMO techniques in an OTFS communication system.

DETAILED DESCRIPTION

Disclosed herein are systems, methods and devices for establishing and maintaining communication between IOT devices and one or more IOT managers using OTFS communication techniques. In order to facilitate understanding of these various systems, methods and devices, an explanation of an exemplary OTFS communication system and techniques is provided prior to discussing the integration of such techniques within IOT devices and systems.

Exemplary OTFS Communication System

As is discussed below, OTFS is a modulation technique that involves transmitting each information symbol by modulating a two-dimensional (2D) basis function on the time-frequency plane. In exemplary embodiments the modulation basis function set is specifically derived to best represent the dynamics of the time varying multipath channel. In this way OTFS transforms the time-varying multipath channel into a time invariant delay-Doppler two dimensional convolution channel. This effectively eliminates the difficulties in tracking time-varying fading in, for example, communications involving high speed vehicles.

OTFS increases the coherence time of the channel by orders of magnitude. It simplifies signaling over the channel using well studied AWGN codes over the average channel SNR. More importantly, it enables linear scaling of throughput with the number of antennas in moving vehicle applications due to the inherently accurate and efficient estimation of channel state information (CSI). In addition, since the delay-Doppler channel representation is very compact, OTFS enables massive MIMO and beamforming with CSI at the transmitter for four, eight, and more antennas in moving vehicle applications. The CSI information needed in OTFS is a fraction of what is needed to track a time varying channel.

In deep building penetration use cases, one QAM symbol may be spread over multiple time and/or frequency points. This is a key technique to increase processing gain and in building penetration capabilities for IoT deployment and PSTN replacement applications. Spreading in the OTFS domain allows spreading over wider bandwidth and time durations while maintaining a stationary channel that does not need to be tracked over time.

These benefits of OTFS will become apparent once the basic concepts behind OTFS are understood. There is a rich mathematical foundation of OTFS that leads to several variations; for example it can be combined with OFDM or with multicarrier filter banks. Prior to proceeding to a detailed discussion of OTFS, various drawbacks of communication systems predicated on one-dimensional channel models are first described.

Figure 1:
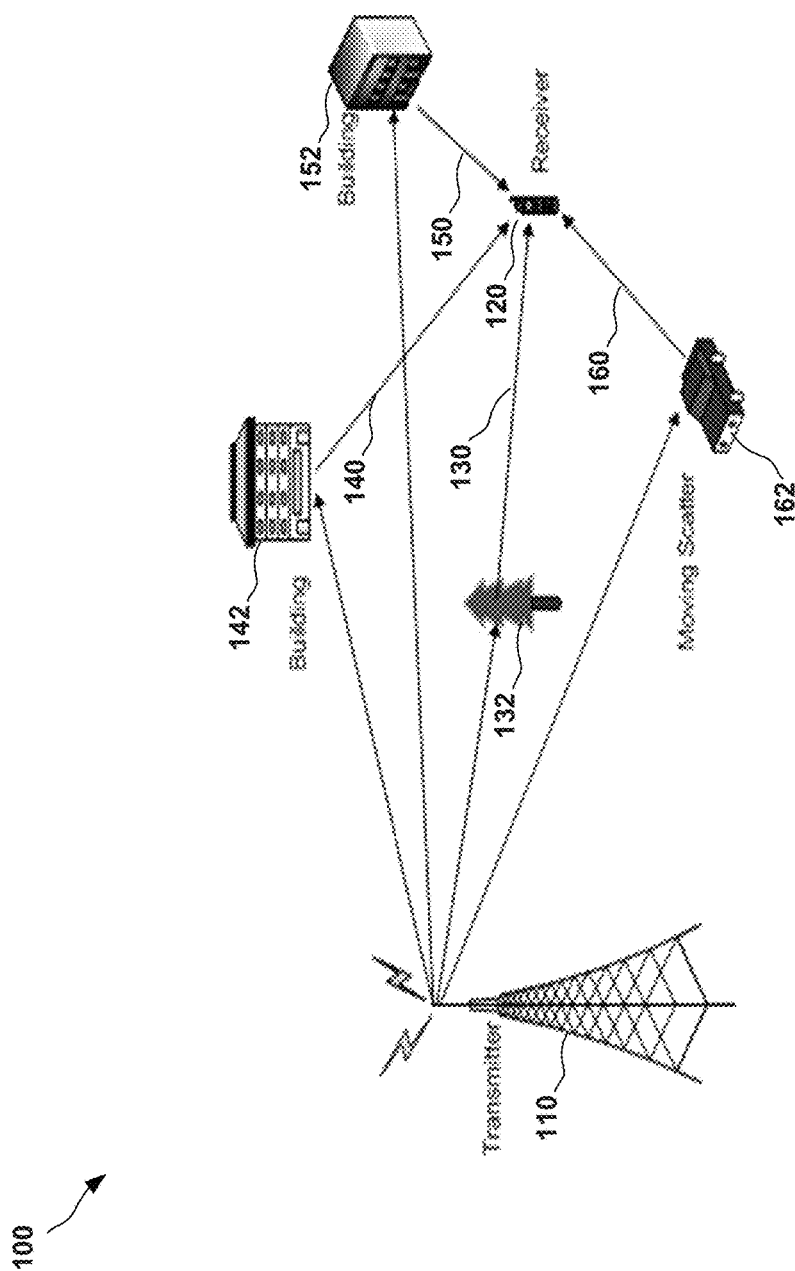
FIG. 1 illustrates an example of a wireless communication system that may exhibit time/frequency selective fading.

FIG. 1 illustrates an example of a wireless communication system 100 that may exhibit time/frequency selective fading. The system 100 includes a transmitter 110 (e.g., a cell phone tower) and a receiver 120 (e.g., a cell phone). The scenario illustrated in FIG. 1 includes multiple pathways (multi-path) that the signal transmitted from the transmitter 100 travels through before arriving at the receiver 100. A first pathway 130 reflects through a tree 132, second pathway 140 reflects off of a building 142 and a third pathway 150 reflects off of a second building 152. A fourth pathway 160 reflects off of a moving car 162. Because each of the pathways 130, 140, 150 and 160 travels a different distance, and is attenuated or faded at a different level and at a different frequency, when conventionally configured the receiver 120 may drop a call or at least suffer low throughput due to destructive interference of the multi-path signals.

Figure 43:
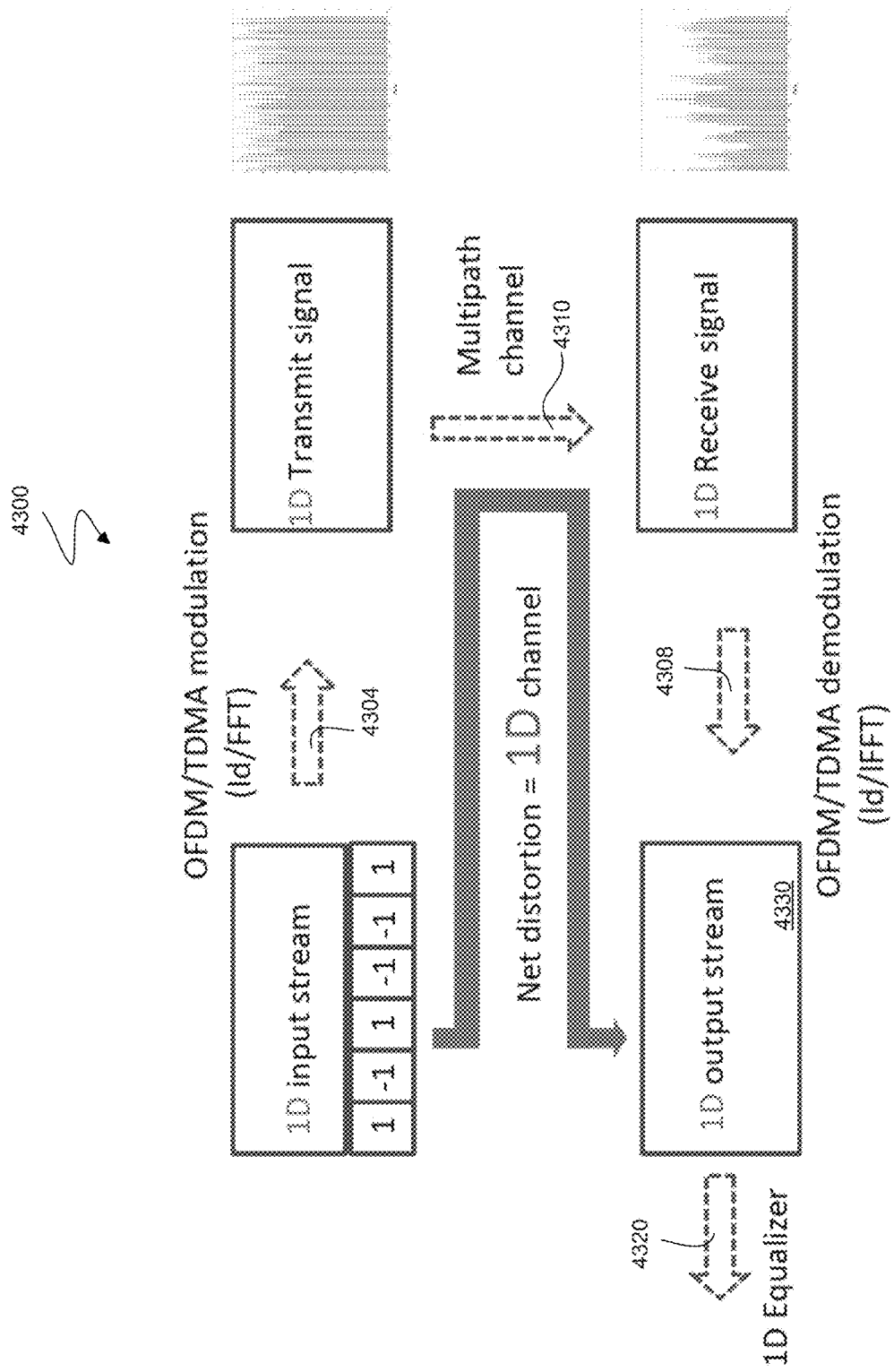
FIG. 43 provides a high-level representation of a conventional transceiver which could be utilized in an exemplary wireless communication system.

Turning now to FIG. 43, a high-level representation is provided of a conventional transceiver 4300 which could be utilized in the wireless communication system 100 of FIG. 1. The transceiver 4300 could, for example, operate in accordance with established protocols for time-division multiple access (TDMA), code-division multiple access (CDMA) or orthogonal frequency-division multiple access (OFDM) systems. In conventional wireless communication systems such as TDMA, CDMA, and OFDM) systems, the multipath communication channel 4310 between a transmitter 4304 and a receiver 4308 is represented by a one-dimensional model. In these systems channel distortion is characterized using a one-dimensional representation of the impulse response of the communication channel. The transceiver 4300 may include a one-dimensional equalizer 4320 configured to at least partially remove this estimated channel distortion from the one-dimensional output data stream 4330 produced by the receiver 4308.

Unfortunately, use of a one-dimensional channel model presents a number of fundamental problems. First, the one-dimensional channel models employed in existing communication systems are non-stationary; that is, the symbol-distorting influence of the communication channel changes from symbol to symbol. In addition, when a channel is modeled in only one dimension it is likely and possible that certain received symbols will be significantly lower in energy than others due to "channel fading". Finally, one-dimensional channel state information (CSI) appears random and much of it is estimated by interpolating between channel measurements taken at specific points, thus rendering the information inherently inaccurate. These problems are only exacerbated in multi-antenna (MIMO) communication systems. As is discussed below, embodiments of the OTFS method described herein can be used to substantially overcome the fundamental problems arising from use of a one-dimensional channel model.

The multipath fading channel is commonly modeled one-dimensionally in the baseband as a convolution channel with a time varying impulse response $$r(t)=\int \tilde{h}(\tau,t)s(t-\tau)d\tau \tag{1}$$

where s(t) and r(t) represent the complex baseband channel input and output respectively and where $\tilde{h}(\tau, t)$ is the complex baseband time varying channel response.

This representation, while general, does not give us insight into the behavior and variations of the time varying impulse response. A more useful and insightful model, which is also commonly used for Doppler multipath doubly fading channels is $$r(t) = \iint h(\tau,\nu)e^{j2\pi\nu(t-\tau)}s(t-\tau)d\nu d\tau \quad (2)$$

In this representation, the received signal is a superposition of reflected copies of the transmitted signal, where each copy is delayed by the path delay $\tau$, frequency shifted by the Doppler shift $\nu$ and weighted by the time-independent delay-Doppler impulse response $h(\tau, \nu)$ for that $\tau$ and $\nu$. In addition to the intuitive nature of this representation, Eq. (2) maintains the generality of Eq. (1). In other words it can represent complex Doppler trajectories, like accelerating vehicles, reflectors etc. This can be seen if we express the time varying impulse response as a Fourier expansion with respect to the time variable t $$\tilde{h}(\tau,t) = \int h(\tau,\nu)e^{j2\pi\nu t}d\nu \quad (3)$$

Figure 2A:
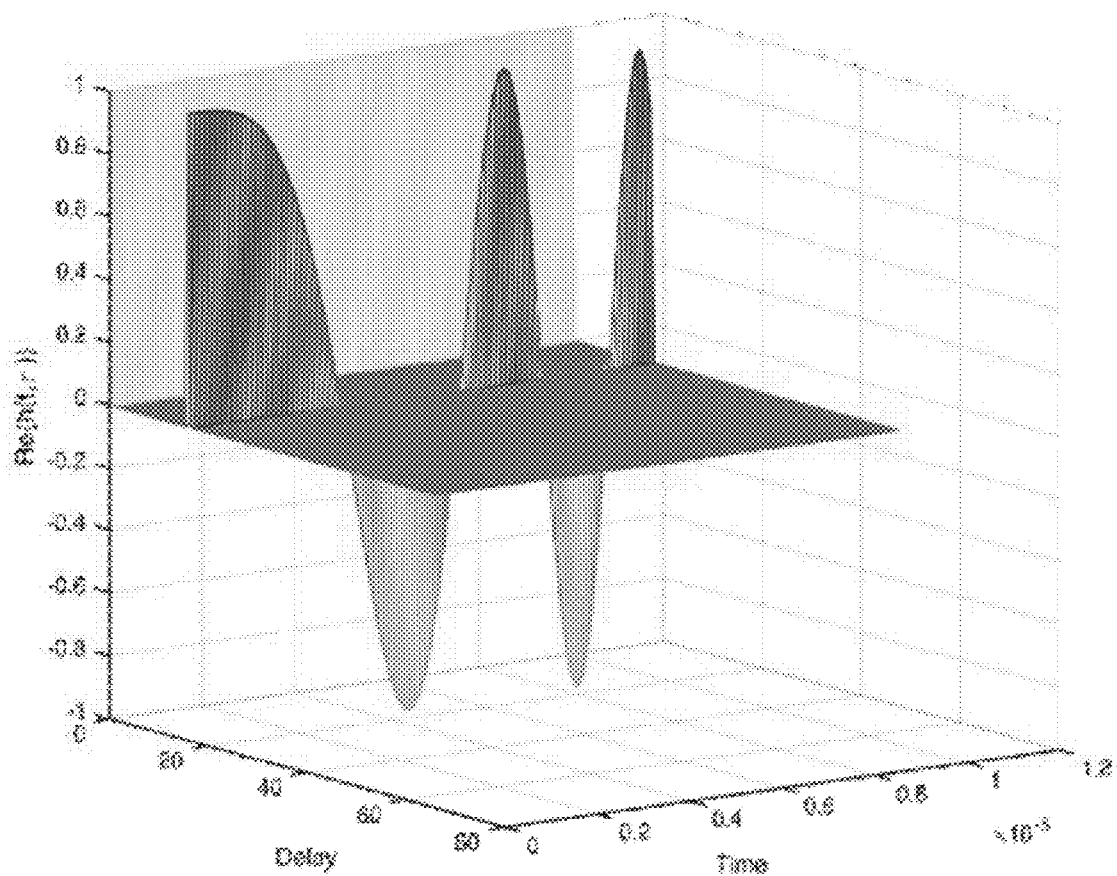
FIG. 2A shows the time-varying impulse response for an accelerating reflector in the $(\tau, t)$ coordinate system.
Figure 2B:
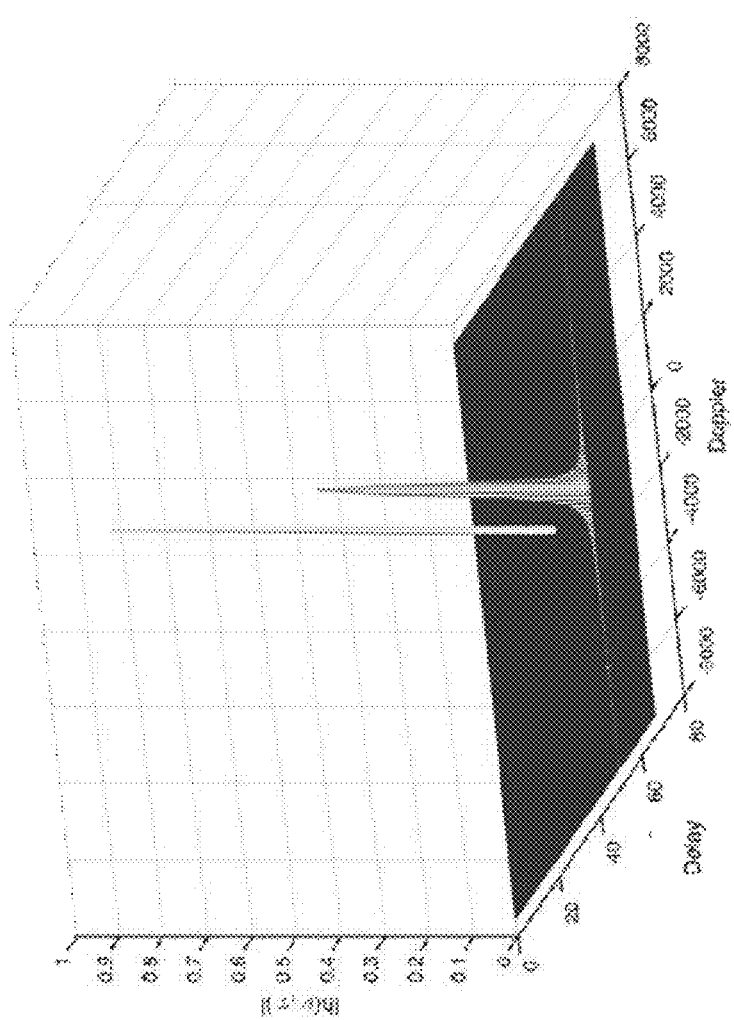
FIG. 2B shows the channel of FIG. 2A represented as a time invariant impulse response in the $(\tau, v)$ coordinate system.

Substituting (3) in (1) we obtain Eq. (2) after some manipulation. As an example, FIG. 2A shows the time-varying impulse response for an accelerating reflector in the $(\tau, t)$ coordinate system, while FIG. 2B shows the same channel represented as a time invariant impulse response in the $(\tau, \nu)$ coordinate system.

An important feature revealed by these two figures is how compact the $(\tau, \nu)$ representation is compared to the $(\tau, t)$ representation. This has important implications for channel estimation, equalization and tracking as will be discussed later.

Notice that while $h(\tau, \nu)$ is, in fact, time-independent, the operation on $s(t)$ is still time varying, as can be seen by the effect of the explicit complex exponential function of time in Eq. (2). The technical efforts in this paper are focused on developing a modulation scheme based on appropriate choice of orthogonal basis functions that render the effects of this channel to become truly time-independent in the domain defined by those basis functions. The proposed scheme has the following high level outline.

Let us consider a set of orthonormal basis functions $\phi_{\tau,\nu}(t)$ indexed by $\tau$, $\nu$ which are orthogonal to translation and modulation, i.e., $$\phi_{\tau,\nu}(t-\tau_0) = \phi_{\tau+\tau_0,\nu}(t)$$

$$e^{j2\pi\nu_0 t}\phi_{\tau,\nu}(t) = \phi_{\tau,\nu-\nu_0}(t) \quad (4)$$

and let us consider the transmitted signal as a superposition of these basis functions $$s(t) = \iint x(\tau,\nu)\phi_{\tau,\nu}(t)d\tau d\nu \quad (5)$$

where the weights $x(\tau, \nu)$ represent the information bearing signal to be transmitted. After the transmitted signal of (5) goes through the time varying channel of Eq. (2) we obtain a superposition of delayed and modulated versions of the basis functions, which due to (4) results in $$r(t) = \iint h(\tau,\nu)e^{j2\pi\nu(t-\tau)}s(t-\tau)d\nu d\tau \quad (6)$$

$$= \iint \phi_{\tau,\nu}(t)\{h(\tau,\nu) * x(\tau,\nu)\}d\tau d\nu$$

where * denotes two dimensional convolution. Eq. (6) can be thought of as a generalization of the convolution relationship for linear time invariant systems, using one dimensional exponentials as basis functions. Notice that the term in brackets can be recovered at the receiver by matched filtering against each basis function $\phi_{\tau,\nu}(t)$. In this way a two dimensional channel relationship is established in the $(\tau, \nu)$ domain $$y(\tau,\nu) = h(\tau,\nu) * x(\tau,\nu) \quad (7)$$

where $y(\tau, \nu)$ is the receiver two dimensional matched filter output. Notice also, that in this domain the channel is described by a time invariant two-dimensional convolution.

A final different interpretation of the wireless channel will also be useful in what follows. Let us consider $s(t)$ and $r(t)$ as elements of the Hilbert space of square integrable functions $\mathcal{H}$. Then Eq. (2) can be interpreted as a linear operator on $\mathcal{H}$ acting on the input $s(t)$, parameterized by the impulse response $h(\tau, \nu)$, and producing the output $r(t)$|Cooley Spec|ZZMPTAG|

$$r = \Pi_h(s): s(t) \in \mathcal{H} \xrightarrow{\Pi_h(\cdot)} r(t) \in \mathcal{H} \quad (8)$$

Notice that although the operator is linear, it is not time-invariant. If there is no Doppler, i.e., if $h(\nu, \tau) = h(0, \tau)\delta(\nu)$, then Eq. (2) reduces to a time invariant convolution. Also notice that while for time invariant systems the impulse response is parameterized by one dimension, in the time varying case we have a two dimensional impulse response. While in the time invariant case the convolution operator produces a superposition of delays of the input $s(t)$, (hence the parameterization is along the one dimensional delay axis) in the time varying case we have a superposition of delay-and-modulate operations as seen in Eq. (2) (hence the parameterization is along the two dimensional delay and Doppler axes). This is a major difference which makes the time varying representation non-commutative (in contrast to the convolution operation which is commutative), and complicates the treatment of time varying systems.

The important point of Eq. (8) is that the operator $\Pi_h(\cdot)$ can be compactly parameterized by a two dimensional function $h(\tau, \nu)$, providing an efficient, time-independent description of the channel. Typical channel delay spreads and Doppler spreads are a very small fraction of the symbol duration and subcarrier spacing of multicarrier systems.

In the mathematics literature, the representation of time varying systems of (2) and (8) is called the Heisenberg representation [4]. It can actually be shown that every linear operator (8) can be parameterized by some impulse response as in (2).

OTFS Modulation Over the Doppler Multipath Channel

The time variation of the channel introduces significant difficulties in wireless communications related to channel acquisition, tracking, equalization and transmission of channel state information (CSI) to the transmit side for beamforming and MIMO processing. We herein develop a modulation domain based on a set of orthonormal basis functions over which we can transmit the information symbols, and over which the information symbols experience a static, time invariant, two dimensional channel for the duration of the packet or burst transmission. In that modulation domain, the channel coherence time is increased by orders of magnitude and the issues associated with channel fading in the time or frequency domain in SISO or MIMO systems are significantly reduced.

Figure 3A:
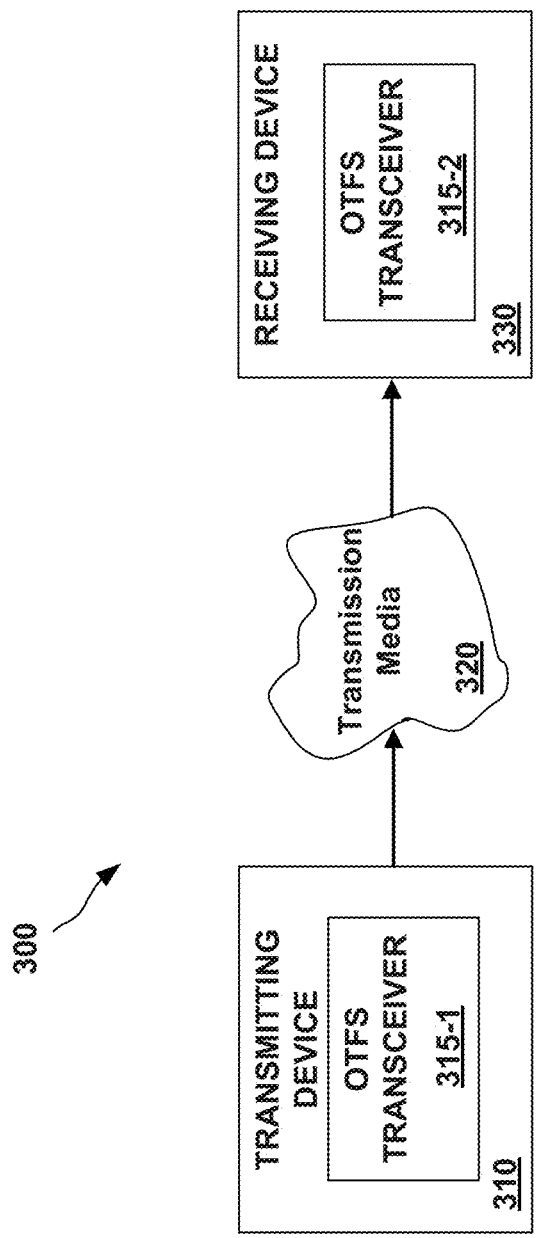
FIG. 3A shows an exemplary block diagram of components of an OTFS communication system.

FIG. 3 is a block diagram of components of an exemplary OTFS communication system 300. As shown, the system 300 includes a transmitter 310 and a receiver 330. The transmitting device 310 and the receiving device 330 include first and second OTFS transceivers 315-1 and 315-2, respectively. The OTFS transceivers 315-1 and 315-2 communicate, either unidirectionally or bidirectionally, via communication channel 320 in the manner described herein. Although in the exemplary embodiments described herein the system 300 may comprise a wireless communication system, in other embodiments the communication channel may comprise a wired communication channel such as, for example, a communication channel within a fiber optic or coaxial cable. As was described above, the communication channel 320 may include multiple pathways and be characterized by time/frequency selective fading.

The components of the OTFS transceiver may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Figure 33A:
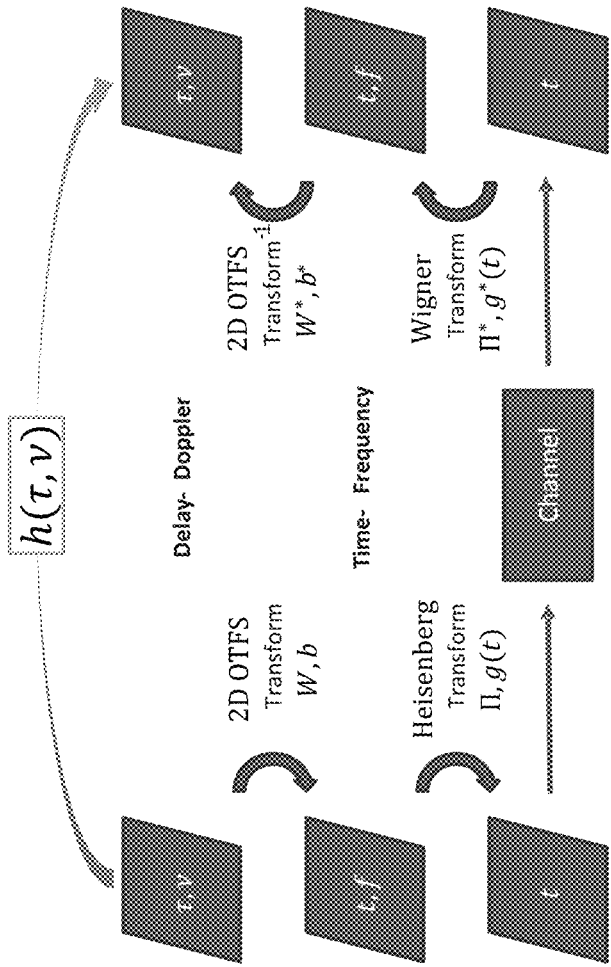
FIG. 33A provides a pictorial view of the two transformations that constitute an exemplary form of OTFS modulation.
Figure 34:
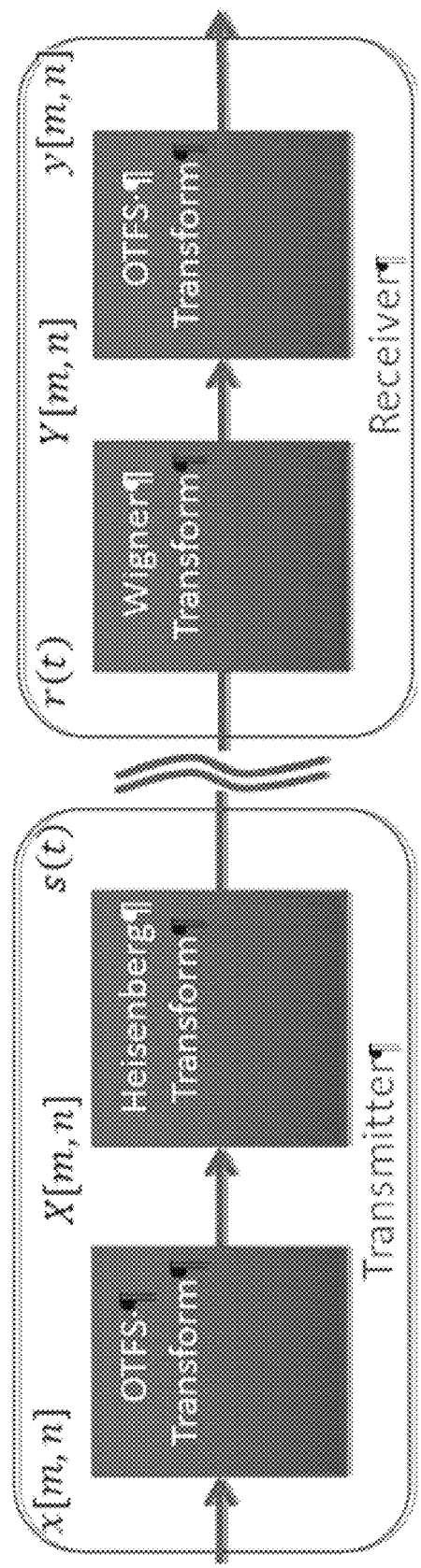
FIG. 34 shows a block diagram of the different processing stages at the transmitter and receiver and establishes the notation that will be used for the various signals.

Referring now to FIG. 33A, there is provided a pictorial view of the two transformations that constitute an exemplary form of OTFS modulation. It shows at a high level the signal processing steps that are required at a transmitter, such as the transmitter 310, and a receiver, such as the receiver 330. It also includes the parameters that define each step, which will become apparent as we further expose each step. Further, FIG. 34 shows a block diagram of the different processing stages at the transmitter and receiver and establishes the notation that will be used for the various signals.

We start our description with the transform which relates the waveform domain to the time-frequency domain.
The Heisenberg Transform Our purpose in this section is to construct an appropriate transmit waveform which carries information provided by symbols on a grid in the time-frequency plane. Our intent in developing this modulation scheme is to transform the channel operation to an equivalent operation on the time-frequency domain with two important properties: (i) the channel is orthogonalized on the time-frequency grid; and (ii) the channel time variation is simplified on the time-frequency grid and can be addressed with an additional transform. Fortunately, these goals can be accomplished with a scheme that is very close to well-known multicarrier modulation techniques, as explained next. We will start with a general framework for multicarrier modulation and then give examples of OFDM and multicarrier filter bank implementations.

Let us consider the following components of a time frequency modulation:
A lattice or grid on the time frequency plane, that is a sampling of the time axis with sampling period T and the frequency axis with sampling period $\Delta f$.

$$\Lambda = \{(nT, m\Delta f), n, m \in \mathbb{Z}\} \quad (9)$$

A packet burst with total duration NT secs and total bandwidth $M\Delta f$ Hz
A set of modulation symbols X[n, m], n=0, ..., N−1, m=0, ..., M−1 we wish to transmit over this burst A transmit pulse $g_{tr}(t)$ with the property of being orthogonal to translations by T and modulations by $\Delta f$ (generally required if the receiver uses the same pulse as the transmitter)

$$\langle g_{tr}(t), g_{tr}(t-nT)e^{j2\pi m\Delta f(t-nT)}\rangle = \quad (10)$$
$$\int g_{tr}^*(t)g_{tr}(t-nT)e^{j2\pi m\Delta f(t-nT)}dt = \delta(m)\delta(n)$$

Given the above components, the time-frequency modulator is a Heisenberg operator on the lattice $\Lambda$, that is, it maps the two dimensional symbols X[n, m] to a transmitted waveform, via a superposition of delay-and-modulate operations on the pulse waveform $g_{tr}(t)$ $$s(t) = \sum_{m=-M/2}^{M/2-1} \sum_{n=0}^{N-1} X[n,m] g_{tr}(t-nT) e^{j2\pi m\Delta f(t-nT)} \quad (11)$$

More formally $$x = \Pi_X(g_{tr}): \ g_{tr}(t) \in \mathcal{H} \xrightarrow{\Pi_X(\cdot)} y(t) \in \mathcal{H} \quad (12)$$

where we denote by $\Pi_X(\cdot)$ the "discrete" Heisenberg operator, parameterized by discrete values X[n, m].

Notice the similarity of (12) with the channel equation (8). This is not by coincidence, but rather because we apply a modulation effect that mimics the channel effect, so that the end effect of the cascade of modulation and channel is more tractable at the receiver. It is not uncommon practice, for example, linear modulation (aimed at time invariant channels) is in its simplest form a convolution of the transmit pulse g(t) with a delta train of QAM information symbols sampled at the Baud rate T.

$$s(t) = \sum_{n=0}^{N-1} X[n]g(t-nT) \quad (13)$$

In our case, aimed at the time varying channel, we convolve-and-modulate the transmit pulse (c.f the channel Eq. (2)) with a two dimensional delta train which samples the time frequency domain at a certain Baud rate and subcarrier spacing.

The sampling rate in the time-frequency domain is related to the bandwidth and time duration of the pulse $g_{tr}(t)$; namely, its time-frequency localization. In order for the orthogonality condition of (10) to hold for a frequency spacing $\Delta f$, the time spacing must be $T \geq 1/\Delta f$. The critical sampling case of $T=1/\Delta f$ is generally not practical and refers to limiting cases, for example to OFDM systems with cyclic prefix length equal to zero or to filter banks with $g_{tr}(t)$ equal to the ideal Nyquist pulse.

Some examples are now in order:

Example 1: OFDM Modulation

Let us consider an OFDM system with M subcarriers, symbol length $T_{OFDM}$, cyclic prefix length $T_{CP}$ and subcarrier spacing $1/T_{OFDM}$. If we substitute in Equation (11)

symbol duration $T=T_{OFDM}+T_{CP}$, number of symbols N=1, subcarrier spacing $\Delta f=1/T_{OFDM}$ and $g_{tr}(t)$ a square window that limits the duration of the subcarriers to the symbol length T $$g_{tr}(t) = \begin{cases} 1/\sqrt{T-T_{CP}}, & -T_{CP} < t < T - T_{CP} \\ 0, & \text{else} \end{cases} \quad (14)$$

then we obtain the OFDM formula $$x(t) = \sum_{m=-M/2}^{M/2-1} X[n,m] g_{tr}(t) e^{j2\pi m \Delta f t} \quad (15)$$

Technically, the pulse of Eq. (14) is not orthonormal but is orthogonal to the receive filter (where the CP samples are discarded).

Example 2: Single Carrier Modulation

Equation (11) reduces to single carrier modulation if we substitute M=1 subcarrier, T equal to the Baud period and $g_{tr}(t)$ equal to a square root raised cosine Nyquist pulse.

Example 3: Multicarrier Filter Banks (MCFB)

Equation (11) describes a MCFB if $g_{tr}(t)$ is a square root raised cosine Nyquist pulse with excess bandwith $\alpha$, T is equal to the Baud period and $\Delta f=(1+\alpha)/T$.

Expressing the modulation operation as a Heisenberg transform as in Eq. (12) may be counterintuitive. We usually think of modulation as a transformation of the modulation symbols X[m, n] to a transmit waveform s(t). The Heisenberg transform instead, uses X[m, n] as weights/parameters of an operator that produces s(t) when applied to the prototype transmit filter response $g_{tr}(t)$—c.f. Eq. (12). While counterintuitive, this formulation is useful in pursuing an abstraction of the modulation-channel-demodulation cascade effects in a two dimensional domain where the channel can be described as time invariant.

We next turn our attention to the processing on the receiver side needed to go back from the waveform domain to the time-frequency domain. Since the received signal has undergone the cascade of two Heisenberg transforms (one by the modulation effect and one by the channel effect), it is natural to inquire what the end-to-end effect of this cascade is. The answer to this question is given by the following result:

Proposition 1:

Let two Heisenberg transforms as defined by Eqs. (8), (2) be parameterized by impulse responses $h_1(\tau, \nu)$, $h_2(\tau, \nu)$ and be applied in cascade to a waveform $g(t) \in \mathcal{H}$. Then $$\Pi_{h_2}(\Pi_{h_1}(g(t))) = \Pi_h(g(t)) \quad (16)$$

where $h(\tau, \nu) = h_2(\tau, \nu) \odot h_1(\tau, \nu)$ is the "twisted" convolution of $h_1(\tau, \nu)$, $h_2(\tau, \nu)$ defined by the following convolve-and-modulate operation $$h(\tau,\nu)=\iint h_2(\tau',\nu')h_1(\tau-\tau',\nu-\nu')e^{j2\pi\nu'(\tau-\tau')}d\tau'd\nu' \quad (17)$$

Applying the above result to the cascade of the modulation and channel Heisenberg transforms of (12) and (8), we can show that the received signal is given by the Heisenberg transform $$r(t)=\Pi_f(g_{tr}(t))+\nu(t)=\iint f(\tau,\nu)e^{j2\pi\nu(t-\tau)}g_{tr}(t-\tau)d\nu d\tau+\nu(t) \quad (18)$$

where v(t) is additive noise and $f(\tau, \nu)$, the impulse response of the combined transform, is given by the twisted convolution of X[n, m] and $h(\tau, \nu)$ $$f(\tau, \nu) = h(\tau, \nu) \odot X[n, m] \quad (19)$$

$$= \sum_{m=-M/2}^{M/2-1} \sum_{n=0}^{N-1} X[n,m]h(\tau-nT, \nu-m\Delta f)e^{j2\pi(\nu-m\Delta f)nT}$$

This result can be considered an extension of the single carrier modulation case, where the received signal through a time invariant channel is given by the convolution of the QAM symbols with a composite pulse, that pulse being the convolution of the transmitter pulse and the channel impulse response.

With this result established we are ready to examine the receiver processing steps.

Receiver Processing and the Wigner Transform

Typical communication system design dictates that the receiver performs a matched filtering operation, taking the inner product of the received waveform with the transmitter pulse, appropriately delayed or otherwise distorted by the channel. In our case, we have used a collection of delayed and modulated transmit pulses, and we need to perform a matched filter on each one of them.

Figure 35:
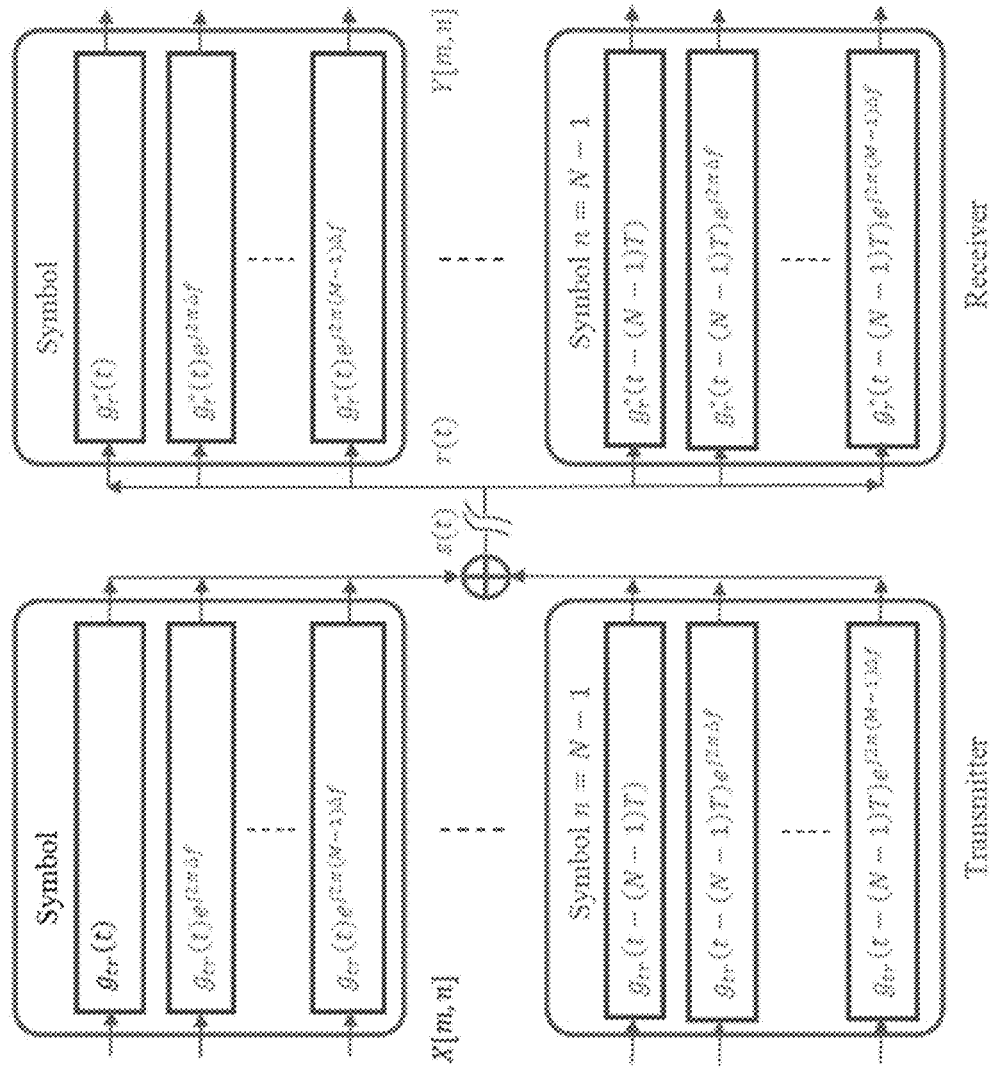
FIG. 35 illustrates an exemplary implementation of a Heisenberg transform in a transmitter and a Wigner transform in a receiver.

FIG. 35 provides a conceptual view of this processing. On the transmitter, we modulate a set of M subcarriers for each symbol we transmit, while on the receiver we perform matched filtering on each of those subcarrier pulses. We define a receiver pulse $g_r(t)$ and take the inner product with a collection of delayed and modulated versions of it. The receiver pulse $g_r(t)$ is in many cases identical to the transmitter pulse, but we keep the separate notation to cover some cases where it is not (most notably in OFDM where the CP samples have to be discarded).

While this approach will yield the sufficient statistics for data detection in the case of an ideal channel, a concern can be raised here for the case of non-ideal channel effects. In this case, the sufficient statistics for symbol detection are obtained by matched filtering with the channel-distorted, information-carrying pulses (assuming that the additive noise is white and Gaussian). In many well designed multicarrier systems however (e.g., OFDM and MCFB), the channel distorted version of each subcarrier signal is only a scalar version of the transmitted signal, allowing for a matched filter design that is independent of the channel and uses the original transmitted subcarrier pulse. We will make these statements more precise shortly and examine the required conditions for this to be true.

In actual embodiments of an OTFS receiver, this matched filtering may be implemented in the digital domain using an FFT or a polyphase transform for OFDM and MCFB respectively. However, for purposes of the present discussion, we will consider a generalization of this matched filtering by taking the inner product $<g_r(t-\tau)e^{j2\pi\nu(t-\tau)}, r(t)>$ of the received waveform with the delayed and modulated versions of the receiver pulse for arbitrary time and frequency offset $(\tau, \nu)$. While likely not a practical implementation, it allows us to view the operations of FIG. 35 as a two dimensional sampling of this more general inner product.

Let us define the inner product $$A_{g_r,r}(\tau,\nu)=<g_r(t-\tau)e^{j2\pi\nu(t-\tau)},r(t)>=\int g^*_r(t-\tau)e^{-j2\pi\nu(t-\tau)}r(t)dt \quad (20)$$

The function $A_{g_r,r}(\tau, \nu)$ is known as the cross-ambiguity function in the radar and math communities and yields the matched filter output if sampled at $\tau=nT$, $\nu=m\Delta f$ (on the lattice $\Lambda$), i.e., $$Y[n,m] = A_{g_r,r}(\tau,\nu)|_{\tau=nT,\nu=m\Delta f} \quad (21)$$

The ambiguity function is related to the inverse of the Heisenberg transform, namely the Wigner transform. FIG. 35 provides an intuitive feel for that, as the receiver appears to invert the operations of the transmitter. More formally, if we take the cross-ambiguity or the transmit and receive pulses $A_{g_r,g_{tr}}(\tau, \nu)$, and use it as the impulse response of the Heisenberg operator, then we obtain the orthogonal cross-projection operator $$\Pi_{A_{g_r,g_{tr}}}(y(t)) = g_{tr}(t)\langle g_r(t), y(t)\rangle$$

In words, the coefficients that come out of the matched filter, if used in a Heisenberg representation, will provide the best approximation to the original y(t) in the sense of minimum square error.

The key question here is what the relationship is between the matched filter output Y[n, m] (or more generally $Y(\tau, \nu)$) and the transmitter input X[n, m]. We have already established in (18) that the input to the matched filter r(t) can be expressed as a Heisenberg representation with impulse response $f(\tau, \nu)$ (plus noise). The output of the matched filter then has two contributions $$Y(\tau,\nu) = A_{g_r,r}(\tau,\nu) = A_{g_r,[\Pi_f(g_{tr})+\nu]}(\tau,\nu) = A_{g_r,\Pi_f(g_{tr})}(\tau,\nu) + A_{g_r,\nu}(\tau,\nu) \quad (22)$$

The last term is the contribution of noise, which we will denote $V(\tau, \nu) = A_{g_r,\nu}(\tau, \nu)$. The first term on the right hand side is the matched filter output to the (noiseless) input comprising of a superposition of delayed and modulated versions of the transmit pulse. We next establish that this term can be expressed as the twisted convolution of the two dimensional impulse response $f(\tau, \nu)$ with the cross-ambiguity function (or two dimensional cross correlation) of the transmit and receive pulses.

The following theorem summarizes the key result.

Theorem 1:
(Fundamental Time-Frequency Domain Channel Equation).
If the received signal can be expressed as $$\Pi_f(g_{tr}(t)) = \iint f(\tau,\nu)e^{j2\pi\nu(t-\tau)}g_{tr}(t-\tau)d\nu d\tau \quad (23)$$

Then the cross-ambiguity of that signal with the receive pulse $g_{tr}(t)$ can be expressed as $$A_{g_r,\Pi_f(g_{tr})}(\tau,\nu) = f(\tau,\nu) \odot A_{g_r,g_{tr}}(\tau,\nu) \quad (24)$$

Recall from (19) that $f(\tau, \nu) = h(\tau, \nu) \odot X[n, m]$, that is, the composite impulse response is itself a twisted convolution of the channel response and the modulation symbols.

Substituting $f(\tau, \nu)$ from (19) into (22) we obtain the end-to-end channel description in the time frequency domain $$Y(\tau, \nu) = A_{g_r,\Pi_r(g_{tr})}(\tau, \nu) + V(\tau, \nu) \quad (25)$$
$$= h(\tau, \nu) \odot X[n, m] \odot A_{g_r,g_{tr}}(\tau, \nu) + V(\tau, \nu)$$

where $V(\tau, \nu)$ is the additive noise term. Eq. (25) provides an abstraction of the time varying channel on the time-frequency plane. It states that the matched filter output at any time and frequency point $(\tau, \nu)$ is given by the delay-Doppler impulse response of the channel twist-convolved with the impulse response of the modulation operator twist-convolved with the cross-ambiguity (or two dimensional cross correlation) function of the transmit and receive pulses.

Evaluating Eq. (25) on the lattice $\Lambda$ we obtain the matched filter output modulation symbol estimates $$\hat{X}[m,n] = Y[n,m] = Y(\tau,\nu)|_{\tau=nT,\nu=m\Delta f} \quad (26)$$

In order to get more intuition on Equations (25), (26). let us first consider the case of an ideal channel, i.e., $h(\tau, \nu) = \delta(\tau)\delta(\nu)$. In this case by direct substitution we get the convolution relationship $$Y[n, m] = \sum_{m'=-M/2}^{M/2-1} \sum_{n'=0}^{N-1} X[n', m']A_{g_r,g_{tr}}((n-n')T, (m-m')\Delta f) + V[m, n] \quad (27)$$

In order to simplify Eq. (27) we will use the orthogonality properties of the ambiguity function. Since we use a different transmit and receive pulses we will modify the orthogonality condition on the design of the transmit pulse we stated in (10) to a bi-orthogonality condition $$\langle g_{tr}(t), g_{tr}(t-nT)e^{j2\pi m\Delta f(t-nT)}\rangle = \int g_{tr}^*(t)g_r(t-nT)e^{j2\pi m\Delta f(t-nT)}dt = \delta(m)\delta(n) \quad (28)$$

Under this condition, only one term survives in (27) and we obtain $$Y[n,m] = X[n,m] + V[n,m] \quad (29)$$

where V[n, m] is the additive white noise. Eq. (29) shows that the matched filter output does recover the transmitted symbols (plus noise) under ideal channel conditions. Of more interest of course is the case of non-ideal time varying channel effects. We next show that even in this case, the channel orthogonalization is maintained (no intersymbol or intercarrier interference), while the channel complex gain distortion has a closed form expression.

The following theorem summarizes the result as a generalization of (29).

Theorem 2:
(End-to-End Time-Frequency Domain Channel Equation):
If $h(\tau, \nu)$ has finite support bounded by $(\tau_{max}, \nu_{max})$ and if $A_{g_r,g_{tr}}(\tau, \nu) = 0$ for $\tau \in (nT-\tau_{max}, nT+\tau_{max})$, $\nu \in (m\Delta f-\nu_{max}, m\Delta f+\nu_{max})$, that is, the ambiguity function bi-orthogonality property of (28) is true in a neighborhood of each grid point $(m\Delta f, nT)$ of the lattice $\Lambda$ at least as large as the support of the channel response $h(\tau, \nu)$, then the following equation holds $$Y[n,m] = H[n,m]X[n,m]$$

$$H[n,m] = \iint h(\tau,\nu)e^{j2\pi\nu nT}e^{-j2\pi(\nu+m\Delta f)\tau}d\nu d\tau \quad (30)$$

If the ambiguity function is only approximately bi-orthogonal in the neighborhood of $\Lambda$ (by continuity), then (30) is only approximately true. Eq. (30) is a fundamental equation that describes the channel behavior in the time-frequency domain. It is the basis for understanding the nature of the channel and its variations along the time and frequency dimensions.

Some observations are now in order on Eq. (30). As mentioned before, there is no interference across X[n, m] in either time n or frequency m.

The end-to-end channel distortion in the modulation domain is a (complex) scalar that needs to be equalized.

If there is no Doppler, i.e. $h(\tau, v) = h(\tau, 0)\delta(v)$, then Eq. (30) becomes $$Y[n, m] = X[n, m] \int h(\tau, 0) e^{-j2\pi m \Delta f \tau} d\tau \quad (31)$$
$$= X[n, m] H(0, m\Delta f)$$

which is the well-known multicarrier result, that each subcarrier symbol is multiplied by the frequency response of the time invariant channel evaluated at the frequency of that subcarrier.

If there is no multipath, i.e. $h(\tau, v) = h(0, v)\delta(\tau)$, then Eq. (30) becomes $$Y[n,m] = X[n,m] \int h(v,0) e^{j2\pi v n T} d\tau \quad (32)$$

Notice that the fading each subcarrier experiences as a function of time nT has a complicated expression as a weighted superposition of exponentials. This is a major complication in the design of wireless systems with mobility like LTE; it necessitates the transmission of pilots and the continuous tracking of the channel, which becomes more difficult the higher the vehicle speed or Doppler bandwidth is.

We close this section with some examples of this general framework.

Example 3: OFDM Modulation

In this case the fundamental transmit pulse is given by (14) and the fundamental receive pulse is $$g_r(t) = \begin{cases} 0 & -T_{CP} < t < 0 \\ \frac{1}{\sqrt{T - T_{CP}}} & 0 < t < T - T_{CP} \\ 0 & \text{else} \end{cases} \quad (33)$$

i.e., the receiver zeroes out the CP samples and applies a square window to the symbols comprising the OFDM symbol. It is worth noting that in this case, the bi-orthogonality property holds exactly along the time dimension.

Example 4: MCFB Modulation

In the case of multicarrier filter banks $g_{tr}(t) = g_r(t) = g(t)$. There are several designs for the fundamental pulse g(t). A square root raised cosine pulse provides good localization along the frequency dimension at the expense of less localization along the time dimension. If T is much larger than the support of the channel in the time dimension, then each subchannel sees a flat channel and the bi-orthogonality property holds approximately.

In summary, in this section we described the one of the two transforms that define OTFS. We explained how the transmitter and receiver apply appropriate operators on the fundamental transmit and receive pulses and orthogonalize the channel according to Eq. (30). We further saw via examples how the choice of the fundamental pulse affect the time and frequency localization of the transmitted modulation symbols and the quality of the channel orthogonalization that is achieved. However, Eq. (30) shows that the channel in this domain, while free of intersymbol interference, suffers from fading across both the time and the frequency dimensions via a complicated superposition of linear phase factors.

In the next section we will start from Eq. (30) and describe the second transform that defines OTFS; we will show how that transform defines an information domain where the channel does not fade in either dimension.

The 2D OTFS Transform

Notice that the time-frequency response H[n, m] in (30) is related to the channel delay-Doppler response $h(\tau, v)$ by an expression that resembles a Fourier transform. However, there are two important differences: (i) the transform is two dimensional (along delay and Doppler) and (ii) the exponentials defining the transforms for the two dimensions have opposing signs. Despite these difficulties, Eq. (30) points in the direction of using complex exponentials as basis functions on which to modulate the information symbols; and only transmit on the time-frequency domain the superposition of those modulated complex exponential bases. This is the approach we will pursue in this section. As is discussed below, this approach exploits Fourier transform properties and effectively translates a multiplicative channel in one Fourier domain to a convolution channel in the other Fourier domain.

Given the difficulties of Eq. (30) mentioned above we need to develop a suitable version of Fourier transform and associated sampling theory results. Let us start with the following definitions:

Definition 1

Symplectic Discrete Fourier Transform

Given a square summable two dimensional sequence $X[m, n] \in \mathbb{C}(\Lambda)$ we define $$x(\tau, v) = \sum_{m,n} X[n, m] e^{-j2\pi(vnT - \tau m \Delta f)} \quad (34)$$
$$\overset{\Delta}{=} SDFT(X[n, m])$$

Notice that the above 2D Fourier transform (known as the Symplectic Discrete Fourier Transform in the math community) differs from the more well known Cartesian Fourier transform in that the exponential functions across each of the two dimensions have opposing signs. This is necessary in this case, as it matches the behavior of the channel equation.

Further notice that the resulting $x(\tau, v)$ is periodic with periods $(1/\Delta f, 1/T)$. This transform defines a new two dimensional plane, which we will call the delay-Doppler plane, and which can represent a max delay of $1/\Delta f$ and a max Doppler of $1/T$. A one dimensional periodic function is also called a function on a circle, while a 2D periodic function is called a function on a torus (or donut). In this case $x(\tau, v)$ is defined on a torus Z with circumferences (dimensions) $(1/\Delta f, 1/T)$.

The periodicity of $x(\tau, v)$ (or sampling rate of the time-frequency plane) also defines a lattice on the delay-Doppler plane, which we will call the reciprocal lattice $$\Lambda^{\perp} = \left\{ \left( m \frac{1}{\Delta f}, n \frac{1}{T} \right), n, m \in \mathbb{Z} \right\} \quad (35)$$

The points on the reciprocal lattice have the property of making the exponent in (34), an integer multiple of $2\pi$.

The inverse transform is given by:

$$X[n, m] = \frac{1}{c}\int_0^{\frac{1}{\Delta f}}\int_0^{\frac{1}{T}} x(\tau, v)e^{j2\pi(vnT-\tau m\Delta f)}dvd\tau \quad (36)$$
$$\triangleq SDFT^{-1}(x(\tau, v))$$

where $c=T\Delta f$.

We next define a sampled version of $x(\tau, v)$. In particular, we wish to take M samples on the delay dimension (spaced at $1/M\Delta f$) and N samples on the Doppler dimension (spaced at $1/NT$). More formally we define a denser version of the reciprocal lattice $$\Lambda_0^\perp = \left\{\left(m\frac{1}{M\Delta f}, n\frac{1}{NT}\right), n, m \in \mathbb{Z}\right\} \quad (37)$$

So that $\Lambda^\perp \subseteq \Lambda_0^\perp$. We define discrete periodic functions on this dense lattice with period $(1/\Delta f, 1/T)$, or equivalently we define functions on a discrete torus with these dimensions $$Z_0^\perp = \left\{\left(m\frac{1}{M\Delta f}, n\frac{1}{NT}\right), m = 0, \ldots, M-1, n = 0, \ldots N-1,\right\} \quad (38)$$

These functions are related via Fourier transform relationships to discrete periodic functions on the lattice $\Lambda$, or equivalently, functions on the discrete torus $$Z_0 = \{(nT, m\Delta f), m=0, \ldots, M-1, n=0, \ldots N-1,\} \quad (39)$$

We wish to develop an expression for sampling Eq. (34) on the lattice of (38). First, we start with the following definition.

Definition 2

Symplectic Finite Fourier Transform

If $X_p[k, l]$ is periodic with period $(N, M)$, then we define $$x_p[m, n] = \sum_{k=0}^{N-1}\sum_{l=-\frac{M}{2}}^{\frac{M}{2}-1} X_p[k, l]e^{-j2\pi\left(\frac{nk}{N}-\frac{ml}{M}\right)} \quad (40)$$
$$\triangleq SFFT(X[k, l])$$

Notice that $x_p[m, n]$ is also periodic with period $[M, N]$ or equivalently, it is defined on the discrete torus $Z_0^\perp$. Formally, the $SFFT(X[n, m])$ is a linear transformation from $\mathbb{C}(Z_0) \to \mathbb{C}(Z_0^\perp)$.

Let us now consider generating $x_p[m, n]$ as a sampled version of (34), i.e., $$x_p[m, n] = x[m, n] = x(\tau, v)|_{\tau=\frac{m}{M\Delta f}, v=\frac{n}{NT}}.$$

Then we can show that (40) still holds where $X_p[m, n]$ is a periodization of $X[n, m]$ with period $(N, M)$ $$X_p[n, m] = \sum_{l,k=-\infty}^{\infty} X[n-kN, m-lM] \quad (41)$$

This is similar to the well-known result that sampling in one Fourier domain creates aliasing in the other domain.

The inverse discrete (symplectic) Fourier transform is given by $$X_p[n, m] = \frac{1}{MN}\sum_{l,k} x[l, k]e^{j2\pi\left(\frac{nk}{N}-\frac{ml}{M}\right)} \quad (42)$$
$$\triangleq SFFT^{-1}(x[l, k])$$

where $l=0, \ldots, M-1, k=0, \ldots, N-1$. If the support of $X[n, m]$ is time-frequency limited to $Z_0$ (no aliasing in (41)), then $X_p[n, m]=X[n, m]$ for n, $m\in Z_0$, and the inverse transform (42) recovers the original signal.

In the math community, the SDFT is called "discrete" because it represents a signal using a discrete set of exponentials, while the SFFT is called "finite" because it represents a signal using a finite set of exponentials.

Arguably the most important property of the symplectic Fourier transform is that it transforms a multiplicative channel effect in one domain to a circular convolution effect in the transformed domain. This is summarized in the following proposition:

Proposition 2:

Let $X_1[n, m]\in\mathbb{C}(Z_0)$, $X_2[n, m]\in\mathbb{C}(Z_0)$ be periodic 2D sequences. Then $$SFFT(X_1[n,m]*X_2[n,m])=SFFT(X_1[n,m])\cdot SFFT(X_2[n,m]) \quad (43)$$

where * denotes two dimensional circular convolution. With this framework established we are ready to define the OTFS modulation.

Discrete OTFS Modulation:

Consider a set of NM QAM information symbols arranged on a 2D grid $x[l, k], k=0, \ldots, N-1, l=0, \ldots, M-1$ we wish to transmit. We will consider $x[l, k]$ to be two dimensional periodic with period $[N, M]$. Further, assume a multicarrier modulation system defined by A lattice on the time frequency plane, that is a sampling of the time axis with sampling period T and the frequency axis with sampling period $\Delta f$ (c.f. Eq. (9)).

A packet burst with total duration NT secs and total bandwidth $M\Delta f$ Hz.

Transmit and receive pulses $g_{tr}(t)$, $g_{tr}(t)\in L_2(\mathbb{R})$ satisfying the bi-orthogonality property of (28)

A transmit windowing square summable function $W_{tr}[n, m]\in\mathbb{C}(\Lambda)$ multiplying the modulation symbols in the time-frequency domain A set of modulation symbols $X[n, m], n=0, \ldots, N-1, m=0, \ldots, M-1$ related to the information symbols $x[k, l]$ by a set of basis functions $b_{k,l}[n, m]$ $$X[n, m] = \frac{1}{MN}W_{tr}[n, m]\sum_{k=0}^{N-1}\sum_{l=0}^{M-1} x[l, k]b_{k,l}[n, m] \quad (44)$$

$$b_{k,l}[n, m] = e^{j2\pi\left(\frac{ml}{M}-\frac{nk}{N}\right)}$$

where the basis functions $b_{k,l}[n, m]$ are related to the inverse symplectic Fourier transform (c.f., Eq. (42))

Given the above components, we define the discrete OTFS modulation via the following two steps $$X[n,m]=W_{tr}[n,m]SFFT^{-1}(x[k,l])$$

$$s(t)=\Pi_X(g_{tr}(t)) \quad (45)$$

The first equation in (45) describes the OTFS transform, which combines an inverse symplectic transform with a widowing operation. The second equation describes the transmission of the modulation symbols X[n, m] via a Heisenberg transform of $g_{tr}(t)$ parameterized by X[n, m]. More explicit formulas for the modulation steps are given by Equations (42) and (11).

While the expression of the OTFS modulation via the symplectic Fourier transform reveals important properties, it is easier to understand the modulation via Eq. (44), that is, transmitting each information symbol x[k, l] by modulating a 2D basis function $b_{k,l}[n, m]$ on the time-frequency plane.

Discrete OTFS Demodulation:

Let us assume that the transmitted signal s(t) undergoes channel distortion according to (8), (2) yielding r(t) at the receiver. Further, let the receiver employ a receive windowing square summable function $W_r[n, m]$. Then, the demodulation operation consists of the following steps:

(i) Matched filtering with the receive pulse, or more formally, evaluating the ambiguity function on Λ (Wigner transform) to obtain estimates of the time-frequency modulation symbols $$Y[n,m]=A_{g_r,y}(\tau,\nu)|_{\tau=nT,\nu=m\Delta f} \quad (46)$$

(ii) windowing and periodization of Y[n, m]|Body Text|ZZMPTAG|

$$Y_w[n, m] = W_r[n, m]Y[n, m] \quad (47)$$

$$Y_p[n, m] = \sum_{k,l=-\infty}^{\infty} Y_w[n - kN, m - lM]$$

(iii) and applying the symplectic Fourier transform on the periodic sequence $Y_p[n,m]$|Body Text|ZZMPTAG|

$$\hat{x}[l,k]=y[l,k]=SFFT(Y_p[n,m]) \quad (48)$$

The first step of the demodulation operation can be interpreted as a matched filtering operation on the time-frequency domain as we discussed earlier. The second step is there to ensure that the input to the SFFT is a periodic sequence. If the trivial window is used, this step can be skipped. The third step can also be interpreted as a projection of the time-frequency modulation symbols on the orthogonal basis functions $$\hat{x}[l, k] = \sum_{m=0}^{M-1} \sum_{n=0}^{N-1} \hat{X}(n, m) b_{k,l}^*(n, m) \quad (49)$$

$$b_{k,l}^*(n, m) = e^{-j2\pi\left(\frac{lm}{L}-\frac{kn}{K}\right)}$$

The discrete OTFS modulation defined above points to efficient implementation via discrete-and-periodic FFT type processing. However, it does not provide insight into the time and bandwidth resolution of these operations in the context of two dimensional Fourier sampling theory. We next introduce the continuous OTFS modulation and relate the more practical discrete OTFS as a sampled version of the continuous modulation.

Continuous OTFS Modulation:

Consider a two dimensional periodic function x(τ, ν) with period [1/Δf, 1/T] we wish to transmit; the choice of the period may seem arbitrary at this point, but it will become clear after the discussion in the next section. Further, assume a multicarrier modulation system defined by A lattice on the time frequency plane, that is a sampling of the time axis with sampling period T and the frequency axis with sampling period Δf (c.f. Eq. (9)).

Transmit and receive pulses $g_{tr}(t)$, $g_{tr}(t) \in L_2(\mathbb{R})$ satisfying the bi-orthogonality property of (28)

A transmit windowing function $W_{tr}[n, m] \in \mathbb{C}(\Lambda)$ multiplying the modulation symbols in the time-frequency domain Given the above components, we define the continuous OTFS modulation via the following two steps $$X[n,m]=W_{tr}[n,m]SDFT^{-1}(x(\tau,\nu))$$

$$s(t)=\Pi_X(g_{tr}(t)) \quad (50)$$

The first equation describes the inverse discrete time-frequency symplectic Fourier transform [c.f. Eq. (36)] and the windowing function, while the second equation describes the transmission of the modulation symbols via a Heisenberg transform [c.f. Eq. (11)].

Continuous OTFS Demodulation:

Let us assume that the transmitted signal s(t) undergoes channel distortion according to (8), (2) yielding r(t) at the receiver. Further, let the receiver employ a receive windowing function $W_r[n, m] \in \mathbb{C}(\Lambda)$. Then, the demodulation operation consists of two steps:

(i) Evaluating the ambiguity function on Λ (Wigner transform) to obtain estimates of the time-frequency modulation symbols $$Y[n,m]=A_{g_r,y}(\tau,\nu)|_{\tau=nT,\nu=m\Delta f} \quad (51)$$

(ii) Windowing and applying the symplectic Fourier transform on the modulation symbols $$\hat{x}(\tau,\nu)=SDFT(W_r[n,m]Y[n,m]) \quad (52)$$

Notice that in (51), (52) there is no periodization of Y[n, m], since the SDFT is defined on aperiodic square summable sequences. The periodization step needed in discrete OTFS can be understood as follows. Suppose we wish to recover the transmitted information symbols by performing a continuous OTFS demodulation and then sampling on the delay-Doppler grid $$\hat{x}(l, k) = \hat{x}(\tau, \nu)|_{\tau=\frac{m}{M\Delta f}, \nu=\frac{n}{NT}}$$

Since performing a continuous symplectic Fourier transform is not practical we consider whether the same result can be obtained using SFFT. The answer is that SFFT processing will produce exactly the samples we are looking for if the input sequence is first periodized (aliased)—see also (40) (41).

We have now described each of the steps of an exemplary form of OTFS modulation. We have also discussed how the Wigner transform at the receiver inverts the Heisenberg transform at the transmitter [c.f. Eqs. (27), (29)], and similarly for the forward and inverse symplectic Fourier transforms.

Figure 33B:
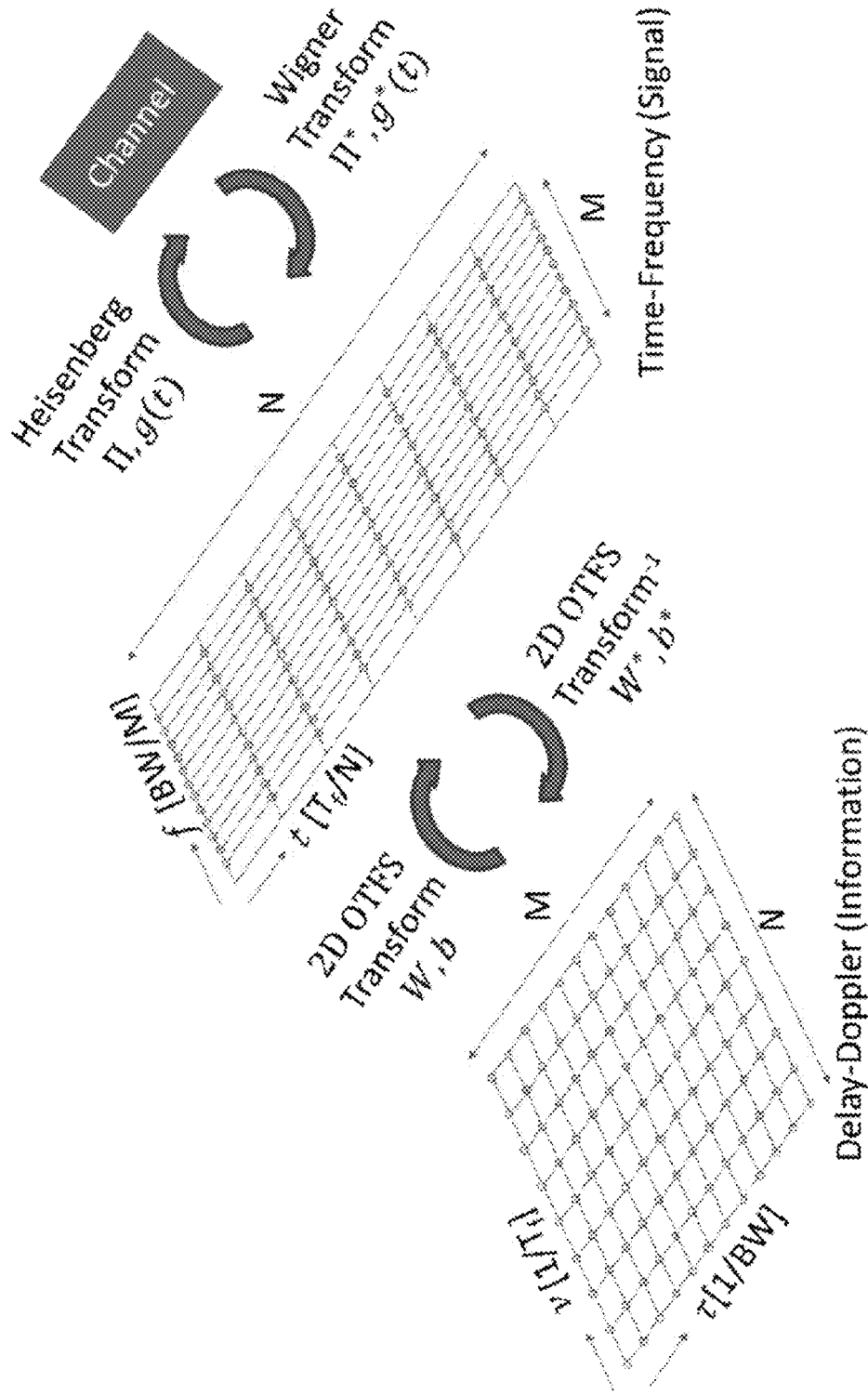
FIG. 33B summarizes an exemplary embodiment of OTFS modulation and indicates relationships between sampling rate, delay resolution and time resolution.

FIG. 33B summarizes an exemplary embodiment of OTFS modulation and indicates relationships between sampling rate, delay resolution and time resolution. Specifically, in a first operation a Heisenberg transform translates a time-varying convolution channel in the waveform domain to an orthogonal but still time varying channel in the time frequency domain. For a total bandwidth BW and M subcarriers the frequency resolution is $\Delta f = BW/M$. For a total frame duration $T_f$ and N symbols the time resolution is $T = T_f/N$.

In a second operation a SFFT transform translates the time-varying channel in the time-frequency domain to a time invariant one in the delay-Doppler domain. The Doppler resolution is $1/T_f$ and the delay resolution is $1/BW$. The choice of window can provide a tradeoff between main lobe width (resolution) and side lobe suppression, as in classical spectral analysis.

Channel Equation in the OTFS Domain

A mathematical characterization of the end-to-end signal relationship in an OTFS system when a non-ideal channel is between the transmitter and receiver will now be provided. Specifically, this section demonstrates how the time varying channel in (2), (8), is transformed to a time invariant convolution channel in the delay Doppler domain.

Proposition 3:

Consider a set of NM QAM information symbols arranged in a 2D periodic sequence x[l, k] with period [M, N]. The sequence x[k, l] undergoes the following transformations:

It is modulated using the discrete OTFS modulation of Eq. (45).

It is distorted by the delay-Doppler channel of Eqs. (2), (8).

It is demodulated by the discrete OTFS demodulation of Eqs. (46), (48).

The estimated sequence $\hat{x}[l, k]$ obtained after demodulation is given by the two dimensional periodic convolution $$\hat{x}[l,k] \simeq \frac{1}{MN} \sum_{m=0}^{M-1} \sum_{n=0}^{N-1} x[m,n] h_w\left(\frac{l-m}{M\Delta f}, \frac{k-n}{NT}\right) \quad (53)$$

of the input QAM sequence x[m, n] and a sampled version of the windowed impulse response $h_w(\cdot)$, $$h_w\left(\frac{l-m}{M\Delta f}, \frac{k-n}{NT}\right) = h_w(\tau', \nu')|_{\tau'=\frac{l-m}{M\Delta f}, \nu'=\frac{k-n}{NT}} \quad (54)$$

where $h_w(\tau', \nu')$ denotes the circular convolution of the channel response with a windowing function $$h_w(\tau',\nu') = \iint e^{-j2\pi\nu\tau} h(\tau,\nu) w(\tau'-\tau, \nu'-\nu) d\tau d\nu \quad (55)$$

To be precise, the window $w(\tau, \nu)$ is circularly convolved with a slightly modified version of the channel impulse response $e^{-j2\pi\nu\tau} h(\tau, \nu)$ (by a complex exponential) as can be seen in the equation. The windowing function $w(\tau, \nu)$ is the symplectic Fourier transform of the time-frequency window W[n, m]

$$w(\tau, \nu) = \sum_{m=0}^{M-1} \sum_{n=0}^{N-1} W[n, m] e^{-j2\pi(\nu nT - \tau m\Delta f)} \quad (56)$$

and where W[n, m] is the product of the transmit and receive window.

$$W[n,m] = W_{tr}[n,m] W_r[n,m] \quad (57)$$

In many cases, the windows in the transmitter and receiver are matched, i.e., $W_{tr}[n, m] = W_0[n, m]$ and $W_r[n, m] = W_0^*[n, m]$, hence $W[n, m] = |W_0[n, m]|^2$.

The window effect is to produce a blurred version of the original channel with a resolution that depends on the span of the frequency and time samples available as will be discussed in the next section. If we consider the rectangular (or trivial) window, i.e., W[n, m] = 1, n = 0, ..., N−1, m = −M/2, ..., M/2−1 and zero else, then its SDFT $w(\tau, \nu)$ in (56) is the two dimensional Dirichlet kernel with bandwidth inversely proportional to N and M.

There are several other uses of the window function. The system can be designed with a window function aimed at randomizing the phases of the transmitted symbols. This randomization may be more important for pilot symbols than data carrying symbols. For example, if neighboring cells use different window functions, the problem of pilot contamination is avoided.

Channel Estimation in the OTFS Domain

There is a variety of different ways a channel estimation scheme could be designed for an OTFS system, and a variety of different implementation options and details. In the section we will only present a high level summary and highlight the key concepts.

A straightforward way to perform channel estimation entails transmitting a sounding OTFS frame containing a discrete delta function in the OTFS domain or equivalently a set of unmodulated carriers in the time frequency domain. From a practical standpoint, the carriers may be modulated with known, say BPSK, symbols which are removed at the receiver as is common in many OFDM systems. FIG. 14 shows an OTFS symbol containing such an impulse.

This approach may however be wasteful as the extend of the channel response is only a fraction of the full extend of the OTFS frame ($1/T$, $1/\Delta f$). For example, in LTE systems $1/T \approx 15$ KHz while the maximum Doppler shift $f_{d,max}$ is typically one to two orders of magnitude smaller. Similarly $1/\Delta f \approx 67$ usec, while maximum delay spread $\tau_{d,max}$ is again one to two orders of magnitude less. We therefore can have a much smaller region of the OTFS frame devoted to channel estimation while the rest of the frame carries useful data. More specifically, for a channel with support ($\pm f_{d,max}$, $\pm \tau_{max}$) we need an OTFS subframe of length ($2f_{d,max}/T$, $2\tau_{max}/\Delta f$).

In the case of multiuser transmission, each UE can have its own channel estimation subframe positioned in different parts of the OTFS frame. This is akin to multiplexing of multiple users when transmitting Uplink Sounding Reference Signals in LTE. The difference is that OTFS benefits from the virtuous effects of its two dimensional nature. For example, if $\tau_{max}$ is 5% of the extend of the delay dimension and $f_{d,max}$ is 5% of the Doppler dimension, the channel estimation subframe need only be 5%×5%=0.25% of the OTFS frame.

Notice that although the channel estimation symbols are limited to a small part of the OTFS frame, they actually sound the whole time-frequency domain via the corresponding basis functions associated with these symbols.

A different approach to channel estimation is to devote pilot symbols on a subgrid in the time-frequency domain. The key question in this approach is the determination of the density of pilots that is sufficient for channel estimation without introducing aliasing. Assume that the pilots occupy the subgrid $(n_0T, m_0\Delta f)$ for some integers $n_0, m_0$. Recall that for this grid the SDFT will be periodic with period $(1/n_0T, 1/m_0\Delta f)$. Then, applying the aliasing results discussed earlier to this grid, we obtain an alias free Nyquist channel support region of $(\pm f_{d,max}, \pm\tau_{max}) = (\pm\frac{1}{2}n_0T, \pm\frac{1}{2}m_0\Delta f)$. The density of the pilots can then be determined from this relation given the maximum support of the channel. The pilot subgrid should extend to the whole time-frequency frame, so that the resolution of the channel is not compromised.

OTFS-Access: Multiplexing More than One User

There is a variety of ways to multiplex several uplink or downlink transmissions in one OTFS frame. Here we will briefly review the following multiplexing methods:

Multiplexing in the OTFS delay-Doppler domain
Multiplexing in the time-frequency domain
Multiplexing in the code speading domain
Multiplexing in the spatial domain 1. Multiplexing in the Delay-Doppler Domain:

This is the most natural multiplexing scheme for downlink transmissions. Different sets of OTFS basis functions, or sets of information symbols or resource blocks are given to different users. Given the orthogonality of the basis functions, the users can be separated at the UE receiver. The UE need only demodulate the portion of the OTFS frame that is assigned to it.

Figure 60:
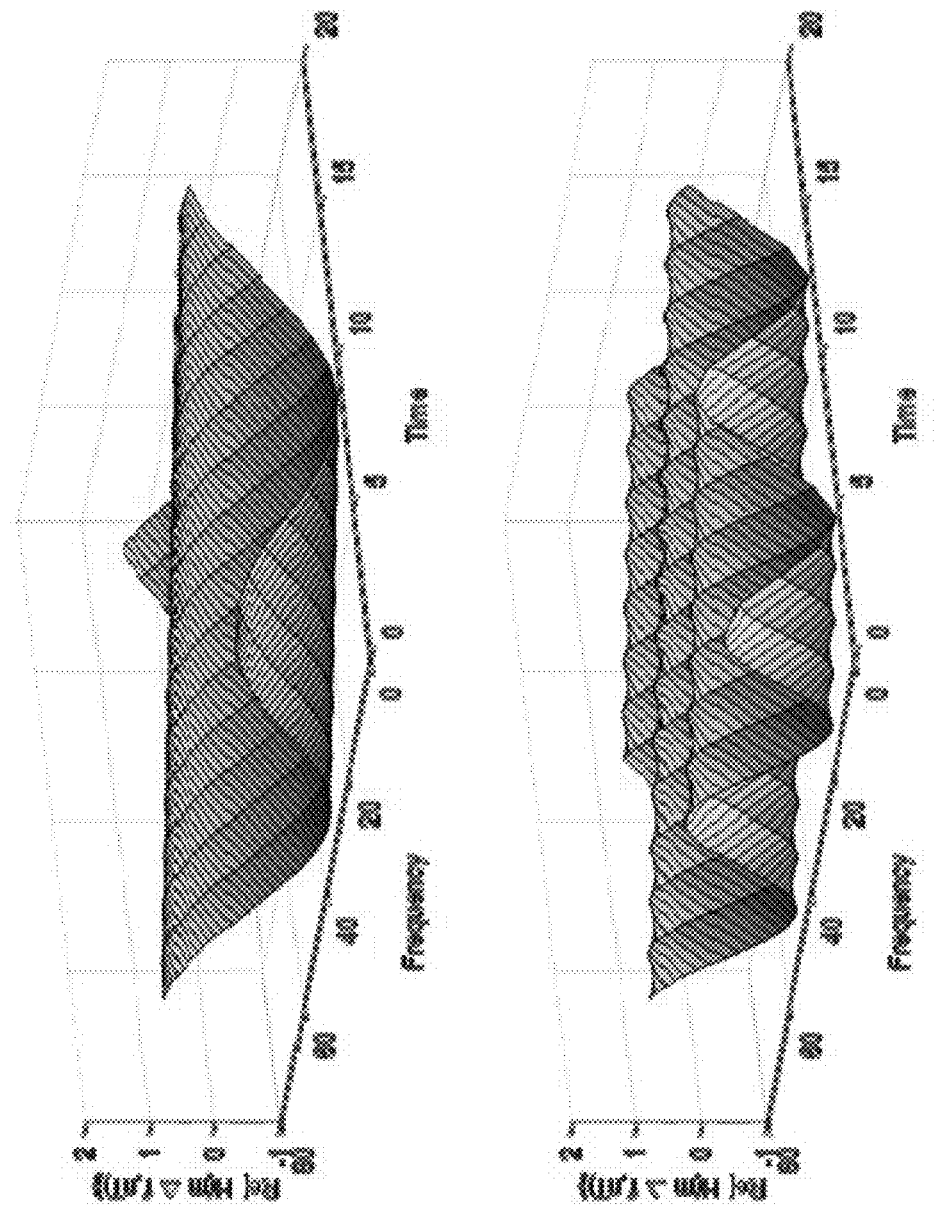
FIG. 60 illustrates different two-dimensional basis functions associated with different users.

This approach is similar to the allocation of PRBs to different UEs in LTE. One difference is that in OTFS, even a small subframe or resource block in the OTFS domain will be transmitted over the whole time-frequency frame via the basis functions and will experience the average channel response. FIG. 60 illustrates this point by showing two different basis functions belonging to different users. Because of this, there is no compromise on channel resolution for each user, regardless of the resource block or subframe size.

In the uplink direction, transmissions from different users experience different channel responses. Hence, the different subframes in the OTFS domain will experience a different convolution channel. This can potentially introduce inter-user interference at the edges where two user subframes are adjacent, and would require guard gaps to eliminate it. In order to avoid this overhead, a different multiplexing scheme can be used in the uplink as explained next.

Figure 46:
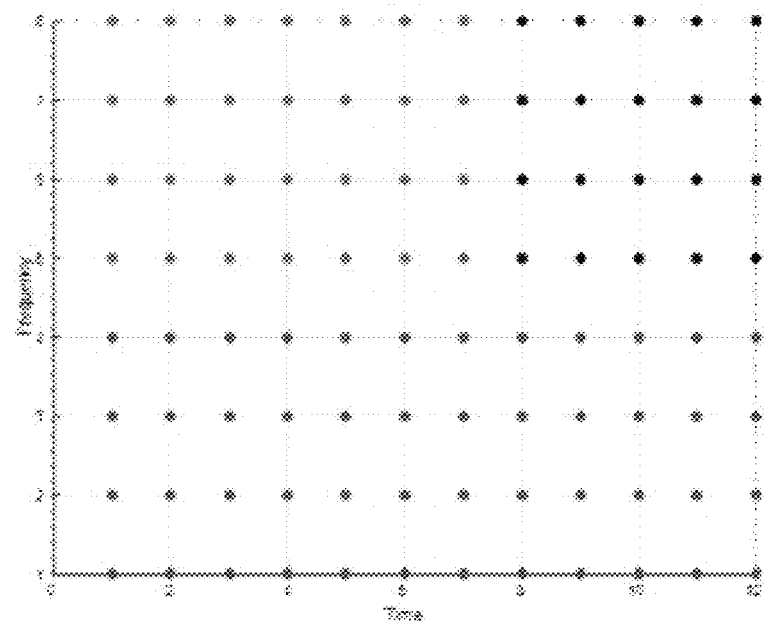
FIG. 46 illustrates the allocation of resource blocks or subframes to among three users in the time-frequency domain.

2. Multiplexing in the Time-Frequency Domain:

In this approach, resource blocks or subframes are allocated to different users in the time-frequency domain, burst type of IoT applications. FIG. 46 illustrates this for a three user case. In this figure, User 1 (blue) occupies the whole frame length but only half the available subcarriers. Users 2 and 3 (red and black respectively) occupy the other half subcarriers, and divide the total length of the frame between them.

Notice that in this case, each user employs a slightly different version of the OTFS modulation described. One difference is that each user i performs an SFFT on a subframe $(N_i, M_i)$, $N_i \leq N$, $M_i \leq M$. This reduces the resolution of the channel, or in other words reduces the extent of the time-frequency plane in which each user will experience its channel variation. On the other side, this also gives the scheduler the opportunity to schedule users in parts of the time-frequency plane where their channel is best.

Figure 47:
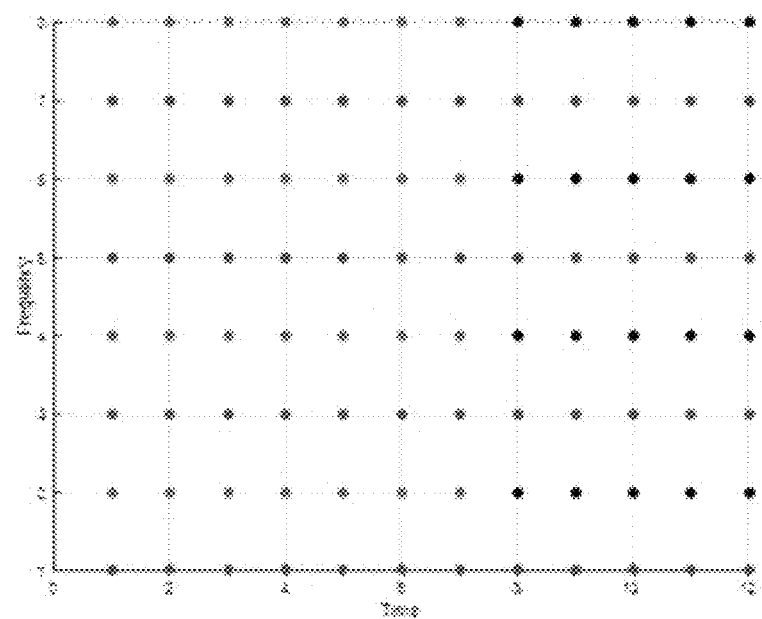
FIG. 47 illustrates an allocation of resource blocks among three users in the time-frequency domain with interleaving on the subcarrier dimension.

If we wish to extract the maximum diversity of the channel and allocate users across the whole time-frequency frame, we can multiplex users via interleaving. In this case, one user occupies a subsampled grid of the time-frequency frame, while another user occupies another subsampled grid adjacent to it. FIG. 47 shows the same three users as before but interleaved on the subcarrier dimension. Of course, interleaving is possible in the time dimension as well, and/or in both dimensions. The degree of interleaving, or subsampling the grip per user is only limited by the spread of the channel that we need to handle.

3. Multiplexing in the Time-Frequency Spreading Code Domain:

Let us assume that we wish to design a random access PHY and MAC layer where users can access the network without having to undergo elaborate RACH and other synchronization procedures. There have been several discussions on the need for such a system to support Internet of Things (IoT) deployments. OTFS can support such a system by employing a spread-spectrum approach. Each user is assigned a different two-dimensional window function that is designed as a randomizer. The windows of different users are designed to be nearly orthogonal to each other and nearly orthogonal to time and frequency shifts. Each user then only transmits on one or a few basis functions and uses the window as a means to randomize interference and provide processing gain. This can result in a much simplified system that may be attractive for low cost, short burst type of IoT applications.

4. Multiplexing in the Spatial Domain:

Finally, like other OFDM multicarrier systems, a multi-antenna OTFS system can support multiple users transmitting on the same basis functions across the whole time-frequency frame. The users are separated by appropriate transmitter and receiver beamforming operations.

Exemplary Implementations of OTFS Communication Systems

Embodiments of Orthogonal Time Frequency Space (OTFS) modulation are comprised of a cascade of two transformations. The first transformation maps the two dimensional plane where the information symbols reside (and which we call the delay-Doppler plane) to the time frequency plane. The second one transforms the time frequency domain to the waveform time domain where actual transmitted signal is constructed. This transform can be thought of as a generalization of multicarrier modulation schemes.

Figure 3B:
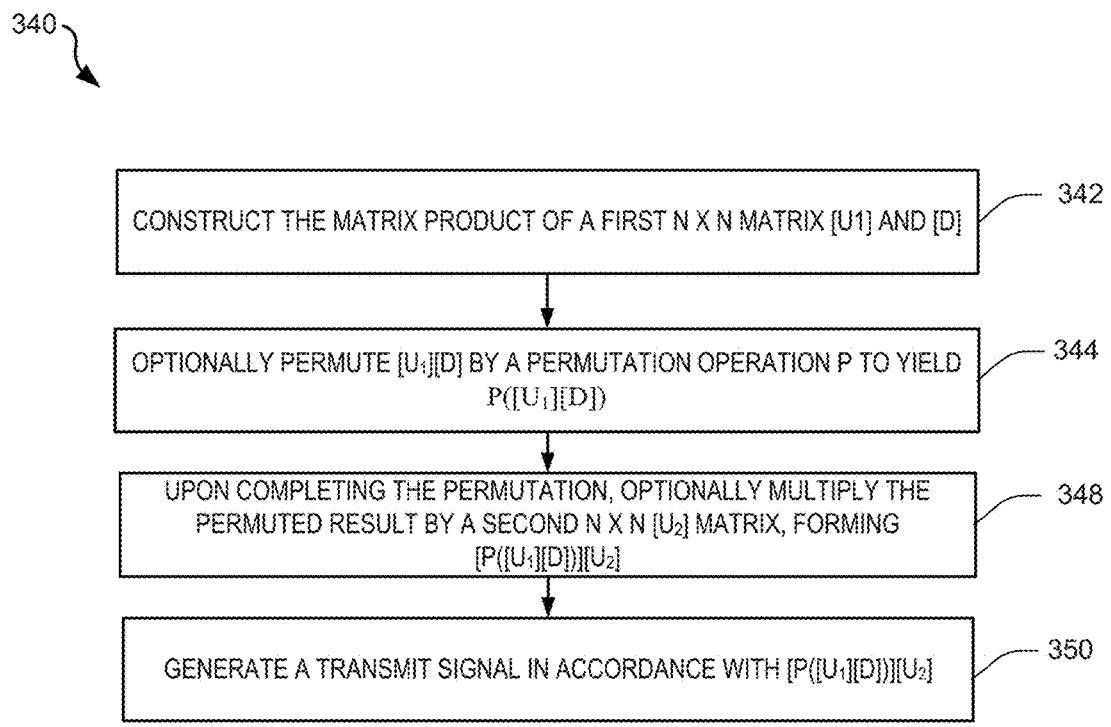
FIG. 3B illustrates a process by which an OTFS transceiver of a transmitting device within the system of FIG. 3A may transmit a data frame.
Figure 3C:
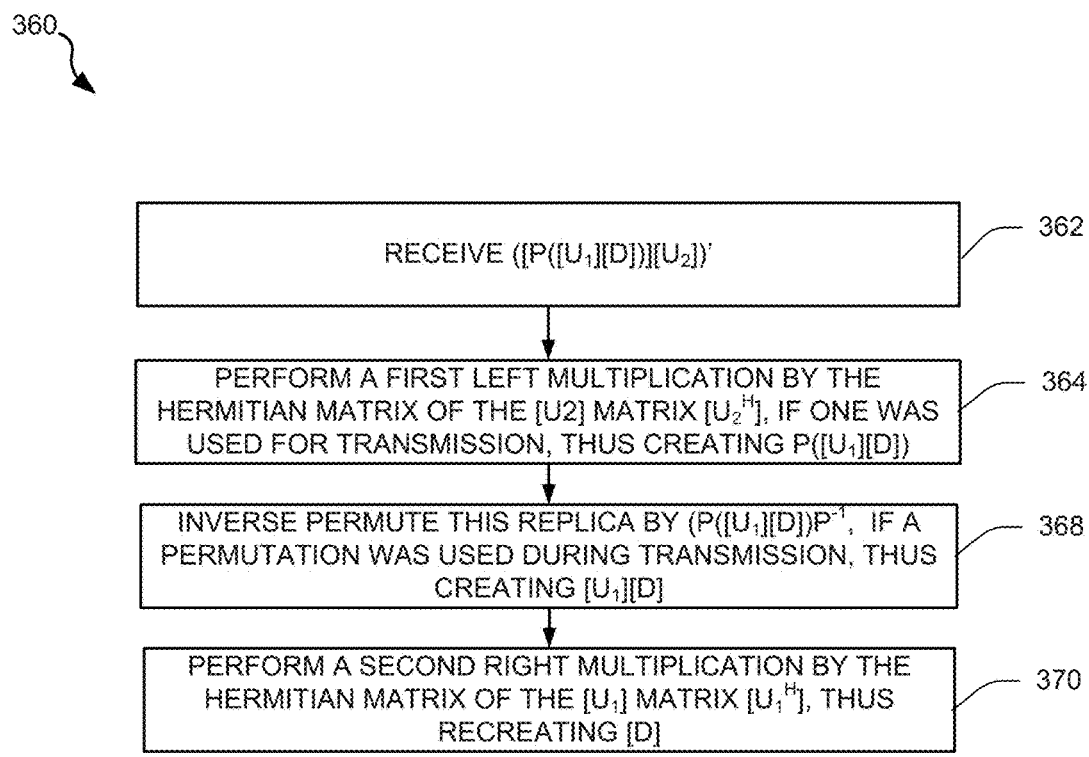
FIG. 3C illustrates a process by which an OTFS transceiver of a receiving device within the system of FIG. 3A may operate to receive a transmitted data frame.
Figure 4A:
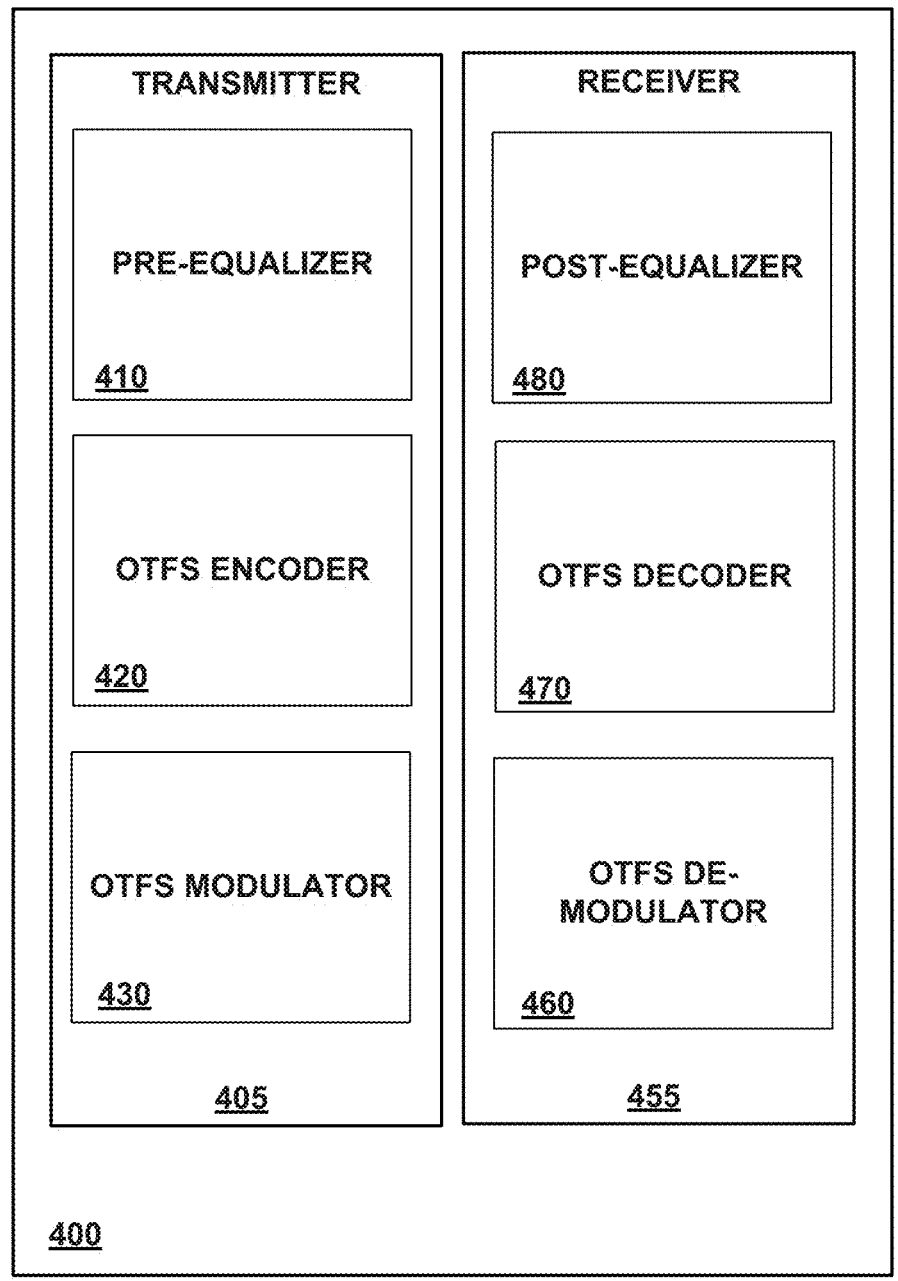
FIG. 4A illustrates components of an exemplary OTFS transceiver.

FIG. 4A illustrates components of an exemplary OTFS transceiver 400. The OTFS transceiver 400 can be used as one or both of the exemplary OTFS transceivers 315 illustrated in the communication system 300 of FIG. 3. The OTFS transceiver 400 includes a transmitter module 405 that includes a pre-equalizer 410, an OTFS encoder 420 and an OTFS modulator 430. The OTFS transceiver 400 also includes a receiver module 455 that includes a post-equalizer 480, an OTFS decoder 470 and an OTFS demodulator 460. The components of the OTFS transceiver may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. The disclosed OTFS methods will be described in view of the various components of the transceiver 400.

In one aspect a method of OTFS communication involves transmitting at least one frame of data ([D]) from the transmitting device 310 to the receiving device 330 through the communication channel 320, such frame of data comprising a matrix of up to $N^2$ data elements, N being greater than 1. The method comprises convolving, within the OTFS transceiver 315-1, the data elements of the data frame so that the value of each data element, when transmitted, is spread over a plurality of wireless waveforms, each waveform having a characteristic frequency, and each waveform carrying the convolved results from a plurality of said data elements from the data frame [D]. Further, during the transmission process, cyclically shifting the frequency of this plurality of wireless waveforms over a plurality of times so that the value of each data element is transmitted as a plurality of cyclically frequency shifted waveforms sent over a plurality of times. At the receiving device 330, the OTFS transceiver 315-2 receives and deconvolves these wireless waveforms thereby reconstructing a replica of said at least one frame of data [D]. In the exemplary embodiment the convolution process is such that an arbitrary data element of an arbitrary frame of data ([D]) cannot be guaranteed to be reconstructed with full accuracy until substantially all of these wireless waveforms have been transmitted and received.

Figure 5:
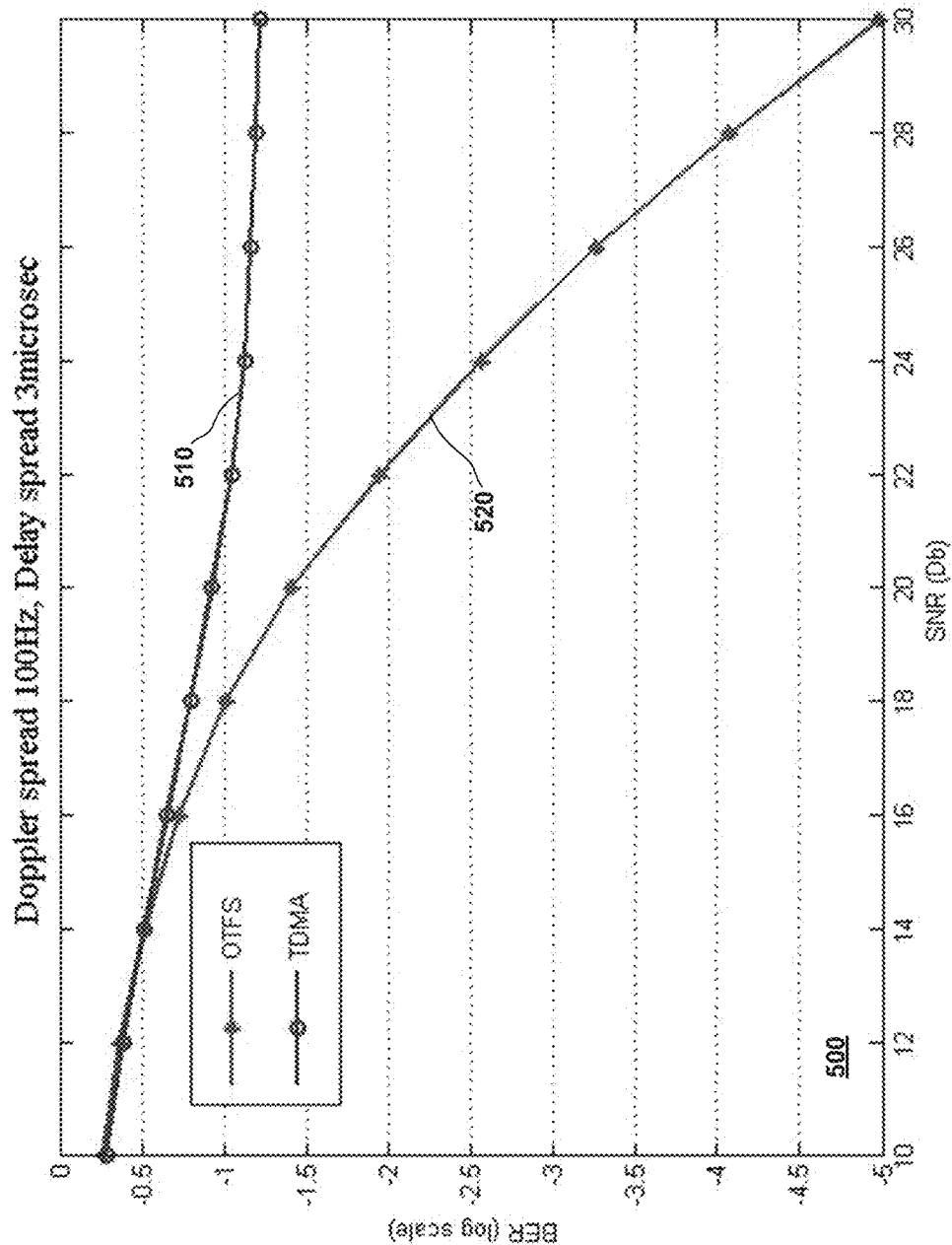
FIG. 5 illustrates a comparison of predicted bit error rate between an exemplary OTFS method and a time division multiple access method over an exemplary communication channel exhibiting time/frequency fading.

FIG. 5 illustrates a comparison of bit error rates (BER) predicted by a simulation of a TDMA system and an OTFS system. Both systems utilize a 16 QAM constellation. The simulation modeled a Doppler spread of 100 Hz and a delay spread of 3 microsec. As can be seen from the graphs, the OTFS system offers much lower BER than the TDMA system for the same signal-to-noise ratio (SNR).

Figure 44:
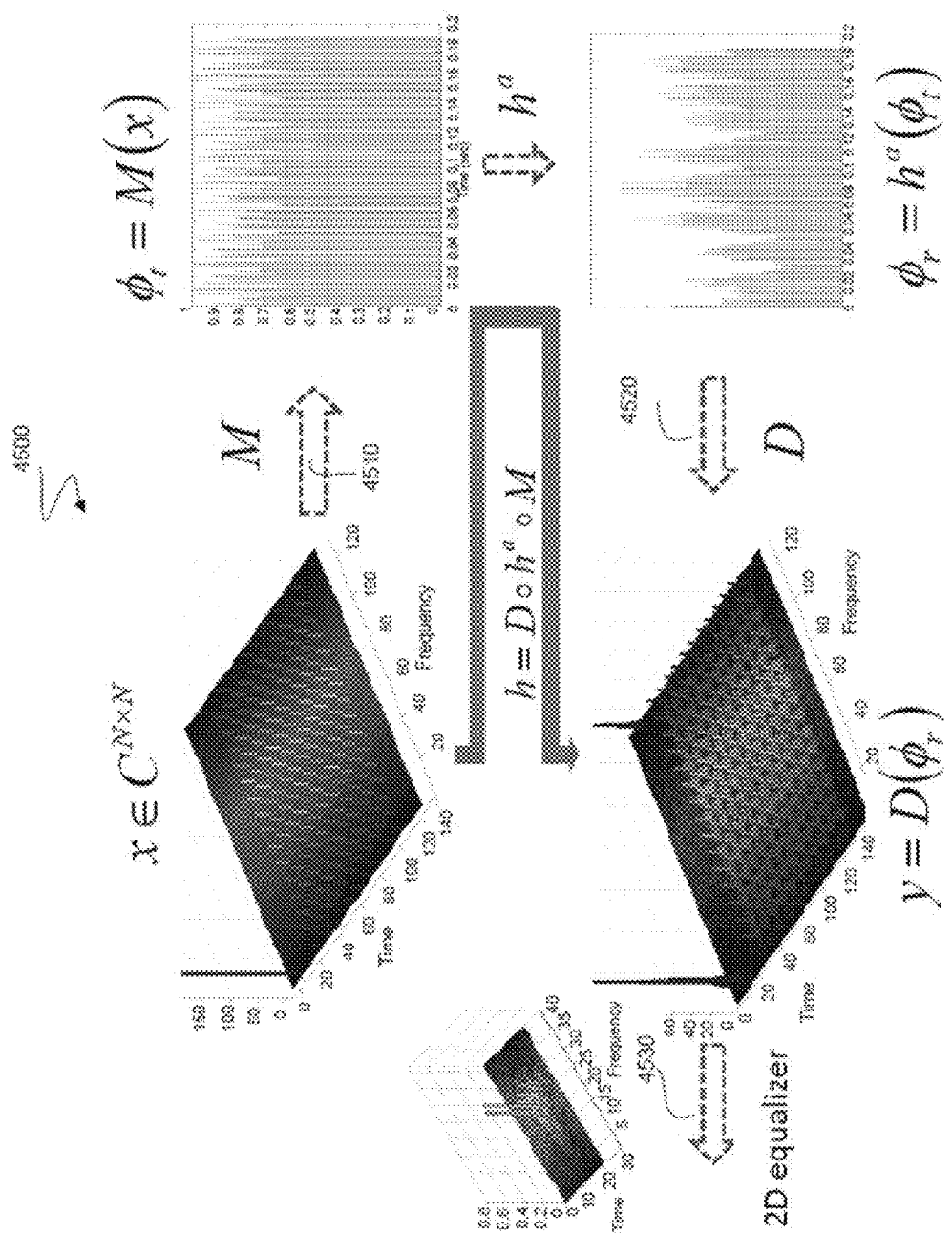
FIG. 44 is a flowchart representative of the operations performed by an OTFS transceiver.

Attention is now directed to FIG. 44, which is a flowchart representative of the operations performed by an OTFS transceiver 4400 which may be implemented as, for example, the OTFS transceiver 400. The OTFS transceiver 4400 includes a transmitter including a modulator 4410 and a receiver including a demodulator 4420 and two-dimensional equalizer 4430. In operation, a transmitter of the OTFS transceiver 4400 receives a two-dimensional symbol stream in the form of an N×N matrix of symbols, which may hereinafter be referred to as a TF matrix:

$$x \in C^{N \times N}$$

Figure 45:
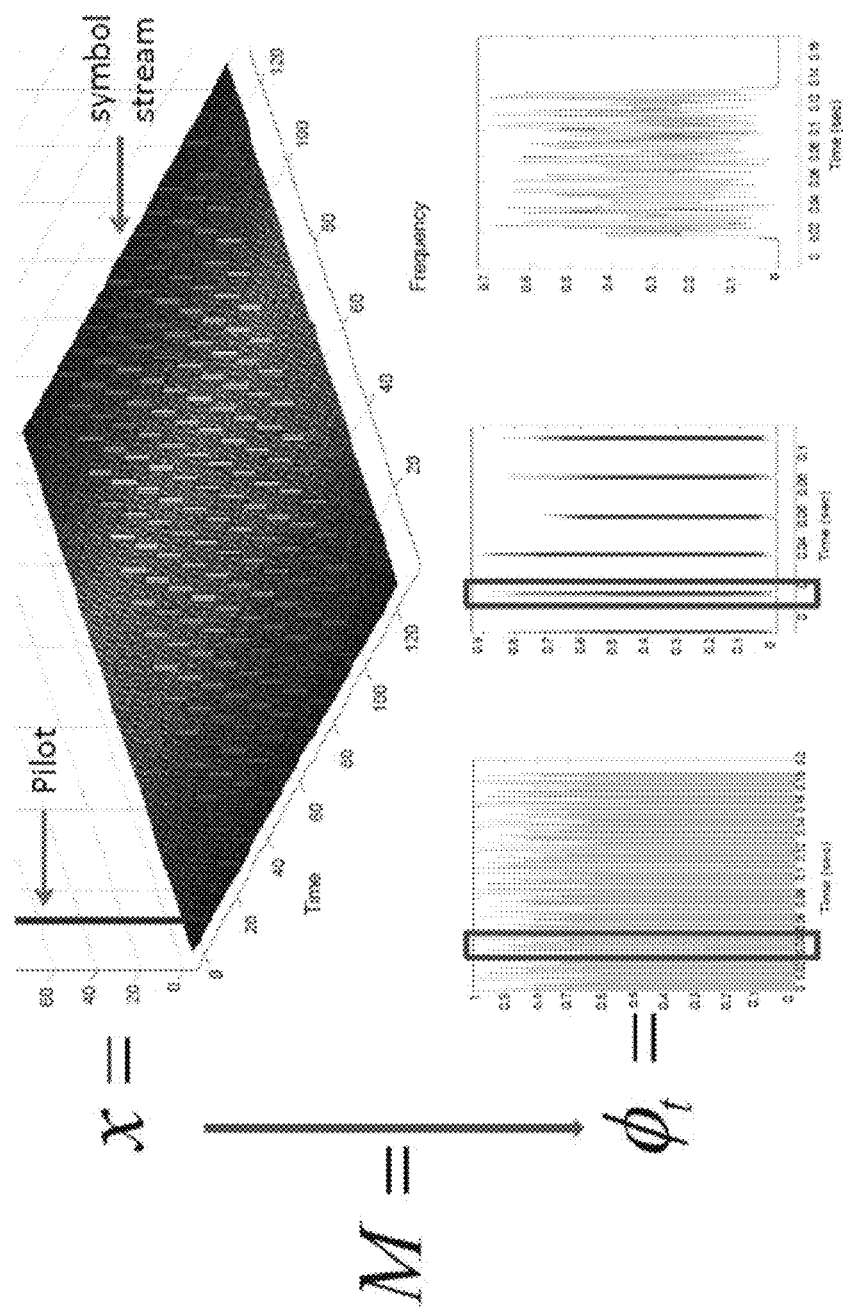
FIG. 45 illustrates the functioning of a modulator as an orthogonal map disposed to transform a two-dimensional time-frequency matrix to a transmitted waveform.

As is illustrated in FIG. 45, in one embodiment the modulator 4410 functions as an orthogonal map disposed to transform the two-dimensional TF matrix to the following transmitted waveform:

$$\phi_t = M(x) = \Sigma x(i,j)\phi_{i,j} \phi_{i,j} \overset{4}{\vee} \phi_{k,l}$$

Figure 36:
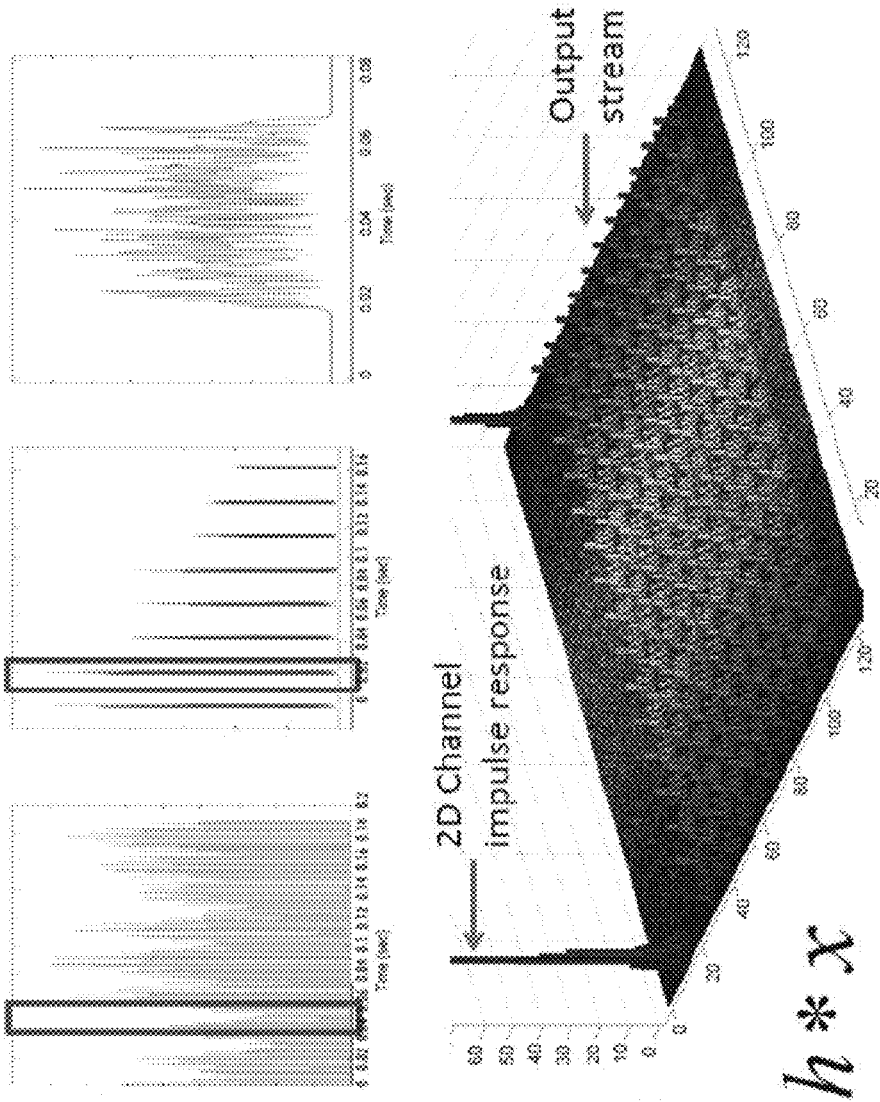
FIGS. 36 and 37 illustrate the transformation by a demodulator of a received waveform to a two-dimensional time-frequency matrix in accordance with an orthogonal map.

Referring to FIG. 36, the demodulator 4420 transforms the received waveform to a two-dimensional TF matrix in accordance with an orthogonal map in order to generate an output stream:

$$\phi_r \mapsto y = D(\phi_r)$$

In one embodiment the OTFS transceiver 4400 may be characterized by a number of variable parameters including, for example, delay resolution (i.e., digital time "tick" or clock increment), Doppler resolution, processing gain factor (block size) and orthonormal basis function. Each of these variable parameters may be represented as follows.

Delay Resolution (Digital Time Tick):

$$\Delta T \in R^{>0} \left(\Delta T = \frac{1}{Bw}\right)$$

Doppler Resolution:

$$\Delta F \in R^{>0} \left(\Delta F = \frac{1}{Trans}\right)$$

Processing Gain Factor (Block Size):

$$N > 0$$

Orthonormal Basis of $C^{N \times 1}$ (Spectral Shapes):

$$U = \{u_1, u_2, \ldots, u_N\}$$

Figure 37:
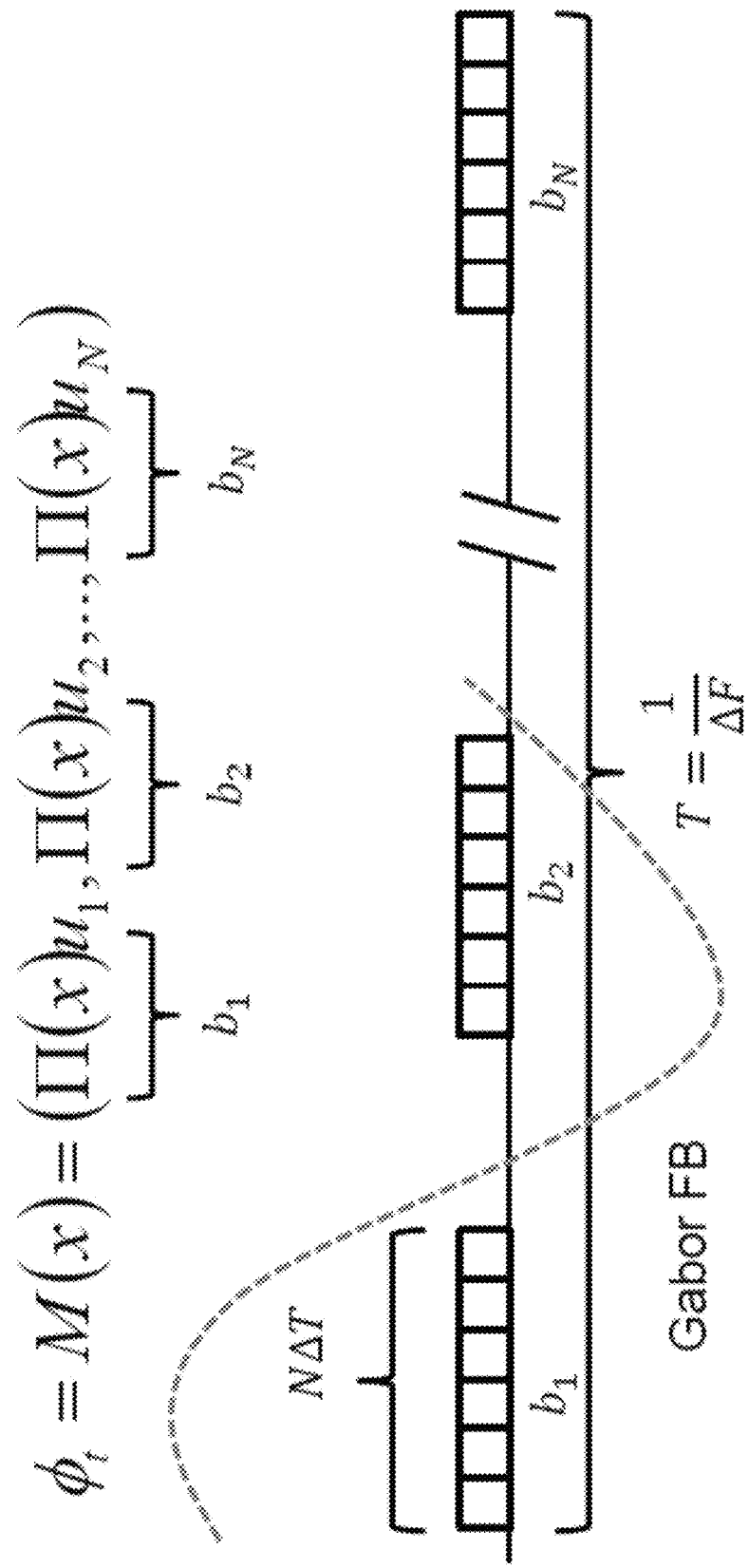

As is illustrated by FIG. 44, during operation the modulator 4410 takes a TF matrix $x \in C^{N \times N}$ and transforms it into a pulse waveform. In one embodiment the pulse waveform comprises a pulse train defined in terms of the Heisenberg representation and the spectral shapes:

$$\phi_t = M(x) = (\underbrace{\Pi(x)u_1}_{b_1}, \underbrace{\Pi(x)u_2}_{b_2}, \ldots, \underbrace{\Pi(x)u_N}_{b_N})$$

where $b_1, b_2 \ldots b_N$ are illustrated in FIG. 37 and where, in accordance with the Heisenberg relation:

$$\Pi(h*x) = \Pi(h) \cdot \Pi(x) \text{ in particular:}$$

$$\Pi(\delta_{(\tau,O)} *x) = L_\tau \cdot \Pi(x)$$

$$\Pi(\delta_{(\omega,107)} *x) = M_w \cdot \Pi(x)$$

The Heisenberg representation provides that:

$$\Pi: C^{N \times N} \overset{\cong}{\to} C^{N \times N} \text{ given by:}$$

$$\Pi(x) = \sum_{\tau,w=0}^{N-1} x(\tau, w) M_w L_\tau, x \in C^{N \times N}$$

where $L_t$ and $M_w$ are respectively representative of cyclic time and frequency shifts and may be represented as:

$$L_\tau \in C^{N \times N}: L_\tau(\varphi)(t) = \varphi(t + \tau), \tau = 0, \ldots, N - 1$$

$$M_w \in C^{N \times N}: M_w(\varphi)(t) = e^{\frac{j2\pi}{N} wt} \varphi(t), w = 0, \ldots, N - 1$$

The demodulator 4420 takes a received waveform and transforms it into a TF matrix $y \in C^{N \times N}$ defined in terms of the Wigner transform and the spectral shapes:

$$\phi_r = (b_1, b_2, \ldots, b_N)$$

$$y(\tau, w) = D(\phi_r)(\tau, w) = \overset{Wigner\ transform}{\frac{1}{N} \sum_{n=1}^{N} \langle M_w L_\tau u_n, b_n \rangle}$$

Main property of M and D (Stone von Neumann theorem):

$$D(h*M(x)) = h*x \text{ where:}$$

$$h(\tau, w) \approx a(\tau \Delta T, w \Delta F)$$

Figure 38:
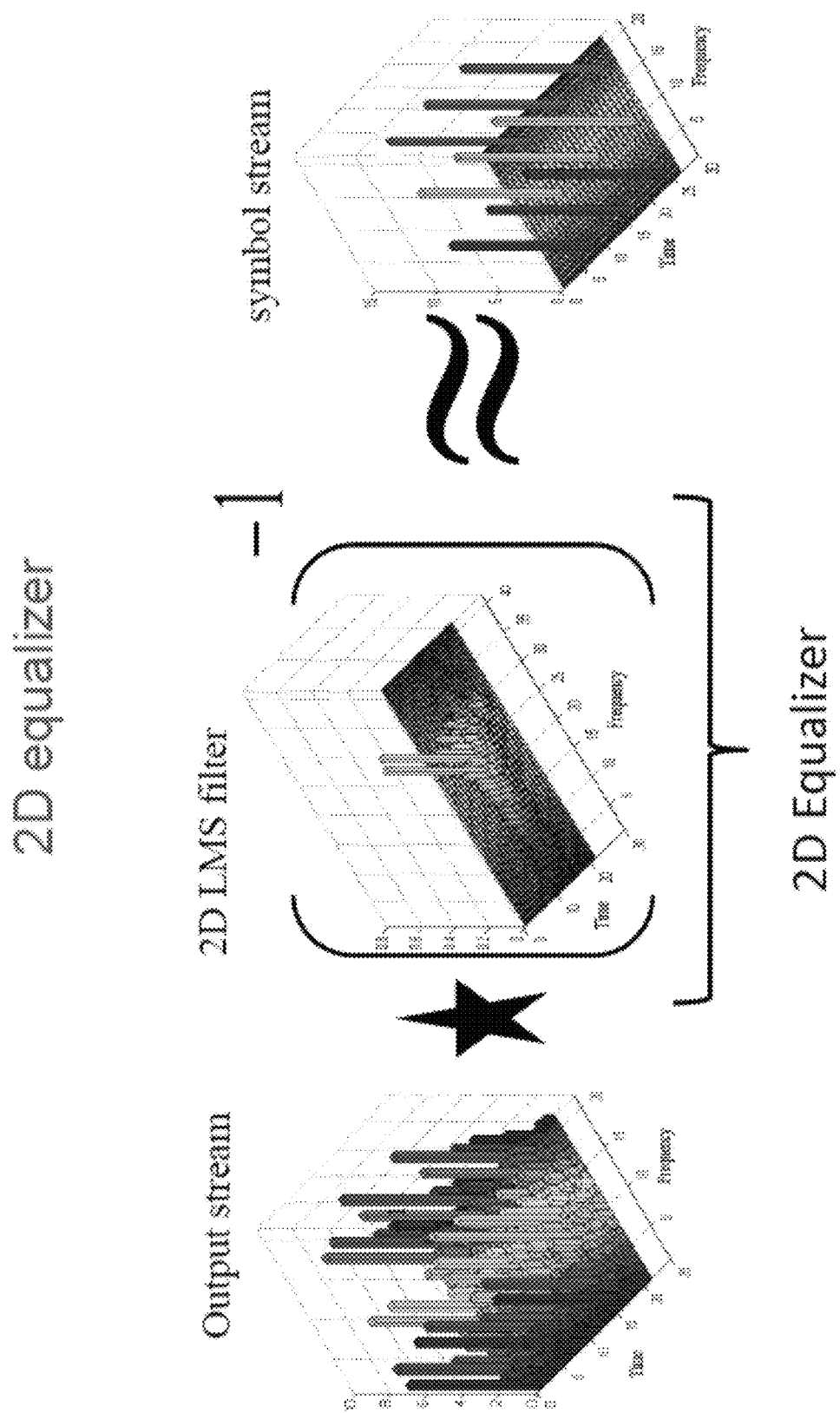
FIG. 38 illustrates an exemplary implementation of a two-dimensional decision feedback equalizer configured to perform a least means square (LMS) equalization procedure.

As illustrated in FIG. 38, the equalizer 4430 may be implemented as a two-dimensional decision feedback equalizer configured to perform a least means square (LMS) equalization procedure such that:

$$y \mapsto \hat{x}$$

Exemplary OTFS Matrix Formulation

Throughout this description, the use of matrix terminology should be understood as being a concise description of the various operations that will be carried out by either the OTFS transceiver 315-1 or the OTFS transceiver 315-2. Thus the series of steps used to obtain the coefficients of a particular matrix generally correspond to a set of instructions for the transmitter or receiver electronic circuitry (e.g., the various components of the transmitter 405 and the receiver 455 illustrated in FIG. 4A). For example, one set of coefficients may instruct the transmitter 405 or receiver 455 to perform a spread spectrum operation, a different set of coefficients may instruct the transmitter 405 or receiver 455 to perform a spectral shaping modulation or demodulation operation, and another set of coefficients may instruct the transmitter to perform various time spreading or time accumulation functions. Here standard matrix mathematics is used as a shorthand way of reciting the series of instructions used to transmit and receive these complex series of wireless signals.

Thus, when the discussion speaks of multiplying matrices, each data element in the matrix formed by the multiplication can be understood in terms of various multi-step operations to be carried out by the transmitter or receiver electronic circuitry (e.g., the transmitter 405 or the receiver 455 as illustrated in FIG. 4A), rather than as a pure number. Thus, for example, a matrix element formed from one matrix that may have spread-spectrum like pseudorandom numbers multiplied by another matrix that may have tone or spectral-shape spreading instructions, such as QAM or phase shift keying instructions, multiplied by another scanning system, permutation scheme, or matrix that may have data instructions, should be understood as directing the transmitter 405 to transmit a radio signal that is modulated according to these three means, or as directing the receiver 455 to receive and demodulate/decode a radio signal that is modulated according to these three means.

Put into matrix terminology, the OTFS method of convolving the data for a group of symbols over both time, spectrum, and tone or spectral-shape can be viewed as transforming the data frame with $N^2$ information elements (symbols) to another new matrix with $N^2$ elements whereby each element in the new transformed matrix, (here called the TFS data matrix) carries information about all elements of the original data frame. In other words the new transformed TFS data matrix will generally carry a weighted contribution from each element of the original data frame matrix [D]. Elements of this TFS data matrix are in turn transmitted and received over successive time intervals.

As previously discussed, in embodiments of the OTFS method the basic unit of convolution and deconvolution (convolution unit) is composed of a matrix of $N^2$ symbols or data elements. Over each time interval, a different waveform may be used for each data element. By contrast, prior art methods generally use the same waveform for each data element. For consistency, the $N^2$ units of data will generally be referred to in this specification as a "data frame". N may be any value greater than one, and in some embodiments will range from 64 to 256.

One distinction between the OTFS method and conventional modulation schemes may be appreciated by observing that a basic unit of convolution, transmission, reception and deconvolution for a prior art communications protocol may be characterized as a data frame of in symbols or elements "d" operated on spreading codes that send the data for in symbols over one spreading interval time where:

$$[D_{1 \times n}] = [d_1 \ d_2 \ \ldots \ d_n]$$

In contrast, embodiments of the OTFS method generally use a different basic unit of convolution, transmission, reception, and deconvolution. In particular, such OTFS embodiments will typically use a larger data frame $[D_{N \times N}]$ composed of $N^2$ elements or symbols "d" that, as will be discussed, send the data for these $N^2$ elements over a plurality of spreading interval times (often the plurality is N). The data frame $[D_{N \times N}]$ may be expressed as:

$$[D_{N \times N}] = \begin{bmatrix} d_{1,1} & d_{1,2} & \ldots & d_{1,N} \\ d_{2,1} & d_{2,2} & \ldots & d_{2,N} \\ d_{3,1} & d_{3,2} & \ldots & \\ d_{4,1} & d_{4,2} & \ldots & d_{N,N} \end{bmatrix}$$

In general, references herein to a frame of data may be considered to be a reference to the N×N or $N^2$ matrix such as the one shown above, where at least some elements in the matrix may be zero or null elements. In some embodiments, a frame of data could be non-square, or N×M, where N≠M.

OTFS Signal Transmission

As previously discussed, the OTFS method will spread this group of $N^2$ symbols across a communications link over multiple spreading intervals of time (usually at least N spreading intervals or times), where each individual spreading interval of time is composed of at least N time slices. Note that due to potential overhead for synchronization and identification purposes, in some embodiments, extra time slices and/or extra spreading intervals of time may be allocated to provide room for this overhead. Although for clarity of presentation this overhead will generally be ignored, it should be understood that the disclosure is intended to also encompass methods in which such overhead exists.

In exemplary embodiments of the OTFS method the data will thus be transmitted as a complex series of waveforms, usually over wireless radio signals with frequencies usually above 100 MHz, and often above 1 GHz or more. These radio frequencies are then usually received over at least N spreading time intervals, where each spreading time interval is often composed of at least N time-slices. Once received, the original data frame will be deconvolved (i.e. solved for) and the most likely coefficients of the original group of symbols are reconstructed. It should be evident that in order to successfully deconvolve or solve for the original data frame, the receiver will usually have prior knowledge of the time, spectrum, and tone or spectral-shape spreading algorithms used by the transmitter.

Attention is now directed to FIG. 3B, which illustrates an exemplary process 340 by which the OTFS transceiver 315-1 of the transmitting device 310 may transmit a data frame (or a convolution unit) of data, here expressed as an (N by N) or ($N^2$) matrix [D]. This process may be described using standard matrix multiplication as follows:

1: Construct the matrix product of a first N×N matrix [U1] and [D] (often written as either [$U_1$]*[D] or more simply [$U_1$][D]—here both the "*" and simple close association (e.g. [$U_1$][D]) both are intended to represent matrix multiplication)(stage 342).

2: Optionally permute [$U_1$][D] by a permutation operation P in order to create a new N×N matrix (stage 344). In general, any invertible permutation operation may be used. P may be an identity operation, or alternatively may be a permutation operation that essentially translates the columns of the original N×N [U$_1$][D] matrix to diagonal elements of a transformed [U$_1$][D]' matrix.

3: Upon completing the permutation, optionally multiply the permuted result by a second N×N [U$_2$] matrix (for spectral shaping for example), forming:
[P([U$_1$][D])][U$_2$] (stage 348).

4: Transmit this signal, according to methods discussed below (stage 350).

In one embodiment the permutation operation P may optionally be of the form:

$$b_{i,j} = a_{i,(j-i) \bmod N}$$

where [a] is the original matrix (here [U$_1$][D]), and [b] is the new matrix (here P([U$_1$][D]).

For sake of simplicity, the result of this permutation operation may be written as P([U$_1$][D]).

FIG. 22 illustrates another permutation that may be used. In this case, the permutation is given by the following relationship:

$$b_{i,j} = a_{i,(j+i) \bmod N}$$

Figure 23:
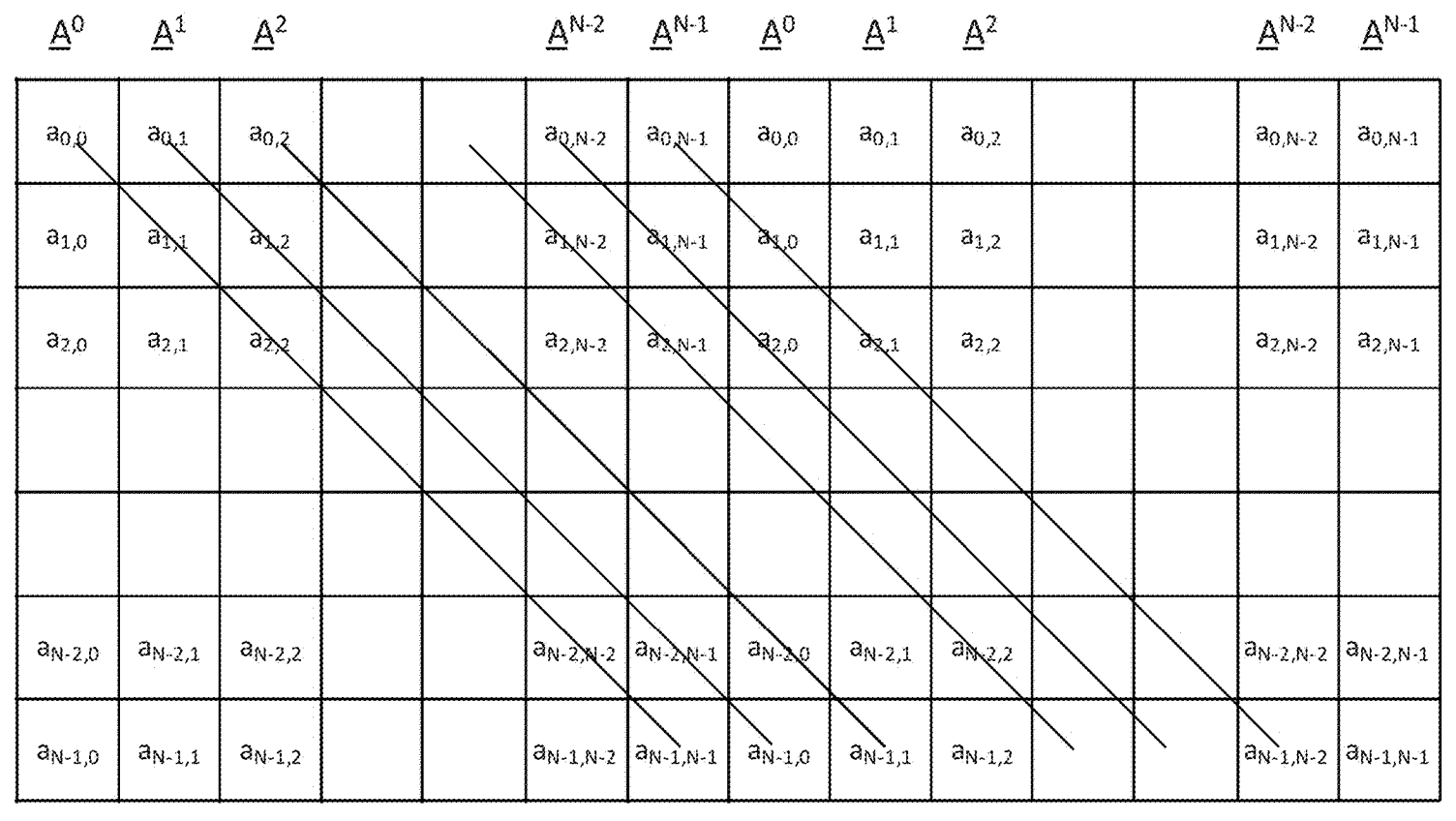

Yet another permutation option is illustrated in FIG. 23. In FIG. 23, for illustrative purposes, a second [a] matrix is placed next to the original [a] matrix. Diagonal lines are drawn overlapping the first and second [a] matrices. The permuted [b] matrix is formed by translating each diagonal line one column to the left (or right in yet another permutation), where one or more of the translated entries falls into the second [a] matrix such that one or more entries is moved from the second [a] matrix to the same position in the first [a] matrix.

Here [U$_1$] and [U$_2$], if being used, can both be unitary N×N matrices, usually chosen to mitigate certain impairments on the (often wireless) communications link, such as wide band noise, narrow-band interference, impulse noise, Doppler shift, crosstalk, etc. To do this, rather than simply selecting [U$_1$] and [U$_2$] to be relatively trivial identity matrices [I], or matrices with most of the coefficients simply being placed along the central diagonal of the matrix, [U$_1$] and [U$_2$] will usually be chosen with non-zero coefficients generally throughout the matrix so as to accomplish the desired spreading or convolution of the convolution unit [D] across spectrum and tone or spectral-shape space in a relatively efficient and uniform manner. Usually, the matrix coefficients will also be chosen to maintain orthogonality or to provide an ability to distinguish between the different encoding schemes embodied in the different rows of the respective matrices, as well as to minimize autocorrelation effects that can occur when radio signals are subjected to multi-path effects.

In reference to the specific case where [U$_1$] may have rows that correspond to pseudo-random sequences, it may be useful to employ a permutation scheme where each successive row in the matrix is a cyclically rotated version of the pseudo-random sequence in the row above it. Thus the entire N×N matrix may consist of successive cyclically rotated versions of a single pseudo-random sequence of length N.

Figures 17A, 17B:
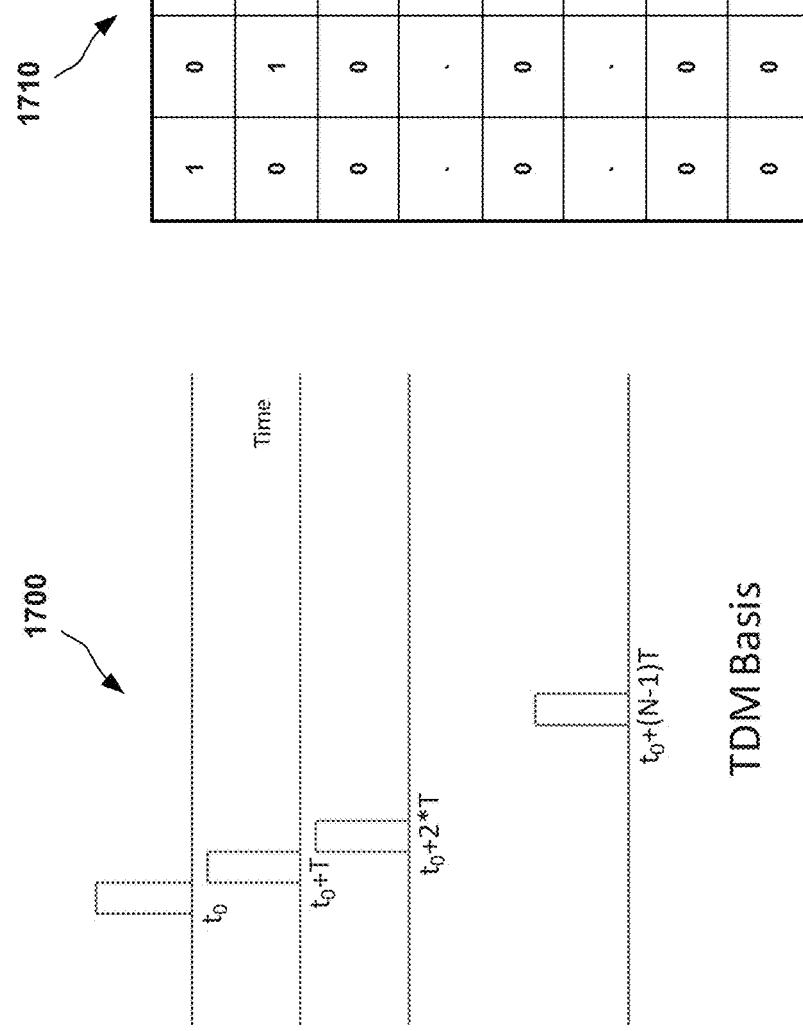
FIG. 17A illustrates a unitary matrix [U1] in the form of an identity matrix representative of a time division multiplexed transmission basis.
FIG. 17B illustrates a series of time slots on a set of time lines corresponding to a series of time division multiplexed transmissions.
Figure 19B:
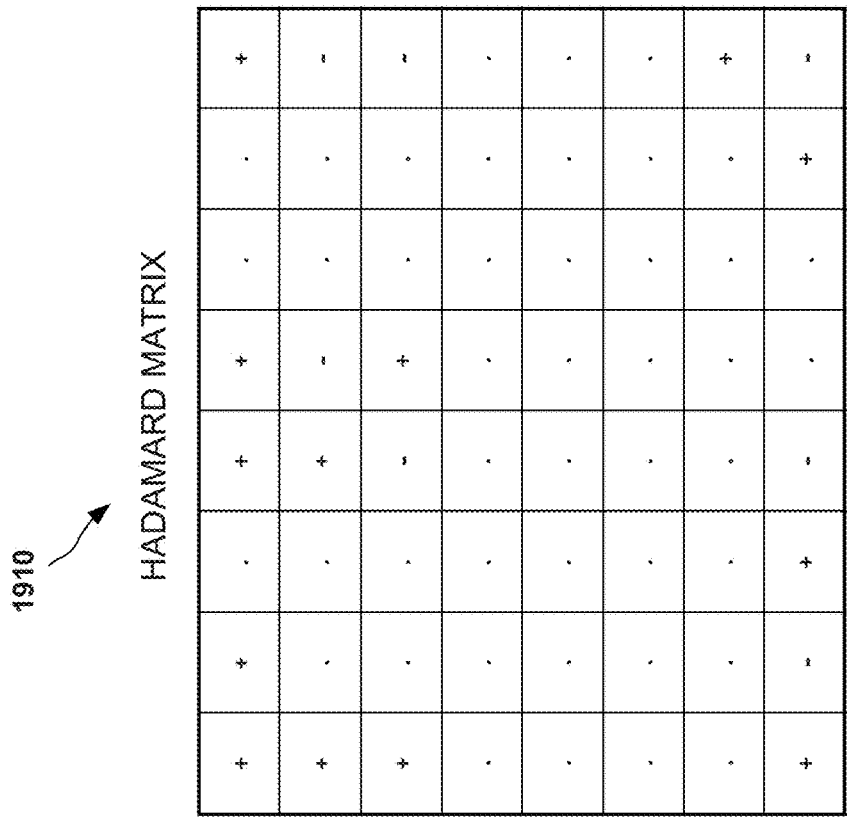
FIG. 19B is an illustration including a set of time lines representing the transmission of different quasi-random code division multiplexed signals using different quasi-random codes.
Figure 19A:
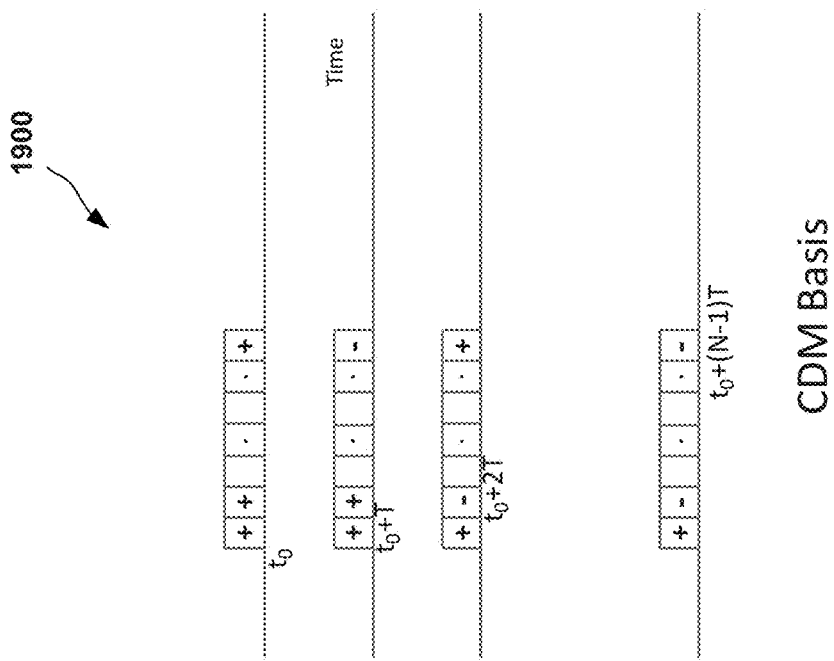
FIG. 19A illustrates a unitary matrix [U1] in the form of a Hadamard matrix representative of a code division multiplexed transmission basis.

FIGS. 17-19 illustratively represent the manner in which different types of unitary matrices [U$_1$] can be used to represent various forms of modulation. For example, FIG. 17A illustrates a unitary matrix [U1] in the form of an identity matrix 1710 representative of a time division multiplexed transmission basis; that is, a matrix of basis vectors where each column and each row is comprised of a single "1" and multiple "0" values. When the identity matrix 1710 is combined with a data matrix [D], the result corresponds to each column of [D] being transmitted in a different time slot corresponding to one of the time lines 1700 (i.e., the columns of [D] are transmitted in a time division multiplexed series of transmissions). See FIG. 17B.

FIG. 18A illustrates a unitary matrix [U$_1$] in the form of a DFT basis vector matrix 1810 representative of a frequency division multiplexed transmission basis. The DFT basis vector matrix 1810 is comprised of N column entries representing rotating phaser or tone basis vectors. When the DFT basis vector matrix 1810 is multiplied by a data matrix [D], the columns of the resulting matrix represent rotating phasers each having a different frequency offset or tone as represented by the set of time lines 1800 (FIG. 18B). This corresponds to each column of [D] being transmitted at a different frequency offset or tone.

FIG. 19 illustrates a unitary matrix [U$_1$] in the form of a Hadamard matrix 1910 representative of a code division multiplexed transmission basis. The Hadamard matrix 1910 is comprised of a set of quasi-random plus and minus basis vectors. When the Hadamard matrix 1910 is multiplied by a data matrix [D], the columns of the resulting matrix represent different quasi-random code division multiplexed signals as represented by the set of time lines 1900 (FIG. 19B). This corresponds to each column of [D] being transmitted using a different quasi-random code.

In principle, [U$_1$] and [U$_2$], if both are being used, may be a wide variety of different unitary matrices. For example, [U$_1$] may be a Discrete Fourier Transform (DFT) matrix and [U$_2$] may be a Hadamard matrix. Alternatively [U$_1$] may be a DFT matrix and [U$_2$] may be a chirp matrix. Alternatively [U$_1$] may be a DFT matrix and [U$_2$] may also be a DFT matrix, and so on. Thus although, for purposes of explaining certain aspects of the OTFS method, certain specific examples and embodiments of [U$_1$] and [U$_2$] will be given, these specific examples and embodiments are not intended to be limiting.

Note that a chirp matrix, [V], is commonly defined in signal processing as a matrix where, if $\Psi$ is the chirp rate, [V]=diag($\Psi, \Psi^2, \ldots, \Psi^n$), $\Psi = e^{j\psi}$, and frequency=$e^{j\omega}$
where $\omega$ is the initial center frequency of the spectrum.

Alternatively, a different chirp matrix may be used, filled with elements of the form:

$$V_{j,k} = e^{\left(\frac{-i2\pi k j^2}{N}\right)}$$

Where j is the matrix row, k is the matrix column, and N is the size of the matrix.

Other commonly used orthonormal matrices, which may be used for [U$_1$], or [U$_2$] or [U$_3$] (to be discussed), include Discrete Fourier matrices, Polynomial exponent matrices, harmonic oscillatory, matrices, the previously discussed Hadamard matrices, Walsh matrices, Haar matrices, Paley matrices, Williamson matrices, M-sequence matrices, Legendre matrices, Jacobi matrices, Householder matrices, Rotation matrices, and Permutation matrices. The inverses of these matrices may also be used.

As will be discussed, in some embodiments, [U$_1$] can be understood as being a time-frequency shifting matrix, and [U$_2$] can be understood as being a spectral shaping matrix. In order to preserve readability, [U$_1$] will thus often be referred to as a first time-frequency shifting matrix, and [U$_2$] will thus often be referred to as a second spectral shaping matrix. However use of this nomenclature is also not intended to be limiting. In embodiments in which the optional permutation or multiplication by a second matrix [U2] is not performed, the [U1] matrix facilitates time shifting by providing a framework through which the elements of the resulting transformed data matrix to be transmitted at different times (e.g., on a column by column basis or any other ordered basis).

Turning to some more specific embodiments, in some embodiments, [U$_1$] may have rows that correspond to Legendre symbols, or spreading sequences, where each successive row in the matrix may be a cyclically shifted version of the Legendre symbols in the row above it. These Legendre symbols will occasionally also be referred to in the alternative as base vectors, and occasionally as spectrum-spreading codes.

In some embodiments, [U$_2$] may chosen to be a Discrete Fourier transform (DFT) matrix or an Inverse Discrete Fourier Transform matrix (IDFT). This DFT and IDFT matrix can be used to take a sequence of real or complex numbers, such as the N×N (P[U$_1$][D]) matrix, and further modulate P([U$_1$][D]) into a series of spectral shapes suitable for wireless transmission.

The individual rows for the DFT and IDFT matrix [U$_2$] will occasionally be referred in the alternative as Fourier Vectors. In general, the Fourier vectors may create complex sinusoidal waveforms (tone or spectral-shapes) of the type:

$$X_j^k = e^{\left(\frac{-i*2*\pi*j*k}{N}\right)}$$

where, for an N×N DFT matrix, X is the coefficient of the Fourier vector in row k, column N of the DFT matrix, and j is the column number. The products of this Fourier vector can be considered to be tones or spectral-shapes.

Although certain specific [U$_1$] and [U$_2$] can be used to transmit any given data frame [D], when multiple data frames [D] are being transmitted simultaneously, the specific [U$_1$] and [U$_2$] chosen may vary between data frames [D], and indeed may be dynamically optimized to avoid certain communications link impairments over the course of transmitting many data frames [D] over a communications session.

This process of convolution and modulation will normally be done by an electronic device, such as a microprocessor equipped, digital signal processor equipped, or other electronic circuit that controls the convolution and modulation parts of the wireless radio transmitter. Similarly the process of receiving and demodulation will also generally rely upon a microprocessor equipped, digital signal processor equipped, or other electronic circuit that controls the demodulation, accumulation, and deconvolution parts of the wireless radio receiver.

Thus again using matrix multiplication, and again remembering that these are all N×N matrices, [P([U$_1$][D])][U$_2$], where [U$_2$] is optional, represents the TFS data matrix that the transmitter will distribute over a plurality of time spreading intervals, time slices, frequencies, and spectral shapes. Note again that as a result of the various matrix operation and optional permutation steps, a single element or symbol from the original N×N data matrix [D] after modulation and transmission, will be distributed throughout the different time spreading intervals, time slices, frequencies, and spectral shapes, and then reassembled by the receiver and deconvolved back to the original single data element of symbol.

Figure 6A:
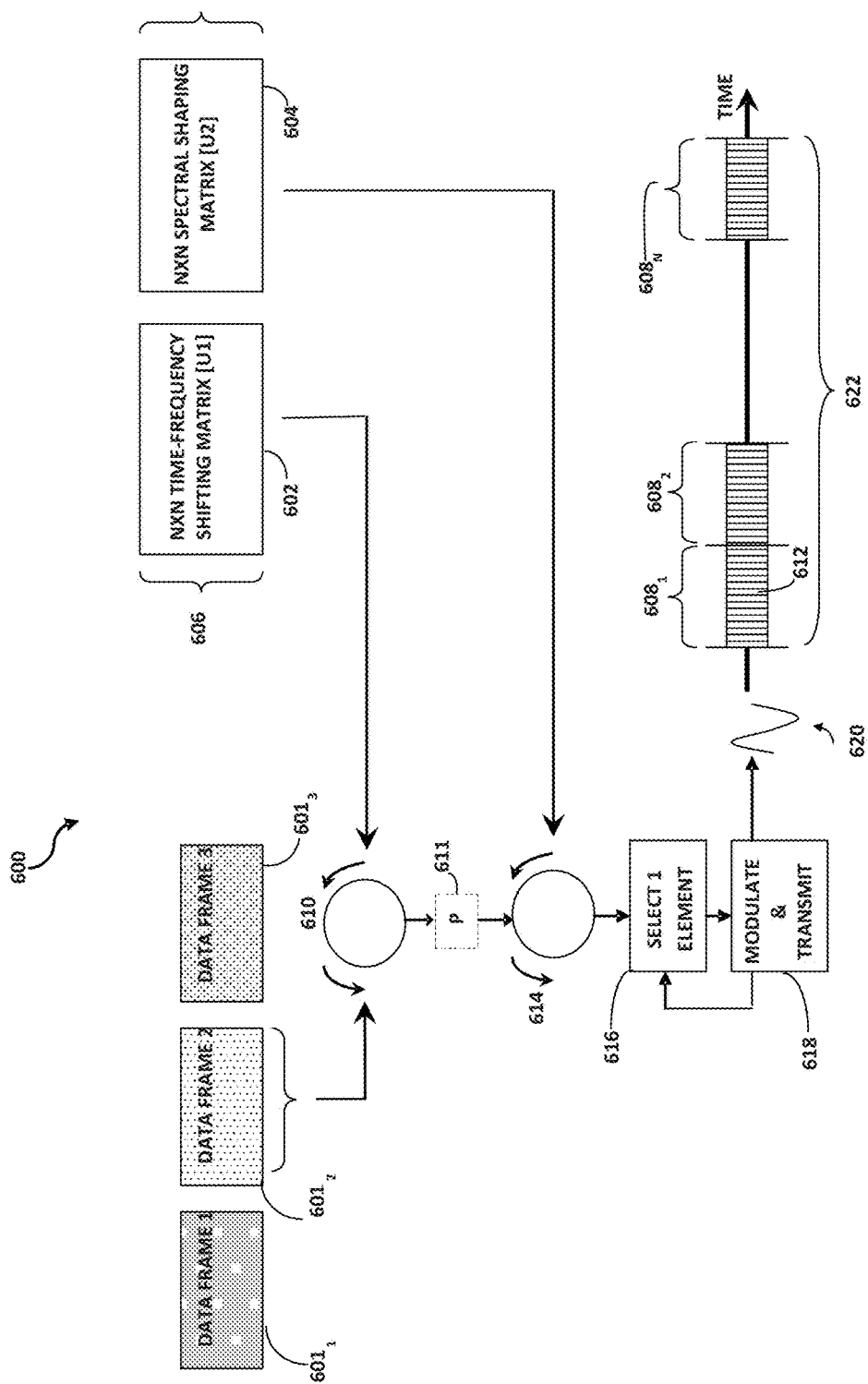
FIG. 6A shows an overview of one manner in which an OTFS method may be used to transmit data over a wireless link.
Figure 6B:
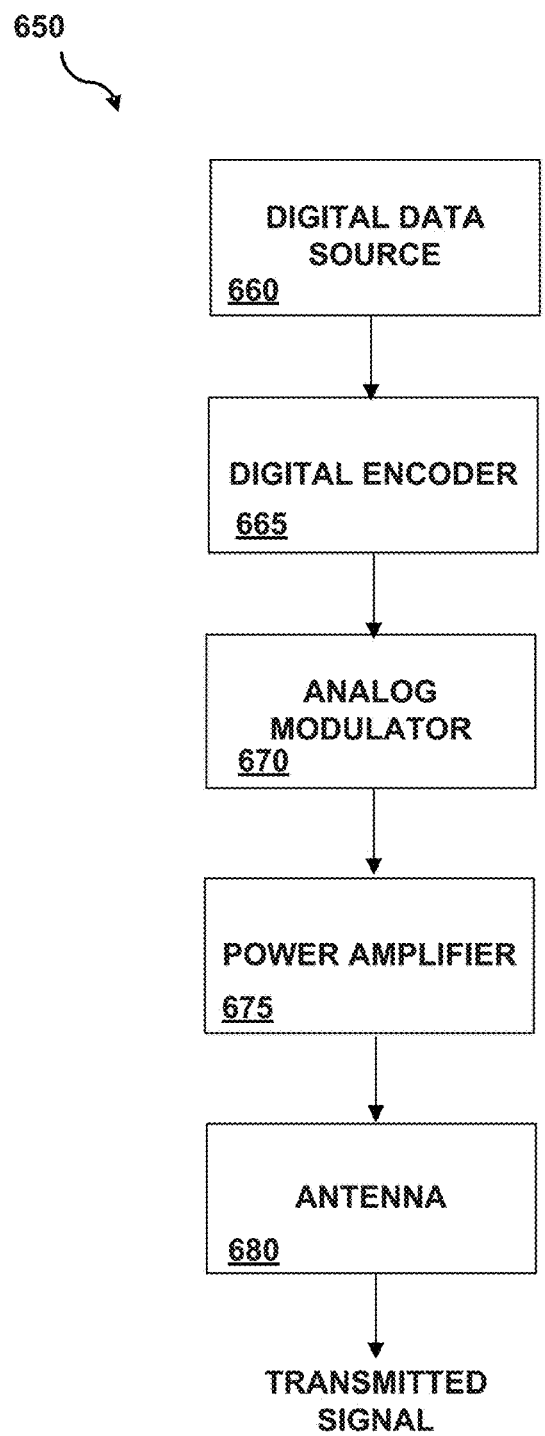
FIG. 6B illustrates components of an exemplary OTFS transmitter for performing the method of FIG. 6A.

FIG. 6A illustratively represents an exemplary OTFS method 600 for transmitting data over a wireless link such as the communication channel 320. FIG. 6B illustrates components of an exemplary OTFS transmitter 650 for performing the method of FIG. 6A. The method 600 can be performed, for example, by components of the OTFS transceiver 400 of FIG. 4A or by components of the OTFS transmitter 650 of FIG. 6B.

In the example of FIG. 6, the payload intended for transmission comprises an input data frame 601 composed of an N×N matrix [D] containing N$^2$ symbols or data elements. As shown in FIG. 6A, a succession of data frames 601 are provided, each of which defines a matrix [D] of N×N data elements. Each matrix [D] can be provided by a digital data source 660 in the OTFS transmitter 650. The elements of the matrix [D] can be complex values selected from points in a constellation matrix such as, for example, a 16 point constellation of a 16QAM quantizer. In order to encode this data, an OTFS digital encoder 665 will select an N×N matrix [U$_1$] 602 and, in some embodiments, select an N×N matrix [U$_2$] 604 (stage 606). As previously discussed, in some embodiments the matrix [U$_1$] 602 may be a matrix composed of Legendre symbols or a Hadamard matrix. This matrix [U$_1$] 602 will often be designed to time and frequency shift the symbols or elements in the underlying data matrix [D] 601.

The matrix [U$_2$] 604 may be a DFT or IDFT matrix and is often designed to spectrally shape the signals. For example, in some embodiments the matrix [U$_2$] 604 may contain the coefficients to direct the transmitter circuits of the OTFS modulator 430 to transform the signals over time in a OFDM manner, such as by quadrature-amplitude modulation (QAM) or phase-shift keying, or other scheme.

Usually the matrix [D] 601 will be matrix multiplied by the matrix [U$_1$] 602 by the digital encoder 665 at stage 610, and the matrix product of this operation [U$_1$][D] then optionally permuted by the digital encoder 665 forming P([U$_1$][D]) (stage 611). In embodiments in which a spectral shaping matrix is utilized, the digital encoder 665 multiplies matrix [U$_1$][D] by matrix [U$_2$] 604 forming an N×N TFS data matrix, which may also be referred to herein as an OFTS transmission matrix (stage 614).

The various elements of the TFS matrix are then selected by the OTFS analog modulator 670, usually a column of N elements at a time, on a single element at a time basis (stage 616) The selected elements are then used to generate a modulated signal that is transmitted via an antenna 680 (stage 618). More specifically, in one embodiment the particular real and imaginary components of each individual TFS matrix element are used to control a time variant radio signal 620 during each time slice. Thus one N-element column of the TFS matrix will usually be sent during each time-spreading interval 608, with each element from this column being sent in one of N time slices 612 of the time-spreading interval 608. Neglecting overhead effects, generally a complete N×N TFS matrix can be transmitted over N single time spreading intervals 622.

Figure 6C:
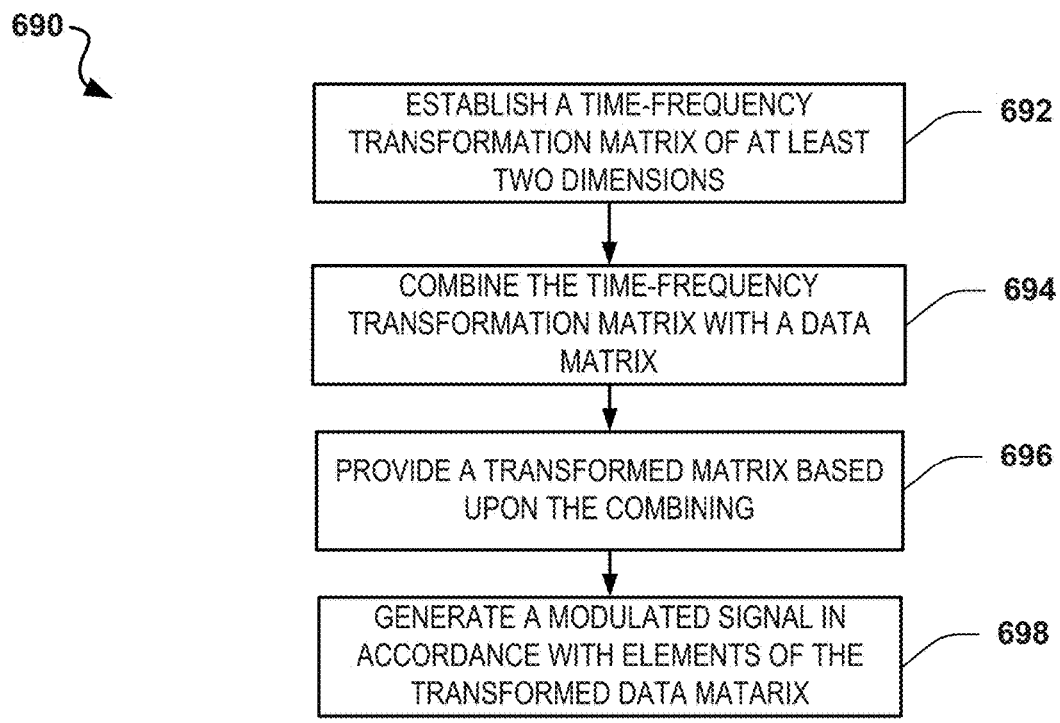
FIG. 6C is a flowchart representative of an exemplary OTFS data transmission method.

Attention is now directed to FIG. 6C, which is a flowchart representative of an exemplary OTFS data transmission method 690 capable of being implemented by the OTFS transmitter 650 or, for example, by the OTFS transmitter 2100 of FIG. 21 (discussed below). As shown, the method includes establishing a time-frequency transformation matrix of at least two dimensions (stage 692). The time-frequency transformation matrix is then combined with a data matrix (stage 694). The method 690 further includes providing a transformed matrix based upon the combining of the time-frequency transformation matrix and the data matrix (stage 696). A modulated signal is then generated in accordance with elements of the transformed data matrix (stage 698).

Attention is now directed to FIG. 21A, which is a block diagram representation of an OTFS transmitter module 2100 capable of performing functions of the OTFS transmitter 650 (FIG. 6B) in order to implement the transmission method 600 of FIGS. 6A and 6C. With reference to FIG. 21 and FIG. 6B, the transmitter 2100 includes a digital processor 2102 configured for inclusion within the digital encoder 665 and a modulator 2104 configured for inclusion within the analog modulator component 670. The digital processor 2102, which may be a microprocessor, digital signal processor, or other similar device, accepts as input the data matrix [D] 2101 and may either generate or accept as inputs a $[U_1]$ matrix 2102 and a $[U_2]$ matrix 2104. A matrix generation routine 2105 stored within a memory associated with the processor 2102 will, when executed by the processor 2102, generate a TFS matrix 2108 (FIG. 21B), which will generally be comprised of a set of complex-valued elements. Once generated, scanning/selection routine 2106 will, when executed by the processor 2102, select individual elements from the TFS matrix 2108 matrix, often by first selecting one column of N elements from the TFS matrix and then scanning down this column and selecting individual elements at a time. Generally one new element will be selected every time slice 2112 (FIG. 21C).

Thus every successive time slice, one element from the TFS matrix 2108 will be used to control the modulator 2104. In one embodiment of the OTFS method, the modulator 2104 includes modules 2132 and 2134 for separating the element into its real and imaginary components, modules 2142 and 2144 for chopping the resultant real and imaginary components, and filtering modules 2152 and 2154 for subsequently performing filtering operations. The filtered results are then used to control the operation of sin and cosine generators 2162 and 2164, the outputs of which are upconverted using a RF carrier in order to produce an analog radio waveform 2120. This waveform then travels to the receiver where it is demodulated and deconvolved as will be described below with reference to FIG. 7. Thus in this scheme (again neglecting overhead effects), element $t_{1,1}$ from the first column of the TFS matrix can be sent in the first time slice, and the Nth element from the first column of the TFS matrix can be sent in the last time slice of the first time spreading interval 2124. The next element $t_{1,2}$ from the second column of the TFS matrix can be sent in the first time slice of the second time spreading interval 2128, and so on. Thus, the modulator 2104 transmits a composite waveform during each time spreading interval, where the value of the waveform is determined by a different element of the TFS matrix 2108 during each time slice of the spreading interval.

In an alternative embodiment, diagonals of the TFS data matrix may be transmitted over a series of single time-spreading intervals, one diagonal per single time-spreading interval, so that N diagonals of the final N×N transmission matrix are transmitted over N time intervals. In other embodiments the order in which individual elements of the TFS transmission matrix $[[U_1][D]][U_2]$ are transmitted across the communications link is determined by a transmit matrix or transmit vector.

In some embodiments, there may be some overhead to this basic model. Thus, for example, with some time padding (additional time slices or additional time spreading intervals), checksums or other verification/handshaking data, which could be transmitted in a non-convolved manner, could be sent back by the receiver to the transmitter on a per time-spreading interval, per N time spreading intervals, or even on a per time slice interval in order to request retransmission of certain parts of the TFS data matrix as needed.

Figure 9:
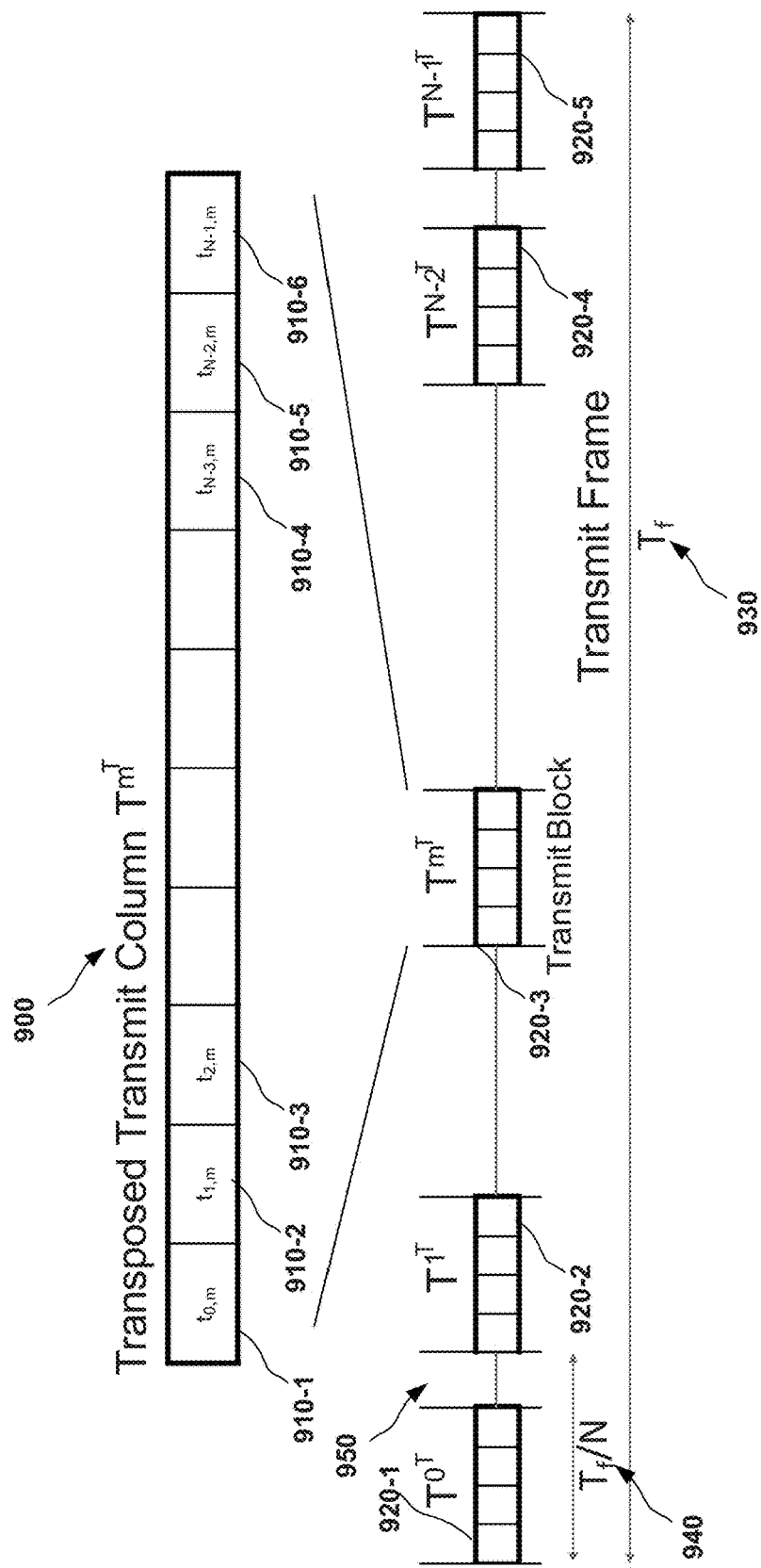
FIG. 9 shows an exemplary transmit frame including guard times between groups of transmitted data.

FIG. 9 illustratively represents an exemplary transmit frame 900 comprised of a plurality of transmit blocks 920 separated by guard times 950. Each transmit block 920 includes data corresponding to a portion of the [D] matrix, such as a column as shown in FIG. 9, or a row, or sub-blocks of the [D] matrix. The guard time 950 can provide the receiver with time to resolve Doppler shift in transmitted signals. The Doppler shift causes delays or advances in the receive time and the OTFS receiver 455 can use the spaces between the transmit blocks 920-1, 920-2, 920-3, 920-4 and 920-5 to capture data without interference from other users. The guard times 950 can be used with either the first or second forms of the OTFS methodology. The guard times 950 can be utilized by other transmitters in the area so long as the transmission uses different codes (e.g., Hadamard codes) than those used to transmit the frame 900.

Figure 20:
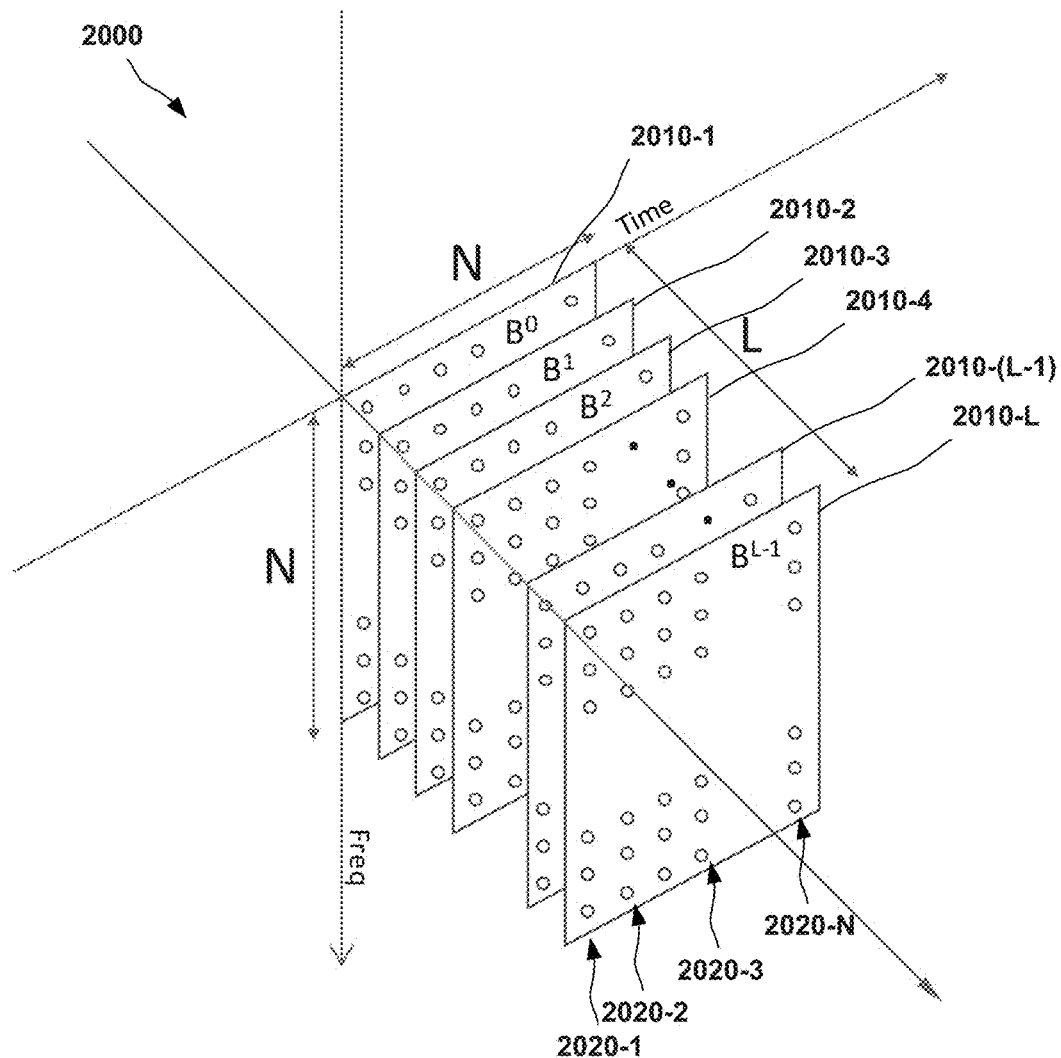
FIG. 20 illustrates a sequence of L-OTFS N×N matrices making up a frame of data comprising L×N×N symbols spread in both time and frequency.

Attention is now directed to FIG. 20, which illustrates a sequence of L OTFS matrices 2010, each of dimension N×N. The L OFTS matrices 2010 collectively comprise a frame of data which includes L×N×N symbols spread out in both time and frequency. The matrices 2010-1 through 2010-L are transmitted back-to-back and include guard times $(T_g)$ between matrices 2010. The N columns 2020 of a given matrix 2010 are transmitted on a column-by-column basis, typically with guard times inserted between the transmission of each column 2020. Therefore, the L frames 2010 are transmitted in a time greater than N×[L×(N×T+Tg)], where T is the time to transmit one column of symbols inclusive of the guard times described above.

As previously discussed, in some embodiments, the first N×N time spreading matrix $[U_1]$ may be constructed out of N rows of a cyclically shifted Legendre symbols or pseudorandom number of length N. That is, the entire N×N spreading matrix is filled with all of the various cyclic permutations of the same Legendre symbols. In some embodiments, this version of the $[U_1]$ matrix can be used for spectrum spreading purposes and may, for example, instruct the transmitter to rapidly modulate the elements of any matrix that it affects rapidly over time, that is, with a chip rate that is much faster than the information signal bit rate of the elements of the matrix that the Legendre symbols are operating on.

In some embodiments, the second N×N spectral shaping matrix $[U_2]$ can be a Discrete Fourier Transform (DFT) or an Inverse Discrete Fourier Transform (IDFT) matrix. These DFT and IDFT matrices can instruct the transmitter to spectrally shift the elements of any matrix that the DFT matrix coefficients act upon. Although many different modulation schemes may be used, in some embodiments, this modulation may be chosen to be an Orthogonal Frequency-Division Multiplexing (OFDM) type modulation, in which case a modulation scheme such as quadrature amplitude modulation or phase-shift keying may be used, and this in turn may optionally be divided over many closely-spaced orthogonal sub-carriers.

Often the actual choice of which coefficients to use for the first N×N time-frequency shifting matrix $[U_1]$ and what coefficients to use for the second N×N spectral shaping matrix $[U_2]$ may depend on the conditions present in the communications channel 320. If, for example, a communications channel 320 is subjected to a particular type of impairment, such as wide band noise, narrow-band interference, impulse noise, Doppler shift, crosstalk and so on, then some first N×N time-frequency shifting matrices and some second N×N spectral shaping matrices will be better able to cope with these impairments. In some embodiments of the OTFS method, the transmitter and receiver will attempt to measure these channel impairments, and may suggest alternate types of first N×N time-frequency shifting matrices [$U_1$] and second N×N spectral shaping matrices to each [$U_2$] in order to minimize the data loss caused by such impairments.

Figure 13A:
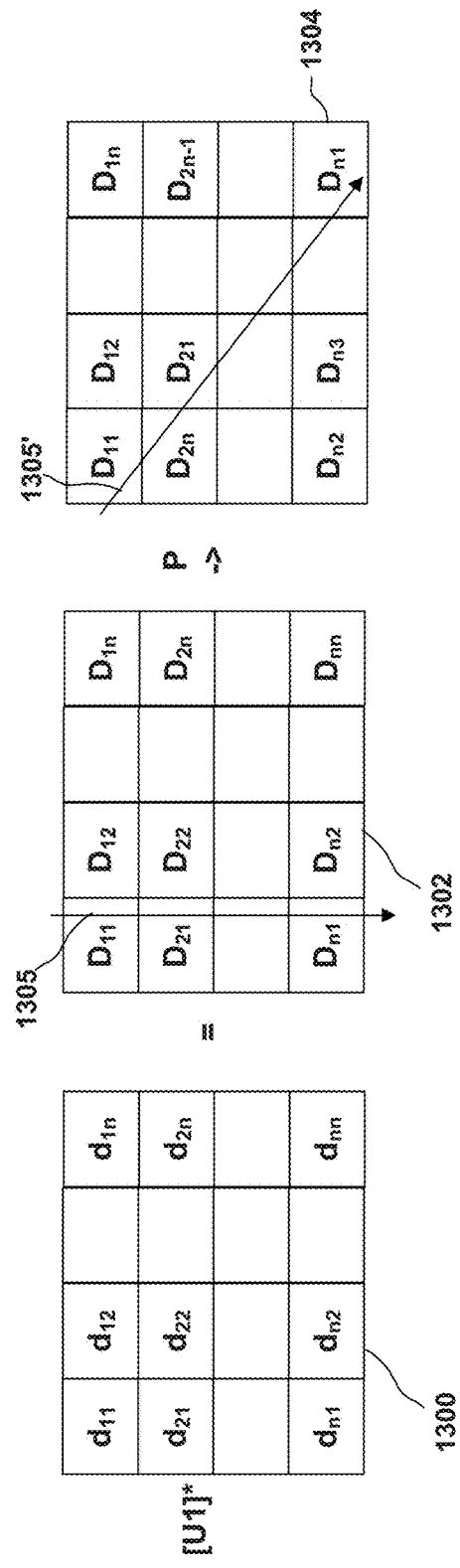
FIGS. 13A and 13B illustrate operations performed by a transmitter consistent with a first alternative OTFS transmission scheme.
Figure 13B:
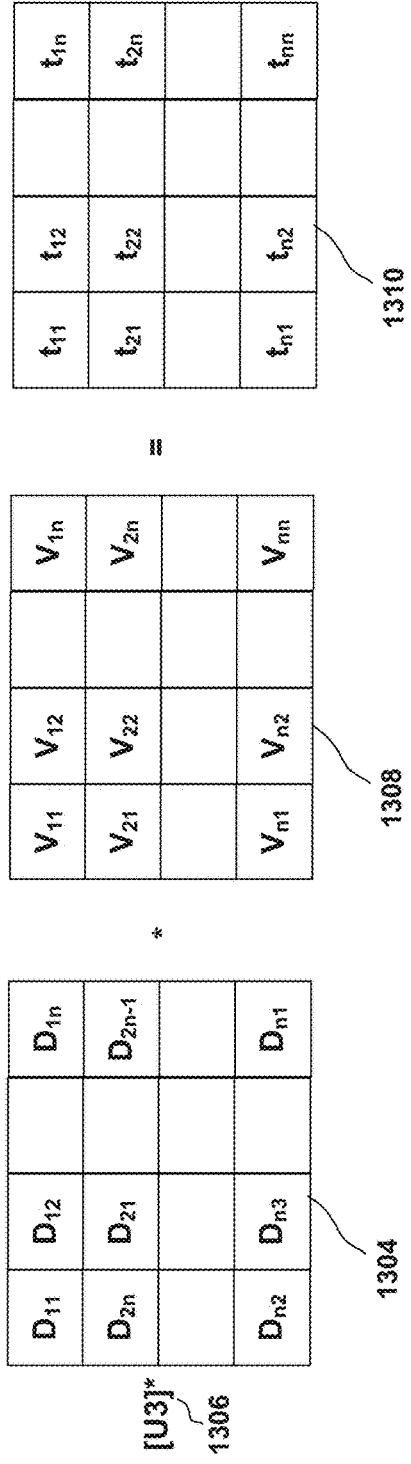

Various modifications of the above-described data transmission process represented by the matrix multiplication [[$U_1$][D]][$U_2$] are also within the scope of the present disclosure and are described below with reference to FIGS. 13 and 15. For example, FIGS. 13A and 13B show a first alternative OTFS transmission scheme. In the embodiment of FIGS. 13A and 13B, the data matrix [D] may be further convolved by means of a third unitary matrix [$U_3$] 1306, which may be an IDFT matrix. In one implementation [U1] may be a DFT matrix and the matrix [$U_2$] 1308 may be the product of a DFT matrix and a base. In this scheme, the process of scanning and transmitting the data is represented by the previously described permutation operation P. The basic transmission process can thus be represented as [$U_3$]*[P([$U_1$][D])]*[$U_2$]. Here the matrix [D] is identified by reference numeral 1300, and the matrix product ([$U_1$][D]) is identified by reference numeral 1302. The permuted version of the matrix product ([$U_1$][D]), i.e., P([$U_1$][D]), is identified by reference numeral 1304 and the final matrix product [$U_3$][P([$U_1$][D])][$U_2$] is identified by reference numeral 1310. In various embodiment the matrix [$U_3$] 1306 may comprise a DFT matrix, an IDFT matrix, or a trivial identity matrix (in which case this first alternative scheme becomes essential equivalent to a scheme in which a matrix [$U_3$] is not employed).

Figure 15A:
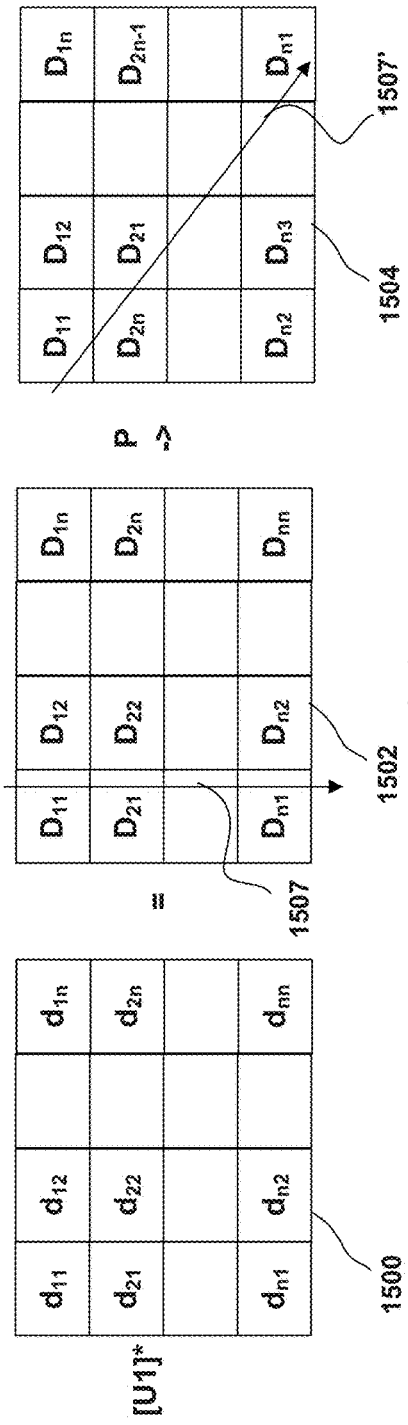
FIGS. 15A and 15B illustrate operations performed by a transmitter consistent with a second alternative OTFS scheme.
Figure 15B:
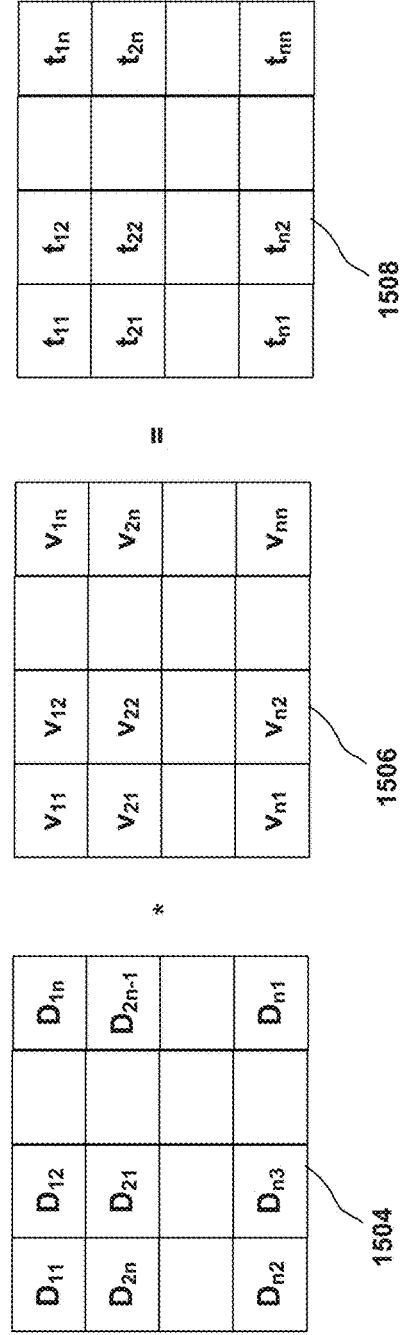

Attention is now directed to FIGS. 15A and 15B, which illustrate a second alternative OTFS transmission scheme. As shown, the original data matrix [D] is identified by reference numeral 1500, the matrix product [$U_1$][D] is identified by reference numeral 1502, the permuted matrix P([$U_1$][D]) is identified by reference numeral 1504, and the matrix [$U_2$] is identified by reference numeral 1506. In the representation of FIGS. 15A and 15B, at least certain of the effects of the permutation operation P are represented by the differing directions of arrow 1507 and arrow 1507'. In one embodiment [$U_1$] may be a Hadamard matrix; that is, a square matrix composed of mutually orthogonal rows and either +1 or −1 coefficients. This matrix has the property that $H*H^T=nI_n$ where $I_n$ is an N×N identity matrix and $H^T$ is the transpose of H). Consistent with the alternative OTFS transmission scheme of FIG. 15, the matrix corresponding to the transmitted signal may be expressed as [P([$U_1$][D])]*[$U_2$] and is identified by reference numeral 1508.

Signal Reception and Data Reconstruction

Attention is now directed to FIG. 3C, which illustrates a process 360 by which the OTFS transceiver 315-2 of the receiving device 330 may operate to receive a transmitted data frame. Within the OTFS transceiver 315-2, the process performed during transmission is essentially done in reverse. Here the time and frequency spread replica of the TFS data matrix ([P([$U_1$][D])][$U_2$])' (where the ' annotation is indicative of a replicated matrix) is accumulated over multiple time spreading intervals, time slices, frequencies, and spectral shapes, and then deconvolved to solve for [D] by performing the following operations:

1: Receive ([P([$U_1$][D])][$U_2$])' (stage 362)
2: Perform a first left multiplication by the Hermitian matrix of the [U2] matrix [$U_2^H$], if one was used for transmission, thus creating P([$U_1$][D]) (stage 364).
3: Inverse permute this replica by (P([$U_1$][D])$P^{-1}$, if a permutation was used during transmission, thus creating [$U_1$][D] (stage 368)
4. Perform a second right multiplication by the Hermitian matrix of the [$U_1$] matrix [$U_1^H$], thus recreating [D] (stage 370).

As a consequence of noise and other impairments in the channel, use of information matrices and other noise reduction methods may be employed to compensate for data loss or distortion due to various impairments in the communications link. Indeed, it may be readily appreciated that one advantage of spreading out the original elements of the data frame [D] over a large range of times, frequencies, and spectral shapes as contemplated by embodiments of the OTFS method is that it becomes straightforward to compensate for the loss during transmission of information associated with a few of the many transmission times, frequencies and spectral shapes.

Although various deconvolution methods may used in embodiments of the OTFS method, the use of Hermitian matrices may be particularly suitable since, in general, for any Hermitian matrix [$U^H$] of a unitary matrix [U], the following relationship applies:

$[U][U^H]=[I]$ where $[I]$ is the identity matrix.

Communications links are not, of course, capable of transmitting data at an infinite rate. Accordingly, in one embodiment of the OTFS method the first N×N time-frequency shifting matrix ([$U_1$], the second N×N spectral shaping matrix ([$U_2$] (when one is used), and the elements of the data frame, as well as the constraints of the communications link (e.g. available bandwidth, power, amount of time, etc.), are chosen so that in balance (and neglecting overhead), at least N elements of the N×N TFS data matrix can be transmitted over the communications link in one time-spreading interval. More specifically (and again neglecting overhead), one element of the N×N TFS data matrix will generally be transmitted during each time slice of each time-spreading interval.

Given this rate of communicating data, then typically the entire TFS data matrix may be communicated over N time-spreading intervals, and this assumption will generally be used for this discussion. However it should be evident that given other balancing considerations between the first N×N time-frequency shifting matrix, the second N×N spectral shaping matrix, and the elements of the data frame, as well as the constraints of the communications link, the entire TFS data matrix may be communicated in less than N time-spreading intervals, or greater than N time spreading intervals as well.

As discussed above, the contents of the TFS data matrix may be transmitted by selecting different elements from the TFS data matrix, and sending them over the communications link, on a one element per time slice basis, over multiple spreading time intervals. Although in principle this process of selecting different elements of the TFS data matrix can be accomplished by a variety of different methods, such as sending successive rows of the TFS data matrix each single time spreading interval, sending successive columns of the TFS data matrix each successive time spreading interval, sending successive diagonals of the TFS data matrix each successive time spreading intervals, and so on, from the standpoint of communications link capacity, minimizing interference, and reducing ambiguity, some schemes are often better than others. Thus, often the $[U_1]$ and $[U_2]$ matrices, as well as the permutation scheme P, may be chosen to optimize transmission efficiency in response to various impairments in the communications link.

Figure 4B:
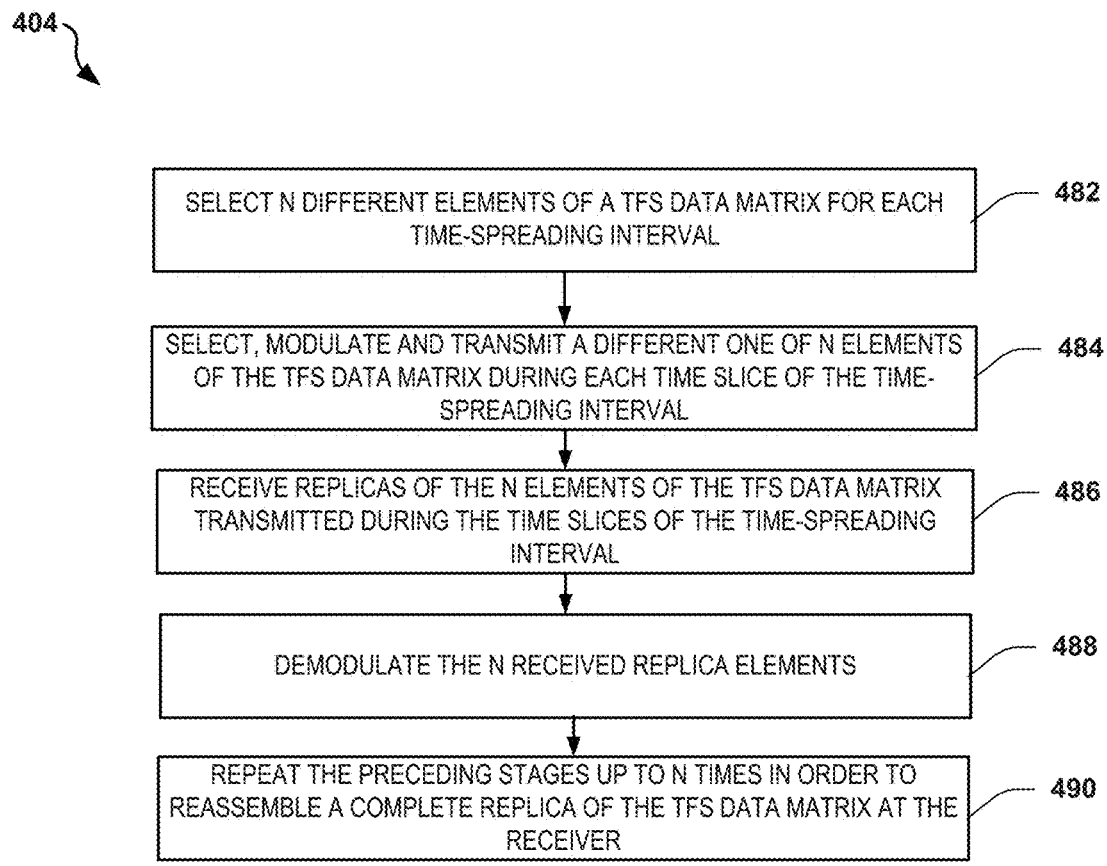
FIG. 4B illustrates an exemplary process pursuant to which an OTFS transceiver may transmit, receive and reconstruct information utilizing a TFS data matrix.

As shown in FIG. 4B, an exemplary process 404 pursuant to which an OTFS transceiver may transmit, receive and reconstruct information utilizing a TFS data matrix may thus be generally characterized as follows:

1: For each single time-spreading interval, selecting N different elements of the TFS data matrix (often successive columns of the TFS matrix will be chosen) (stage 482).
2: Over different time slices in the given time spreading interval, selecting one element (a different element each time slice) from the N different elements of the TFS data matrix, modulating this element, and transmitting this element so that each different element occupies its own time slice (stage 484).
3: Receiving these N different replica elements of the transmitted TFS data matrix over different said time slices in the given time spreading interval (stage 486).
4: Demodulating these N different elements of the TFS data matrix (stage 488).
5. Repeating stages 482, 484, 486 and 488 up to a total of N times in order to reassemble a replica of the TFS data matrix at the receiver (stage 490).

This method assumes knowledge by the receiver of the first N×N spreading code matrix $[U_1]$, the second N×N spectral shaping matrix $[U_2]$, the permutation scheme P, as well as the particular scheme used to select elements from the TFS matrix to transmit over various periods of time. In one embodiment the receiver takes the accumulated TFS data matrix and solves for the original N×N data frame using standard linear algebra methods. It may be appreciated that because each original data symbol from the original data frame [D] has essentially been distributed over the entire TFS data matrix, it may not be possible to reconstruct an arbitrary element or symbol from the data [D] until the complete TFS data matrix is received by the receiver.

Figure 7A:
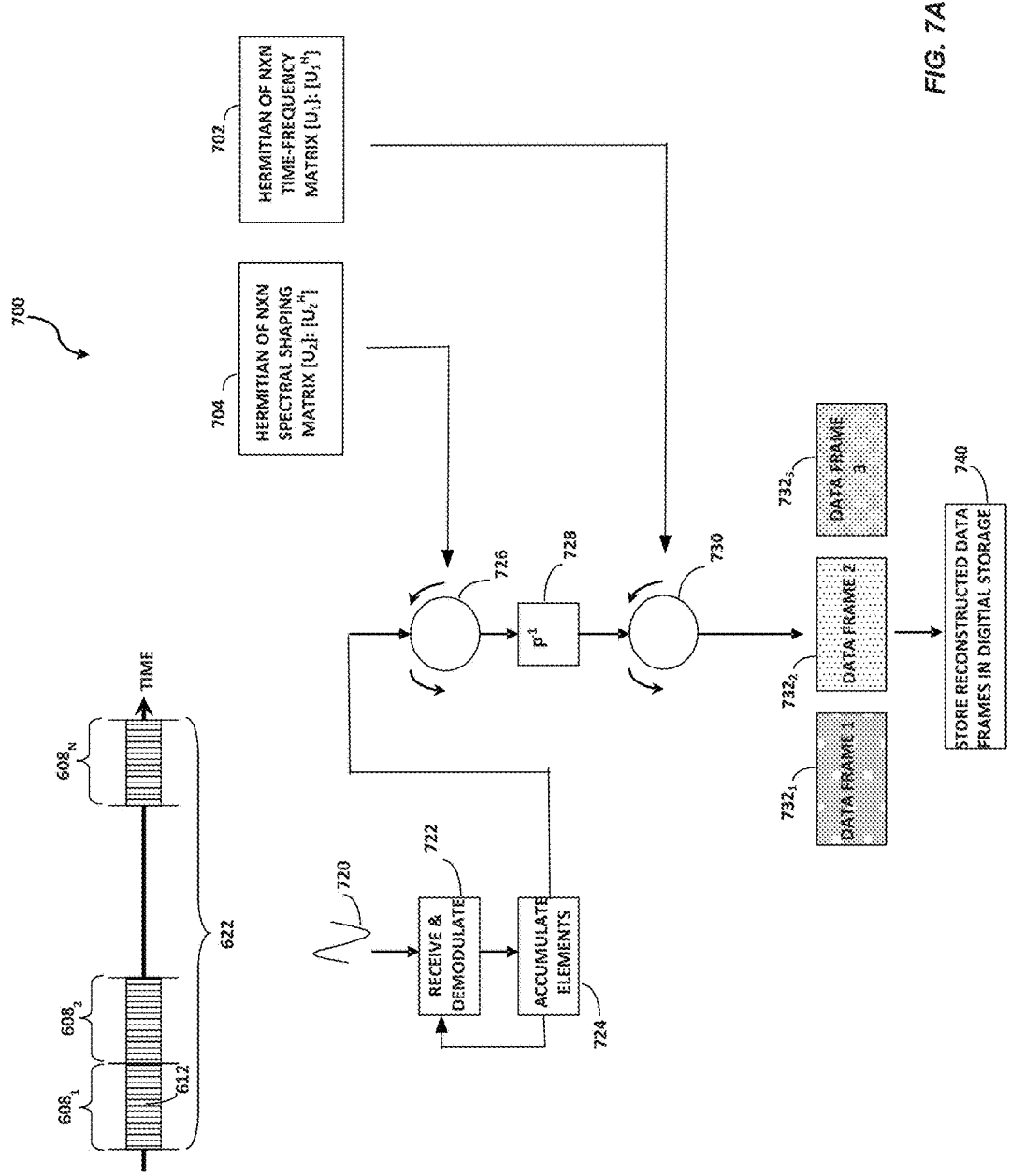
FIG. 7A shows an overview of one manner in which an OTFS method may be used to receive data over a wireless link.
Figure 7B:
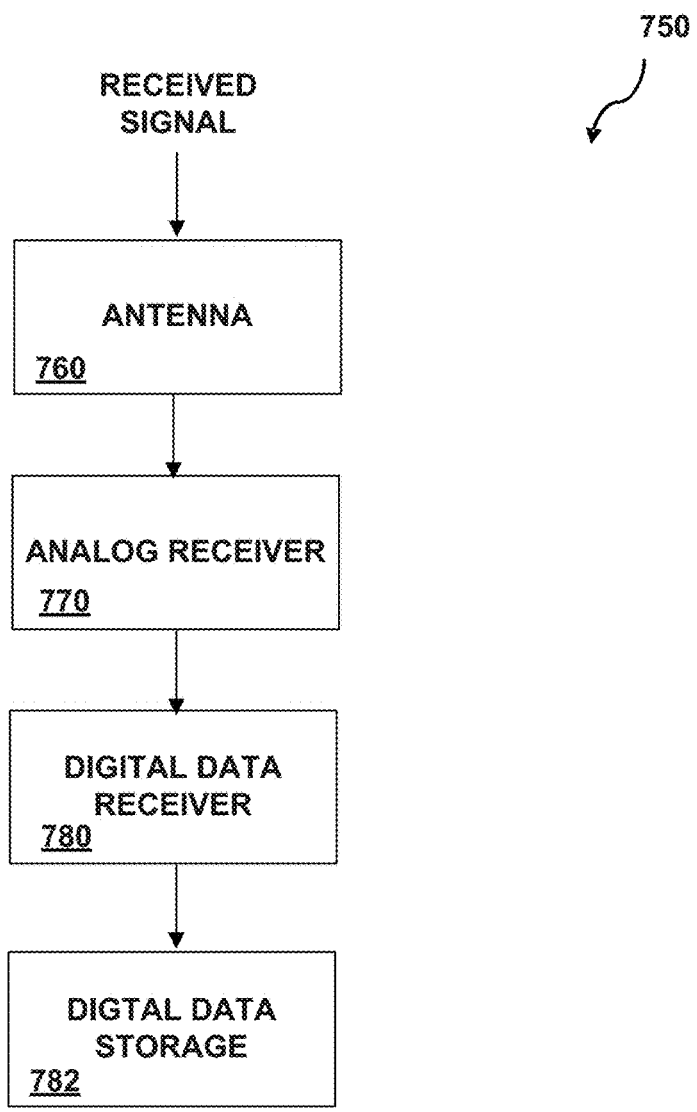
FIG. 7B illustrates components of an exemplary OTFS receiver for performing the method of FIG. 7A.

Attention is now directed to FIG. 7A, which illustratively represents an exemplary method 700 for demodulating OTFS-modulated data over a wireless link such as the communication channel 320. FIG. 7B illustrates components of an exemplary OTFS receiver for performing the method of FIG. 7A. The method 700 can be performed by the OTFS receiver module 455 of the OTFS transceiver 400 of FIG. 4A or by the OTFS receiver 750 of FIG. 7B. Just as the OTFS transmitter 405 is often a hybrid analog/digital device, capable of performing matrix calculations in the digital portion and then converting the results to analog signals in the analog portion, so to the OTFS receiver 750 will typically be capable of receiving and demodulating the radio signals in the analog receiver 770 of the OTFS receiver 750, and then often decoding or deconvolving these signals in the digital portion of the digital OTFS receiver 780.

As shown in FIG. 7A, received signals 720 corresponding to channel-impaired versions of the transmitted radio signals 620 may be received by, for example, an antenna 760 of the OTFS receiver 750. The received signals 720 will generally not comprise exact copies of the transmitted signals 620 because of the signal artifacts, impairments, or distortions engendered by the communication channel 320. Thus replicas, but not exact copies, of the original elements of the TFS matrix are received and demodulated 722 by the OTFS analog receiver 770 every time slice 612. In an exemplary embodiment one column of the TFS matrix is demodulated at stage 722 during every spreading time interval 608. As a consequence, the OTFS demodulator 460 will accumulate these elements over N single time spreading intervals, eventually accumulating the elements necessary to create a replica of the original TFS matrix (stage 724)

In order to decode or deconvolve the TFS matrix accumulated during stage 724, the digital OTFS data receiver 780 left multiplies, during a stage 726, the TFS matrix by the Hermitian matrix of the $[U_2]$ matrix, i.e., $[U_2^H]$, established at a stage 704. Next, the digital OTFS data receiver 780 performs, at a stage 728, an inverse permutation ($P^{-1}$) of the result of this left multiplication. The digital OTFS data receiver 780 then deconvolves the TFS matrix in order to reconstruct a replica 732 of the original data matrix [D] by, in a stage 730, right multiplying the result of stage 728 by the Hermitian of the original N×N time-frequency shifting matrix $[U_1]$, i.e., $[U_1^H]$, established at a stage 702. Because the reconstructed signal will generally have some noise and distortion due to various communications link impairments, various standard noise reduction and statistical averaging techniques, such as information matrices, may be used to assist in the reconstruction process (not shown). Each replicated frame 732 of each original data matrix [D] may be stored within digital data storage 782 (stage 740).

Figure 7C:
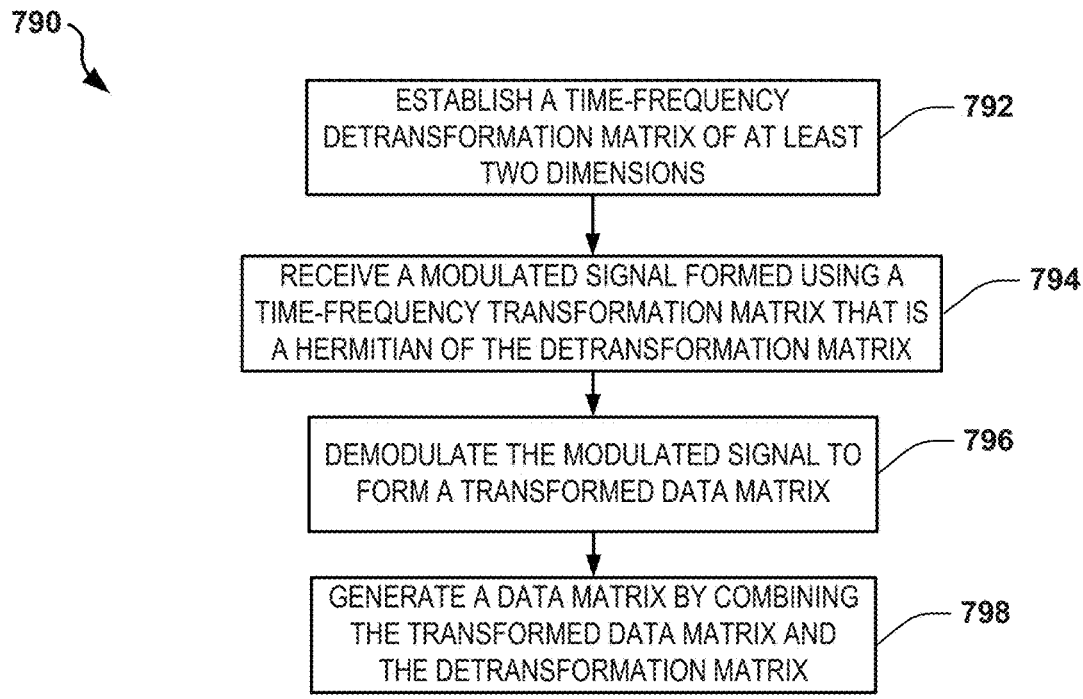
FIG. 7C is a flowchart representative of an exemplary OTFS data demodulation method.

Attention is now directed to FIG. 7C, which is a flowchart representative of an exemplary OTFS data demodulation method 790 capable of being implemented by the OTFS receiver module 455 of the OTFS transceiver 400 or, for example, by the OTFS receiver 750 of FIG. 7B. As shown in FIG. 7C, the method includes establishing a time-frequency detransformation matrix of at least two dimensions (stage 792). The method further includes receiving a modulated signal formed using a time-frequency transformation matrix that is a hermetian of the detransformation matrix (stage 794). The modulated signal is then demodulated to form a transformed data matrix (stage 796). The method further includes generating a data matrix by combining the transformed data matrix and the detransformation matrix (stage 798).

Attention is now directed to FIGS. 16A and 16B, which illustrate an alternative OTFS signal reception scheme corresponding to the alternative OTFS transmission scheme of FIG. 15. As shown, the matrix [r] 1600 of received data is demodulated and deconvolved (decoded) by forming the Hermitian matrices of the matrices $[U_1]$ and $[U_2]$ used to encode and modulate the data [D], as well as the inverse permutation operation $P^{-1}$ to undo the original permutation operation P used to scan and transmit the data over multiple time intervals. In the illustration of FIG. 16, the inverse permutation $P^{-1}([r][U_2^H])$ is identified by reference numeral 1604 and the reconstructed data matrix [D] (created from $[U_1^H]*P^{-1}([r]*[U_2^H])$) is identified by the reference numeral 1606.

Attention is now directed to FIG. 15, which illustrates an alternative OTFS transmission scheme. As shown, the original data matrix [D] is identified by reference numeral 1500, the matrix product $[U_1][D]$ is identified by reference numeral 1502, the permuted matrix $P([U_1][D])$ is identified by reference numeral 1504, and the matrix $[U_2]$ is identified by reference numeral 1506. In the representation of FIG. 15, at least certain of the effects of the permutation operation P are represented by the differing directions of arrow 1507 and arrow 1507'. In one embodiment $[U_1]$ may be a Hadamard matrix; that is, a square matrix composed of mutually orthogonal rows and either +1 or −1 coefficients. This matrix has the property that $H^*H^T=nI_n$ where $I_n$ is an N×N identity matrix and Hr is the transpose of H). Consistent with the alternative OTFS transmission scheme of FIG. 15, the matrix corresponding to the transmitted signal may be expressed as $[P([U_1][D])]^*[U_2]$ and is identified by reference numeral 1508.

Various modifications of the above-described data reconstruction process are also within the scope of the present disclosure and are described below with reference to FIGS. 14 and 16. Turning now to FIGS. 14A and 14B, there is illustrated a scheme for reception and reconstruction of signals transmitted consistent with the first alternative OTFS transmission scheme of FIG. 13. Here the data that the transmitter has received and accumulated, after various communications link impairment effects, is represented as the [r] matrix 1400. The [r] matrix 1400 is demodulated and deconvolved (decoded) by forming the Hermitian matrices of the original $[U_1]$, $[U_2]$, and $[U_3]$ matrices originally used to encode and modulate the data [D], as well as the inverse permutation operation $P^{-1}$ to undo the original permutation operation P used to scan and transmit the data over multiple time intervals. Here $[U_1^H]$ may be an IDFT matrix, $[U_3^H]$ may be a DFT matrix, and $[U_2^H]$ 1402 may be a DFT matrix times a base. As shown, $P^{-1}([U_3^H][r][U_2H])$ is identified by the reference numeral 1404 and the reconstructed data matrix [D] is identified by reference numeral 1406.

Figure 11:
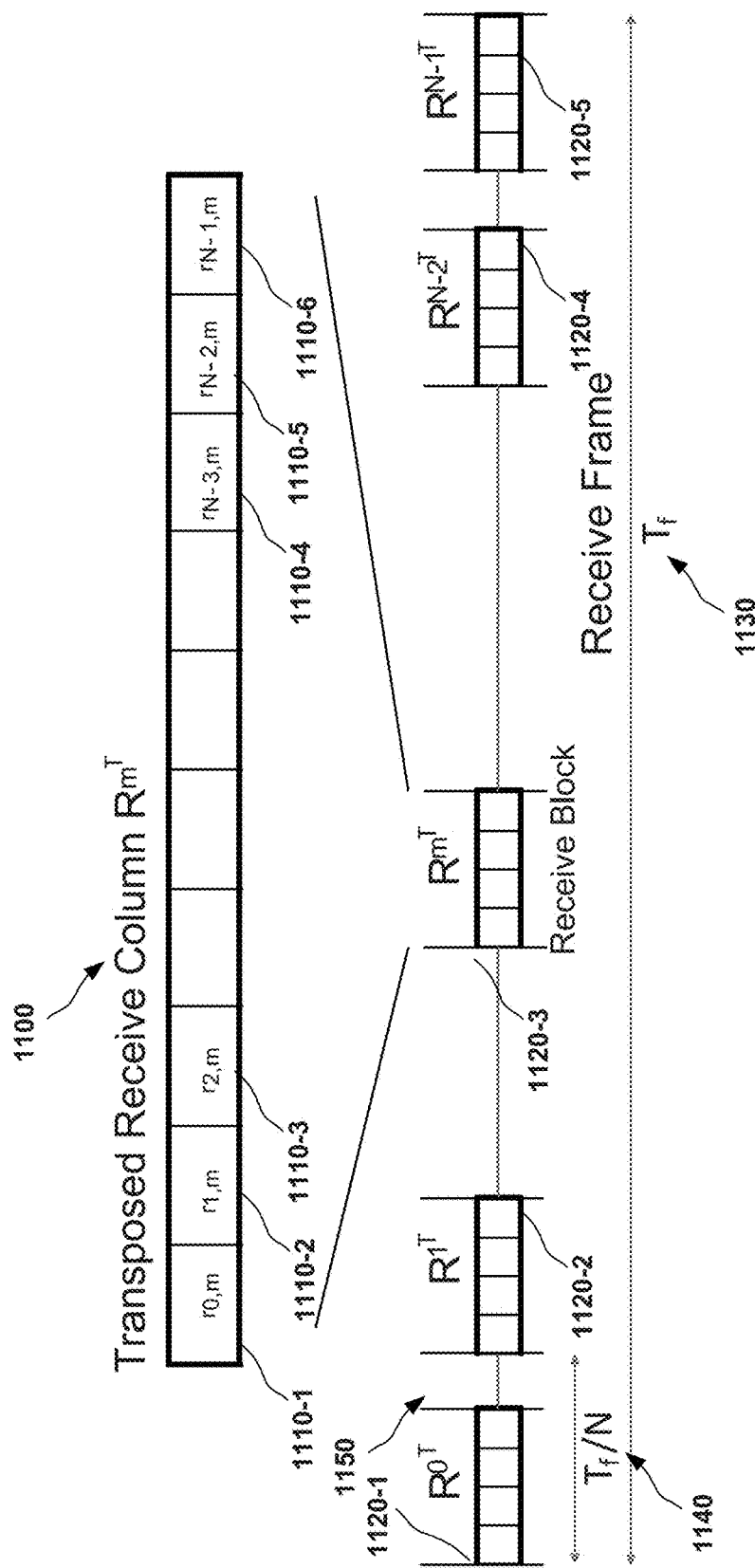
FIG. 11 shows an exemplary structure of a receive frame resulting from the transmit frame of FIG. 9.

Referring now to FIG. 11, there is illustrated an exemplary receive frame 1100 including guard times 1150 between groups of received data or blocks 1120. The receive frame 1100 corresponds to a frame received in response to transmission of a frame having characteristics equivalent to those illustrated in FIG. 9. As shown in FIG. 11, each receive block 1120 includes information comprising a portion of the [D] matrix, such as a column as shown in FIG. 11, or a row, or sub-blocks of the [D] matrix. The entire [D] matrix is received in a time $T_f$ 1130 that includes N blocks 1120 and N−1 guard times 1150. The guard time 1150 provides the receiver with time to resolve Doppler shift in the received signals. The Doppler shift causes delays or advances in the receive time and the OTFS receiver 455 can use the guard times 1120 between the receive blocks 1120-1, 1120-2, 1120-3, 1120-4 and 1120-5 to capture data without interference from other users.

Figure 8:
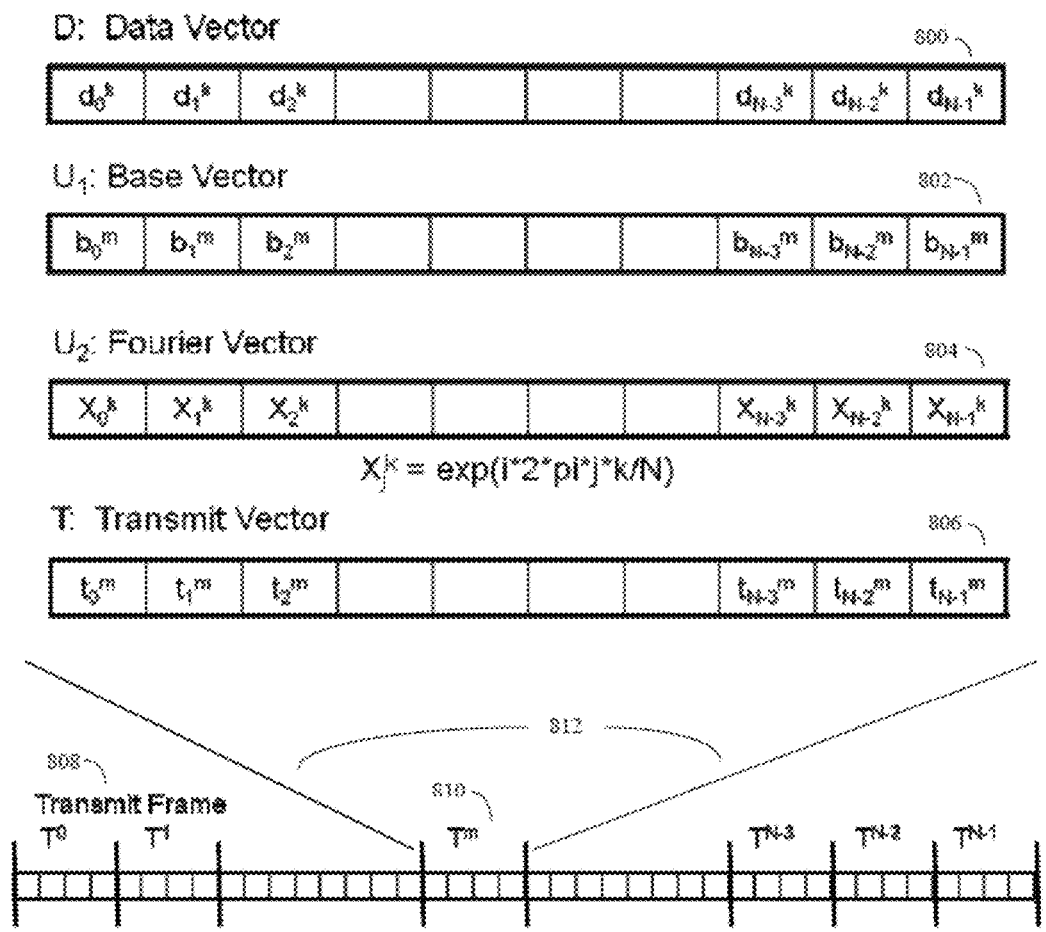
FIG. 8 shows an exemplary set of basic building blocks used to convolve and deconvolve data according to a second form of the OTFS method.
Figure 10:
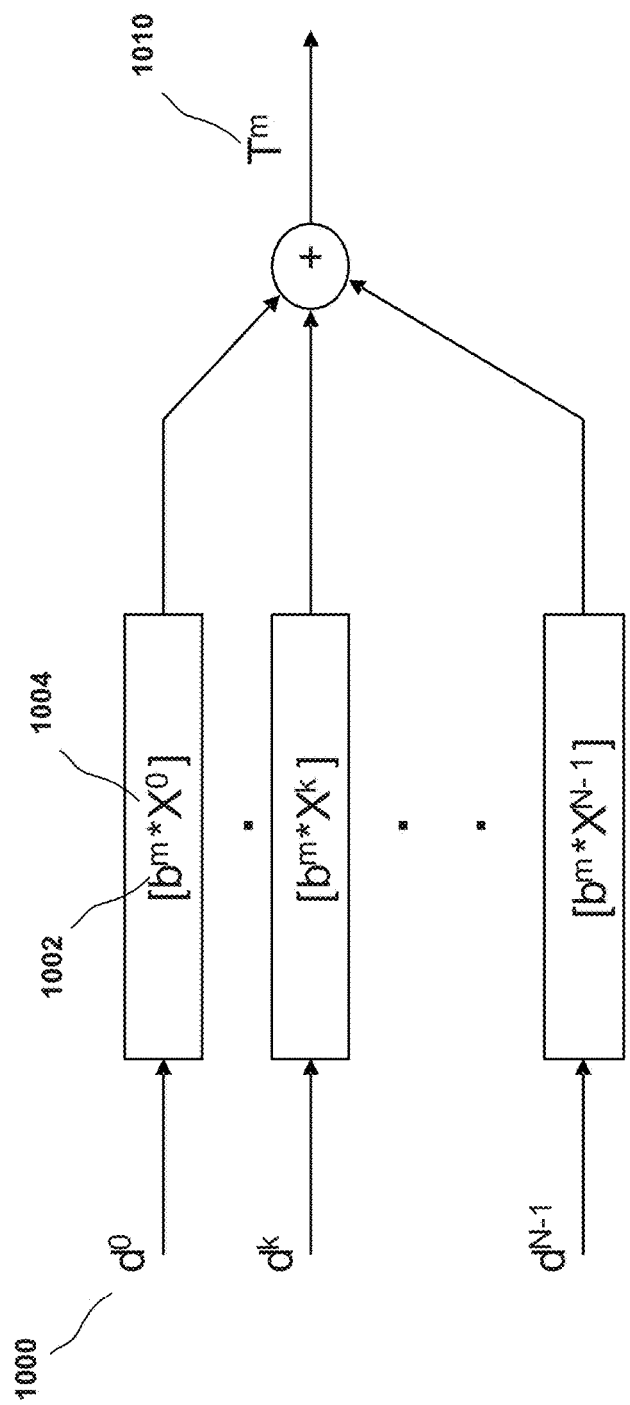
FIG. 10 shows a diagram of the cyclic convolution method used to convolve data and transmit data according to the second form of the OTFS method.
Figure 12:
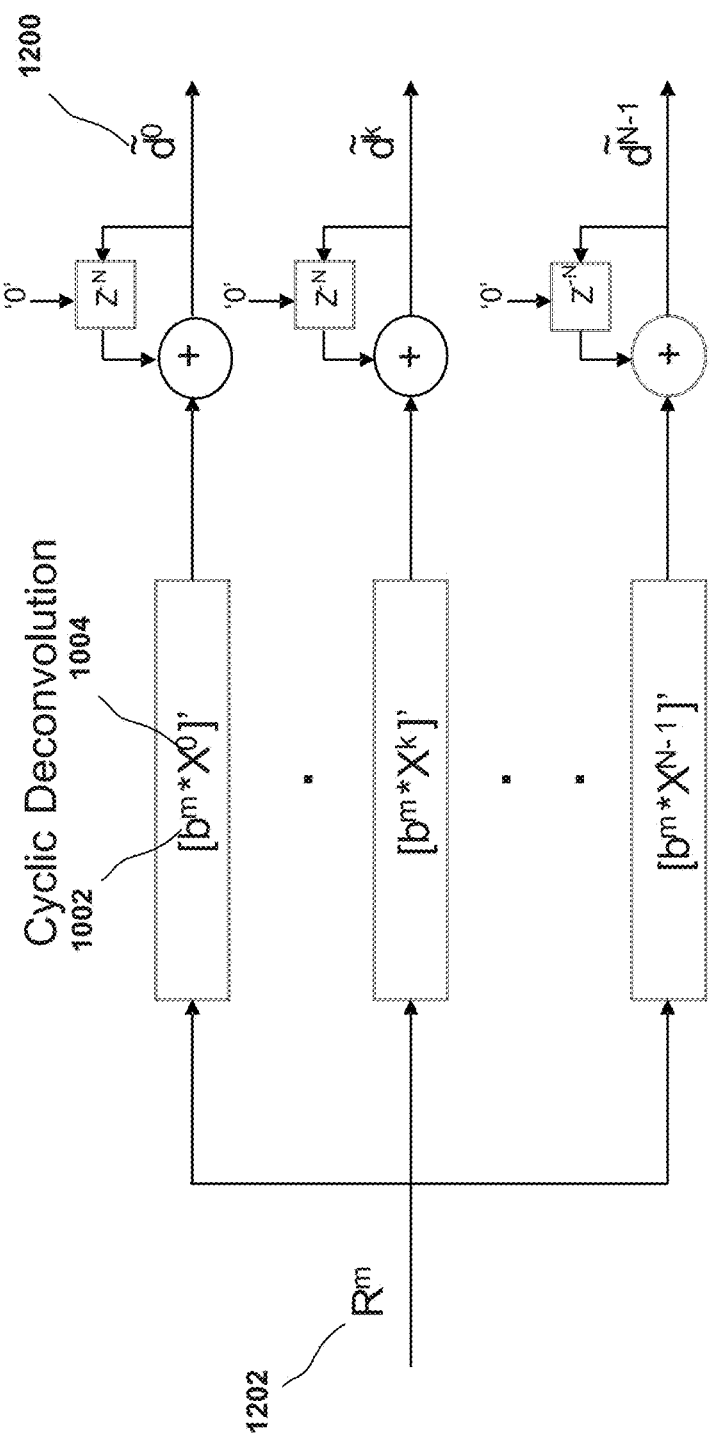
FIG. 12 shows a diagram of the cyclic deconvolution method used to deconvolve received data according to the second form of the OTFS method.

Attention is now directed to FIGS. 8, 10 and 12, to which reference will be made in describing aspects of a second form of the OTFS method. As mentioned previously, in the first OTFS method, which was described with reference to FIGS. 6 and 7, data is transmitted on a per time slice basis. In contrast, the second form of the OTFS method contemplates that data is transmitted as a series of waveforms, each of which generally subsists for a period of N time slices. More particularly, in embodiments of the second form of the OTFS method each data element within an input frame of data [D] including $N^2$ data elements is assigned a unique waveform derived from a basic waveform of duration N time slices. In one implementation this uniqueness is obtained by assigning to each data element a specific combination of a time and frequency cyclic shift of the basic waveform.

Consistent with one embodiment of the second form of the OTFS method, each element in the input frame of data [D] is multiplied by its corresponding unique waveform, thereby producing a series of $N^2$ weighted unique waveforms. Over one spreading time interval (generally composed of N time slices), all $N^2$ weighted unique waveforms corresponding to each data element in the fame of data [D] are simultaneously combined and transmitted. Further, in this embodiment a different unique basic waveform of length (or duration) of N time slices is used for each consecutive time-spreading interval. The set of N unique basic waveforms (i.e., one for each of the N time-spreading intervals) form an orthonormal basis. As may be appreciated, embodiments of the second form of the OTFS element contemplate that at least a part of [D] is transmitted within each of the N time-spreading intervals.

To receive waveforms modulated and transmitted in accordance with this second form of the OTFS method, the received signal is (over each spreading interval of N time slices), correlated with the set of all $N^2$ waveforms previously assigned to each data element during the transmission process for that specific time spreading interval. Upon performing this correlation, the receiver will produce a unique correlation score for each one of the $N^2$ data elements (the receiver will have or be provided with knowledge of the set of $N^2$ waveforms respectively assigned by the transmitter to the corresponding set of $N^2$ data elements). This process will generally be repeated over all N time-spreading intervals. The original data matrix [D] can thus be reconstructed by the receiver by, for each data element, summing the correlation scores over N time-spreading intervals. This summation of correlation scores will typically yield the $N^2$ data elements of the frame of data [D].

Turning now to FIG. 8, there are shown an exemplary set of vectors used in convolving and deconvolving data in accordance with the second form of the OTFS method. Specifically, FIG. 8 depicts a base vector 802, data vector 800, Fourier vector 804 and Transmit vector 806. In the embodiment of FIG. 8 the data vector 800 may include N elements (often one row, column, or diagonal) of an N×N [D] matrix, the base vector 802 may include N elements (often one row, column, or diagonal) of an N×N $[U_1]$ matrix, the Fourier vector 804 may include N elements (often one row, column, or diagonal) of an N×N $[U_2]$ matrix, which may often comprise a DFT or IDFT matrix. The transmit frame 808 is composed of N single time-spreading intervals $T^m$ 810, each of which is defined by a transmit vector 806 containing multiple (such as N) time slices. In the embodiment of FIG. 8, the transmit vector 806 provides information used by the transmitter in selecting elements of the OTFS transmission matrix for transmission during each time slice of each transmission interval.

In FIG. 8, the lines 812 are intended to indicate that each Fourier vector waveform 804 is manifested over one spreading time interval $T^m$ 810. It is observed that this is representative of a difference in wireless radio signal modulation between the second form of the OTFS method (in which each waveform exists over a time spreading interval composed of multiple (e.g. N) time slices) and the first form of the OTFS method (in which the wireless signal is essentially transmitted on a per time slice basis).

FIG. 10 illustrates aspects of a cyclic convolution method that may be used to convolve data and transmit data according to the second form of the OTFS methodology. As previously discussed, particularly in the case where $[U_1]$ is composed of a cyclically permuted Legendre number of length N, the process of convolving the data and scanning the data can be understood alternatively as being a cyclic convolution of the underlying data. Here the $d^0$, $d^k$, $d^{N-1}$ can be understood as being the elements or symbols of the data vector 1000 component of the [D] matrix, the $b^m$ coefficients can be understood as representing the base vector 1002 components of the $[U_1]$ matrix, and the X coefficients can be understood as representing the Fourier vector 1004 components of the $[U_2]$ matrix. The combinations of the $b^m$ coefficients and the X coefficients are summed to form the transmit block $T^m$ 1010. In the illustration of FIG. 10, each such combination is represented as $[b^m * X^k]$ and comprises the element-wise multiplication of the $m^{th}$ base vector with the $k^{th}$ Fourier vector.

FIGS. 39A-39C illustrate an exemplary OTFS encoding scheme pursuant to which $N^2$ data symbols $d_{ij}$ of a data matrix are spread using a pair of transform matrices into $N^2$ different basis matrices $B_{ij}$ of basis frames $F_{ij}$. With reference to FIG. 39B, a basis matrix includes N length N basis vectors $b_0$-$b_{N-1}$. When [U1] is implemented using a DFT or IDFT matrix, the multiplication of the [D] matrix (FIG. 39A) by [U1] and [U2] can be replicated by multiplying each of the basis vectors $b_0$-$b_{N-1}$ by a diagonal matrix formed by placing the N components of each DFT vector (column) along the main diagonal. The result of these multiplications is $N^2$ basis matrices. As shown in FIG. 39C, each data element $d_{ij}$ is then multiplied by one of the $N^2$ basis matrices and the resulting $N^2$ matrices $d_{ij} * B_{ij}$ are summed to yield an OTFS data matrix. This is illustrated by, for example, the cyclic convolution of FIG. 10. Thus, each data element $d_{ij}$ is spread over each element of the OTFS data matrix.

Figure 39F:
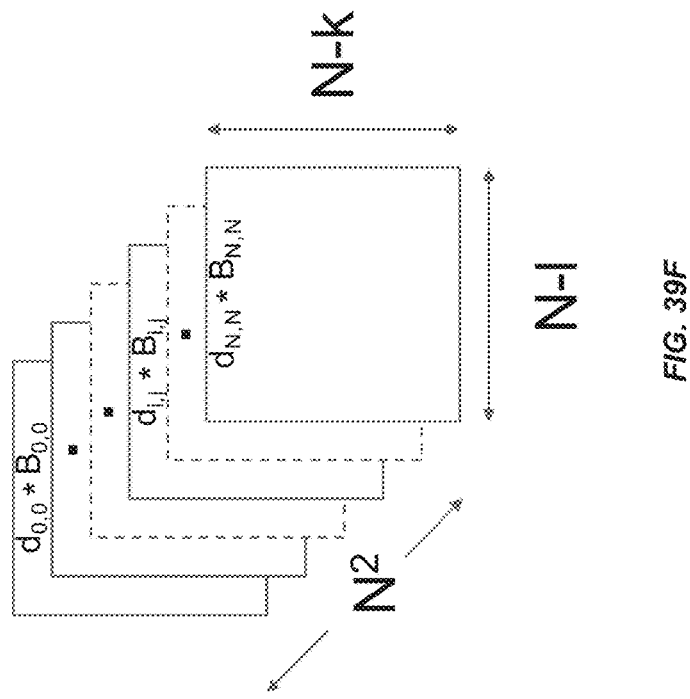
FIGS. 39D-39F illustrate encoding using an incomplete basis matrix that includes N–l columns and N–k rows where l and k are greater than or equal to one.
Figure 39D:
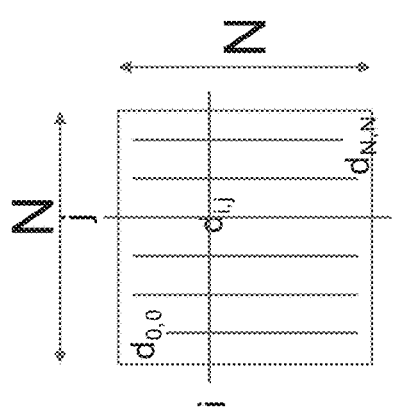
Figure 39E:
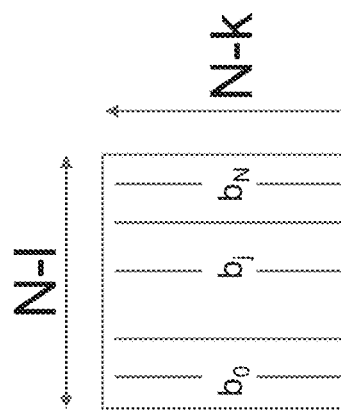
Figure 39I:
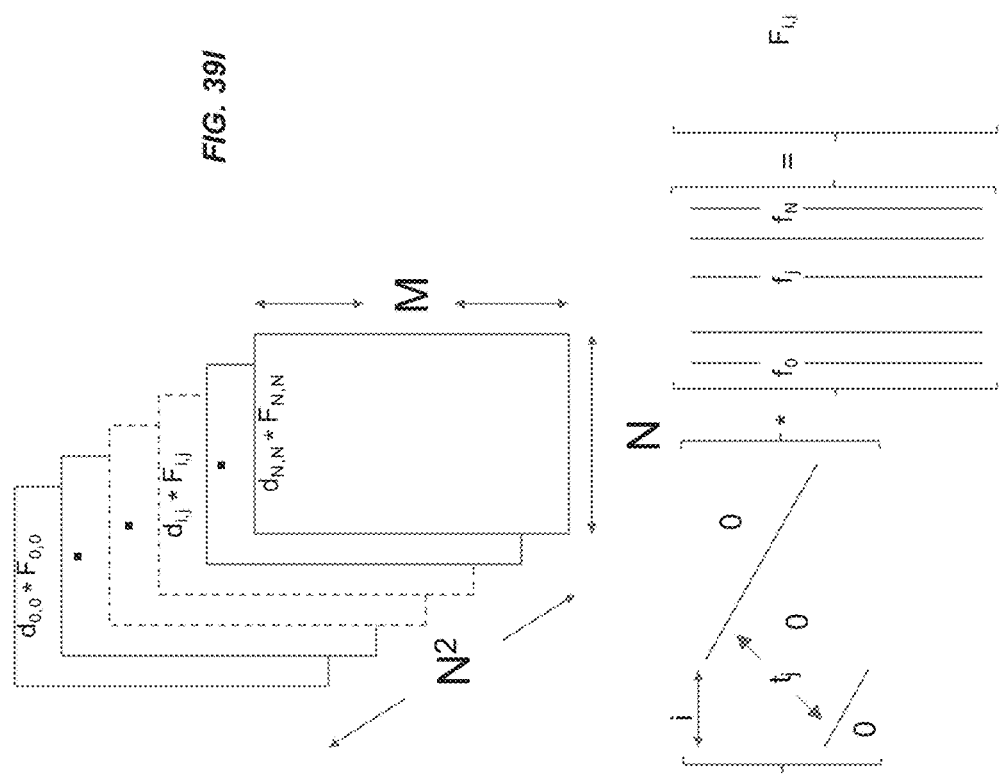
FIGS. 39G-39I illustrate encoding using a basis frame that has N vectors of length M where M is greater than N.
Figure 39G:
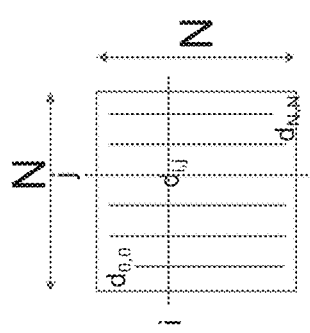
Figure 39H:
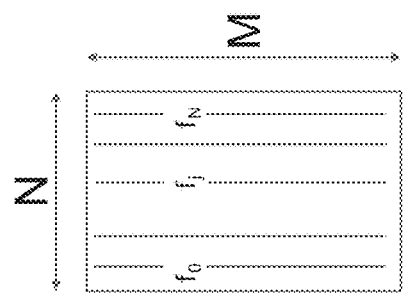
Figure 39L:
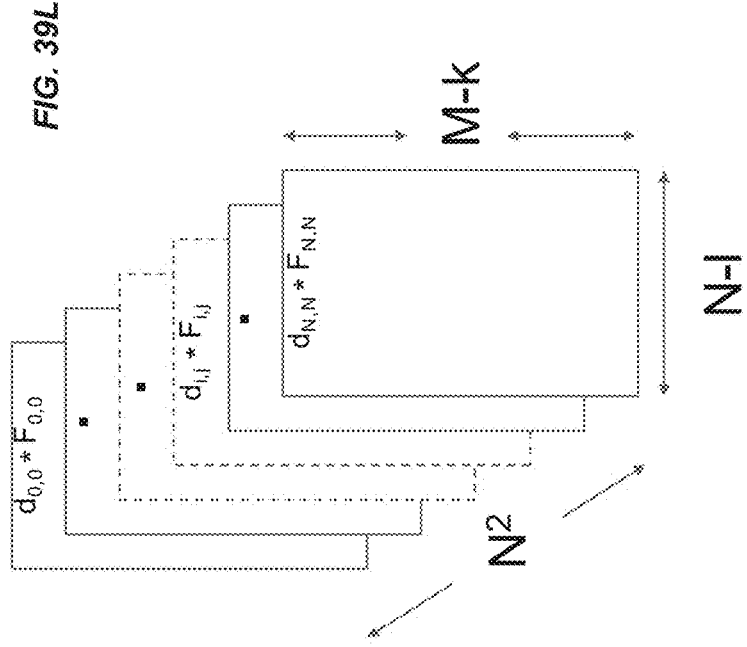
FIGS. 39J-39L illustrate encoding using an incomplete basis frame including N–l columns and M–k rows, where l and k are greater than or equal to one.
Figure 39J:
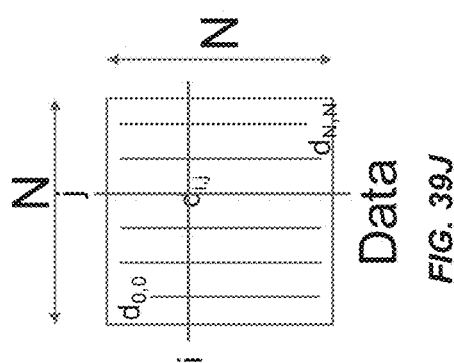
Figure 39K:
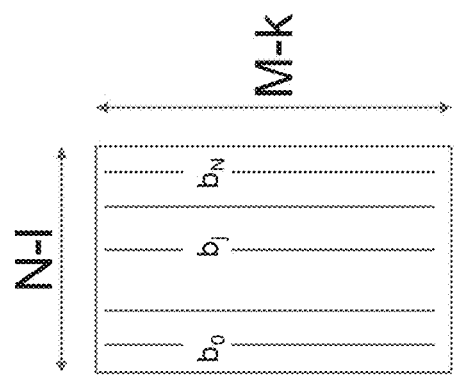

FIGS. 39D-39F illustrate encoding using an incomplete basis matrix that includes N–l columns and N–k rows where l and k are greater than or equal to one. The resulting multiplications spread only a portion of the data elements $d_{ij}$ over the entire N×N OTFS matrix. FIGS. 39G-39I illustrate a basis frame that has N vectors of length M where M is greater than N. The resulting basis frames include N×M elements. FIGS. 39J-L illustrate encoding using an incomplete basis frame including N–l columns and M–k rows, where l and k are greater than or equal to one. The result is that fewer than all the data elements $d_{ij}$ are spread across all of the $N^2$ basis frames.

FIG. 12 shows a diagram of a cyclic deconvolution method that may be used to deconvolve received data according to the second form of the OTFS methodology. In FIG. 12, $R^m$ 1202 denotes a portion of the accumulated signal 730 received and demodulated by the OTFS receiver 455. Again, as previously discussed, particularly in the case where [U1] is composed of a cyclically permuted Legendre number of length N, then the matrix-based mathematical process of deconvolving the data and reconstructing the data can be understood alternatively as being a cyclic deconvolution of the transmitted data previously convolved in FIG. 10. Here the reconstructed components 1200 $\sim d^0$, $\sim d^k$, $\sim d^{N-1}$ can be understood as being the reconstructed elements (symbols) of the data vector 1000 component of the [D] matrix, the $b^m$ coefficients 1002 again can be understood as representing the same base vector 1002 components of the [U1] matrix, and the X coefficients 1004 can again be understood as representing the Fourier vector 1004 components of the [U2] matrix. In addition, $[b^m * X^k]'$ may be understood as denoting the element-wise multiplication of the mirror conjugate of the $m^{th}$ base vector with the $k^{th}$ Fourier vector.

In this alternative scheme or embodiment, the OTFS method can be understood as being a method of transmitting at least one frame of data ([D]) over a communications link, comprising: creating a plurality of time-spectrum-tone or spectral-shape spreading codes operating over a plurality of time-spreading intervals, each single time-spreading interval being composed of at least one clock intervals; each time-spectrum-tone or spectral-shape spreading code comprising a function of a first time-frequency shifting, a second spectral shaping, and a time spreading code or scanning and transmission scheme.

Multiple Users

In an exemplary embodiment, OTFS modulation techniques may be employed to enable data to be sent from multiple users using multiple transmitters (here usually referred to as the multiple transmitter case) to be received by a single receiver. For example, assume multiple users "a", "b", "c", and "d", each desire to send a frame of data including N elements. Consistent with an embodiment of a multi-user OTFS transmission scheme, a conceptual N×N OTFS transmission matrix shared by multiple users may be created in the manner described below. Specifically, each given user packs their N elements of data into one column of an N×N data frame associated with such user but leaves the other columns empty (coefficients set to zero). The N×N data frame [$D_a$] associated with, and transmitted by, a user "a" may thus be represented as:

$$[D_a] = \begin{bmatrix} a_{1,1} & 0_{1,2} & \ldots & 0_{1,n} \\ a_{2,1} & 0_{2,2} & \ldots & 0_{2,n} \\ \ldots & \ldots & \ldots & \ldots \\ a_{n,1} & 0_{n,2} & \ldots & 0_{n,n} \end{bmatrix}$$

Similarly, the N×N data frame [$D_b$] associated with, and transmitted by, a user "b" may thus be represented as $$[D_b] = \begin{bmatrix} 0_{1,1} & b_{1,2} & \ldots & 0_{1,n} \\ 0_{2,1} & b_{2,2} & \ldots & 0_{2,n} \\ \ldots & \ldots & \ldots & \ldots \\ 0_{n,1} & b_{n,2} & \ldots & 0_{n,n} \end{bmatrix}$$

And user "n" sends and N×N data frame [$D_n$]

$$[D_n] = \begin{bmatrix} 0_{1,1} & 0_{1,2} & \ldots & n_{1,n} \\ 0_{2,1} & 0_{2,2} & \ldots & n_{2,n} \\ \ldots & \ldots & \ldots & \ldots \\ 0_{n,1} & 0_{n,2} & \ldots & m_{n,n} \end{bmatrix}$$

Thus, transmission of the data frames [$D_a$], [$D_b$] ... [$D_n$] respectively by the users "a", "b" ... "n" results in transmission of the conceptual N×N OTFS transmission matrix, with each of the users being associated with one of the columns of such conceptual transmission matrix. In this way each independent user "a", "b" ... "n" transmits its N data elements during its designated slot (i.e., column) within the conceptual N×N OTFS transmission matrix, and otherwise does not transmit information. This enables signals corresponding to the data frames [$D_a$], [$D_b$] ... [$D_n$] to be received at the receiver as if the conceptual N×N OTFS transmission matrix was representative of a complete data frame sent by only a single transmitter. Once so received at the receiver, the received data frames [$D_a$], [$D_b$] ... [$D_n$] effectively replicate the conceptual N×N OTFS transmission matrix, which may then be deconvolved in the manner discussed above.

Figure 24:
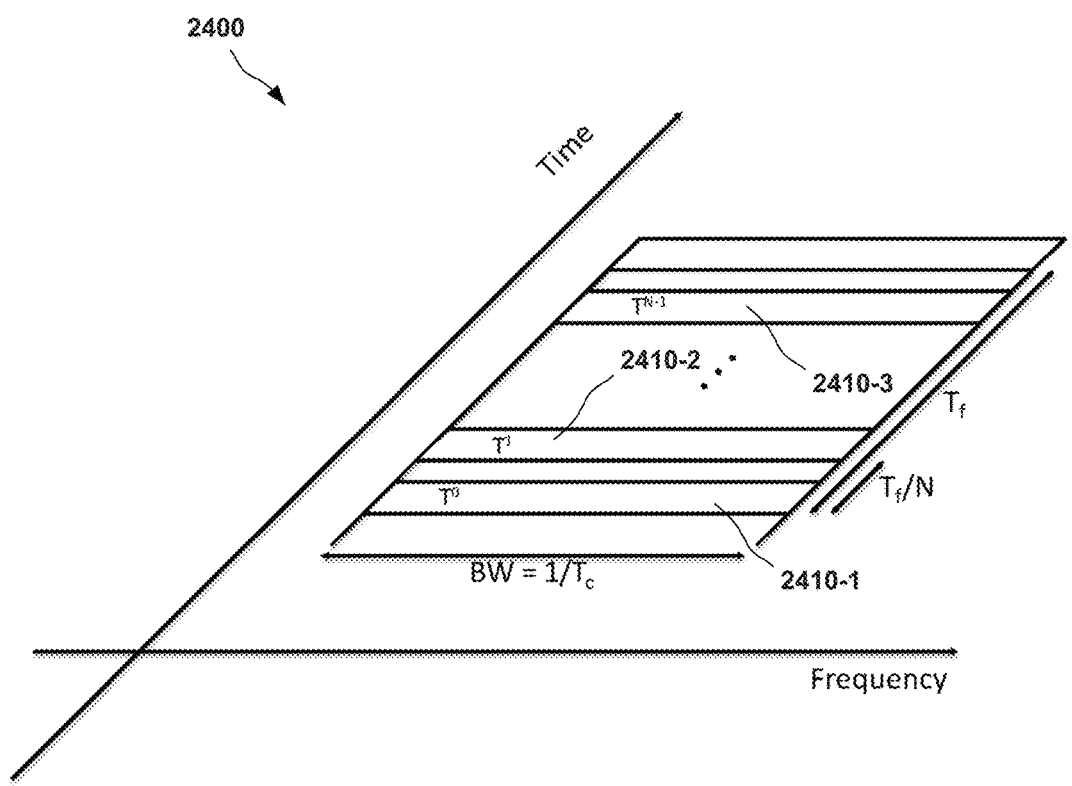
FIG. 24 illustrates a first exemplary time and frequency tiling approach that can be used in an OTFS modulation scheme.

FIG. 24 depicts a time/frequency plane 2400 which illustrates the manner in which multiple users may transmit data in designated columns of a conceptual OTFS transmission matrix consistent with the preceding example. As shown, the time/frequency plane 2400 includes a first tile $T^0$ 2410-1 representative of transmission, by a first user, of data in a first column of the conceptual OTFS transmission matrix. In the embodiment of FIG. 24 the first tile $T^0$ 2410-1 encompasses an entire bandwidth (BW) of the OTFS channel and extends for a duration of $T_f/N$, where $T_f$ denotes a total time required to transmit all of the entries within the conceptual OTFS transmission matrix. Similarly, the time/frequency plane 2400 includes a second tile $T^1$ 2410-2 representative of transmission, by a second user, of data in a second column of the conceptual OTFS matrix during a second $T_f/N$ interval. In this way each of the N users are provided with a time interval of $T_f/N$ to transmit their respective N elements included within the N×N conceptual OTFS transmission matrix.

Figure 25:
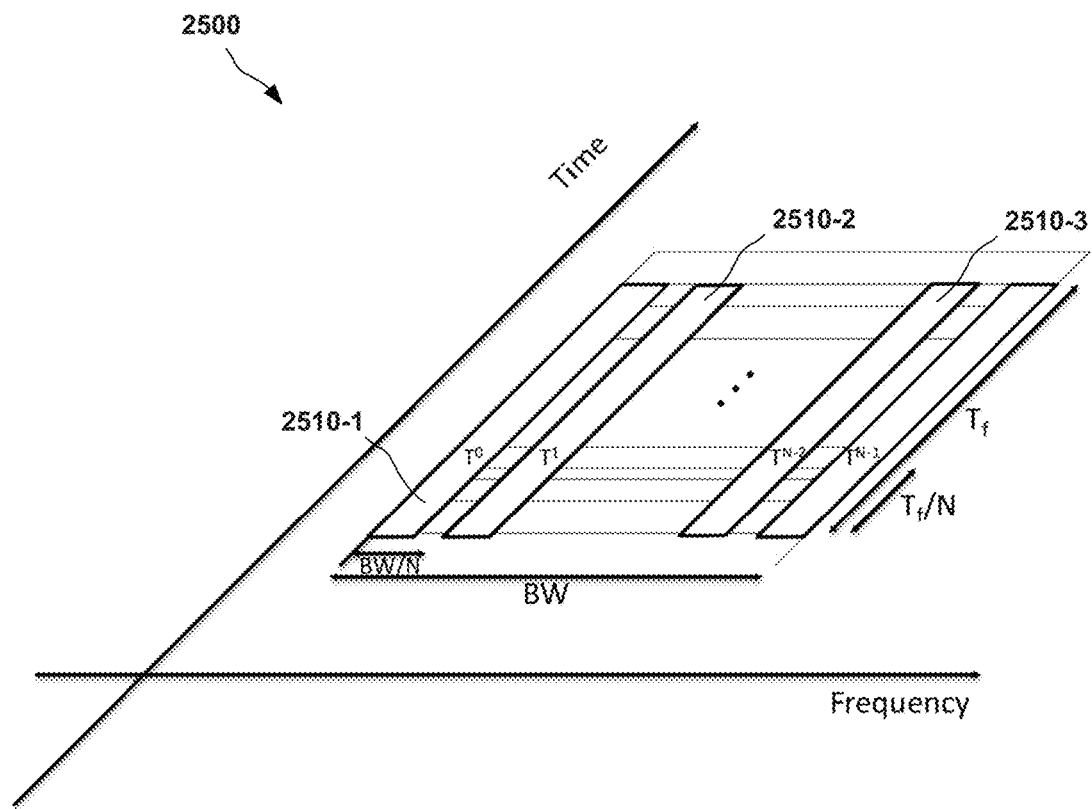
FIG. 25 illustrates a second exemplary time and frequency tiling approach that can be used in an OTFS scheme.

FIG. 25 depicts an alternative time/frequency plane 2400 which illustrates another manner in which multiple users may transmit data in designated rows of a conceptual OTFS transmission matrix consistent with the preceding example. As shown, the time/frequency plane 2500 includes a first tile $T^0$ 2510-1 representative of transmission, by a first user, of data in a first row or first set of rows of the conceptual OTFS transmission matrix. In the embodiment of FIG. 25 the first tile $T^0$ 2510-1 encompasses a first portion of the entire bandwidth (BW) of the OTFS channel corresponding to the number of first rows, and the transmission extends for an entire duration $T_f$, where $T_f$ denotes a total time required to transmit all of the entries within the conceptual OTFS transmission matrix. Similarly, the time/frequency plane 2500 includes a second tile $T^1$ 2510-2 representative of transmission, by a second user, of data in a second row or rows of the conceptual OTFS matrix encompassing a second portion of the bandwidth, and also transmitting during the entire $T_f$ time interval. In this way each of the users are provided with a portion of the bandwidth for the entire time interval of $T_f$ to transmit their respective N elements (or integer multiple of N elements) included within the N×N conceptual OTFS transmission matrix.

Figure 26:
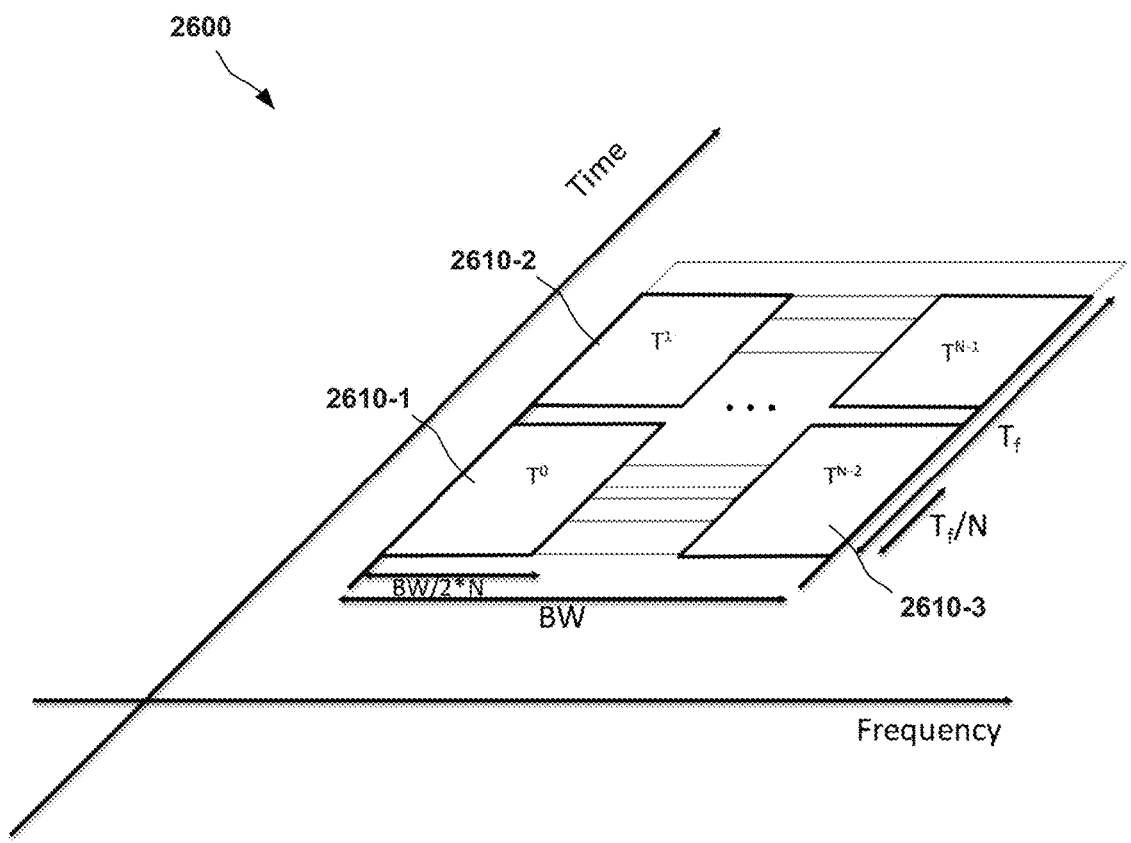
FIG. 26 illustrates a third exemplary time and frequency tiling scheme that can be used in the OTFS modulation scheme.

FIG. 26 depicts yet another time/frequency plane 2600 which illustrates another manner in which multiple users may transmit data in designated column/row portions of a conceptual OTFS transmission matrix consistent with the preceding example. As shown, the time/frequency plane 2600 includes a first tile $T^0$ 2610-1 representative of transmission, by a first user, of data in one or more first columns and one or more first rows of the conceptual OTFS transmission matrix. In the embodiment of FIG. 26 the first tile $T^0$ 2610-1 encompasses a portion of the entire bandwidth (BW) of the OTFS channel proportional to the number of rows in the first tile 2610-1, and the transmission extends for a duration of n $T_f/N$, where $T_f$ denotes a total time required to transmit all of the entries within the conceptual OTFS transmission matrix and n≤N represents the number of rows that the first tile 2610-1 includes. Similarly, the time/frequency plane 2600 includes a second tile $T^1$ 2610-2 representative of transmission, by a second user, of data in a one or more second columns and one or more second rows of the conceptual OTFS matrix during a second m $T_f/N$ interval, where m≤N represents the number of rows in the second tile 2610-2. In this way each of the users are provided with a time interval of an integer multiple of $T_f/N$ to transmit their respective elements included within the N×N conceptual OTFS transmission matrix.

The size of the tiles in FIGS. 24-26 corresponds proportionally to the amount of data provided to the corresponding user. Therefore, users with higher data rate requirements can be afforded larger portions of the [D] matrix and therefore larger tiles. In addition, users that are closer to the transmitter can be afforded larger portions of the [D] matrix while users further away may be provided smaller portions to take advantage of the efficient transmissions to close users and minimize data lost transmitting to further users.

Multiple users that are using different transmitters (or simply multiple transmitters) may communicate over the same communications link using the same protocol. Here, each user or transmitter may, for example, select only a small number of data elements in the $N^2$ sized frame of data to send or receive their respective data. As one example, a user may simply select one column of the frame of data for their purposes, and set the other columns at zero. The user's device will then compute TFS data matrices and send and receive them as usual.

Overview of OTFS Equalization

Figure 27:
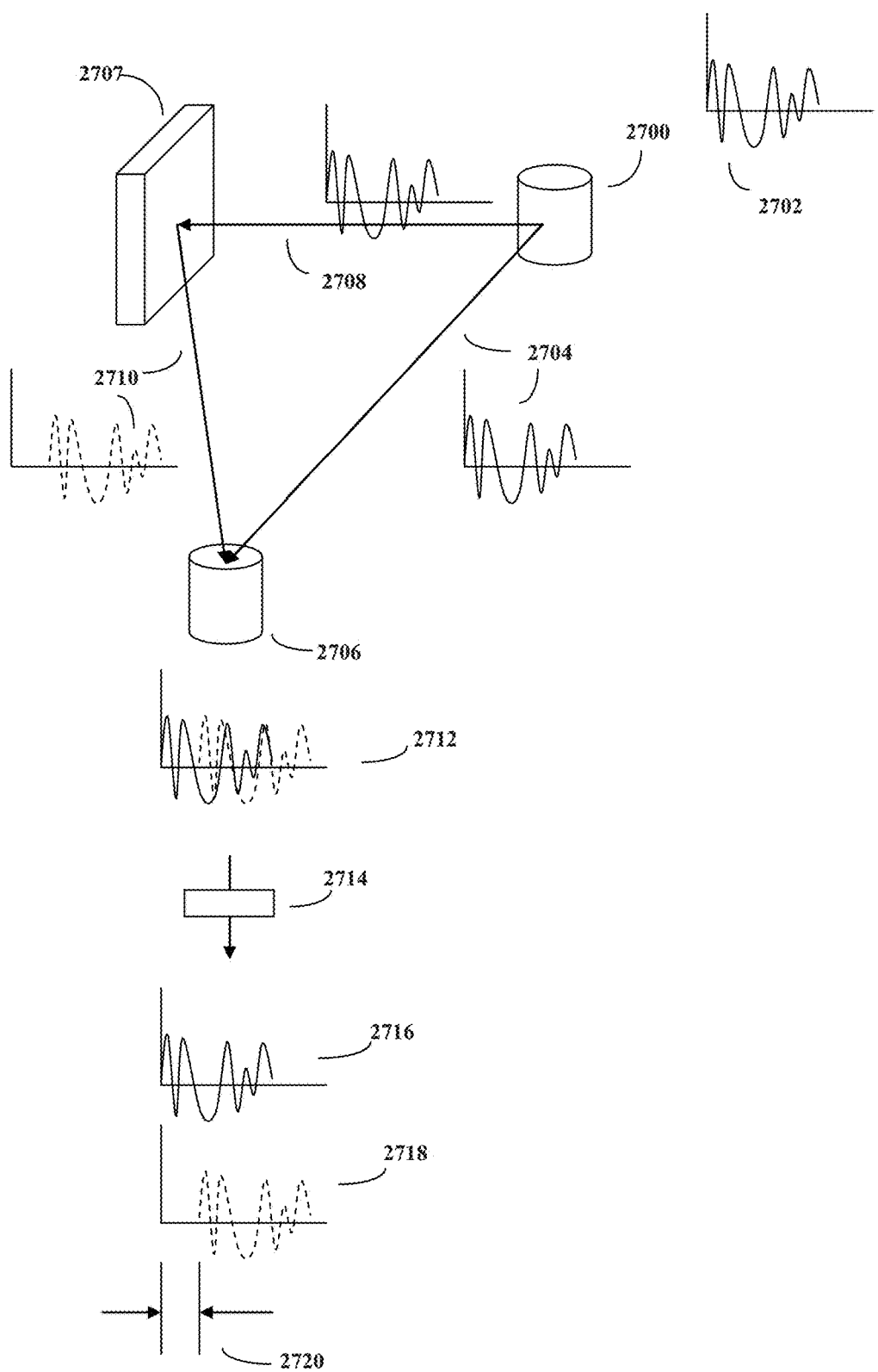
FIG. 27 illustrates the transmission of cyclically time shifted waveforms in order to enable time deconvolution of the received signal to be performed so as to compensate for various types of echo reflections.

Attention is now directed to FIGS. 27-36, to which reference will be made in describing various techniques for compensating for Doppler and frequency shift within an OTFS communication system. Turning now to FIG. 27, there is shown an exemplary process by which a receiver 2706 compensates for various types of echo reflections or other channel distortions through time deconvolution of a received signal in the manner described herein. In FIG. 27, wireless transmitter 2700 transmits a complex cyclically time shifted and cyclically frequency shifted wireless waveform 2702 in multiple directions using methods in accordance with the above description. The wireless transmitter 2700 could be realized using, for example, the OTFS transmitter 405 of FIG. 4. Some of these signals 2704 go directly to the receiver 2706. The receiver 2706 can be, for example, the OTFS receiver 455 of FIG. 4. Other signals 2708 may be reflected by a wireless reflector, such as a building 2707. These "echo" reflections 2710 travel a longer distance to reach receiver 2706, and thus end up being time delayed. As a result, receiver 2706 receives a distorted signal 2712 that is the summation of both the original signal 2704 and the echo waveforms 2710.

Since a portion of the transmitted signal 2702 is a cyclically time shifted waveform, a time deconvolution device 2714 at the receiver, such as the post-equalizer 480 of FIG. 4, analyzes the cyclically time varying patterns of the waveforms and effects appropriate compensation. In the embodiment of FIG. 27 this analysis may include a type of pattern matching or the equivalent and the decomposition of the distorted, received signal back into various time-shifted versions. These time-shifted versions may include, for example, a first time-shifted version 2716 corresponding to direct signals 2704 and a second time-shifted version 2718 corresponding to the reflected signal 2710. The time deconvolution device 2714 may also determine the time-offset 2720 necessary to cause the time delayed echo signal 2718, 2710 to match up with the original or direct signal 2716, 2704. This time offset value 2720, here called a time deconvolution parameter, may provide useful information as to the relative position of the echo location(s) relative to the transmitter 2700 and receiver 2706. This parameter may also help the system characterize some of the signal impairments that occur between the transmitter and receiver.

Figure 28:
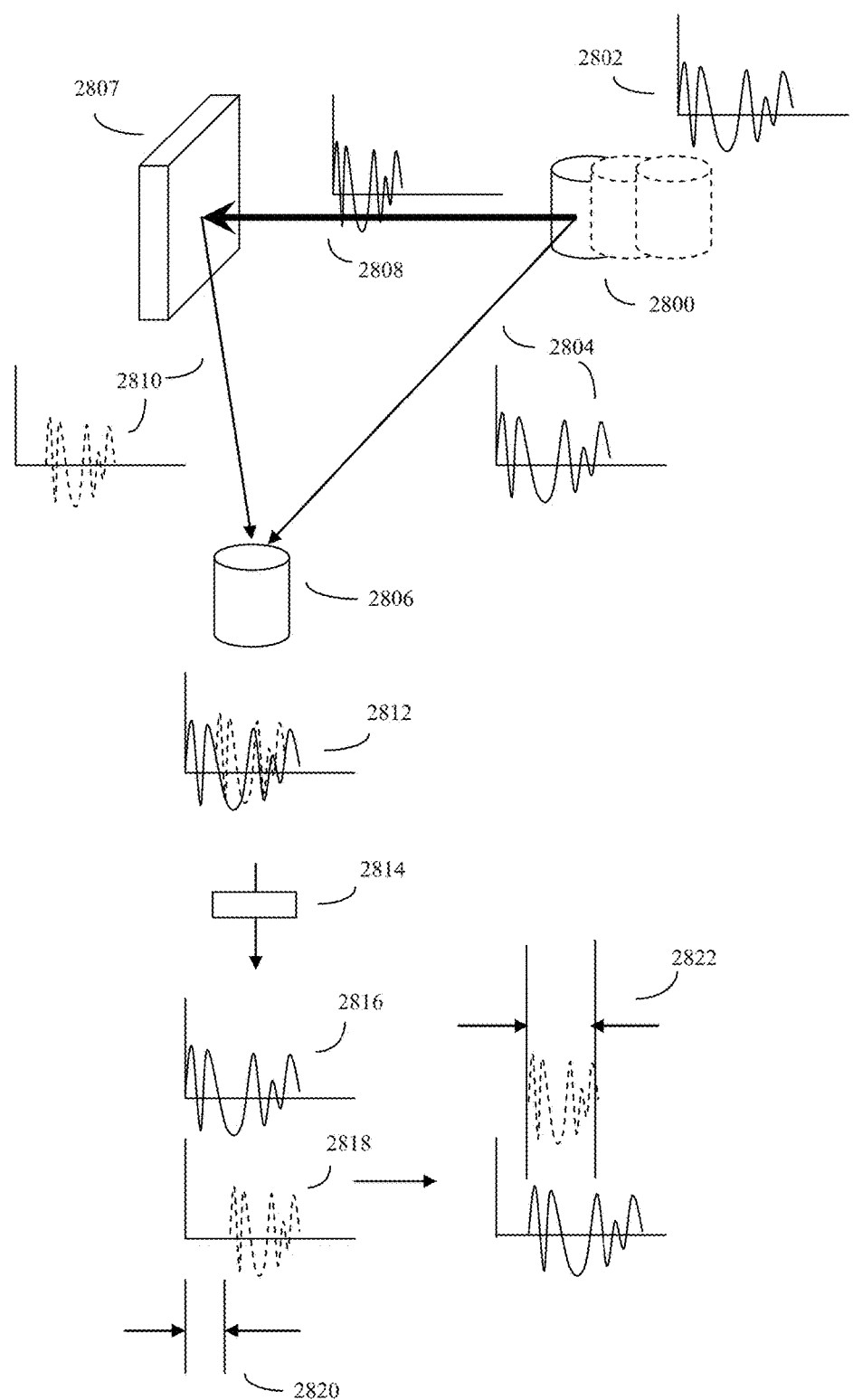
FIG. 28 illustrates the transmission of both cyclically time shifted waveforms and cyclically frequency shifted waveforms in order to enable both time and frequency deconvolution of the received signal to be performed so as to compensate for both echo reflections and frequency shifts.

FIG. 28 shows an example of how transmitting both cyclically time shifted waveforms and cyclically frequency shifted waveforms can be useful to help a receiver 2806 (such as the OTFS receiver 455) effect both time and frequency compensation of the received signal to compensate for both echo reflections and frequency shifts—in this example Doppler effect frequency shifts. In FIG. 28, a moving wireless transmitter 2800, such as the OTFS transmitter 405, is again transmitting a complex cyclically time shifted and cyclically frequency shifted wireless waveform 2802 in multiple directions. To simplify presentation, it is assumed that transmitter 2800 is moving perpendicular to receiver 2806 so that it is neither moving towards nor away from the receiver, and thus there are no Doppler frequency shifts relative to the receiver 2806. It is further assumed that the transmitter 2800 is moving towards a wireless reflector, such as a building 2807, and thus the original wireless waveform 2802 will be modified by Doppler effects, thereby shifting frequencies of the waveform 2802 towards a higher frequency (blue shifted) relative to the reflector 2807.

Thus, the direct signals 2804 impinging upon the receiver 2806 will, in this example, not be frequency shifted. However the Doppler-shifted wireless signals 2808 that bounce off of the wireless reflector, here again building 2807, will echo off in a higher frequency shifted form. These higher frequency shifted "echo" reflections 2810 also still have to travel a longer distance to reach receiver 2806, and thus also end up being time delayed as well. As a result, receiver 2806 receives a signal 2812 that is distorted due to the summation of the direct signal 2804 with the time and frequency shifted echo waveforms 2810.

However, as was described above, the OTFS techniques described herein may utilize the transmission of cyclically time shifted and frequency shifted waveforms. Accordingly, a time and frequency deconvolution device 2814 (alternatively a time and frequency adaptive equalizer such as the OTFS demodulator 460 and the OTFS post-equalizer 480 of FIG. 4) within the receiver 2806 may evaluate the cyclically time varying and frequency varying patterns of the waveforms in order to decompose such waveforms back into various time-shifted and frequency shifted versions. Included among such versions are a first version 2816 corresponding to the direct signal 2804 and a second version 2818 corresponding to the frequency shifted echo waveform 2810. In one embodiment this evaluation and decomposition may be effected using pattern matching or related techniques. At the same time, the time and frequency deconvolution device 2814 may also determine the above-referenced time deconvolution parameter and a frequency offset value 2822, which may also be referred to herein as a frequency deconvolution parameter. These parameters may provide useful information as to the relative position of the echo location(s) relative to the transmitter 2800 and the receiver 2806, and may also enable characterization of certain of the signal impairments that occur between the transmitter and receiver.

The net effect of both time and frequency deconvolutions, when applied to transmitters, receivers, and echo sources that potentially exist at different distances and velocities relative to each other, is to allow the receiver to properly interpret the impaired signal. Here, even if the energy received in the primary signal is too low to permit proper interpretation, the energy from the time and/or frequency shifted versions of the signals can be added to the primary signal upon the application of appropriate time and frequency offsets or deconvolution parameters to signal versions, thereby resulting in a less noisy and more reliable signal at the receiver. Additionally, the time and frequency deconvolution parameters can contain useful information as to the relative positions and velocities of the echo location(s) relative to the transmitter and receiver, as well as the various velocities between the transmitter and receiver, and can also help the system characterize some of the signal impairments that occur between the transmitter and receiver.

Thus, in some embodiments the OTFS systems described herein may also provide a method to provide an improved receiver where, due to either one or a combination of echo reflections and frequency offsets, multiple signals associated with such reflections and offsets result in the receiver receiving a time and/or frequency convolved composite signal representative of time and/or frequency shifted versions of the $N^2$ summation-symbol-weighted cyclically time shifted and frequency shifted waveforms. Here, the improved receiver will further time and/or frequency deconvolve the time and/or frequency convolved signal to correct for such echo reflections and the resulting time and/or frequency offsets. This will result in both time and frequency deconvolved results (i.e. signals, typically of much higher quality and lower signal to noise ratio), as well as various time and frequency deconvolution parameters that, as will be discussed, are useful for a number of other purposes.

Before going into a more detailed discussion of other applications, however, it is useful to first discuss the various waveforms in more detail.

Embodiments of the OTFS systems and methods described herein generally utilize waveforms produced by distributing a plurality of data symbols into one or more N×N symbol matrices, and using these one or more N×N symbol matrices to control the signal modulation of a transmitter. Here, for each N×N symbol matrix, the transmitter may use each data symbol to weight N waveforms, selected from an $N^2$-sized set of all permutations of N cyclically time shifted and N cyclically frequency shifted waveforms determined according to an encoding matrix U, thus producing N symbol-weighted cyclically time shifted and cyclically frequency shifted waveforms for each data symbol. This encoding matrix U is chosen to be an N×N unitary matrix that has a corresponding inverse decoding matrix $U^H$. The method will further, for each data symbol in the N×N symbol matrix, sum the N symbol-weighted cyclically time shifted and cyclically frequency shifted waveforms, producing $N^2$ summation-symbol-weighted cyclically time shifted and cyclically frequency shifted waveforms. The transmitter will transmit these $N^2$ summation-symbol-weighted cyclically time shifted and cyclically frequency shifted waveforms, structured as N composite waveforms, over any combination of N time blocks or frequency blocks.

As discussed above, various waveforms can be used to transmit and receive at least one frame of data [D] (composed of a matrix of up to $N^2$ data symbols or elements) over a communications link. Here each data symbol may be assigned a unique waveform (designated a corresponding waveform) derived from a basic waveform.

For example, the data symbols of the data matrix [D] may be spread over a range of cyclically varying time and frequency shifts by assigning each data symbol to a unique waveform (corresponding waveform) which is derived from a basic waveform of length N time slices (in embodiments described herein the set of N time slices correspond to the time required to transmit this waveform, also referred to as a time block), with a data symbol specific combination of a time and frequency cyclic shift of this basic waveform.

In one embodiment each symbol in the frame of data [D] is multiplied by its corresponding waveform, producing a series of $N^2$ weighted unique waveforms. Over one spreading time interval (or time block interval), all $N^2$ weighted unique waveforms corresponding to each data symbol in the fame of data [D] are simultaneously combined and transmitted. Further, a different unique basic waveform of length (or duration) of one time block (N time slices) may be used for each consecutive time-spreading interval (consecutive time block). Thus a different unique basic waveform corresponding to one time block may be used for each consecutive time-spreading interval, and this set of N unique waveforms generally forms an orthonormal basis. Essentially, each symbol of [D] is transmitted (in part) again and again either over all N time blocks, or alternatively over some combination of time blocks and frequency blocks (e.g. assigned frequency ranges).

To receive data over each block of time, the received signal is correlated with a corresponding set of all $N^2$ waveforms previously assigned to each data symbol by the transmitter for that specific time block. Upon performing this correlation, the receiver may produce a unique correlation score for each one of the $N^2$ data symbols. This process will be repeated over some combination of time blocks and frequency blocks until all N blocks are received. The original data matrix [D] can thus be reconstructed by the receiver by summing, for each data symbol, the correlation scores over N time blocks or frequency blocks, and this summation of the correlation scores will reproduce the $N^2$ data symbols of the frame of data [D].

Note that in some embodiments, some of these N time blocks may be transmitted non-consecutively, or alternatively some of these N time blocks may be frequency shifted to an entirely different frequency range, and transmitted in parallel with other time blocks from the original set of N time blocks in order to speed up transmission time. This is discussed later and in more detail in reference to FIG. 29.

In order to enable focus to be directed to the underlying cyclically time shifted and cyclically shifted waveforms, detailed aspects of one embodiment of the OTFS methods described above may be somewhat generalized and also discussed in simplified form. For example, the operation of selecting from an $N^2$ set of all permutations of N cyclically time shifted and N cyclically frequency shifted waveforms may correspond, at least in part, to an optional permutation operation P as well as to the other steps discussed above. Additionally, the $N^2$ set of all permutations of N cyclically time shifted and N cyclically frequency shifted waveforms may be understood, for example, to be at least partially described by a Discrete Fourier transform (DFT) matrix or an Inverse Discrete Fourier Transform matrix (IDFT). This DFT and IDFT matrix can be used by the transmitter, for example, to take a sequence of real or complex numbers and modulate them into a series of different waveforms.

Considering now a particular example, individual rows of a DFT matrix (e.g., the DFT matrix of FIG. 18) may each be used to generate a Fourier vector including set of N cyclically time-shifted and frequency-shifted waveforms. In general, the Fourier vectors may create complex sinusoidal waveforms of the type:

$$X_j^k = e^{\left(\frac{-i*2*\pi*j*k}{N}\right)}$$

where, for an N×N DFT matrix [X], $X_j^k$ is the coefficient of the Fourier vector in row k column j of the DFT matrix, and N is the number of columns. The products of this Fourier vector may be considered to represent one example of a manner in which the various time shifted and frequency shifted waveforms suitable for use in the OTFS system may be generated.

For example and as mentioned previously, FIG. 10 shows a diagram of one example of a cyclic convolution method that a transmitter can use to encode and transmit data. In FIG. 10, the sum of the various [$b^m*X^k$] components can also be termed a "composite waveform". As a consequence, in an embodiment consistent with FIG. 10 the full [D] matrix of symbols will ultimately be transmitted as N composite waveforms.

Although previously discussed, FIG. 12 may also be understood to provide a diagram of a cyclic deconvolution method capable of being used to decode received data. More specifically, particularly in the case where [$U_1$] is composed of a cyclically permuted Legendre number of length N, the process of deconvolving the data and reconstructing the data can be understood alternatively as being a cyclic deconvolution (cyclic decoding) of the transmitted data previously convolved (encoded) by the transmitter as described in reference to FIG. 10. In the embodiment of FIG. 12, the $\sim d^0$, $\sim d^k$, $\sim d^{N-1}$ elements represent the reconstructed symbols (symbols) of the data vector 1200 component of the [D] matrix (corresponding to the transmitted data vector 1000), the $b^m$ coefficients again represent the base vector 1002 components of the [$U_1$] matrix, and the $X_j^k$ coefficients can again be understood as representing the Fourier vector 1004 components of the [$U_2$] matrix. Here ($R^m$) 1202 is a portion of the accumulated signal 1010 received and demodulated by the receiver.

As described above with reference to FIGS. 24-26, different tiling schemes for proportioning the rows (frequency offsets) and columns (time offsets) of the data matrix [D] can be utilized to provide for multiple users to transmit data over multiple time/frequency offset blocks in the same data matrix [D]. These tiling schemes can be utilized differently depending on the type(s) of motion and reflected signals and the resulting time and frequency offsets that a transmitter and receiver are experiencing. Some exemplary methods for utilizing different time/frequency blocks will now be described with reference to FIGS. 29-30.

Figure 29:
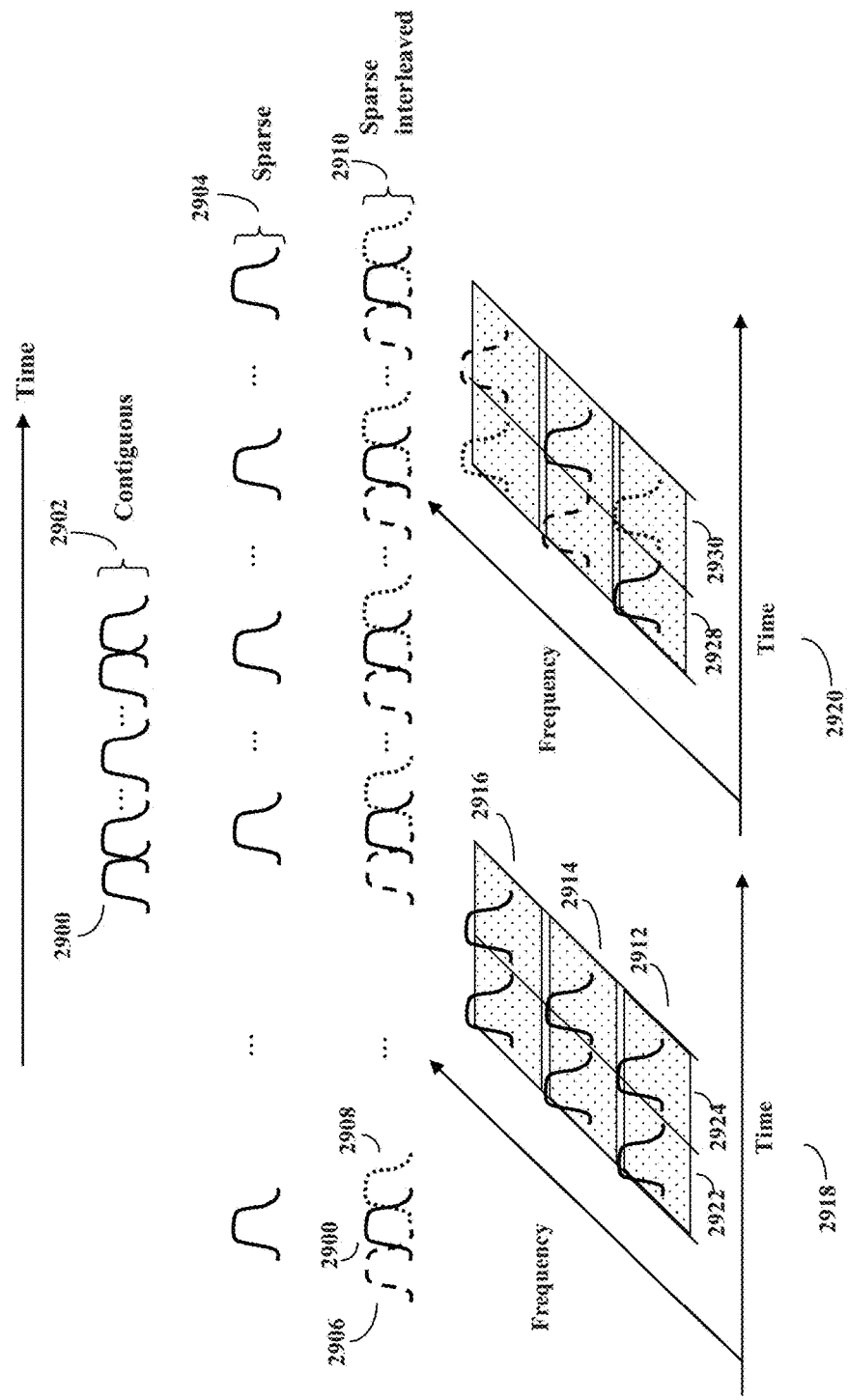
FIG. 29 illustrates the transmission of various composite waveform blocks as either a series of N consecutive time blocks associated within a single symbol matrix or, alternatively, as a time-interleaved series of blocks from different symbol matrices.

Referring now to FIG. 29, there are shown various transmitted waveform blocks 2900 can be transmitted as a series of N consecutive time blocks (i.e. no other blocks in between). These consecutive time blocks can either be a contiguous series 2902 (i.e. with minimal or no time gaps in between various waveform blocks) or they can be a sparsely contiguous series 2904 (i.e. with time gaps between the various waveform bocks, which may in some embodiments be used for synchronization, hand shaking, listening for other user's transmitters, channel assessment and other purposes. Alternatively, the various waveform time blocks can be transmitted either time-interleaved with the blocks from one or more different symbol matrices 2906, 2908 (which in some cases may be from a different transmitter) in a contiguous or sparse interleaved manner as shown in series 2910.

As yet another alternative, some of the various waveform time blocks may be frequency transposed to entirely different frequency bands or ranges 2912, 2914, 2916. This can speed up transmission time, because now multiple waveform time blocks can now be transmitted at the same time as different frequency blocks. As shown in time/frequency offset tiles 2918 and 2920, such multiple frequency band transmissions can also be done on a contiguous, sparse contiguous, contiguous interleaved, or sparse contiguous interleaved manner. Here 2922 and 2928 represent one time block at a first frequency range 2912, and 2924 and 2930 represent the next time block at the frequency range 2912. Here the various frequency ranges 2912, 2914, and 2916 can be formed, as will be described shortly, by modulating the signal according to different frequency carrier waves. Thus, for example, frequency range or band 2912 might be transmitted by modulating a 1 GHz frequency carrier wave, frequency range or band 2914 might be transmitted by modulating a 1.3 GHz frequency carrier wave, and band 2915 might be transmitted by modulating a 1.6 GHz frequency carrier wave, and so on.

Stated differently, the N composite waveforms, themselves derived from the previously discussed $N^2$ summation-symbol-weighted cyclically time shifted and cyclically frequency shifted waveforms, may be transmitted over at least N time blocks. These N time blocks may be either transmitted consecutively in time (e.g. 2902, 2904) or alternatively transmitted time-interleaved with the N time blocks from a second and different N×N symbol matrix.

Figure 30:
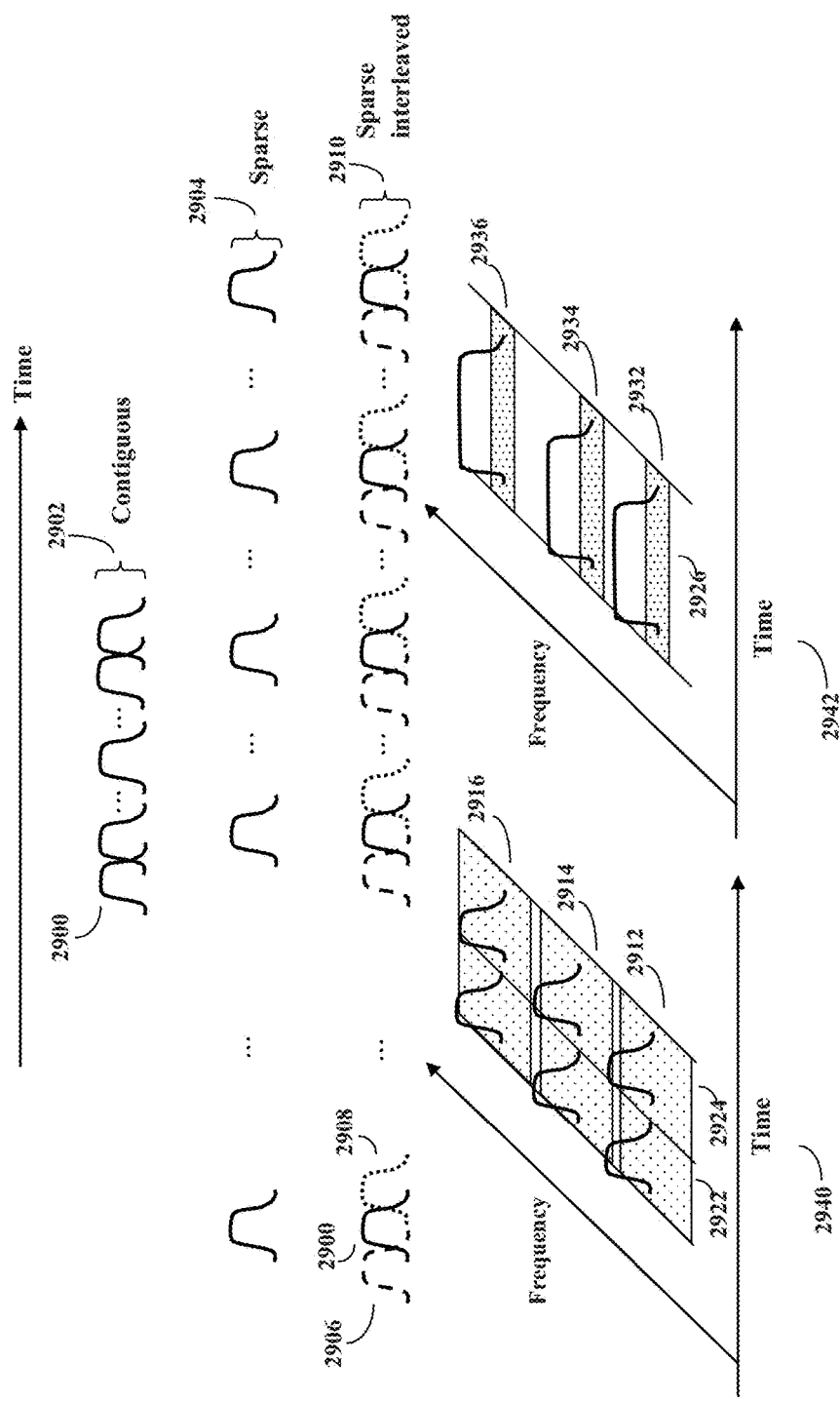
FIG. 30 illustrates the transmission of various composite waveform blocks as either shorter duration time blocks over one or more wider frequency ranges or as longer duration time blocks over one or more narrower frequency ranges.

FIG. 30 shows that the various composite waveform blocks transmitted by the transmitter can be either transmitted as shorter duration time blocks over one or more wider frequency ranges, or as longer duration time blocks over one or more narrower frequency ranges. That is, FIG. 30 shows exemplary tradeoffs between frequency bandwidth and time made available through use of embodiments of the OTFS method. Whereas in time/frequency tile 2940, the available bandwidth for each frequency range 2912, 2914, and 2916 is relatively large, in 2942, the available bandwidth for each frequency range 2932, 2934 and 2936 is considerably less. Here, the OTFS scheme can compensate for narrower frequency ranges by allowing more time per time block. Thus where as in time/frequency tile 2940, with high bandwidth available, the time blocks 2922 and 2924 can be shorter, in time/frequency tile 2942, with lower bandwidth available, the time blocks 2926 for transmitting the composite waveform is longer.

For both FIGS. 29 and 30 then, if there is only one fundamental carrier frequency, then all N blocks are transmitted consecutively in time as N time blocks. If there are less than N multiple fundamental carrier frequencies available, then all N blocks can be transmitted as some combination of N time blocks and N frequency blocks. If there are N or more fundamental frequencies available, then all N blocks can be transmitted over the duration of 1 time block as N frequency blocks.

Attention is now again directed to FIG. 21, to which reference will be made in describing an exemplary pre-equalization scheme. As was described previously, the transmitter 2100 is configured to transmit a series of N consecutive waveform time blocks where each time block encompasses a set of N time slices. During every successive time slice, one element from the OTFS matrix 2108 can be used to control the modulation circuit 2104. As was also previously discussed, the modulation scheme may be one in which the element will be separated into its real and imaginary components, chopped and filtered, and then used to control the operation of a sin and cosine generator, producing a composite analog waveform 2120. The net, effect, by the time that the entire original N×N data symbol matrix [D] is transmitted, is to transmit the data in the form of $N^2$ summation-symbol-weighted cyclically time shifted and cyclically frequency shifted waveforms, structured as N composite waveforms.

In some embodiments the transmitter 2100 may further implement a pre-equalization operation, typically performed by the pre-equalizer 410 of FIG. 4, which involves processing the [D] matrix prior to providing it to the analog modulation circuit 2102. When this pre-equalization operation is performed, the transmitter 2100 outputs pre-equalized OTFS signals 2130; otherwise, the transmitter simply outputs the OTFS signals 2120. The pre-equalization operation may be performed when, for example, the receiver in communication with the transmitter 2100 detects that an OTFS signal 2120 has been subjected to specific echo reflections and/or frequency shifts. Upon so detecting such echo reflections and/or frequency shifts, the receiver may transmit corrective information to the transmitter pertinent to such reflections and shifts. The pre-equalizer 410 may then shape subsequently-transmitted pre-equalized OTFS signals so as to compensate for these echo reflections and/or frequency shift. Thus, for example, if the receiver detects an echo delay, the pre-equalizer 410 may send the signal with an anti-echo cancellation waveform. Similarly, if the receiver detects a frequency shift, the pre-equalizer 410 can introduce a compensatory reverse frequency shift into the transmitted pre-equalization signal 2130.

Figure 31:
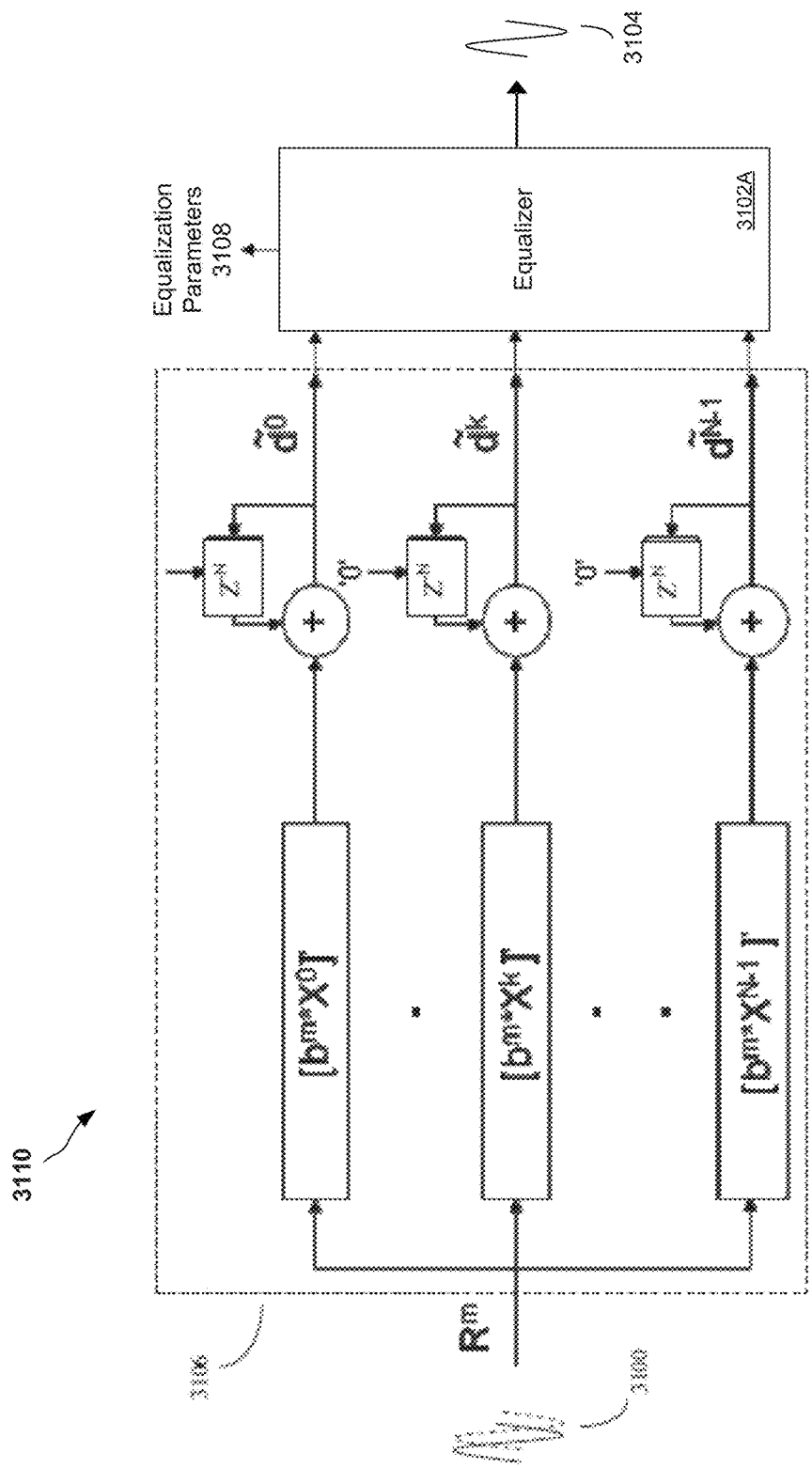
FIG. 31 shows a high-level representation of a receiver processing section configured to mathematically compensate for the effects of echo reflections and frequency shifts using an equalizer.

FIG. 31 illustrates exemplary receiver processing section 3110 operative to compensate for the effects of echo reflections and frequency shifts. Referring to FIG. 31, the receiver processing section 3110 includes a cyclic deconvolution processing block 3106 and an equalizer 3102. The equalizer 3102 performs a series of math operations and outputs equalization parameters 3108 that can also give information pertaining to the extent to which the echo reflections and frequency shifts distorted the underlying signal. The equalizer 3102A can be, for example, an adaptive equalizer.

In FIG. 31, it is assumed that the composite transmitted waveform has, since transmission, been distorted by various echo reflections and/or frequency shifts as previously shown in FIGS. 27 and 28. This produces a distorted waveform 3100, which for simplicity is represented through a simple echo reflection delayed distortion. In FIG. 31, equalizer 3102 is configured to reduce or substantially eliminate such distortion by analyzing the distorted waveform 3100 and, assisted by the knowledge that the original composite waveform was made up of N cyclically time shifted and N cyclically frequency shifted waveforms, determine what sort of time offsets and frequency offsets will best deconvolve distorted waveform 3100 back into a close representation of the original waveform, which is represented in FIG. 31 as deconvolved waveform 3104. The equalization operations performed by equalizer 3102 may alternately be carried out by the cyclic deconvolution device 3106.

In one embodiment the equalizer 3102 produces a set of equalization parameters 3108 during the process of equalizing the distorted waveform. For example, in the simple case where the original waveform was distorted by only a single echo reflection offset by time $t_{offset}$, and by the time the original waveform and the $t_{offset}$ echo waveform reach the receiver, the resulting distorted signal 3100 may be, for example, about 90% original waveform and 10% $t_{offset}$ echo waveform, then the equalization parameters 3108 can output both the 90% original and 10% echo signal mix, as well as the $t_{offset}$ value. Typically, of course, the actual distorted signal 3100 could consist of a number of various time and frequency offset components, and here again, in addition to cleaning this distortion, the equalizer 3102 can also report the various time offsets, frequency offsets, and percentage mix of the various components of signal 3100 to the transmitter and/or the receiver.

As previously discussed in FIGS. 29 and 30, the various composite waveforms in the N time blocks can be transmitted in various ways. In addition to time consecutive transmission, i.e. a first block, followed (often by a time gap which may optionally be used for handshaking or other control signals) by a second time block and then a third time block, the various blocks of composite waveforms can be transmitted by other schemes.

In some embodiments, for example in network systems where there may be multiple transmitters and potentially also multiple receivers, it may be useful to transmit the data from the various transmitters using more than one encoding method. Here, for example, a first set of N time blocks may transmit data symbols originating from a first N×N symbol matrix from a first transmitter using a first unitary matrix [U$_1$]. A second set of N time blocks may transmit data symbols originating from a second N×N symbol matrix from a second transmitter using a second unitary matrix [U$_2$]. Depending on the embodiment, [U$_1$] and [U$_2$] may be identical or different. Because the signals originating from the first transmitter may encounter different impairments (e.g. different echo reflections, different frequency shifts), some schemes of cyclically time shifted and cyclically frequency shifted waveforms may operate better than others. Thus, these waveforms, as well as the unitary matrices [U$_1$] and [U$_2$], may be selected based on the characteristics of these particular echo reflections, frequency offsets, and other signal impairments of the system and environment of the first transmitter, the second transmitter and/or the receiver.

As an example, a receiver configured to implement equalization in accordance with FIG. 31 may, based upon the equalization parameters 3108 which it derives, elect to propose an alternative set of cyclically time shifted and cyclically frequency shifted waveforms intended to provide superior operation in view of the current environment and conditions experienced by such receiver. In this case the receiver could transmit this proposal (or command) to the corresponding transmitter(s). This type of "handshaking" can be done using any type of signal transmission and encoding scheme desired. Thus in a multiple transmitter and receiver environment, each transmitter may attempt to optimize its signal so that its intended receiver is best able to cope with the impairments unique to communication between the transmitter and receiver over the communications channel there between.

In some cases, before transmitting large amounts of data, or any time as desired, a given transmitter and receiver may choose to more directly test the various echo reflections, frequency shifts, and other impairments of the transmitter and receiver's system and environment. This can be done, by, for example having the transmitter send a test signal where the plurality of data symbols are selected to be test symbols known to the receiver (e.g., the receiver may have stored a record of these particular test symbols). Since in this case the receiver will be aware of exactly what sort of signal it should receive in the absence of any impairment, the equalizer 3102 will generally be able to provide even more accurate time and frequency equalization parameters 3108 for use by the receiver relative to the case in which the receiver lacks such awareness. Thus, in this case the equalization parameters provide even more accurate information relating to the characteristics of the echo reflections, frequency offsets, and other signal impairments of the system and environment of the applicable transmitter(s) and the receiver. This more accurate information may be used by the receiver to suggest or command that the applicable transmitter(s) shift to use of communications schemes (e.g., to U matrices) more suitable to the present situation.

In some embodiments, when the transmitter is a wireless transmitter and the receiver is a wireless receiver, and the frequency offsets are caused by Doppler effects, the more accurate determination of the deconvolution parameters, i.e. the characteristics of the echo reflections and frequency offsets, can be used to determine the location and velocity of at least one object in the environment of the transmitter and receiver.

Examples of OTFS Equalization Techniques

This section includes a description of a number of exemplary OTFS equalization techniques capable of being implemented consistent with the general OTFS equalization approach and apparatus discussed above. However, prior to describing such exemplary techniques, a summary of aspects of transmission and reception of OTFS-modulated signals is given in order to provide an appropriate context for discussion of these OTFS equalization techniques.

Turning now to such a summary of OTFS signal transmission and reception, consider the case in which a microprocessor-controlled transmitter packages a series of different symbols "d" (e.g. d$_1$, d$_2$, d$_3$ . . . ) for transmission by repackaging or distributing the symbols into various elements of various N×N matrices [D]. In one implementation such distribution may, for example, include assigning d$_1$ to the first row and first column of the [D] matrix (e.g. d$_1$=d$_{0,0}$), d$_2$ to the first row, second column of the [D] matrix (e.g. d$_2$=d$_{0,1}$) and so on until all N×N symbols of the [D] matrix are full. Here, if the transmitter runs out of "d" symbols to transmit, the remaining [D] matrix elements can be set to be 0 or other value indicative of a null entry.

The various primary waveforms used as the primary basis for transmitting data, which here will be called "tones" to show that these waveforms have a characteristic sinusoid shape, can be described by an N×N Inverse Discrete Fourier Transform (IDFT) matrix [W], where for each element w in [W], $$w_{j,k} = e^{\frac{i2\pi jk}{N}}$$

or alternatively $w_{j,k}=e^{ij\Theta_k}$ or $w_{j,k}=[e^{i\Theta_k}]^j$. Thus the individual data elements d in [D] are transformed and distributed as a combination of various fundamental tones w by a matrix multiplication operation [W]*[D], producing a tone transformed and distributed form of the data matrix, here described by the N×N matrix [A], where [A]=[W]*[D].

To produce N cyclically time shifted and N cyclically frequency shifted waveforms, the tone transformed and distributed data matrix [A] is then itself further permuted by modular arithmetic or "clock" arithmetic, thereby creating an N×N matrix [B], including each element b of [B], $b_{i,j}=a_{i,(i+j)mod\ N}$. This can alternatively be expressed as [B]=Permute([A])=P(IDFT*[D]). Thus the clock arithmetic controls the pattern of cyclic time and frequency shifts.

The previously described unitary matrix [U] can then be used to operate on [B], producing an N×N transmit matrix [T], where [T]=[U]*[B], thus producing an N$^2$ sized set of all permutations of N cyclically time shifted and N cyclically frequency shifted waveforms determined according to an encoding matrix [U].

Put alternatively, the N×N transmit matrix [T]=[U]*P (IDFT*[D]).

Then, typically on a per column basis, each individual column of N is used to further modulate a frequency carrier wave (e.g. if transmitting in a range of frequencies around 1 GHz, the carrier wave will be set at 1 GHz). In this case each N-element column of the N×N matrix [T] produces N symbol-weighted cyclically time shifted and cyclically frequency shifted waveforms for each data symbol. Effectively then, the transmitter is transmitting the sum of the N symbol-weighted cyclically time shifted and cyclically frequency shifted waveforms from one column of [T] at a time as, for example, a composite waveform over a time block of data. Alternatively, the transmitter could instead use a different frequency carrier wave for the different columns of [T], and thus for example transmit one column of [T] over one frequency carrier wave, and simultaneously transmit a different column of [T] over a different frequency carrier wave, thus transmitting more data at the same time, although of course using more bandwidth to do so. This alternative method of using different frequency carrier waves to transmit more than one column of [T] at the same time will be referred to as frequency blocks, where each frequency carrier wave is considered its own frequency block.

Thus, since the N×N matrix [T] has N columns, the transmitter will transmit the $N^2$ summation-symbol-weighted cyclically time shifted and cyclically frequency shifted waveforms, structured as N composite waveforms, over any combination of N time blocks or frequency blocks, as previously shown in FIGS. 29 and 30.

On the receiver side, the transmit process is essentially reversed. Here, for example, a microprocessor controlled receiver would of course receive the various columns [T] (e.g., receive the N composite waveforms, also known as the N symbol-weighted cyclically time shifted and cyclically frequency shifted waveforms) over various time blocks or frequency blocks as desired for that particular application. In cases in which sufficient bandwidth is available and time is of the essence, the transmitter may transmit the data as multiple frequency blocks over multiple frequency carrier waves. On the other hand, if available bandwidth is more limited, and/or time (latency) is less critical, then the transmit will transmit and the receiver will receive over multiple time blocks instead.

During operation the receiver may effectively tune into the one or more frequency carrier waves, and over the number of time and frequency blocks set for the particular application, eventually receive the data or coefficients from the original N×N transmitted matrix [T] as an N×N receive matrix [R]. In the general case [R] will be similar to [T], but may not be identical due to the existence of various impairments between the transmitter and receiver.

The microprocessor controlled receiver then reverses the transmit process as a series of steps that mimic, in reverse, the original transmission process. The N×N receive matrix [R] is first decoded by inverse decoding matrix $[U^H]$, producing an approximate version of the original permutation matrix [B], here called $[B^R]$, where $[B^R]=([U^H]*[R])$.

The receiver then does an inverse clock operation to back out the data from the cyclically time shifted and cyclically frequency shifted waveforms (or tones) by doing an inverse modular mathematics or inverse clock arithmetic operation on the elements of the N×N $[B^R]$ matrix, producing, for each element $b^R$ of the N×N $[B^R]$ matrix, $a_{i,j}{}^R=b_{i,(j-i) mod N}{}^R$. This produces a de-cyclically time shifted and de-cyclically frequency shifted version of the tone transformed and distributed form of the data matrix [A], which may hereinafter be referred to as $[A^R]$. Put alternatively, $[A^R]$=Inverse Permute $([B^R])$, or $[A^R]=P^{-1}([U^H]*[R])$.

The receiver then further extracts at least an approximation of the original data symbols d from the $[A^R]$ matrix by analyzing the [A] matrix using an N×N Discrete Fourier Transform matrix DFT of the original Inverse Fourier Transform matrix (IDFT).

Here, for each received symbol $d^R$, the $d^R$ are elements of the N×N received data matrix $[D^R]$ where $[D^R]=DFT*A^R$, or alternatively $[D^R]=DFT*P^{-1}([U^H]*[R])$.

Thus the original $N^2$ summation-symbol-weighted cyclically time shifted and cyclically frequency shifted waveforms are subsequently received by a receiver which is controlled by the corresponding decoding matrix $U^H$ (also represented as $[U^H]$) The processor of the receiver uses this decoding matrix $[U^H]$ to reconstruct the various transmitted symbols "d" in the one or more originally transmitted N×N symbol matrices [D] (or at least an approximation of these transmitted symbols).

Turning now to a discussion of various exemplary OTFS equalization techniques, there exist at least several general approaches capable of being used correct for distortions caused by the signal impairment effects of echo reflections and frequency shifts. One approach leverages the fact that the cyclically time shifted and cyclically frequency shifted waveforms or "tones" form a predictable time-frequency pattern. In this scheme a deconvolution device situated at the receiver's front end may be straightforwardly configured to recognize these patterns, as well as the echo-reflected and frequency shifted versions of these patterns, and perform the appropriate deconvolutions by a pattern recognition process. Alternatively the distortions may be mathematically corrected using software routines, executed by the receiver's processor, designed to essentially determine the various echo reflected and frequency shifting effects, and solve for these effects. As a third alternative, once, by either process, the receiver determines the time and frequency equalization parameters of the communication media's particular time and frequency distortions, the receiver may transmit a command to the transmitter to instruct the transmitter to essentially pre-compensate or pre-encode, e.g., by using a pre-equalizer such as the pre-equalizer 410 of FIG. 4, for these effects. That is, if for example the receiver detects an echo, the transmitter can be instructed to transmit in a manner that offsets this echo, and so on.

FIG. 32A illustrates an exemplary system in which echo reflections and frequency shifts (e.g., Doppler shifts caused by motion) of a channel He can blur or be distorted by additive noise 3202. The time and frequency distortions can be modeled as a 2-dimensional filter He acting on the data array. This filter He represents, for example, the presence of multiple echoes with time delays and Doppler shifts. To reduce these distortions, the signal can be pre-equalized, e.g., using the pre-equalizer 3208, before the signal 3200 is transmitted over the channel to the receiver and subsequently post-equalized, using the post-equalizer 3206, after the $D^R$ matrix has been recovered at 3206. This equalization process may be performed by, for example, using digital processing techniques. The equalized form of the received D matrix, which ideally will completely reproduce the original D matrix, may be referred to hereinafter as $D_{eq}$.

FIG. 32B shows an example of an adaptive linear equalizer 3240 that may be used to implement the post-equalizer 3206 in order to correct for such distortions. The adaptive linear equalizer 3240, which may also be used as the equalizer 3102, may operate according to the function:

$$Y(k) = \sum_{L=Lc}^{Rc} C(l) * X(k-l) + \eta(k)$$

Figure 40:
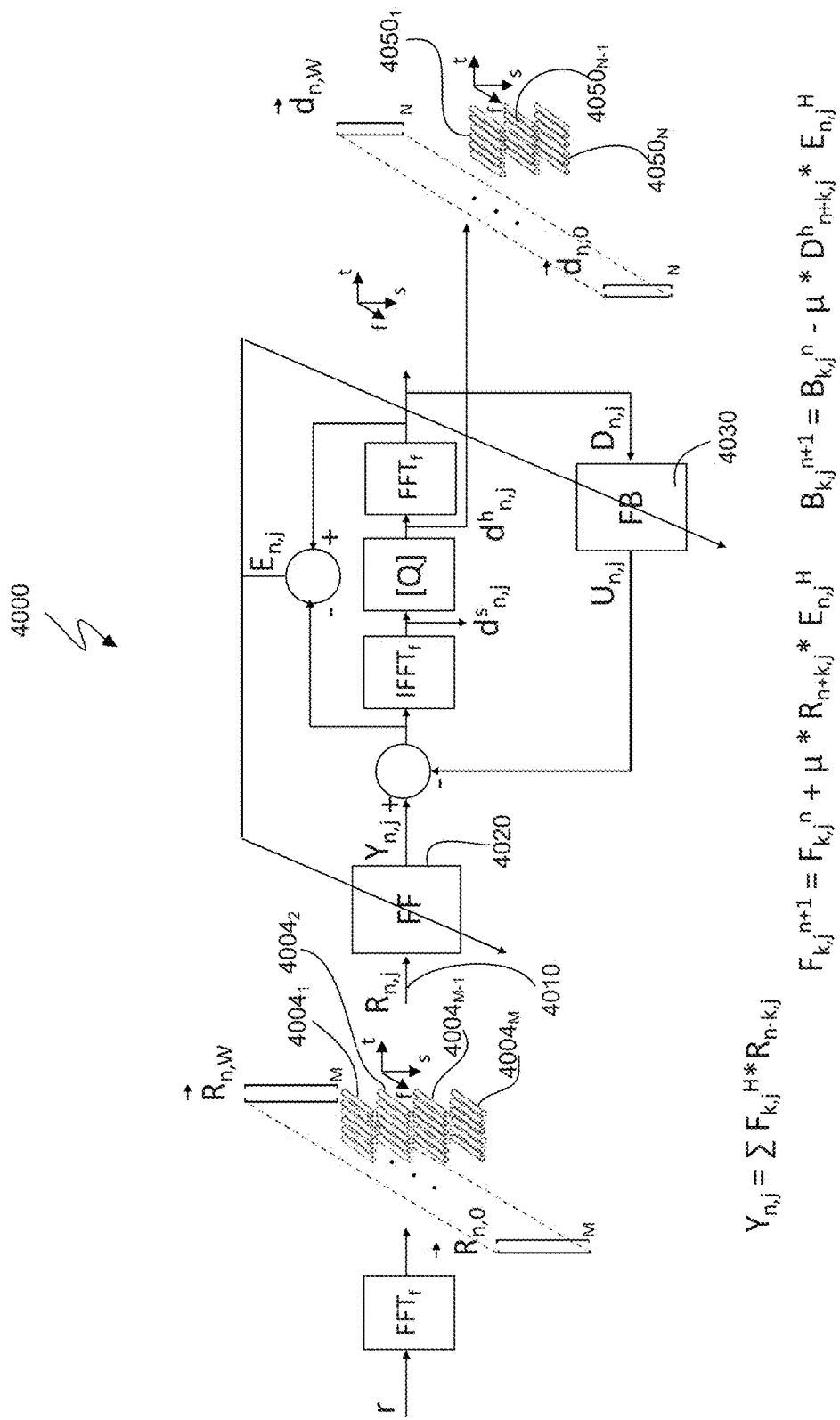
FIG. 40 is a block diagram of a time-frequency-space decision feedback equalizer that may be employed to facilitate signal separation in a multi-antenna OTFS system.

Attention is now directed to FIG. 40, which is a block diagram of a time-frequency-space decision feedback equalizer 4000 that may be employed to facilitate signal separation in a multi-antenna OTFS system. As shown in FIG. 40, received signal information (R) represented by a set of M time-frequency planes 4004 is received at input port 4010 of the equalizer 4000. Each of the M time-frequency planes 4004 represents the information collected from N transmit antenna instances (M>N) by one of M antenna instances associated with an OTFS receiver. The N transmit antenna instances, which may or may not be co-located, will generally be associated with an OTFS transmitter remote from the OTFS receiver associated with the M receive antenna instances. Each of the N transmit antenna instances and M receive antenna instances may, for example, comprise a single physical antenna which is either co-located or not co-located with the other antenna instances. Alternatively, one or more of the N transmit antenna instances and M receive antenna instances may correspond to an antenna instance obtained through polarization techniques.

In the embodiment of FIG. 40, the time-frequency-space decision feedback equalizer 4000 includes a time-frequency-space feedforward FIR filter 4020 and a time-frequency-space feedback FIR filter 4030. The equalizer 4000 produces an equalized data stream at least conceptually arranged in set of N time-frequency planes (M>N) wherein, again, N corresponds to the number of antenna instances transmitting information to the M antenna instances of the OTFS receiver associated with the equalizer 4000.

Figure 41:
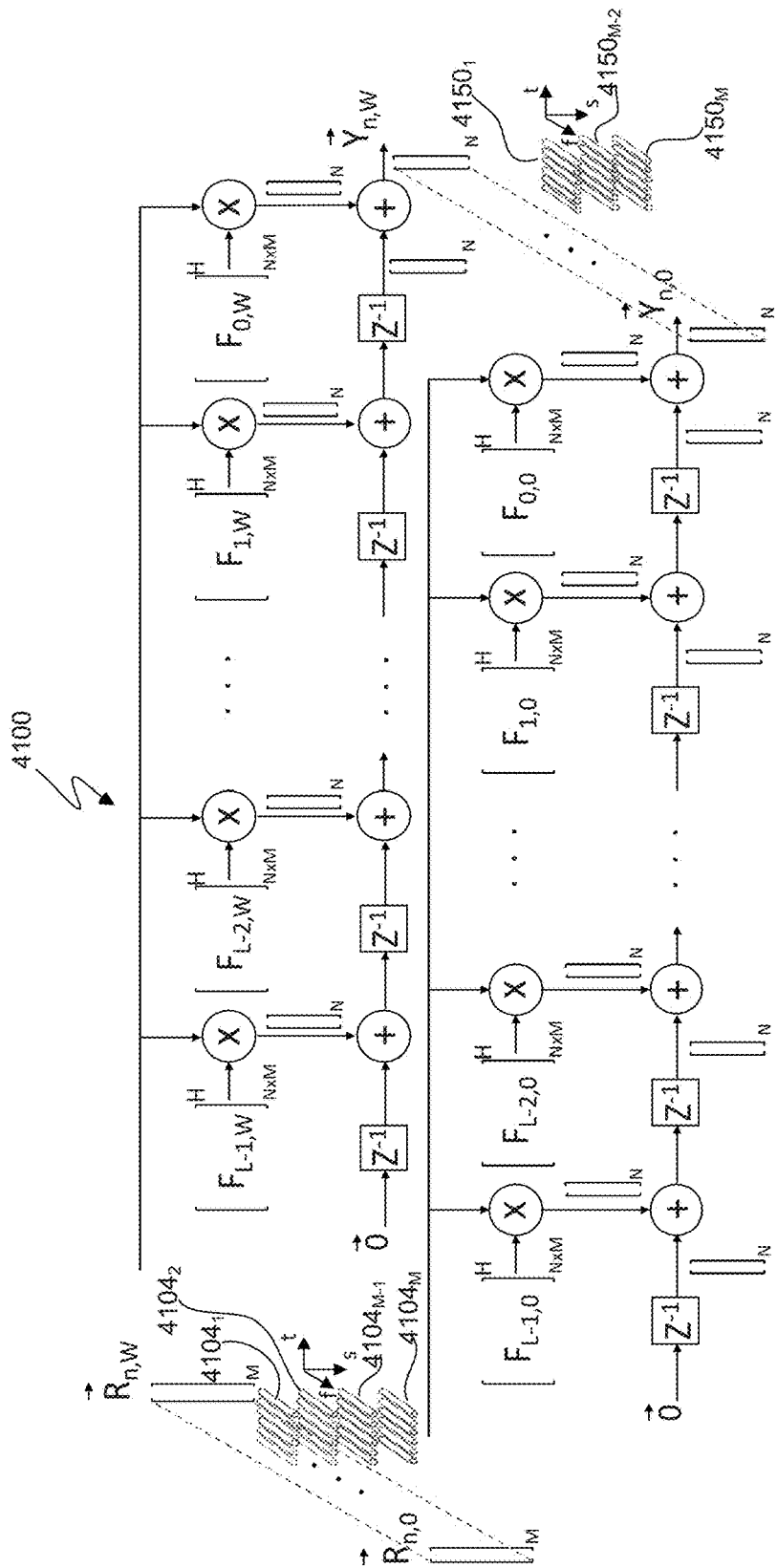
FIG. 41 is a block diagram of a time-frequency-space decision feedforward FIR filter.

Turning now to FIG. 41, a block diagram is provided of a time-frequency-space decision feedforward FIR filter 4100 which may be utilized to implement the time-frequency-space feedforward FIR filter 4020. As shown, the filter 4100 processes received signal information (R) carried on a set of M time-frequency planes 4104 provided by a corresponding set of M receive antennas. The filter 4100 produces a filtered data stream at least conceptually arranged in set of N time-frequency planes 4150 (M>N), where, again, N corresponds to the number of antenna instances transmitting information to the M antenna instances of the OTFS receiver associated with the equalizer 4000.

Figure 42:
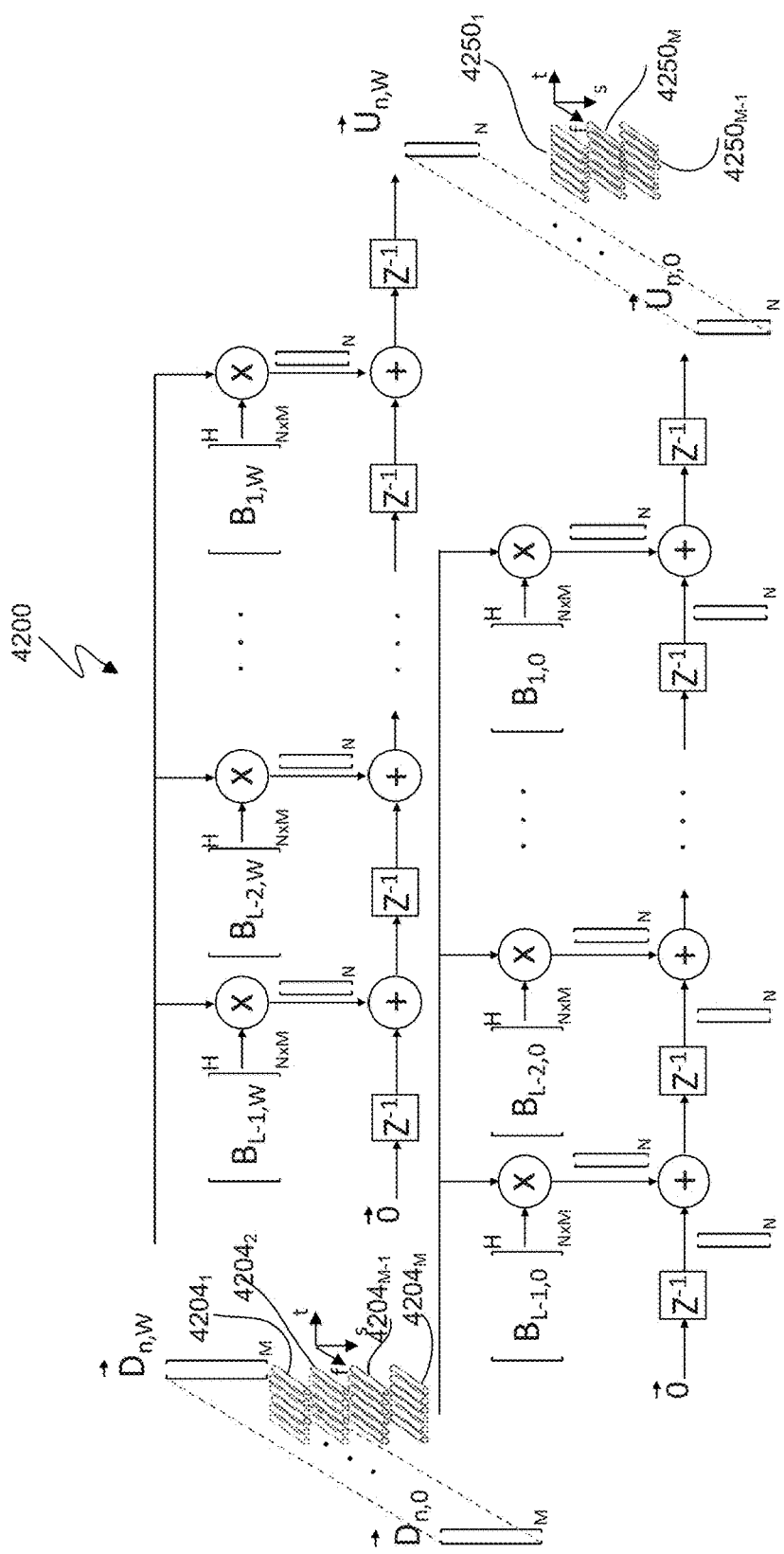
FIG. 42 is a block diagram of a time-frequency-space decision feedback FIR filter.

Referring to FIG. 42, a block diagram is provided of a time-frequency-space decision feedback FIR filter 4200 which may be utilized to implement the time-frequency-space feedback FIR filter 4030. As shown, the filter 4200 processes received signal information (R) carried on a set of M time-frequency planes 4204 which may, for example, correspond to the set of M time-frequency planes provided by a corresponding set of M receive antennas. The filter 4200 produces a filtered data stream at least conceptually arranged in a set of N time-frequency planes 4250 (M>N).

The time-frequency-space decision feedback equalizer 4000 advantageously enables the separation of signals within an OTFS communication system in a manner that substantially maximizes utilization of the available bandwidth. Such signal separation is useful in several contexts within an OTFS communication system. These include separation, at a receiver fed by multiple co-located or non-co-located antennas, of signals transmitted by a set of co-located or non-co-located antennas of a transmitter. In addition, the time-frequency-space decision feedback equalizer 4000 enables the separation, from signal energy received from a remote transmitter, of echoes received by a receive antenna in response to transmissions from a nearby transmit antenna. This echo cancellation may occur even when the transmit and receive signal energy is within the same frequency band, since the two-dimensional channel-modeling techniques described herein enable accurate and stationary representations of the both the echo channel and the channel associated with the remote transmitter. Moreover, as is discussed below the signal separation capability of the disclosed time-frequency-space decision feedback equalizer enables deployment of OTFS transceivers in a mesh configuration in which neighboring OTFS transceivers may engage in full duplex communication in the same frequency band with other such transceivers in a manner transparent to one another.

Again with reference to FIG. 40, operation of an exemplary OTFS system may be characterized as the transmission, from each antenna instance associated with a transmitter, of a time-frequency plane representing a two-dimensional information array being sent. Each such antenna instance, whether co-located or non-co-located, may simultaneously transmit two-dimensional information planes, each independent of the other. The information in each of these information planes may be shifted in time and frequency using the same basis functions. During transmission from each of N transmit antenna instances to each of M receive antenna instances, the information within each transmitted plane is differently affected by the different two-dimensional channels linking one of the N transmit antenna instances to each of the M receive antenna instances.

At each of the M antenna instances associated with an OTFS receiver, each entry within the two-dimensional array of received signal energy being collected will typically include a contribution from each of the N transmit antenna instances involved in transmitting such signal energy. That is, each of the M receive antenna instances collects a mixture of the two-dimensional, time-frequency planes of information separately sent by each of the N transmit antenna instances. Thus, the problem to be solved by the equalizer 4000 may be somewhat simplistically characterized as inversion of the N×M "coupling matrix" representative of the various communication channels between the N OTFS transmit antenna instances and the M OTFS receive antenna instances.

In one embodiment each of the N transmit antenna instances sends a pilot signal which may be differentiated from the pilot signals transmitted by the other N−1 antenna instances by its position in the time-frequency plane. These pilot signals enable the OTFS receiver to separately measure each channel and the coupling between each antenna instance. Using this information the receiver essentially initializes the filters present within the equalizer 4000 such that convergence can be achieved more rapidly. In one embodiment an adaptive process is utilized to refine the inverted channel or filter used in separating the received signal energy into different time-frequency-space planes. Thus, the coupling channel between each transmit and receive antenna instance may be measured, the representation of the measured channel inverted, and that inverted channel representation used to separate the received signal energy into separate and distinct time-frequency planes of information.

OTFS Wireless Internet of Things System

System Overview and Device Architectures

Figure 48:
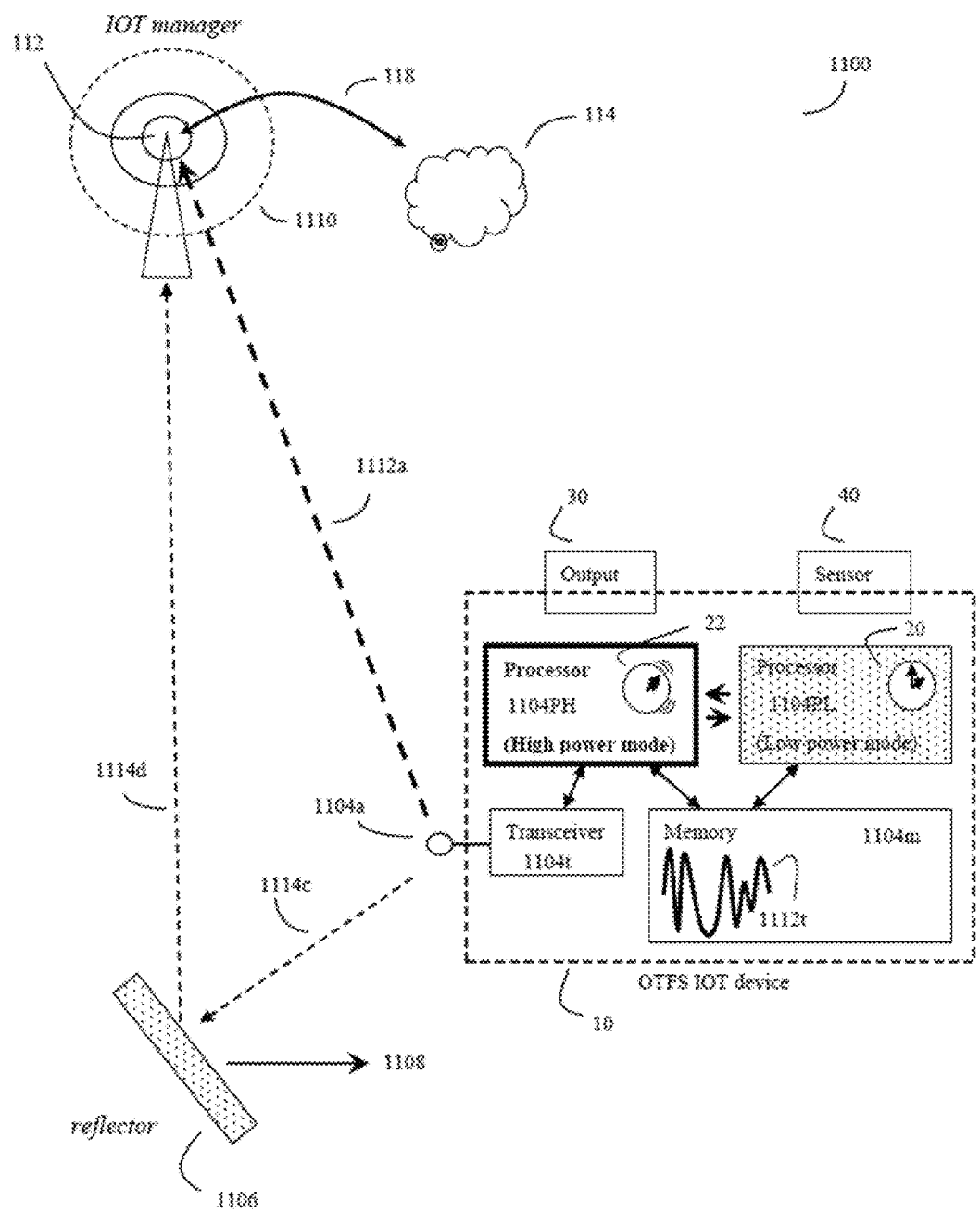
FIG. 48 depicts an exemplary communication system including an OTFS IOT device in wireless communication with an IOT manager device over an impaired wireless data channel.

Attention is now directed to FIG. 48, which depicts an exemplary communication system 1100 including an OTFS Internet of Things ("IOT") device 10 in wireless communication with an IOT manager device 112 over an impaired wireless data channel. In FIG. 48 the impairment is represented by a wireless reflector 1106, which may be stationary or moving at a velocity in a direction 1108. As was discussed above, the two-dimensional ("2D") channel state of this wireless data channel in the OTFS modulation domain, i.e., the delay-Doppler domain, may be characterized using OTFS pilot bursts. Data may be transmitted between the OTFS IOT device 10 and IOT manager device 112 using OTFS waveforms in the manner described previously. The IOT manager device 112 maintains a connection 118 to a larger computer network 114 such as, for example, the Internet.

The IOT device 10 typically includes at least one processor configured to operate in a plurality of different power modes. When operating in a high power mode the processor is identified by reference numeral 1104PH. In this high power mode the processor 1104PH will generally have more circuits activated and/or will be operating at a higher clock speed (frequency), so as to have a higher processing speed at the cost of more power consumption. When operating in a low power mode the processor is identified by reference numeral 1104PL. In the low power mode the processor 1104PL will typically have fewer circuits activated, and/or be operating at a lower clock speed (frequency), so as to have a lower processing speed at the benefit of lower power consumption. To be clear, the indications of the processor 1104PH and the processor 1104PL in FIG. 48 and elsewhere are not intended to represent different processors. Rather, the annotations 1104PH and 1104PL are intended to represent the same processor (or plurality of processors) operating in, or transitioning between, low power and high power modes.

In some embodiments, at least one processor used in the OTFS IOT device 10 can be a general purpose processor, such as an ARM processor. This IOT device processor(s) can either be a stand-alone processor, configured as a microcontroller, or alternatively serve embedded in a larger integrated circuit as one or more processor cores, along with other circuit elements such as wireless transceivers, memory, sensors, and the like. In some embodiments it may be useful to supplement more basic processor functionality with additional data and signal processing capability such as various Digital Signal Processor (DSP) circuitry, Field Programmable Gate Array (FPGA) circuitry, various customized instruction sets, and the like.

Although for clarity of presentation only a low power mode and a high power mode are represented in FIGS. 48-58, there exist processors suitable for use within the OTFS IOT device 10 capable of operating in more than two power modes. Other power modes can include an "off" power mode, where the processor may have close to zero power consumption and close to zero computing capability (e.g. may wake up only upon receiving an external signal), as well as a "very low" power mode where the processor may have only clock (e.g. timer) circuits and outside signal monitoring circuits operating (e.g. the processor may by timer activation or external signals wake itself up from a deep sleep state, but otherwise have minimal computational capability in "very low" power mode).

There also can be additional processor state gradations between low power mode (where the processor is capable of performing calculations, but at a lower rate), and very high power mode (where the processor is running close to its highest speed and highest power consumption).

The IOT device 10 will typically also comprise processor addressable memory (memory) (see FIG. 48, 1104*m*), such as RAM, FLASH, ROM, and the like, and may also include other memory types as well. The IOT device 10 may also comprise at least one timer device (which may be built into the processor), and at least one clock controlled by this at least one timer device. This clock may be a processor implemented software clock that relies on a built-in processor timer, such as is shown in FIG. 48 (20 and 22). Alternatively at least portions of the timer and clock may be external to the at least one processor. Note that although the frequency at which the processor operates is often referred to as a clock cycle, unless otherwise stated clocks may be referred to as a timekeeping mechanism, function, or means. Thus, for example, a software controlled clock in the time keeping sense may be provided by a processor operating at various certain clock cycle rates or times (frequency), and so long as the software is aware and compensates for variations in the underlying clock cycle rate or time, a software controlled clock can keep accurate time regardless.

The IOT device 10 will also comprise at least one wireless transceiver 1104*t* capable of transmitting and receiving OTFS communication signals. The transceiver 1104*t* may be housed external to the processor 1104PH/PL or, alternatively, may be internal to the same chip or chips used for the processor 1104PH/PL, or some combination thereof (e.g. software controlled radio). The transceiver 1104*t* should at least be capable of operating when the least one processor is configured as the processor 1104PH, i.e., in a higher power mode. Portions of the transceiver 1104*t* may optionally also be capable of operating when the at least one processor is configured as the processor 1104PL, i.e., in a lower power mode, but this is not required. In order to simplify explanation, in the examples discussed below it is assumed that at least some portions of the transceiver 1104*t* (e.g. at least the transmitter) will be in a power down state (e.g., not operating) when the at least one processor is configured as the processor 1104PL, but that when configured as the processor 1104PH. The IOT device 10 will also generally include one or more antennas or antenna connections 1104*a*, and may also optionally include one or more output devices 30 and sensors 40 as well.

The IOT device 10 will also typically comprise either a battery or other means of obtaining energy (e.g. solar cell, other energy harvesting device, connection to AC electrical power source, and the like). Here, it will generally be assumed that the IOT device 10 only has access to a limited energy source so that in general, it is desirable to limit the energy needs of the IOT device 10 by having the IOT device 10 spend most of the time with its at least one processor 1104PL running in a low power mode. Other IOT device circuits, such as the transceiver 1104*t* may also be configured to spend most of their time running in a low power mode as well. Thus often the IOT device 10 may spend most of its life in a low power state, perhaps running a few computational tasks (such as OTFS waveform encoding/decoding, sensor monitoring, etc.) in the background, but otherwise saving energy. However occasionally, as will be discussed, the IOT device 10 will transition to a higher power state where it's processor is more computationally active, and where the IOT device 10 may be communicating using its transceiver 1104*t*, and generally expending energy at a substantially higher rate.

In a typical mode of operation, the IOT device 10 will be configured (e.g. often by one or more programs residing in memory 1104*m* so it can use it's at least one clock 20 to configure (e.g. "wake up") the at least one processor 1104PL from a low power mode, and cause this at least one processor to transition into a higher power mode processor 1104PH. In FIG. 48, this "wake up" process is illustratively represented by depicting the IOT device clock 22 (in the time keeping sense vibrating like, for example, an alarm clock.

When the at least one processor is configured as a high power processor 1104PH operative in a high power mode, the processor 1104PH can also direct the IOT device 10 to use its transceiver 1104*t* to wirelessly transmit at least one direct OTFS pilot burst(s) 1112*a* and at least one OTFS data symbol waveform bursts 112*a*, over the impaired data channel (e.g. over 1100 space with various reflectors 1106 to the at least one IOT manager device 112. The IOT manager device 112 in turn is often connected to or capable of exchanging data with a larger computer network such as the Internet 114 over a connection 118. This connection 118 need not be a wireless connection, but instead can be any medium capable of transmitting and receiving data such as cable, optical fiber, wireless signals, and the like).

In the embodiment of FIG. 48, IOT device 10 may have precomputed, or otherwise been provided with, the various OTFS waveforms 1112t that it may subsequently send to the IOT manager 112. The IOT device 10 will generally have stored a digital representation of these various waveforms in memory 1104m prior to transmission. For example, these precomputed waveforms may have been slowly generated while the processor 1104PL was in a lower power state, and then may be transmitted using transceiver 1104t when the processor 1104PH is then in a higher power state.

Unless otherwise specified, assume that the IOT device antenna 1104a is an omnidirectional antenna, and that IOT manager device 112 is also using an omnidirectional antenna. Thus in addition to the direct OTFS pilot bursts and OTFS data symbol waveform bursts 1112a that travel from the IOT device 10 to the IOT manager device 112, other wireless waveforms travel 1114c to the reflector 1106. Wireless waveforms then travel 1114d from the reflector 1106 to the IOT manager device 112.

Figure 49:
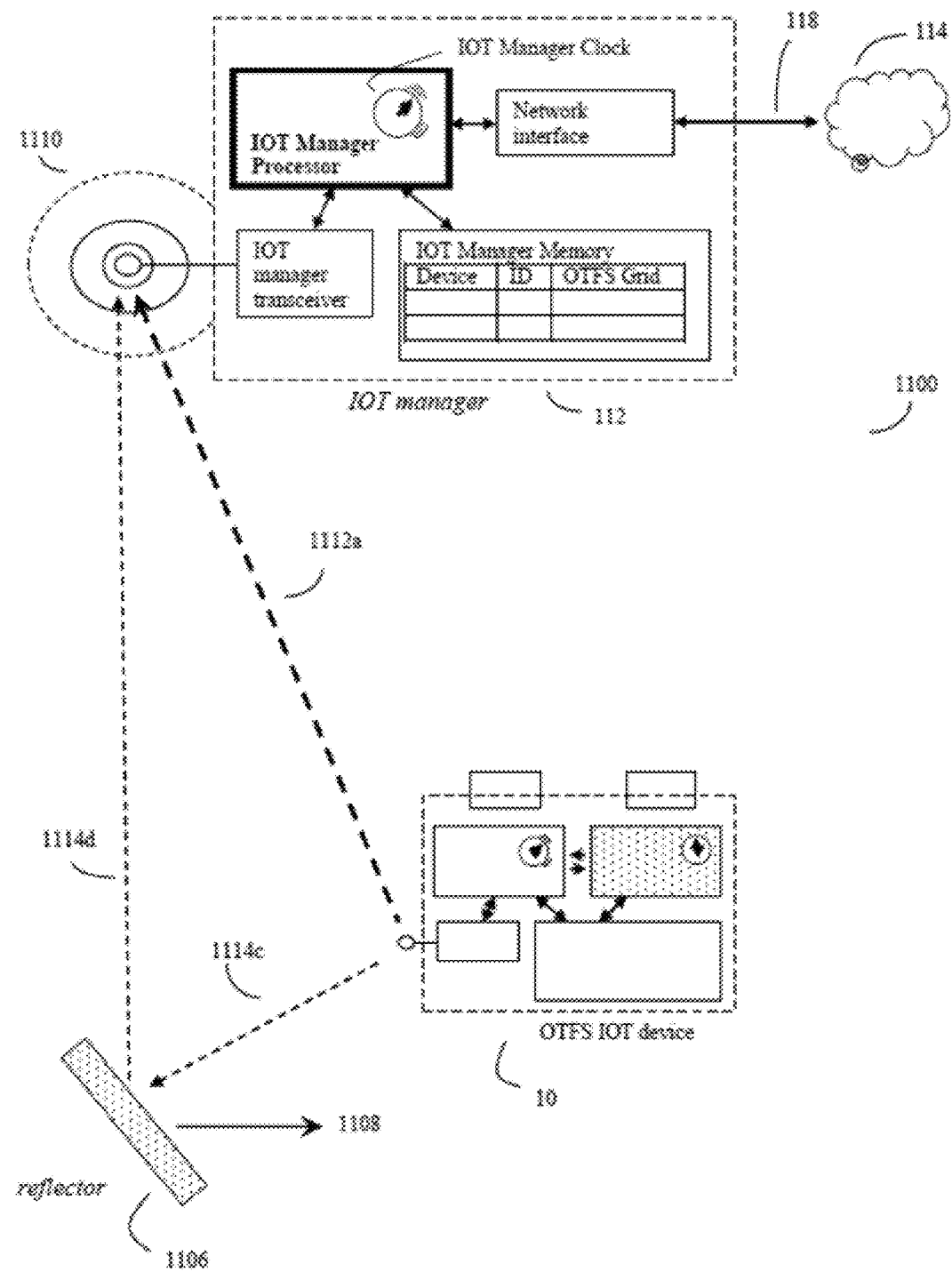
FIG. 49 illustrates details of an internal structure of an exemplary IOT manager device.

FIG. 49 provides further details of an internal structure of the IOT manager device 112 to which reference will be made hereinafter.

Figure 50:
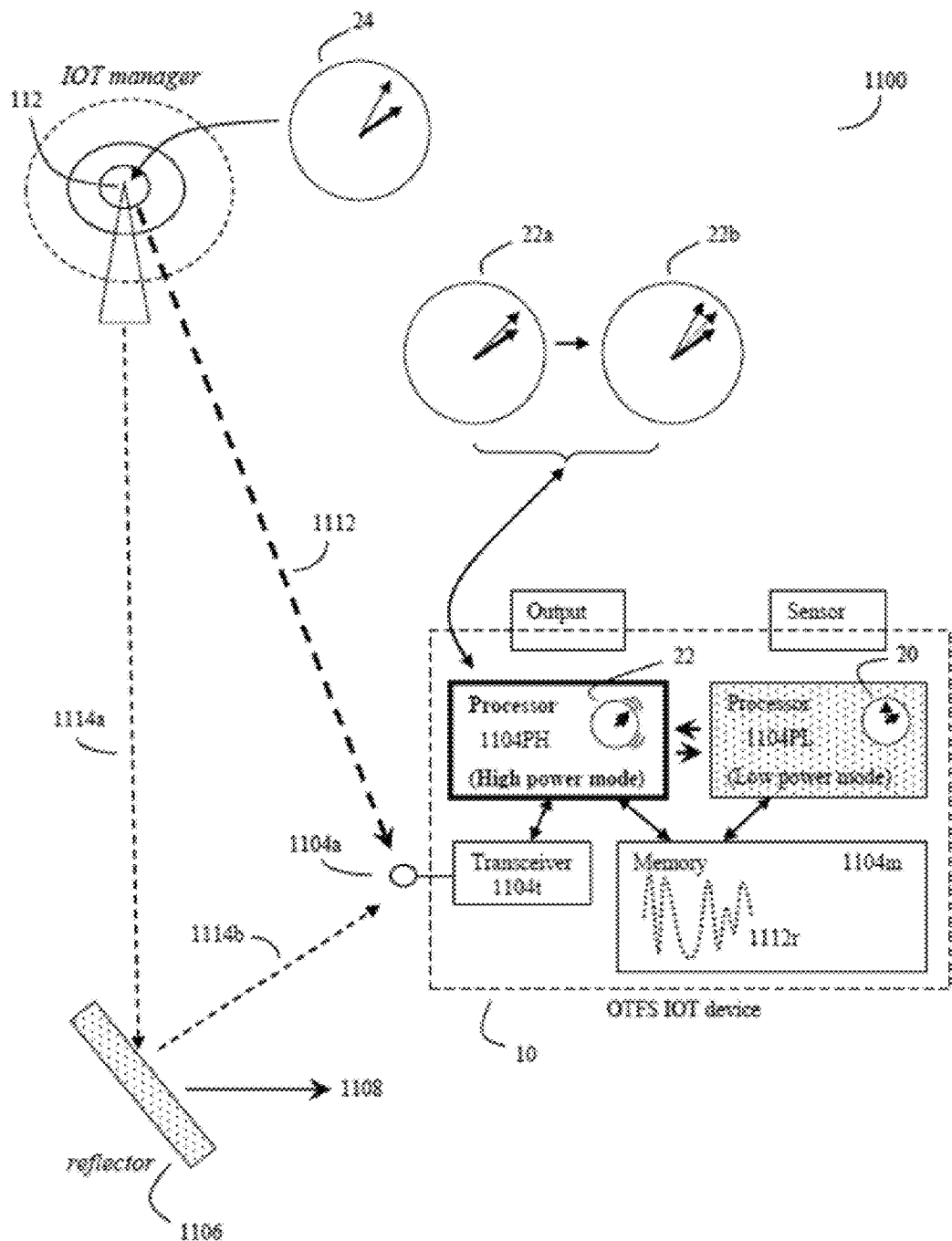
FIG. 50 illustrates one way in which an IOT device can obtain timed wireless signals from an IOT manager device and use such timed signals as time synchronization signals in adjusting a clock of the IOT device.

Turning now to FIG. 50, there is illustrated one way in which the IOT device 10 (typically operating in high power mode) can obtain timed wireless signals from the IOT manager device 112 and use these timed signals as time synchronization signals in adjusting timing of the clock of the IOT device 10. The IOT device clock can then continue operating even when the IOT device 10 is in low power mode. When the IOT manager 112 is transmitting wireless signals (as is shown in FIG. 50), the wireless waveforms may travel through paths (1112, 1114a, 1114b).

These multiple path effects are particularly damaging for IOT devices, which, to save energy, are typically transmitted using relatively weak (low energy) wireless waveforms. As discussed extensively both herein and in the related disclosures, however, OTFS methods are designed to cope with such multiple path effects, and thus in effect allow for higher performance IOT devices to be produced.

During operation, the IOT device 10 may transmit OTFS pilot bursts. These OTFS pilot bursts typically comprise a plurality of OTFS pilot symbols Ppt,pf transmitted as OTFS pilot symbol waveform bursts Ppt,pf·Wp(pt, pf), over a plurality of combinations of times pt and frequencies pf. Each pt and pf are unique pilot time-frequency coordinates chosen from a two dimensional pilot OTFS time-frequency grid. These OTFS pilot symbol waveform bursts Ppt,pf·Wp (pt, pf) are typically mutually orthogonal waveform bursts derived from cyclically time and frequency shifted versions of a same OTFS pilot basis waveform Wp.

The IOT manager 112 includes a transceiver (FIG. 49) configured to receive at least these pilot bursts according to at least a two dimensional pilot OTFS time-frequency bin structure with bin sizes and bin-coordinate positions proportional to the OTFS time-frequency grid. Thus, upon propagation through the impaired data channel 1100, the OTFS pilot bursts (and OTFS data bursts) then travel over at least one path (e.g. 1112a, 1114c, 1114d). This at least one path generally comprises at least one of:

Direct OTFS pilot (or data) bursts traveling directly 1112a from the at least one transmitter to said at least one receiver; and Replica OTFS pilot bursts 1114c, 1114d in the form of direct OTFS pilot bursts that have reflected off of the at least one reflector 1106 before reaching the at least one receiver. The impaired data channel thus produces direct OTFS waveform bursts that are further reflector time-delayed and reflector frequency-shifted at the at least one receiver.

When the direct 1112a and replica 1114d waveform bursts reach the at least one receiver of the IOT manager 112, a resulting combination of these transmitter frequency shifted and receiver frequency shifted direct OTFS pilot bursts and any replica OTFS pilot bursts produces channel-convoluted OTFS pilot bursts (and channel-convoluted OTFS data bursts as well). The receiver of the IOT manager 112 can use this bin structure to receive these channel-convoluted OTFS pilot bursts and use at least one IOT manager processor to determine the 2D channel state of the impaired data channel 1100 between the IOT device 10 and the IOT manager 112. This 2D channel state information in turn can be used to correct for various channel imperfections (such as reflector 1106). Importantly, this 2D channel state information can allow the IOT manager device 112 to detect very faint IOT wireless signals at a significantly greater distance than might be possible using prior art methods. In some embodiments, it is contemplated that the IOT device 10 may also transmit data using a plurality of different types of wireless methodologies other than OTFS including, for example, WiFi, Bluetooth, ZigBee, Z-Wave, and other methods.

FIG. 50 shows how the IOT device 10, typically operating in high power mode 1104PH, can in some embodiments use various wireless signals sent at known timing. In example of FIG. 50, OTFS pilot bursts, or OTFS data symbol waveform bursts, are being used to obtain wireless time synchronization signals 1112, 1114a, 1114b from the IOT manager device 112. The IOT device processor uses these signals to help adjust 22a, 22b the timing of the IOT device's clock 20, 22. The IOT device clock 20 (here clock is again used in the timekeeping sense of the word) can then continue operating even when the IOT device 10 is in low power mode 1104PL.

More specifically, in FIG. 50, the received time synchronization signals, which may have been sent either as OTFS wireless waveforms, or other type of wireless waveforms, can be received by transceiver 1104t, processed by processor 1104PH (for example while operating in a high power mode) and either processed immediately, or alternatively or additionally the wireless waveforms may also be stored 1112r in memory 1104m for later processing. Stated differently, in some embodiments the IOT device 10 can further use it's clock 20 essentially as an alarm clock to "wake up" (configure) the at least one processor 1104PL from a lower power mode into a higher power mode. This processor 1104PH, now operating in a higher power and presumably more capable mode, can in turn direct the at least one wireless transceiver 1104t to perform various tasks. In one mode of operation, the IOT device 10 can check the accuracy of its clock 20, 22 by obtaining at least one wireless time synchronization signal (FIG. 50, 1112, 1114a, 1114b) from the at least one IOT manager device 112 which will presumably have its own more accurate clock 24. The IOT device 10 can then use this at least one wireless time synchronization signal (1112, 1114a, 1114b) to adjust the timing (see FIG. 50, 22a to 22b) of the IOT device's at least one clock (20, 22).

As previously discussed, it is desirable to determine the 2D channel state of an impaired communication channel 1100, and use information obtained from this 2D channel state to help correct for the various distortions that the communications channel imposes on wireless waveforms traversing the data channel. Such distortions include various time delayed echoes of the waveform, as well as various distortions caused by Doppler effects. The 2D channel state can be obtained using either the IOT manager device 112, or by the IOT device 10 itself, by methods discussed hereinafter.

Because the process of obtaining 2D channel state information can be computationally intensive, however, in some embodiments, it may be useful to push the burden of obtaining the 2D channel state information used by the IOT device 10 onto the IOT manager device 112. This is desirable because the IOT manager device 112 may often have access to more power, more powerful processors, as well as possibly more sophisticated transceivers, better antennas, and possibly more extensive a-priori information about the distribution of channel impairments (such as reflector 1106 in the vicinity of IOT device 10.

Once the IOT manager device 112 obtains this 2D channel state information, it can in turn communicate this 2D channel state information, as well as possibly also suggestions or commands as to how to decode and precode wireless communications to overcome these 2D channel impairments, to the IOT device 10. This allows the IOT device 10 to have most or all of the advantages of OTFS 2D channel state compensation methods, but at the same time reduces the demands on the possibly limited processor capability of IOT device 10. Importantly, this may not be generally possible when using wireless communication technologies other than OTFS. The stationary nature of the OTFS channel model enables 2D channel state information to remain relevant and useful to the IOT device 10 even in the case in which it is determined slightly earlier in time by the IOT manager 112 and then communicated to the IOT device 10. The rapid time variation of conventional one-dimensional, non-stationary channel models generally preclude this approach.

Figure 51:
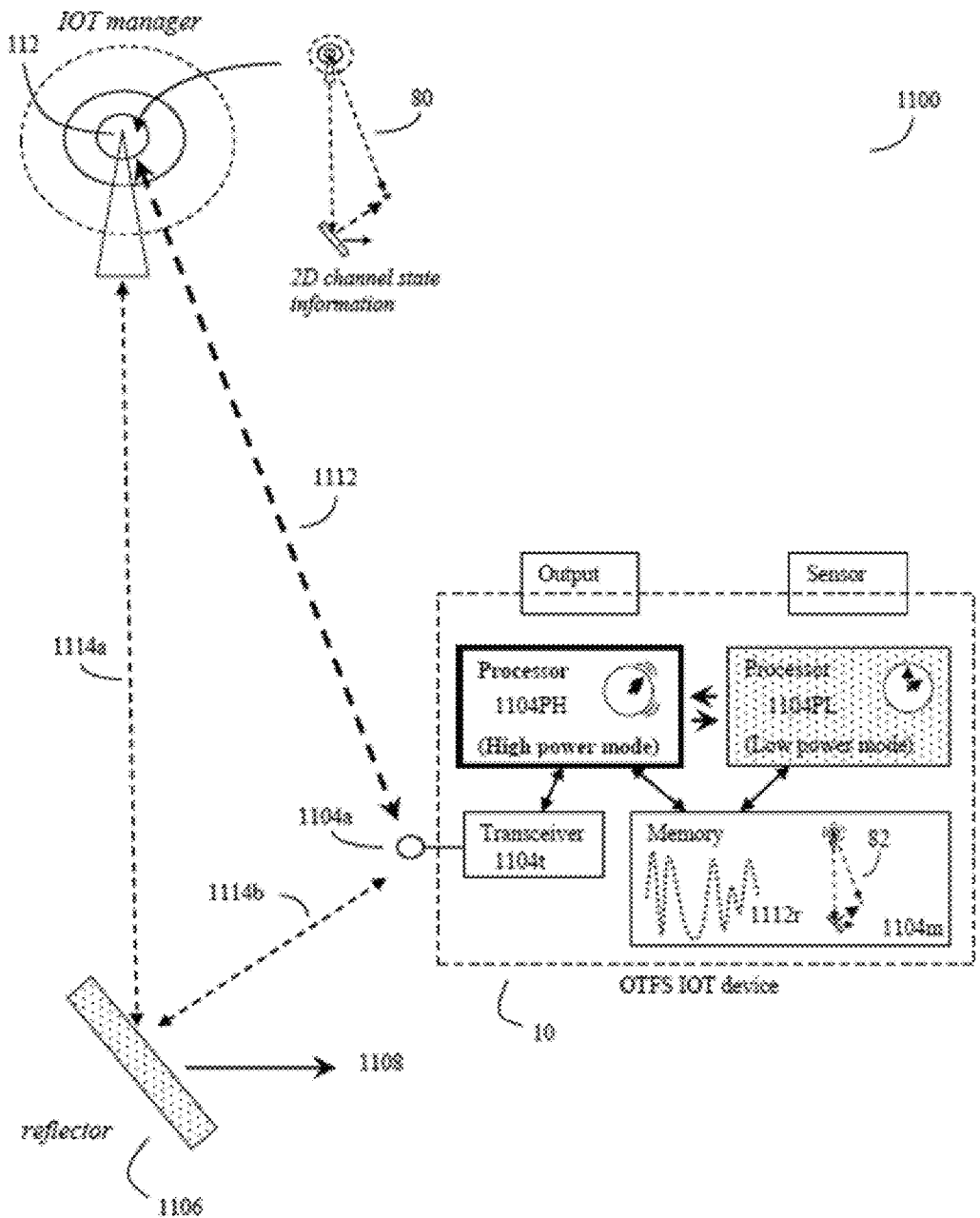
FIG. 51 illustrates one manner in which an IOT manager can receive OTFS pilot bursts from an IOT device and use these IOT pilot bursts to determine a 2D channel state.

FIG. 51 illustrates one manner in which the TOT manager 112 can receive OTFS pilot bursts from the IOT device 10 and use these IOT pilot bursts to determine the 2D channel state of the impaired wireless data channel. In addition to using this 2D channel state information to help distinguish the often faint IOT device signals from background, in some embodiments the IOT manager 112 also transmits at least some portion of this 2D channel state information to the IOT device 10. The IOT device 10 can then use this information to, for example, help precode its subsequent OTFS transmissions to compensate for the various data channel impairments. As shown in FIG. 51, the IOT manager device 112 can receive OTFS pilot bursts (1112, 1114b, 1114a) from the IOT device 10. The IOT manager device 112 then uses these IOT pilot bursts to determine a 2D channel state 80 of the impaired wireless data channel 1100 connecting the IOT manager device 112 and the IOT device 10. The IOT manager 112 can then transmit information obtained from this 2D channel state information to the IOT device 10. The IOT device 10 receives this using transceiver 1104t and use its processor 1104PH to in turn store this received 2D channel state information 82 in IOT device memory 1104m. The IOT device 10 can then use this information to, for example, help precode its subsequent OTFS transmissions to compensate for the various channel impairments (here again exemplified by the wireless reflector 1106. This precoding may, for example, compensate for the location and velocity of reflector 1106 by sending waveforms that in effect cancel out the contribution of reflected signals 1114b and 1114a at the IOT manager 112, thus letting IOT manager 112 better distinguish possibly faint IOT device 10 wireless waveform bursts from background wireless signals, as well as and wireless signals from other IOT devices.

In other embodiments, the IOT device 10 may determine the 2D channel state of the communications channel 1100 using its own processor(s) 1104PH. In this embodiment, also depicted in FIG. 51, the IOT device 10 will first typically receive at least one direct OTFS pilot burst 1112 from the IOT manager device 112 (along with reflected versions of this direct pilot bursts, such as 1114a, 1114b). Here the distinction is that when the IOT device 10 is determining the 2D channel state, the direct OTFS pilot bursts 1112 that the IOT device 10 is analyzing may not have initially had any channel state information previously encoded into them by the IOT manager device 112. Instead the channel state information is inherent within these OTFS pilot bursts received from the IOT manager device 112.

Once the IOT device 10 determines the 2D channel state information 82, the at least one IOT device 10 can then use this 2D channel state information 82 and its at least one processor (operating in either low power or higher power mode) to precode at least some its subsequent OTFS wireless transmissions to better compensate for the impaired data channel. For example the IOT device 10 can precode its various direct OTFS pilot bursts and OTFS data symbol waveform bursts that it then transmits to pre-correct for channel effects. By the time the various precoded OTFS waveforms reach the IOT manager device 112, the distorting effects of the data channel will largely be removed. In an exemplary embodiment both the OTFS pilot bursts and OTFS data symbol waveform bursts will be distributed within an OTFS time-frequency grid, or "OTFS data frame", as shown in, for example, FIGS. 52, 54, 55 and 59.

Figure 52:
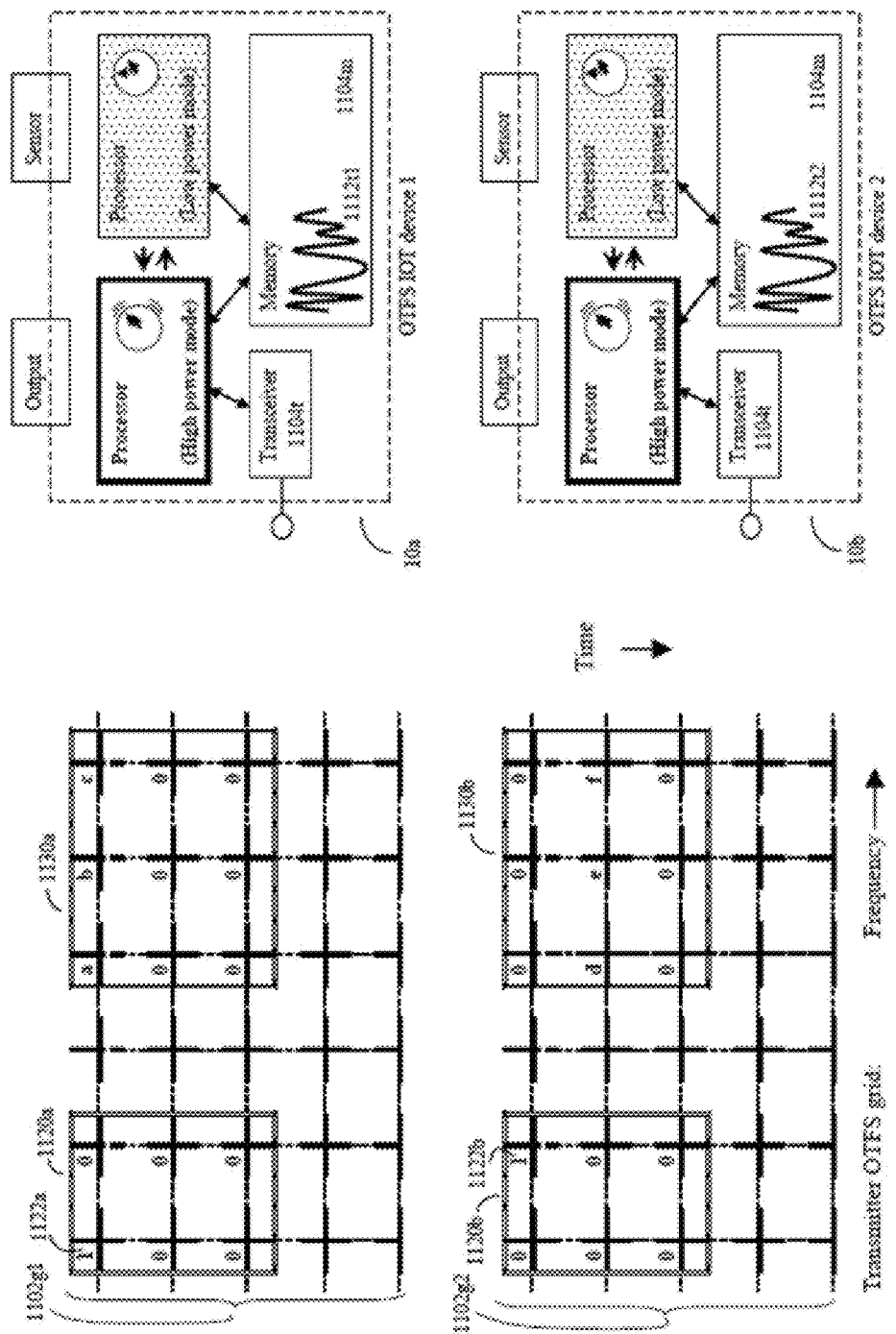
FIG. 52 depicts how two different representative IOT devices can be configured to place time-frequency coordinates of their OTFS pilot bursts and OTFS data symbol waveform bursts at different coordinates in a larger OTFS data frame.

FIG. 52 shows how two different representative IOT devices can be configured (often by commands from an IOT manager device) to place the time-frequency coordinates of their OTFS pilot bursts and OTFS data symbol waveform bursts at different coordinates in a larger OTFS data frame. The two IOT devices, assuming that they have synchronized clocks, can then transmit their respective parts of this larger OTFS data frame at the same time. As shown, the time-frequency coordinates of the various OTFS pilot bursts (see regions 1120a, 1120b) and OTFS data symbol waveform bursts (see regions 1130a, 1130b) are placed at different coordinates in a larger OTFS data frame such as 1102g1 and 1102g2. In this example, IOT device 10a may be configured to transmit its OTFS pilot burst and/or OTFS data symbol waveform bursts 1112t1 (which may have been precomputed and stored in memory 1104m, as for example OTFS pilot burst 1122a in pilot burst region 1120a, as well as OTFS data symbol bursts a, b, and c in OTFS data symbol burst region 1130a. Similarly IOT device 10b may be configured to transmit its OTFS pilot burst and/or OTFS data symbol waveform bursts 1112t2 (which also may have been precomputed and stored in memory 1104m of IOT device 10b, as for example OTFS pilot burst 1122b in pilot burst region 1120b, as well as OTFS data symbol bursts d, e, and fin OTFS data symbol burst region 1130b.

In one embodiment the IOT devices 10a, 10b are time synchronized in the manner described with reference to FIG. 50). This enables each device 10a, 10b to time the transmission of their respective OTFS pilot bursts in their respective transmitted OTFS data frames (1102g1, 1102g2) to occur nearly, but not exactly, simultaneously. In this scheme the distribution of the various direct OTFS pilot bursts (1122a, 1122b) and OTFS data symbol waveform bursts (e.g. 1130a: a, b, c, 1130b: d, e, f) differ between at least some of the various one IOT devices. That is, there is no overlap among at least the non-null OTFS waveform bursts. Thus, from the perspective of the IOT manager device 112, the pilot bursts from the devices 10*a*, 10*b* may be received and decoded as one composite OTFS data frame (1102*g*1+ 1102*g*2).

In order to ensure that there is no overlap among the OTFS waveforms from different IOT devices 10, in some embodiments the IOT devices 10 may receive information assigning and updating these unique locations from the IOT manager device 112. The overall scheme may be similar to that shown in FIG. 50, with the exception that instead of sending wireless waveforms suitable for clock synchronization, the IOT manager device 112 instead transmits OTFS or other wireless waveforms suitable for assigning various IOT devices to grid time-frequency locations for the OTFS pilot bursts and OTFS data symbol waveform bursts. As shown in FIG. 49, the IOT data manager device 112 will normally have software and memory locations or other type of database reserved for managing this process (IOT Manager Memory).

In some embodiments, the various unique locations (such as the 1122*a* "1", the 1122*b* "I", the 1130*a* "a", "b", "c", and the 1130*b* "d", "e", "f" within the larger OTFS data frames can be separated by at least some unique null locations (here represented by the "0"). Since the various channel impairments tend, due to time delays and frequency shifts, to "push" the transmitted symbols into these null locations, the IOT manager device 112 or IOT device 10 receiving the transmitted symbols may then properly determine that OTFS symbols displaced onto these null regions are done so by the channel impairments. This may simplify the process of determining the 2D channel state of the impaired data channel.

As noted above, due to various power constraints, as well as size and cost constraints, the IOT devices 10 may have rather minimal capability processors and for that matter, rather limited capability transceivers as well. To some extent, the costs, and power utilization of the IOT devices 10 can be optimized by adopting techniques to, for example, precompute the various OTFS waveforms and store them in memory (e.g. 1104*m*) prior to transmission. If this is done, the transmitter portion of the IOT device transceiver 1104*t* can consist of as little as a D/A (digital to analog) converter and RF circuitry needed to playback these stored OTFS waveforms as transmitted OTFS waveforms. As a consequence, a slow and relatively primitive IOT processor, running in low power mode, might slowly assemble the OTFS waveforms and store them in memory over a period of hours if needed. Of course faster processors running at high power mode, over much shorter period of times, may also be used.

For that matter, the processor costs and power utilization needed to receive and interpret various OTFS waveforms can also be reduced by, for example, using a receiver portion of the IOT device transceiver that may be little more than RF circuitry and an A/D (analog to digital) converter. This receiver portion may simply digitize the received OTFS waveforms and store them in memory (e. g. 1104*m*) for later processing by the IOT device processor. Here the IOT device processor 1104PL may be also be running relatively slowly and may be using a relatively simple processor instruction set to do this process over a period of time such as hours. Again faster or more capable processors running at high power mode, over much shorter periods of time, may also be used.

Figure 53:
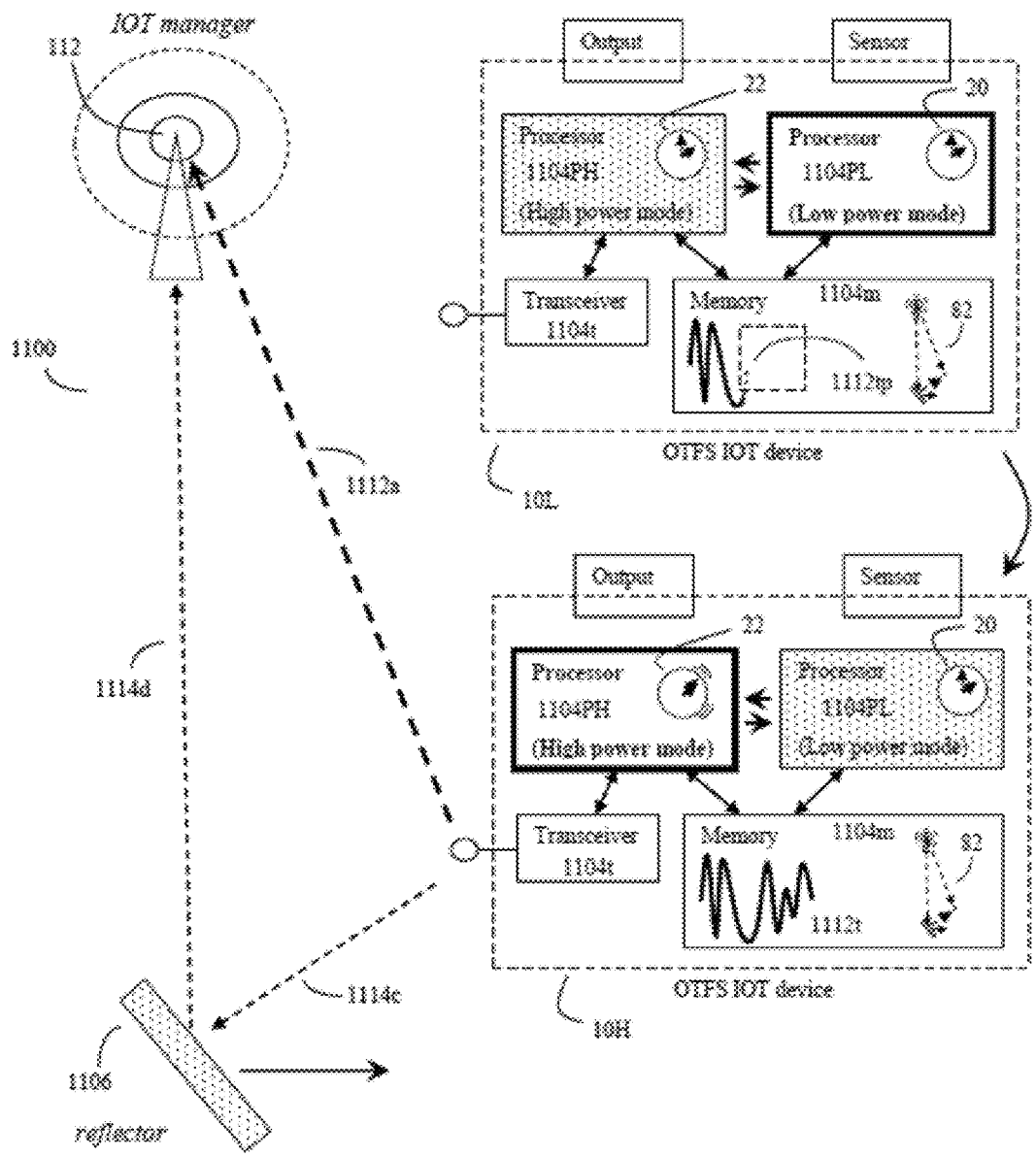
FIG. 53 shows an example of an IOT device capable of operating in a high power mode and a low power mode.

FIG. 53 shows an example of an IOT device capable of operating in a high power mode (10H) and a low power mode (10L). When operative in the low power mode 10L, the IOT device is using its processor (generally functioning at a reduced clock rate) to slowly precompute the mathematical structure(s) of relatively complex OTFS waveform bursts and store this mathematical structure(s) in the IOT device's memory 1104*m*. When the IOT device transitions to high-power mode 10H, the IOT device's processor can retrieve this precomputed OTFS waveform mathematical structure(s). Once retrieved, the precomputed waveform may be converted into analog form and transmitted. The transition of the IOT device processor 1104 from a low power mode to a high power mode may occur when, for example, the IOT device's clock 22 signals that it is time to transition to high power mode or in response to various unscheduled events (e.g., sensor signals).

Put alternatively, the IOT device can further use its at least one processor 1104PL, configured to operate in a lower power mode, to pre-compute one or more mathematical structures 1112*tp* of various OTFS pilot bursts or OTFS data symbol waveform bursts ahead of time. Usually the precomputed mathematical structure 1112*tp* can be stored in the IOT devices memory 1104*m* prior to transmission. In some embodiments the IOT device can use the 2D channel state information 82 to additionally precode the various OTFS mathematical structures and resulting OTFS waveform bursts to pre-compensate for the properties of the impaired data channel 1100.

Similarly, in some embodiments, IOT devices 10 can be configured to receive OTFS pilot and data symbol waveform bursts from various IOT manager devices 112. Here the IOT devices may operate by sampling and digitizing portions of these received bursts, and storing the digitized portions of these received bursts in the IOT device's memory 1104*m* for either rapid analysis, delayed analysis as desired. When speed of analysis is not a major consideration, then the IOT device can do this analysis using its processor(s) configured to operate in a lower power mode 1104PL, retrieve the digitized received bursts from memory, and analyze the received waveforms. To further correct the received wireless OTFS waveforms from the various channel distortions, the IOT device can optionally also use any previously received or determined 2D channel state information 82. This 2D channel state information contains parameters that the IOT device processor can use to further clean up the various received OTFS wireless waveforms.

The IOT device may then use these received OTFS bursts to perform various tasks, such as using received OTFS pilot bursts to determine information pertaining to a 2D channel state of the impaired wireless data channel 82. Additionally or alternatively, the IOT device can parse or otherwise interpret the received OTFS data symbol bursts for data or commands transmitted by the at least one IOT manager device 112 that are intended that IOT device.

Sensors and Output Devices

In some embodiments, the IOT devices disclosed herein may be configured with one or more sensor devices configured to report on events occurring in the IOT device's environment, and/or one or more output devices to enable the IOT device to interact with the IOT device's environment. The IOT device's processor(s), as well the IOT device software (often stored in the IOT device's onboard memory), can control what the IOT device does with any sensor data, as well as how the IOT device configures its output device(s). In some embodiments, the IOT devices may be further configured (often with software) to transmit at least some sensor data to various outside devices (such as the IOT manager device). In some embodiments, the IOT devices may be further configured to receive (from various outside devices such as the IOT manager device) software updates and/or sensor device or output device control information.

Figure 54:
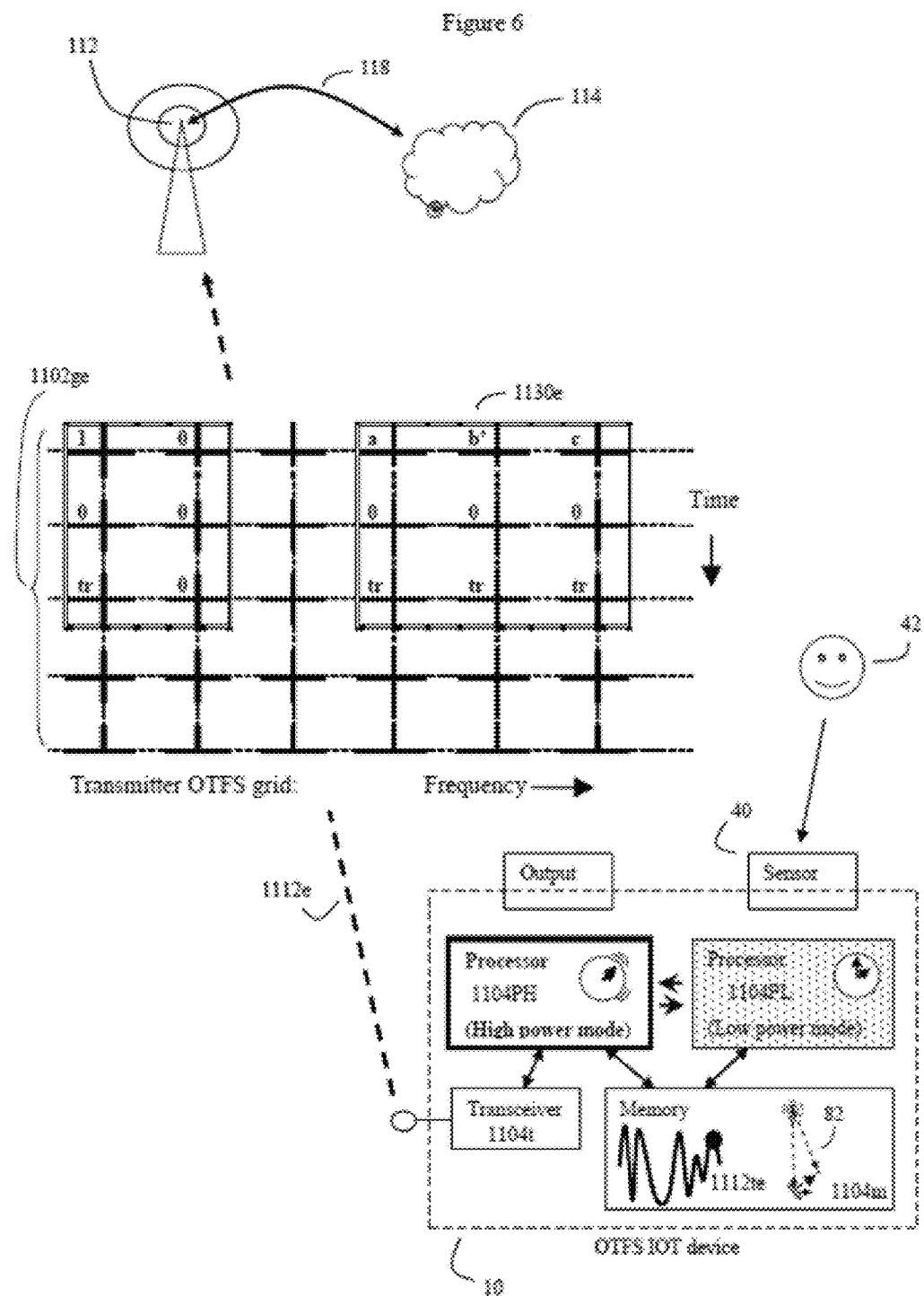
FIG. 54 shows an example of an IOT device sensor detecting an event and subsequently transmitting event information to an IOT manager device.

FIG. 54 shows an example of an IOT device sensor 40 detecting an event 42 and subsequently transmitting information to the IOT manager device 112. In the embodiment of FIG. 54, the IOT device 10 is configured so that when event 42 is detected, the IOT device 10 will then subsequently create at least one OTFS data symbol waveform burst 1112te, possibly precoded to help overcome various channel impairments using the 2D channel state information 82. The resulting data symbols conveying information about this event are further encapsulated by the processor 1104PH into an OTFS data frame 1102ge as various OTFS data symbol waveform bursts (1130e: "a", "b'", and "c"). These various OTFS data symbol waveform bursts are subsequently transmitted using transceiver 1104t and waveform(s) 1112e to the IOT manager 112. The IOT manager 112 in turn can analyze the data and/or retransmit the data 118 to other computer networks such as the Internet 114.

Put alternatively, in this embodiment, the IOT device(s) 10 can comprise at least one IOT sensor 10 configured to store IOT sensor data in the IOT device memory 1104m, usually with the aid of the at least one processor (1104PL, 1104PH) running in either low or high power mode as desired. Here the IOT device can also be configured to use it's at least one processor to package at least some of the IOT sensor data into at least one IOT sensor data OTFS data symbol waveform burst (here exemplified by 1130e: b' on the OTFS data grid 1102ge). The OTFS device can then use its at least one wireless transceiver 1104t to transmit this IOT sensor data as at least one IOT sensor OTFS data symbol waveform burst 112e to at least one IOT manager device 112.

Essentially any type of sensor 40 may be managed by an IOT device. As a non-limiting example, these sensors 40 can include photodetectors, video cameras, infrared sensors, microphones, vibration sensors, motion sensors, accelerometers, stress and strain sensors, MEMS sensors, clinical or vital state sensors, environmental sensors, smoke detectors, carbon monoxide detectors, other chemical detectors, temperature sensors, electrical sensors (e.g. electrical power, voltage, or current sensors, fluid level sensors and the like.

Typically the IOT manager device will be managing a plurality of IOT devices, and indeed may even be managing thousands of different IOT devices at the same time. Thus in this situation, where IOT device may comprises a plurality of IOT devices, all distributed within OTFS wireless range of the IOT manager device 112. Here in some embodiments, each of the individual IOT devices in this plurality of IOT devices may configured by that particular IOT device's processor(s) to transmit that individual IOT device's respective OTFS pilot bursts and at least one OTFS data symbol waveform bursts at various unique or at least typically reserved locations in one or more OTFS data frames (see FIG. 53).

The various IOT devices may be configured so that on a time periodic basis, some or all of the devices transmit sensor data according to a time schedule. For example, IOT devices configured as temperature monitors may report temperature data every 10 minutes on a continual basis. In some embodiments, this schedule may be determined or coordinated by the IOT manager device 112. Indeed the IOT manager may assume executive management functions for the various IOT devices, such as scheduling IOT device data transmission times, managing IOT device software, coordinating which OTFS waveform bursts occupy which time-frequency locations in the OTFS time-frequency grid. Ideally the IOT manager will attempt to schedule these and other functions in advance to optimize the functioning of the various IOT devices, and avoid conflicts.

In the case of the occurrence of unexpected events, such as interrupt driven events caused by unexpected sensor readings or the like, the IOT devices may be configured to "wake up" or otherwise transition to a higher power state ahead of the nominally scheduled time. The IOT device may also need to be configured to use OTFS methods to transmit some sort of previously unscheduled message to the IOT manager device. To cope with this situation, in some embodiments, IOT devices may be further configured to additionally or alternatively perform unscheduled OTFS data transmissions at these typically reserved locations in the OTFS data frame. In other words, these typically "reserved locations" in the OTFS data frame can be time-frequency locations that are reserved for otherwise unscheduled transmissions. These or other "typically reserved locations" can also be used by the systems to allow new IOT devices to initially communicate with IOT manager devices upon initial setup, and before the IOT manager device then assigns an alternate OTFS time-frequency grid set of locations to the newly installed IOT device. An example of such "typically reserved locations" can be seen in FIG. 54 at the various "tr" time-frequency coordinates on OTFS grid 1102ge. If in FIG. 54, the OTFS transmission reporting on the sensor 40 reading of event 42 was occurring at an unscheduled time, then the IOT device 10 might use the "tr" OTFS grid locations instead. As an alternative nomenclature, these "typically reserved locations" can be described as "alternate locations", "standby locations", "previously unallocated locations", "emergency locations", and the like.

Thus, in the embodiment of FIG. 54, some or all of the various IOT devices can receive information assigning and updating any of these unique or typically reserved OTFS time-frequency grid locations from at least one IOT manager device. For example, when initially installed, IOT device 10 might transmit OTFS signals to the manager 112 using the "tr" OTFS grid coordinates. The manager 112 would then later assign the "1" and "a", "b'", "c" OTFS grid coordinates to IOT device 10 for subsequent scheduled use. However, for unscheduled transmissions, IOT device 10 might briefly revert back to the "tr" OTFS grid coordinates. Other OTFS grid allocation schemes may also be used.

Figure 55:
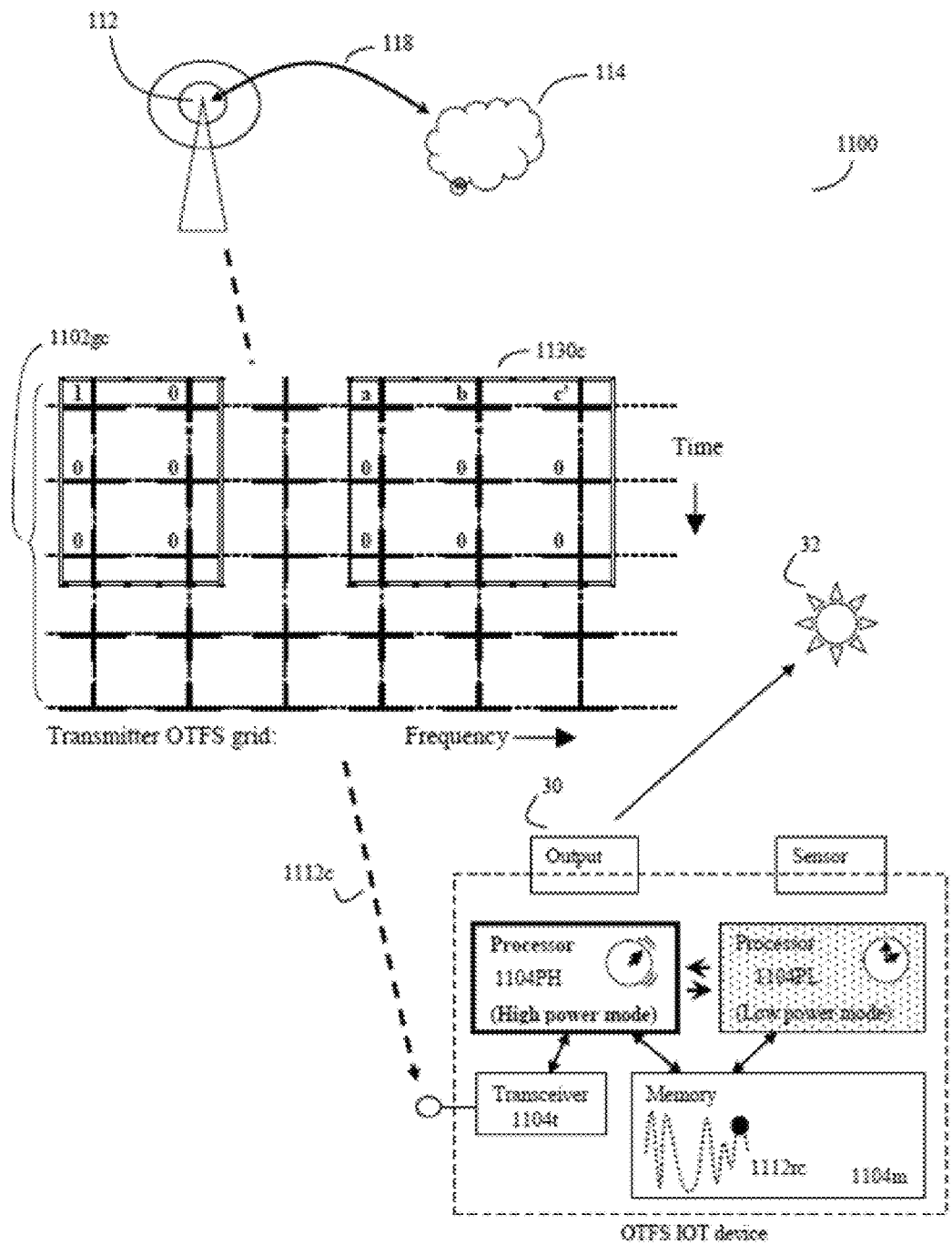
FIG. 55 illustrates an example of an IOT manager device transmitting an IOT device output command to an IOT device.

FIG. 55 illustrates an example of an IOT manager device 112 transmitting an IOT device output command to an IOT device 10. This command may be, for example, transmitted as OTFS data symbol waveform bursts: 1102gc, 1130c: a, b, c'; 1112c. This command may have been generated internally by the IOT manager device 112 or may have originally come from another computer network, such as the Internet. In this embodiment, the IOT device will typically use its at least one processor (typically running in higher power mode 1104PH) to extract received IOT output data from at least one received IOT output data OTFS data symbol waveform bursts (e.g. 1112c; 1102gc; 1130c: a, b, c'; 1112rc), and store this received IOT output data in memory 1104m. There may be optional intermediate steps in this process, including first acquiring the OTFS data symbol waveform bursts, digitizing them, and storing them in memory 1104m as digitized waveforms 1112rc. The IOT device can then analyze the OTFS data symbol waveform either quickly (e.g. by running its processor in high speed mode 1104PH) or slowly (e.g. by running its processor in low speed mode 1104PL), and correcting for the effects of the impaired data channel 1100 using 2D channel state information 82. Once the IOT output data has been obtained, then the IOT device can use it's at least one processor in either low power or high power mode (e.g. either 1104PH or 1104PL) to configure or otherwise control the state of the IOT output device 30 according to the received IOT output data. The output device 30 may be, for example, a switch capable of changing the state of another external device. Alternatively, the output device 30 could be an actuator (e.g. mechanical actuator), or some other type of output mechanism configured to, for example, actuate an alarm 32.

Alternatively, the output device 30 may be configured either according to output data previously stored in IOT memory 1104m, and/or according to direct commands from the IOT device processor (which may be configured in either a low or high energy state). This IOT output data can comprise any of IOT output commands or IOT output control software intended for the IOT device processor (in either low or high power mode), which can then run the IOT output control software, and instruct the processor to in turn configure the status of the IOT output 30. This "status" can be as simple as an "on" or "off" status (in the case where the output is a switch or other binary output device), or it can be very complex (such as if the output is a display screen).

To facilitate response to rapid unscheduled commands in response to unscheduled sensor input, in some embodiments the IOT device may be configured to maintain an otherwise unscheduled high power state for a short time after transmitting the unexpected and unscheduled sensor data. In the event that the IOT device's normally scheduled OTFS grid coordinates are unavailable (perhaps because these grid coordinates are also used by one or more alternate IOT devices that are scheduled for different times), the IOT device may also be configured to, at least for a short time, be responsive to IOT manager commands that are sent on a different set of emergency command OTFS grid time-frequency coordinates (similar to the "tr" locations in FIG. 54). In these situations, the IOT manager device 112 can then take advantage of this IOT device configuration, and send immediate commands back to the IOT device 10 using such emergency command or "tr" type OTFS time-frequency grid coordinates. This can help the IOT manager 112 manage a large number of different IOT devices 10, while still allowing the system to rapidly respond and cope with unscheduled events. This scheme also allows the individual IOT devices 10 to otherwise conserve energy. This sort of unscheduled exception event and IOT manager response command is shown in more detail in FIG. 56, rows 29 to 32.

Almost any type of output and output device can be controlled by the IOT device 10. Examples of such outputs include outputs that control the supply of power to an external device, controllers, electrical or mechanical or electromechanical actuators (e.g. motors, solenoids, and the like) signal generators, light, image, video and/or audio outputs. An IOT device may, of course have more than one output device 30 and also may have more than one type of output device 30.

IOT Manager Device

Again referring to FIG. 49, the IOT manager device 112 will typically comprise at least one manger antenna (e.g. 1110), at least one manager wireless transceiver, at least one manager processor, memory, and at least one manager clock (which may be part of the processor, or may comprise at least some parts external to the processor). In some embodiments, the IOT manager device may be connected to an external computer network such as the Internet 114 by various links 118, including cable, optical fiber, optical signals, wireless signals, and the like, usually by way of a network interface. The IOT manager memory, in addition to having the IOT manager counterpart of the various wireless OTFS functions discussed for the IOT device, will also typically store information, often in a IOT manager database, pertaining to the identification, management, and control of the various IOT devices 10 within range or control responsibility of the IOT manager 112. This information can include, information such as the IOT device identification code, any conversions needed between the IOT device identification code and IPv4, IPv6, URI, or URL identifiers, OTFS time-frequency grid assignments, and other IOT device specific data and software (e.g. IOT device specific management software).

In some embodiments, the IOT manager device may be a high performance IOT manager device that further includes circuitry and functionality as discussed in U.S. provisional application 62/129,930, the entire contents of which are incorporated herein by reference. For example, the high performance IOT manager device may optionally implement a more general method of linking other types of local wireless transceivers (e.g. cellular telephones, WiFi devices, etc.) with backbone data access points as well.

Here for example, in addition to any IOT device management functionality, the high performance IOT manager device may optionally operate as a local data access point device comprising at least one processor, at least one OTFS wireless transceiver and at least one non-OTFS wireless transceiver. This at least one OTFS wireless transceiver can be configured to exchange data with at least one non-OTFS wireless transceiver (e.g. a WiFi or cellular telephone transceiver). The high performance IOT manager device can optionally use its at least one OTFS transceiver to establish at least one OTFS wireless link with at least one backbone data access point using at least one OTFS data stream. The high performance IOT manager device can optionally also use its optional non-OTFS wireless transceiver(s) to establish at least one wireless link with at least one other local non-OTFS wireless transceiver. The high performance IOT manger device can then optionally also receive data transmission or reception requirements from either the backbone data access points or local non-OTFS wireless transceivers, and use its at least one processor, at least one OTFS wireless transceiver, and at least one non-OTFS wireless transceiver to direct data to a required recipient according to the data transmission or reception requirements. Regardless of its ability to connect with other, non-OTFS IOT devices, or not, the IOT manager device 112 will typically be configured through software to perform a substantial number of IOT device management and control tasks.

Figure 56:
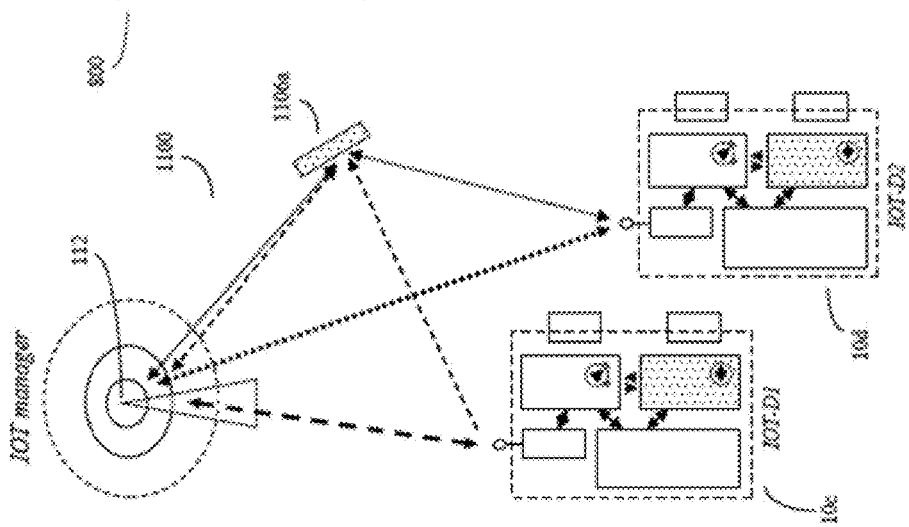
FIG. 56 illustrates various media access control (MAC) and management tasks capable of being performed by embodiments of an IOT manager device.

FIG. 56 illustrates various media access control (MAC) and management tasks capable of being performed by embodiments of the IOT manager device 112. In the embodiment of FIG. 56, the IOT manager device 112 is configured for performing a series of operations in table 800 related to detecting, time synchronizing, and providing OTFS grid time-frequency assignments (and optionally also 2D channel state information) to two different IOT devices (IOT-device-1 10c and IOT-device-2 10d). In the example of FIG. 56 the IOT-device-1 10c is operative to power up and transmit data, and to then return to a low-power mode, at scheduled intervals. IOT-device-2 10d, which is assumed to have been turned on after device 10c, synchronizes with IOT manager device 112 at a later time. Although also returning data at scheduled intervals, device 10d is also shown powering up in response to a detected sensor exception event. Thus device 10d also transmits data to the IOT manager at an unscheduled interval as well.

Referring to FIG. 56, the different rows in table 800 represent the flow of time, with row 1 being the earliest time, and row 36 being the latest time. The various IOT manager device steps of receiving and transmitting various types of OTFS wireless waveform bursts are shown in the IOT manager M1 column. The IOT device D1 column shows the various internal states, computations, and steps of receiving and transmitting various types of OTFS wireless waveforms for the first IOT device 10c. The IOT device D2 column shows the various internal states, computations, and steps of receiving and transmitting various types of OTFS wireless waveforms for the second IOT device 10d. In practice, the IOT manager may mange up to thousands or more of such IOT devices. To allow the various operations to be seen clearly in the limited space available for FIG. 56 table 800, the IOT manager device 112 is abbreviated as "M1", IOT device D1 10c is abbreviated as "D1", and IOT device D2 10d is abbreviated as "D2".

With reference to table 800 of FIG. 56, assume that at the first time point (row 1), the first IOT device-1 (10c, D1) has just been placed into operation and turned on, but that the second IOT device-2 (10d, D2) has not been placed into operation yet. The second IOT device-2 (10d, D2) is placed into operation for the first time at time point 6 (row 6). The two IOT devices will initially communicate with the IOT manager device (112, M1) at different times, but then eventually be time synchronized by time point 19 (row 19). This time synchronization allows for the IOT devices to conserve power because they can spend most of their lifetime in a low power mode in between scheduled periods of activity. The time-synchronization also allows the IOT manager device 112 to manage a large number of IOT devices, because different sets of IOT devices can be configured to communicate on different time schedules.

At time point 1, the IOT manager device (112, M1) transmits OTFS signals containing the manager's identification number (ID) and a clock synchronization pulse. The clock synchronization pulse can be sent using either the IOT manager's device OTFS pilot burst(s) or OTFS data symbol bursts, and the IOT manager's identification number (ID) can be sent using the IOT manager's OTFS data symbol bursts. In this example the first IOT device-1 (10c, D1) is configured to be in high power mode and to listen for the IOT manager device at time point 1. Thus at time point 2 (row 2), after accounting for speed of light transmission delays, the first IOT device D1 receives the ID manager's ID and clock. By contrast, in this example the second IOT device (10d, D2) is not yet operating at this time.

At time point 3 (row 3), the first IOT device (10c, D1) interprets the IOT manager's OTFS signal, confirms that this is the ID of the master IOT manager, and (if needed) adjusts the time of the first IOT device's clock (see FIG. 50). In this example, the IOT device also transmits its device identifier (D1-ID) to the IOT manager at time point 3. The IOT manager (112, M1) receives, at time point 4 (as a result of speed of light delays), the first IOT device's signal.

At time point 5, the IOT manager, after checking out the first IOT device's ID in the IOT manager's database, determines an optimal set of first IOT device settings (e.g. wake-up schedule, OTFS grid coordinates) and then commands the first IOT device to subsequently transmit using a certain set of OTFS grid time frequency coordinates. The IOT manager may optionally transmit the first IOT wake-up schedule as well. The IOT manager may optionally also transmit information pertaining to the 2D channel state of data channel 110 to the first IOT device (see FIG. 51). The first IOT device receives these various command at time point 7 (row 7), and follows these commands. Assuming that this is following the preferred wake-up/sleep (high power/low power) schedule, the first IOT device then transitions into a low power mode at time points 8 and 9 in order to conserve energy. In this example it is assumed that the onboard clock of the first IOT device, previously synchronized at time point 3 (row 3), is now set to wake up and cause the first IOT device to transition to a higher power mode at time point 10 (row 10).

Meanwhile, on a parallel track, assume that the second IOT device (10d, D2) is switched on for the first time at time point 6 (row 6). Assume that the second IOT device is configured to, after being switched on for the first time, remain in a high power mode for at least some period of time listening for a master IOT manager device to which to slave itself.

At time point 10 (row 10), IOT manager (112, M1) sends out its periodic OTFS manager identification and clock pulse. Due to speed of light delays, this is now received by both the first IOT device (10c, D1) and the second IOT device (10d, D2) at time point 11 (row 11).

At time point 12 (row 12), the first IOT device (10c, D1) sees that it does not need to adjust its clock and recognizing the master IOT manager, and with nothing else to report, simply transmits its identifier (D1-ID) back to the IOT manager device, remains in high power mode for any immediate IOT manager commands, and then goes back to low power mode. By contrast, the second IOT device (10d, D2) determines that it needs to adjust its clock (see FIG. 50) and remain in high power mode for a longer period of time to receive additional commands. The second IOT device also transmits its second IOT device identifier (D2-ID) to the IOT manager device.

At time point 13 (row 13), the IOT manager device receives the ID signals from both the first and second IOT devices. In this example the first IOT device and the second IOT device are configured to transmit partial OTFS data grids as per FIG. 52 (110g1 and 110g2), and the IOT manager receives the sum of these partial OTFS data grids as a complete (but channel distorted) OTFS data grid. In other examples, different sets of IOT devices may transmit at different time intervals such that their respective OTFS data grids will not overlap. In this context note that "unique" OTFS grid assignments are "unique" for a given OTFS grid schedule, and different IOT devices nominally assigned to different high-power/low power schedules can share the same "unique" OTFS grid coordinates.

Again referring to table 800, while the first IOT device is transmitting on the unique (IOT device specific) OTFS data frame pilot or data coordinates previously assigned by the IOT manager at time point 5 (row 5), the second IOT device has not yet had its unique OTFS data frame pilot or data coordinates assigned by the IOT manager device. Thus the second IOT device initially transmits signals to the IOT manager device using OTFS time-frequency coordinates typically used for unscheduled OTFS data transmissions, such as the FIG. 54 "tr" grid coordinates. Thus at time point 14 (row 14), the IOT manager (112, M1), after consulting its database and determining an optimum assignment for the second IOT device, transmits commands to the second IOT device (10d, D2) giving the second IOT device its own unique OTFS time-frequency grid coordinates to use for its OTFS data frame or pilot signals. Assume here that the IOT manager also assigns the second IOT device to the same time schedule as the first IOT device. The IOT manger can optionally also transmit 2D channel state information relevant to the 2D channel state for communications channel 1100 between the IOT manager 112 and the second IOT device (10d, D2).

At time point 15 (row 15), the second IOT device receives these commands and follows them. Both the first and second IOT device can then follow their instructions and both go into a lower power "sleep" mode set of synchronized schedules from time points 16 to 18 (rows 16 to 18). Here internal clocks for both IOT devices are both set to wake them both up (transition to high power mode) at time point 19 (row 19), just in time to catch the latest routine IOT manager identification and clock signals transmitted by the IOT manager. This latest routine scheduled transmission is received by both IOT devices at time point 20 (row 20).

In the present example the IOT devices may have accumulated some routine data, possibly from various IOT device sensors 30, and may have both been configured to transmit their respective sets of data (D1-data and D2-data) back to the IOT manager at the same time. These transmissions may be performed using different unique OTFS data grid time-frequency coordinates, at time point 21 (row 21). In order to save power both IOT devices, following their assigned schedules, may transition back to low power "sleep" mode until time point 25. At time point 25, according to schedule, both of their clocks then automatically wake (transition to high power mode) both IOT devices again at time point 26 (row 26).

At time point 26 (row 26), the IOT manager device 112 then transmits its routine OTFS identification and clock synchronization signals. A time point 27 (row 27), both IOT devices receive these signals. In the present example it is assumed that both IOT devices determine that their respective clocks are set adequately, and thus neither updates their clocks.

At time point 28 (row 28), both IOT devices then transmit their routinely scheduled respective sets of data (D1-data and D2 data) to the IOT manager using different unique OTFS data grid time-frequency coordinates (see FIG. 52). This routine, scheduled data transmission is received by the IOT data manager at time point 29 (row 29). At this point the first IOT device (10c, D1) goes back to sleep (low power mode) during time points 29-32 in order to save power.

In order to illustrate how the present system can cope with non-scheduled exceptions, assume that at time point 29 (row 29) the second IOT device's (10d, D2) sensor (40) detects an exception. For example, in the case in which the IOT device's sensor 40 was a camera equipped with some sort of facial recognition software, the exception could correspond to the detection of an unfamiliar face 42. However, for purposes of generality, the exception could be any unexpected sensor reading exceeding pre-programmed limits or a threshold defined in the memory of the second IOT device.

In this example, assume that the second IOT device has been configured to not wait for its regular time schedule, but instead to immediately report this exception back to the IOT manager device (112, M1). In this case the IOT device's "unique" OTFS grid coordinates may be unavailable to use for such immediate reporting, because the IOT manager 112 may have allocated these "unique" coordinates to other IOT devices 10 on different schedules. In order to avoid this situation, the second IOT device can, at time 30 (row 30), optionally transmit OTFS data signals (corresponding to the second IOT device's identification and the exception data) using OTFS grid time-frequency coordinates typically used for unscheduled OTFS data transmissions (such as the FIG. 54 "tr" OTFS grid coordinates). Assume here that the second IOT device is also configured so that under these conditions, the second IOT device will temporarily remain in an otherwise unscheduled high power mode and look for instructions from the IOT manager device 112.

At time point 31 (row 31), the IOT manager device receives the second IOT device's identification code and exception data, and then may either automatically, or in response from commands relayed from other computer networks such as the Internet 114, shortly thereafter issue a set of exception handling commands to the second IOT device at time point 32. For purposes of explanation, assume that this exception command is instantly received by the second IOT device and immediately executed by the second IOT device. The exception command may be, for example, a command to change the state of an output of the second IOT device. From time points 33 to 36 (rows 33 to 36), it is assumed that both IOT devices resume the normal cycle of IOT manager device identification and clock synchronization, waking up, receiving IOT manger information, transmitting routine data, and then going back to the earlier described sleep and wake up cycles.

As may be appreciated from FIG. 56, the IOT manager device 112 may be configured to handle a variety of problems relating to the care and management of a plurality of IOT devices. For example, the processor of the IOT manager device may be configured to use the IOT manager's wireless transceiver to receive, from an IOT device, wireless OTFS signals containing IOT device identification information and to perform one or more of the following operations:

1: Detect a 2D channel state of the impaired data channel connecting the IOT manager device and the IOT device and use this 2D channel state to determine at least one scheme for compensating or precoding for an effect of the impaired data channel. Transmit this scheme (or the 2D channel state information itself) to this IOT device.

2: Detect identification codes associated with each of various IOT devices, and assign at least one OTFS data frame pilot or data coordinates to each of these various IOT devices according to these identification codes.

3a: Receive IOT clock time parameters from at least one IOT device, determine time differences between these IOT clock time parameters and the IOT manager's own clock, and transmit time adjustment parameters to the at least one IOT device that can be used by the IOT device to adjust its clock time to reduce these differences.

3b: Transmit time parameters based on the IOT manager's own clock. These will typically be used by the IOT device to adjust the IOT device's clock time minimize any differences between the IOT device's clock and the IOT manager's clock.

3c: Transmit at least one time schedule for the IOT device to periodically transition or cycle between low power mode and high power mode.

4: Receive sensor data from those various IOT devices that are equipped with at least one sensor device.

5: Transmit output data to various IOT devices that are equipped with at least one output device.

6: Receive or transmit data pertaining to a status of either the IOT manager device or various IOT devices to at least one external computer network (such as the Internet).

Multiple Polarization Modes

In some embodiments at least certain of the IOT devices in communication with the IOT manager may include a wireless transceiver configured to transmit and receive in a plurality of polarization states and a plurality of antennas. During operation the transceiver and antennas cooperate to transmit and receive OTFS wireless waveform bursts over a plurality of polarization states.

Figure 57:
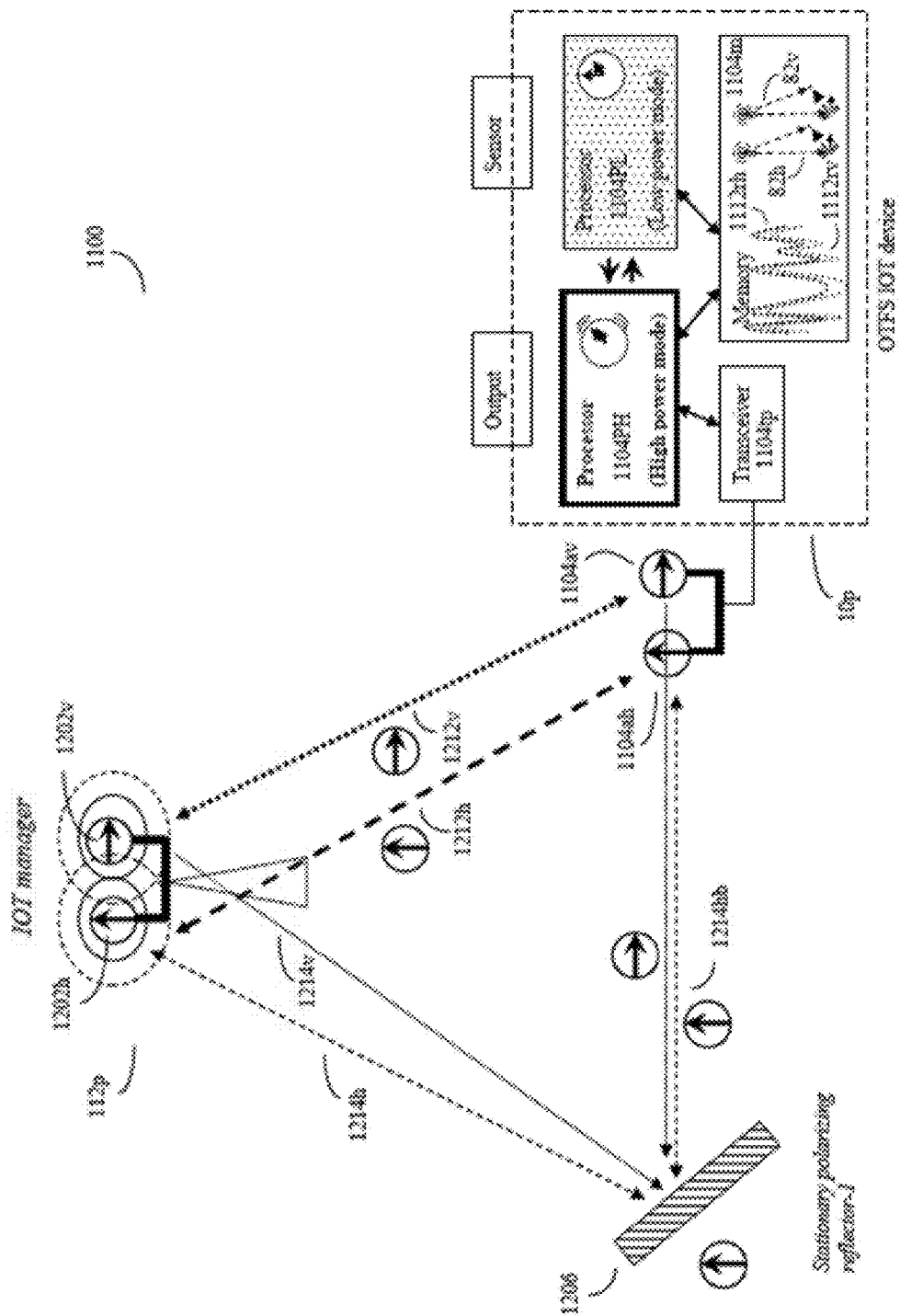
FIG. 57 shows an exemplary IOT device operating with a polarization-capable transceiver and antenna system.

Attention is now directed to FIG. 57, which shows an exemplary IOT device 10p operating with a polarization-capable transceiver 1104tp and antenna system (1104ah, 1104av). The IOT device 10p uses two differently types of polarized OTFS wireless waveforms to communicate with an IOT manager device 1112p, which is also equipped with a polarized transceiver and antenna system (1202h, 1201v). Use of such polarized OTFS wireless waveforms is particularly useful, because it may help to better characterize various channel impairments such as, for example, a polarizing reflector 1206. These methods can also allow for more streams of data to be transmitted at the same time and frequency, thus allowing for more efficient utilization of the data channel and IOT devices.

As shown in FIG. 57, IOT device 10p communicates with IOT manger 112p using polarized OTFS wireless waveforms such as 1212h, 1212v, 1214h, 1214v, 1214hb. As is further discussed in U.S. patent application Ser. No. 14/583,911, which is hereby incorporated herein by reference, use of such polarized OTFS wireless waveforms may be highly useful. These methods can help to better characterize various channel impairments and to improve the rank of the data channel, which may allow for more streams of data to be transmitted at the same time and frequency.

In the example of FIG. 57, assume that reflector 1206 reflects the horizontal polarized waveforms 1214h but absorbs the vertical polarized waveforms 1214v. As a consequence, when IOT device 10p receives polarized OTFS transmissions from the IOT manager 112p, it will be receiving, at antennas 1104ah and 1104av, a mixture of direct polarized OTFS waveforms 1212h and 1212v and replica OTFS polarized waveforms for at least the 1214h waveforms. The reverse is also true when the IOT device 10p transmits polarized OTFS waveforms to the IOT manager 112p.

In this example, the impaired data channel 1100 thus can be represented by two somewhat different 2D channel states. One 2D channel state 82h represents the 2D channel state of the impaired data channel as viewed in a first polarization mode such as a horizontal polarization mode. Another 2D channel state 82v represents the 2D channel state of the impaired data channel as viewed in a second polarization mode such as a vertical polarization mode.

It is also observed that the IOT device 10p and the IOT manager 112p can receive and digitize the various polarized OTFS waveforms, here represented by 1112rh and 1112rv, and store them in memory such as 1104m. These OTFS waveforms can then be analyzed or precoded using the 2D channel state information (82h, 82v). This technique is particularly useful for facilitating the ability for the IOT manager to receive faint (low power) OTFS wireless transmissions from the various IOT devices.

MIMO Modes

Figure 58:
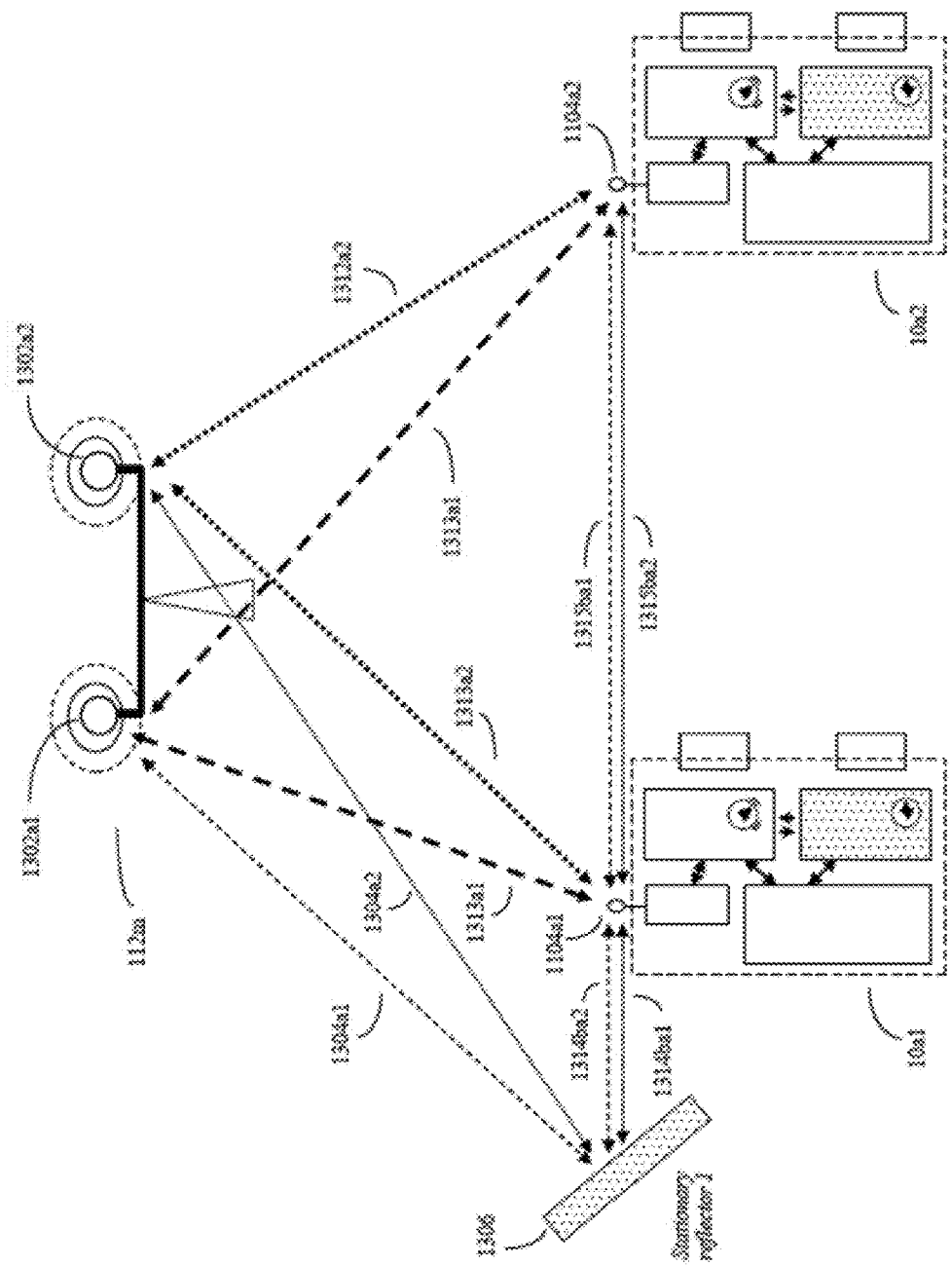
FIG. 58 shows an example of an IOT manager device configured with a multiple transceiver and antenna system.

FIG. 58 shows an example of an IOT manager device 112m configured with a multiple transceiver and antenna (1302a1, 1302a2) system. During operation the IOT manager device 112m may determine a 2D channel state relative to one or more IOT devices (10a1, 10a2) transmit and receive multiple data streams. The use of multiple antennas 1302 enables the electromagnetic beams used for communication with the IOT devices (10a1, 10a2), which may be widely separated, to be shaped and directed. The use of such MIMO techniques enables improved characterization of channel impairments such as, for example, wireless reflector 1306, and can also improve the rank of the data channel (thereby potentially allowing a greater number of data streams to be sent over the available time and frequency resources).

Before continuing with a discussion of potential MIMO implementations, the concept of a "data stream" will be further described. In a wireless context, if wireless waveforms propagating through a communication channel are separated by different frequencies, or modulated by different (orthogonal to one another) waveforms, then the separated or differently modulated waveforms may be used to carry multiple independent streams of data. As another example, if wireless communications are done between different sets of highly directional transmitter and receiver antennas, with minimal cross-talk between different sets of directional transmitter and receiver antennas, then each transmitter and receiver antenna set can be viewed as forming its own unique communications channel capable of conveying a separate data stream.

Use of OTFS modulation by the IOT manager 112m and IOT devices 10a1, 10a2 further enables simultaneously-transmitted "streams" of information to be differentiated. The number of different "streams" of information a data channel can support can be viewed as varying according to the underlying data channel structure or impairments (e.g. distribution of reflectors) of the data channel. Consider a case where the distribution of reflectors in a data channel is such as to effectively create an isolated conduit between each different transmitting antenna and each different receiving antenna. Such a data channel could give rise to a 2D channel state capable of supporting a large number of different streams of data when MIMO techniques are used in combination with OTFS modulation.

As previously discussed, the 2D channel state information can, in some embodiments, be represented by matrices, and with regards to different streams of information or data, the question of how many different streams can be simultaneously transmitted by a given data channel can be viewed (in linear algebra terms) somewhat in terms of the "rank" of the 2D channel state matrix. This rank is the size of the collection of linearly independent rows (or columns, since column rank is equal to row rank) of the matrix. In some embodiments, this can also be viewed as the number of solutions of the system of linear equations that represent the effect of the impaired data channel on data transmission.

Given this insight, the methods described herein thus teach that using techniques to improve the "rank" of the 2D channel state matrix, such as by using polarization and MIMO, to thus create higher rank 2D channel state matrixes and "richer" data channels. These in turn allow wireless systems to operate at increasingly higher levels of performance (e.g. higher data transmission rates, lower energy per symbol, increased resistance to fading, and the like). In some embodiments, improvement of an order of magnitude and more over prior art methods may be achieved according to these schemes.

Thus in some embodiments, particularly with regards to MIMO techniques, an IOT manager or other entity may determine 2D channel state information and use this in generating OTFS waveforms carrying OTFS data symbols. The wireless transmitter may have T uniquely configured transmitting antennas for transmitting the OTFS waveforms, and the wireless receiver may R uniquely configured receiving antennas. Both T and R will be greater than 1, and R (the number of receiver antennas) may often be greater than or equal to T.

The wireless transmitter may be configured to use its T transmitting antennas to simultaneously transmit, over a same frequency range, at most T streams of stream identifiable direct OTFS data and pilot bursts. Here each stream identifiable direct OTFS data and pilot bursts will preferably have at least their various OTFS pilot symbols $P_{s,pt,pf}$ further chosen to be stream identifiable.

Figure 59B:
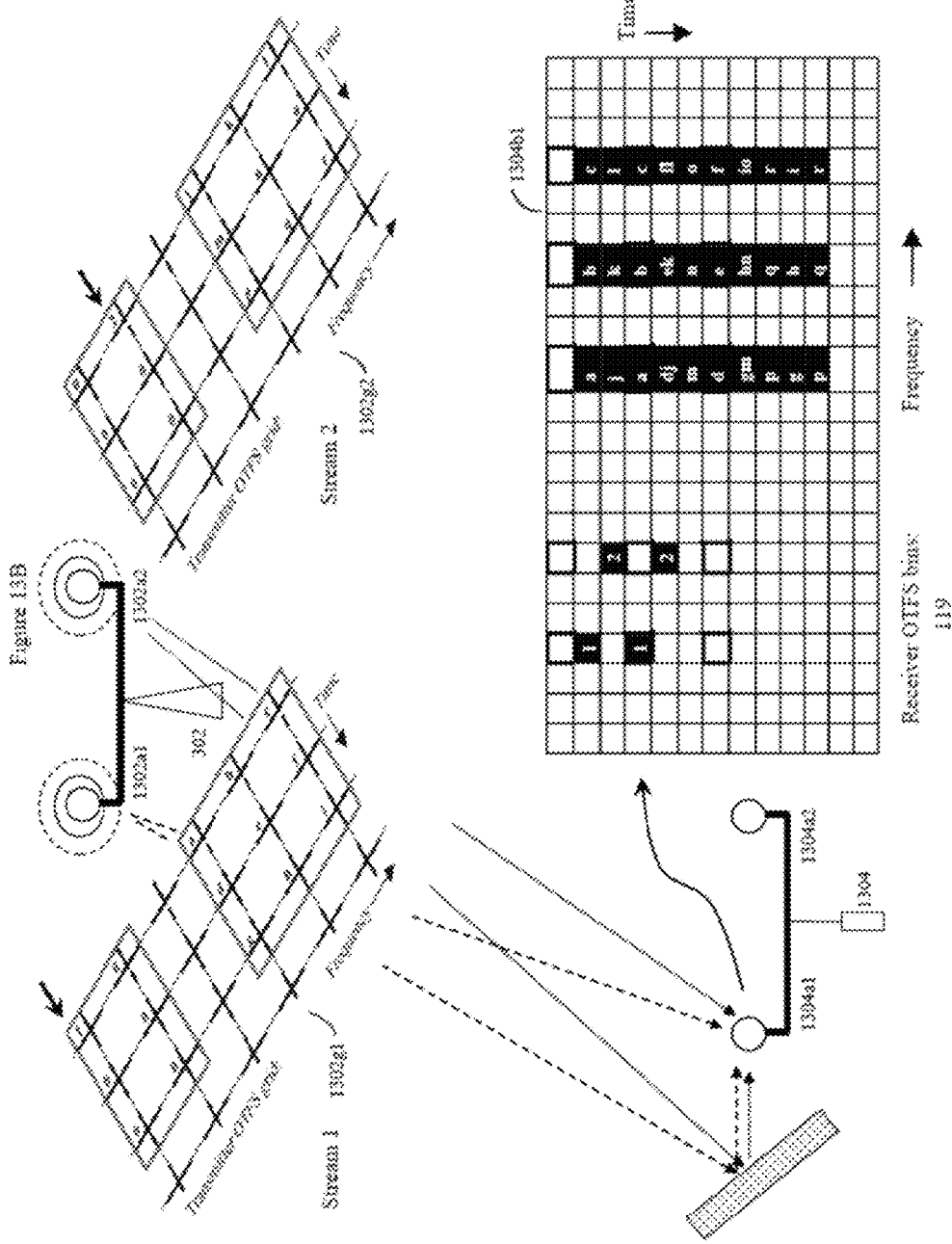
Figure 59C:
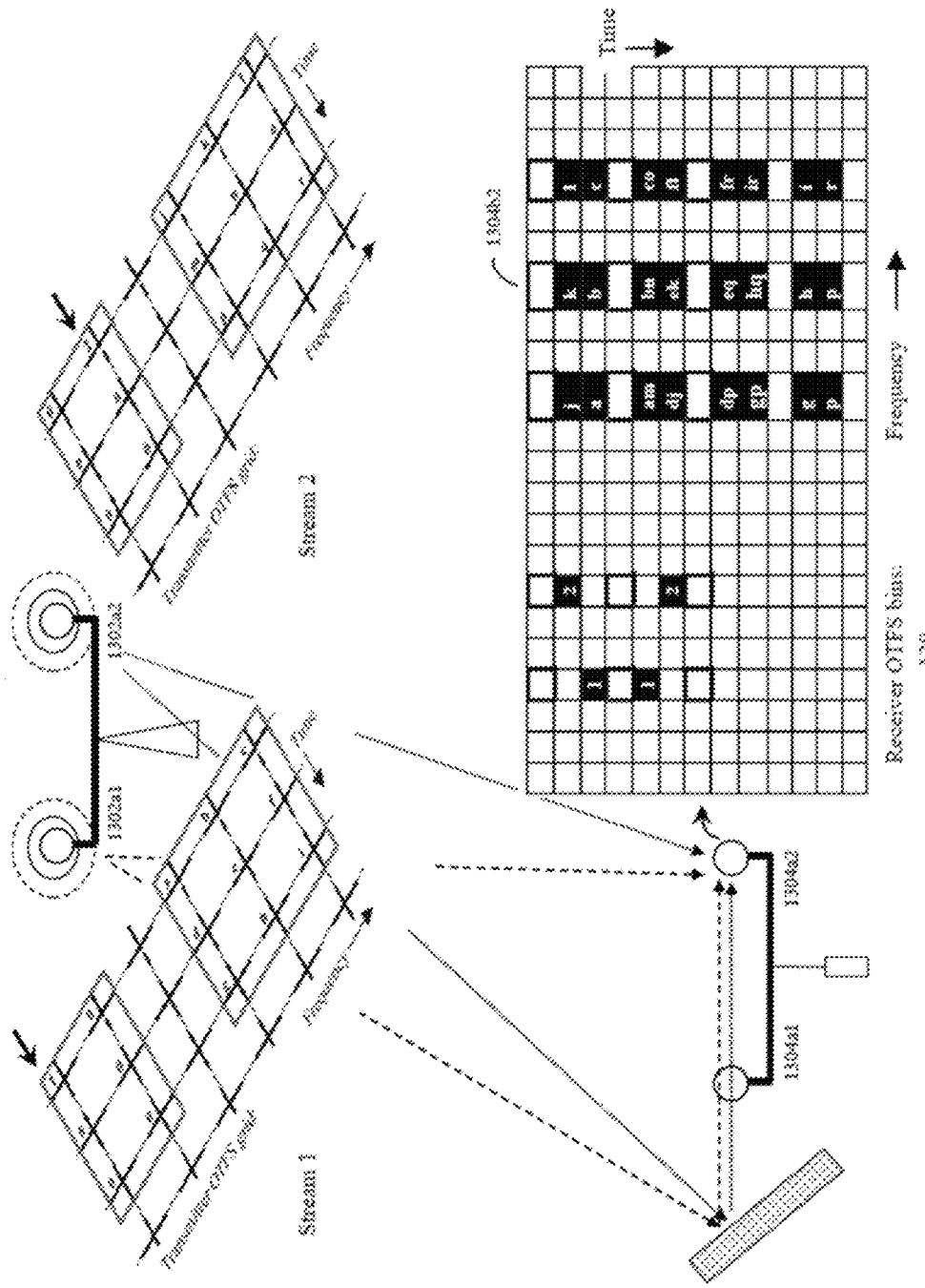

Attention is now directed to FIGS. 59A-59C, which exemplify the use of MIMO techniques in an OTFS communication system. In the examples of FIGS. 59A-59C, a first stream has associated therewith a first OTFS pilot burst occupying a first OTFS transmitter OTFS grid location, while a second stream has associated therewith a second OTFS pilot burst occupying a second OTFS transmitter OTFS grid location. This association of different pilots with different regions of an OTFS grid will generally assist the receiver in determining an accurate 2D channel state for each stream.

FIG. 59A illustratively represents use of spatially separated transmitting and receiving antennas (1302a1, 1302a2) and various OTFS pilot symbol waveform bursts to further characterize the 2D channel state of the data channel, and for other purposes. Such other purposes may include, for example, imparting a spatial directionality to the transmitted or receiving wireless waveforms, and simultaneously transmitting and receiving multiple streams of data over the same frequencies. In particular, FIG. 59A shows a simplified MIMO situation where the MIMO transmitter 1302 has two spatially separated antennas, the MIMO receiver 1304 has two spatially separated antennas (1304a1, 1304a2), and there is one stationary reflector in the data channel 1306, here shown positioned closer to the left hand side of the transmitting and receiving antennas than it is to the right hand side of the antennas.

In the example of FIG. 59A, it is assumed that the order of arrival of the various OTFS pilot bursts (and any data bursts as well) to the various receiving antennas is, with respect to receiving antenna 1304a1, first direct 1312a1, then direct 1313a2, then replica (reflected) (1314a1 to 1314ba1), and finally replica (reflected (1314a2 to 1314ba2). The different orders of arrival can show up as different arrival times on the receiver bin structure or, alternatively, as different waveform phases or different angles of arrival on a higher dimensional representation of the receiver bin structure (not shown). The order of arrival of the various OTFS pilot bursts is, with respect to receiving antenna 1304a2, first 1312a2, then 1313a1, then (with a greater delay) replica (reflected 1314a1 to 1315ba1, and last (due to the longer distance) replica (reflected) (1314a2 to 1315ba2). Again the different orders of arrival can show up as different arrival times on the receiver bin structure, as different waveform phases, or as different angles of arrival on a higher dimensional representation of the receiver bin structure.

FIG. 59B demonstrates one manner in which the MIMO transmitter 1302 (FIG. 59A) can transmit different but time, frequency, and OTFS waveform synchronized, streams of data as different transmitter grids 1302g1, 1302g2 from its two antennas (1302a1 and 1302a2). Here the MIMO transmitter's left antenna 1302a1 is transmitting pilot symbol "1" and OTFS data symbols "a, b, c, d, e, f, g, h, i" as various OTFS symbol waveform bursts according to the time and frequency spacing shown in the OTFS transmitter grid 1302g1. The MIMO transmitter is also, at the exactly the same time, and exactly according to the same time and frequency spacing, transmitting pilot symbol "2" (time and frequency offset from pilot symbol 1) and OTFS data symbols "j, k, l, m, n, o, p, q, r" on its left antenna 1302a2 according to grid 1302g2. The reflector 1306 acts on these signals as previously discussed in FIG. 59A. As previously discussed, due to the spatial arrangement of the various antennas, the OTFS waveforms do not all arrive simultaneously and at the same angle, but rather arrive at different times (and different waveform phases, which also vary as a function of time) and different angles.

For simplicity of explanation and presentation, it is assumed that the MIMO receiver antennas 1304a1 and 1304a2 are receiving and detecting the slightly different travel times for the various transmitter antenna, reflector, and receiver antenna configuration as different delay times on the receiver OTFS time-frequency bin structure. In actuality, the MIMO receiver may often instead detect these differences as differences in the phase angles of the various waveforms, or even as different directions of arrival of the various waveforms, and handle this using receiver bins with additional dimensions, but it is easier to show these differences as time differences to illustrate the concept.

As shown in FIG. 59B, the MIMO receiver 1304 receives the channel convoluted OTFS waveform bursts on its antennas. Here the MIMO receiver reception on the MIMO receiver's left antenna 1304a1 OTFS time-frequency bin structure 1304b1 is shown.

FIG. 59C is similar to FIG. 59B, but instead illustrates the signals that are received by the MIMO receiver's right hand antenna 1304a2 according to its OTFS time-frequency bin structure 1304b2.

In exemplary embodiments the T transmitting antennas and R receiving antennas of a MIMO-equipped device supporting OTFS communication should be configured so that the R receiving antennas receive different receiving antenna specific channel-convoluted stream identifiable OTFS data and pilot bursts with detectably different 2D channel states. This can be done by various methods including, for example, ensuring that a sufficiently large separation between the antennas so as to impart an ability for the receiving antennas to sense the directionality of the incoming wireless waveforms. Alternatively, the receiver may be configured so that it further keeps track of the relative phases of the incoming wireless waveforms.

During operation of the MIMO-equipped OTFS communication devices of FIGS. 59A-59C, each OTFS transmitter transmits (at most) T streams of data to an OTFS wireless receiver. The receiver's R receiving antennas are then used to receive the antenna specific channel-convoluted stream identifiable OTFS data and pilot bursts. For each wireless receiving antenna R and each stream identifiable plurality of OTFS pilot symbol waveforms, a processor (typically within the receiver) determines the 2D channel state at such receiving antenna and thereby determines various stream-specific 2D channel states. These stream-specific 2D channel states (e.g. the information in the stream specific 2D channel states) may then be used to deconvolute at least some of the antenna specific channel-convoluted stream identifiable OTFS data and pilot bursts at the receiver. This allows the OTFS receiver to determine an estimate of the data symbols within the data stream originally transmitted by the OTFS transmitter.

Transmitter Precoding

In some embodiments, the previously discussed 2D channel state and precoding methods may be further used to shape a spatial directionality of the wireless waveforms transmitted by the T uniquely configured transmitting antennas. Alternatively or additionally, the 2D channel state information and previously discussed 2D channel state assisted deconvolution methods may also be used to shape a spatial directionality of the wireless waveforms received by the R uniquely configured receiving antennas.

As one example, this spatial directionality may be achieved by using the transmitter processor to adjust any of relative phases or angles of the wireless waveforms transmitted by the T uniquely configured transmitting antennas. Alternatively or additionally, the spatial directionality of the wireless waveforms received by the R uniquely configured receiving antennas may be achieved by using the receiver processor to monitor the relative phases or angles of the wireless waveforms received by the R uniquely configured receiving antennas.

In some embodiments, the underlying structure of the 2D data channel (e.g. position of various reflectors, other channel imperfections) may be exploited to enable more than one stream of data at the same time. In this case an OTFS transmitter may transmit the same stream-identifiable OTFS data and pilot bursts through more than one antenna at the same time. In some embodiments a varying phase delay or other adjustment is introduced between the different antennas, thus providing directionality. The same principle may also be employed at the receiver. In such embodiments the transmitter does not configure the stream identifiable direct OTFS data and pilot bursts to be antenna identifiable and or antenna specific. Rather, each different transmitting antenna may transmit at least one stream (e.g. often more than one stream) of wireless OTFS data symbol waveforms along the at least one stream identifiable wireless OTFS pilot symbol waveform. For example, in such embodiments, each transmitting antenna may transmit at least one stream of wireless OTFS data symbol waveforms along with at least one stream identifiable wireless OTFS pilot symbol waveforms according to various transmitting antenna specific phases or power settings. This effectively introduces a spatial directionality to the wireless waveforms transmitted by those transmitting antennas sending the particular stream.

While various embodiments have been described above, it should be understood that they have been presented by way of example only, and not limitation. They are not intended to be exhaustive or to limit the claims to the precise forms disclosed. Indeed, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated.

Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded into one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of operating an Internet of things (IOT) device, the method comprising:
   receiving, from an IOT manager device, at least one orthogonal time frequency space (OTFS) pilot transmission;
   determining two-dimensional (2D) channel state information for a channel using the OTFS pilot transmission;
   determining, during operation in a low power mode, an OTFS transmission waveform using the 2D channel state information wherein the (2D) channel state information is with respect to a delay-Doppler channel domain and wherein, for a path delay $\tau$ in the channel and a Doppler shift $v$ in the channel, the impulse response $h(\tau, v)$ of the channel in the delay-Doppler channel domain is time-independent; and
   transmitting, during operation in a high power mode, the OTFS transmission waveform.

2. The method of claim 1 wherein the determining the OTFS transmission waveform includes precoding at least one OTFS data symbol using the 2D channel state information.

3. A method of operating an Internet of things (IOT) device, the method comprising:
   receiving, from an IOT manager device, at least one orthogonal time frequency space (OTFS) pilot transmission;
   determining two-dimensional (2D) channel state information for a channel using the at least one OTFS pilot transmission;
   operating a processor of the IOT device in a low power mode;
   creating, during operation in the low power mode, an OTFS waveform using an OTFS data symbol and the 2D channel state information wherein the 2D channel state information is with respect to a delay-Doppler channel domain and wherein, for a path delay $\tau$ in the channel and a Doppler shift $v$ in the channel, the impulse response $h(\tau, v)$ of the channel in the delay-Doppler channel domain is time-independent;

transitioning operation of the processor to a high power mode;

transmitting the OTFS waveform during the operation of the processor in the high power mode; and transitioning, after the transmitting, the processor to operation in the low power mode.

4. The method of claim 3 wherein the IOT device is included among a plurality of IOT devices in wireless communication with the IOT manager device and wherein the plurality of IOT devices are configured to transmit OTFS waveforms generated using OTFS data symbols occupying locations within an OTFS data frame uniquely corresponding to ones of the plurality of IOT devices.

5. The method of claim 4 wherein the IOT device includes a sensor, the method including performing an unscheduled OTFS data transmission in response to input provided by the sensor wherein the unscheduled OTFS data transmission is generated using an OTFS data symbol associated with a reserved location in the OTFS data frame different from the locations within the OTFS data frame uniquely corresponding to the ones of the plurality of IOT devices.

6. An Internet of things (IOT) device, comprising:
a transceiver configured to receive, from an IOT manager device, at least one orthogonal time frequency space (OTFS) pilot transmission;
a processor capable of operating in a low power mode and in a high power mode; and
a memory including program code executable by the processor, the program code including:
code for determining two-dimensional (2D) channel state information for a channel using the at least one OTFS pilot transmission;
code for determining, during operation of the processor in the low power mode, an OTFS transmission waveform using the 2D channel state information wherein the (2D) channel state information is with respect to a delay-Doppler channel domain and wherein, for a path delay $\tau$ in the channel and a Doppler shift $v$ in the channel, the impulse response $h(\tau, v)$ of the channel in the delay-Doppler channel domain is time independent;
code for causing the transceiver to transmit, during operation of the processor in the high power mode, the OTFS transmission waveform.

7. The IOT device of claim 6 wherein the code for determining includes code for precoding at least one OTFS data symbol using the 2D channel state information.

8. An Internet of things (IOT) device, comprising:
a wireless transceiver configured to receive, from an IOT manager device, at least one orthogonal time frequency space (OTFS) pilot transmission;
a processor capable of operating in a low power mode and in a high power mode; and
a memory including program code executable by the processor, the program code including:
code for determining two-dimensional (2D) channel state information for a channel using the at least one OTFS pilot transmission;
code for causing the processor to transition from operation in the low power mode to operation in the high power mode;
code for causing the wireless transceiver to transmit an OTFS waveform during the operation of the IOT device in the high power mode;
code for creating, during operation of the processor in the low power mode, the OTFS waveform using an OTFS data symbol and the 2D channel state information wherein the 2D channel state information is with respect to a delay-Doppler channel domain and wherein, for a path delay $\tau$ in the channel and a Doppler shift $v$ in the channel, the impulse response $h(\tau, v)$ of the channel in the delay-Doppler channel domain is time-independent;
code for causing processor to transition, after the transmitting, to operation in the low power mode.

9. The IOT device of claim 8 wherein the IOT device is included among a plurality of IOT devices in wireless communication with an IOT manager device and wherein the plurality of IOT devices are configured to transmit OTFS waveforms generated using OTFS data symbols occupying locations within an OTFS data frame uniquely corresponding to ones of the plurality of IOT devices.

10. The IOT device of claim 9 wherein the IOT device further includes a sensor and wherein the program code further includes code for performing an unscheduled OTFS data transmission in response to input provided by the sensor wherein the unscheduled OTFS data transmission is generated using an OTFS data symbol associated with a reserved location in the OTFS data frame different from the locations within the OTFS data frame uniquely corresponding to the ones of the plurality of IOT devices.

* * * * *